US012750621B2

(12) United States Patent
Dickins et al.

(10) Patent No.: US 12,750,621 B2
(45) Date of Patent: *Sep. 29, 2026

(54) COORDINATION OF AUDIO DEVICES

(71) Applicants: DOLBY LABORATORIES LICENSING CORPORATION, San Francisco, CA (US); Dolby International AB, Dublin (IE)

(72) Inventors: Glenn N. Dickins, Como (AU); Mark R.P. Thomas, Walnut Creek, CA (US); Alan J. Seefeldt, Alameda, CA (US); Joshua B. Lando, Mill Valley, CA (US); Daniel Arteaga, Barcelona (ES); Carlos Medaglia Dyonisio, Greystanes (AU); David Gunawan, Sydney (AU); Richard J. Cartwright, Killara (AU); Christopher Graham Hines, Sydney (AU)

(73) Assignees: DOLBY LABORATORIES LICENSING CORPORATION, San Francisco, CA (US); Dolby International AB, Dublin (IE)

( * ) Notice: Subject to any disclaimer, the term of this patent is extended or adjusted under 35 U.S.C. 154(b) by 63 days.

This patent is subject to a terminal disclaimer.

(21) Appl. No.: 18/415,544

(22) Filed: Jan. 17, 2024

(65) Prior Publication Data

US 2024/0163340 A1 May 16, 2024

Related U.S. Application Data

(63) Continuation of application No. 17/630,779, filed as application No. PCT/US2020/043795 on Jul. 28,
(Continued)

(30) Foreign Application Priority Data

Jul. 30, 2019 (ES) ............................... ES201930702
Dec. 18, 2019 (EP) .................................... 19217580

(51) Int. Cl.
*H04R 5/04* (2006.01)
*G06F 3/16* (2006.01)
(Continued)

(52) U.S. Cl.
CPC ............... *H04R 5/04* (2013.01); *G06F 3/165* (2013.01); *G06N 20/00* (2019.01); *G10L 15/08* (2013.01);
(Continued)

(58) Field of Classification Search
CPC ............... H04L 67/141; H04L 12/1813; H04L 12/1818; H04L 12/1822; H04L 12/1827;
(Continued)

(56) References Cited

U.S. PATENT DOCUMENTS 5,561,737 A 10/1996 Bowen
5,625,697 A 4/1997 Bowen
(Continued)

FOREIGN PATENT DOCUMENTS

CN 102474424 A 5/2012
CN 103703751 A 4/2014
(Continued)

OTHER PUBLICATIONS

Author: Unavailable: CheVolume Liberate your audio, Dec. 31, 2016, http://www.chevolume.com/.
(Continued)

*Primary Examiner* — Lun-See Lao

(57) ABSTRACT

An audio session management method may involve: determining, by an audio session manager, one or more first media engine capabilities of a first media engine of a first smart audio device, the first media engine being configured for managing one or more audio media streams received by the first smart audio device and for performing first smart audio device signal processing for the one or more audio
(Continued)

media streams according to a first media engine sample clock; receiving, by the audio session manager and via a first application communication link, first application control signals from the first application; and controlling the first smart audio device according to the first media engine capabilities, by the audio session manager, via first audio session management control signals transmitted to the first smart audio device via a first smart audio device communication link and without reference to the first media engine sample clock.

20 Claims, 67 Drawing Sheets

Related U.S. Application Data

2020, now Pat. No. 11,968,268, which is a continuation of application No. 16/929,215, filed on Jul. 15, 2020, now Pat. No. 11,659,332.

(60) Provisional application No. 62/705,884, filed on Jul. 20, 2020, provisional application No. 62/705,883, filed on Jul. 20, 2020, provisional application No. 62/705,410, filed on Jun. 25, 2020, provisional application No. 62/705,351, filed on Jun. 23, 2020, provisional application No. 62/705,143, filed on Jun. 12, 2020, provisional application No. 62/992,068, filed on Mar. 19, 2020, provisional application No. 62/971,421, filed on Feb. 7, 2020, provisional application No. 62/949,998, filed on Dec. 18, 2019, provisional application No. 62/880,121, filed on Jul. 30, 2019, provisional application No. 62/880,118, filed on Jul. 30, 2019, provisional application No. 62/880,114, filed on Jul. 30, 2019, provisional application No. 62/880,115, filed on Jul. 30, 2019.

(51) Int. Cl.

| | |
|---|---|
| ***G06N 20/00*** | (2019.01) |
| ***G10L 15/08*** | (2006.01) |
| ***H04L 67/141*** | (2022.01) |
| ***H04R 1/32*** | (2006.01) |
| ***H04R 1/40*** | (2006.01) |
| ***H04R 3/00*** | (2006.01) |
| ***H04R 3/12*** | (2006.01) |
| ***H04S 7/00*** | (2006.01) |

(52) U.S. Cl.

CPC ........... *H04L 67/141* (2013.01); *H04R 1/326* (2013.01); *H04R 1/403* (2013.01); *H04R 1/406* (2013.01); *H04R 3/005* (2013.01); *H04R 3/12* (2013.01); *H04S 7/303* (2013.01); *G10L 2015/088* (2013.01)

(58) Field of Classification Search

CPC ............. H04L 12/1831; H04L 12/1836; H04L 12/185; H04L 51/00; H04L 51/04; H04L 51/10; H04L 65/1101; H04L 65/4038; H04L 65/80; H04L 67/14; H04L 67/75; H04L 9/40; H04R 1/326; H04R 1/403; H04R 1/406; H04R 27/00; H04R 3/005; H04R 3/12; H04R 2227/005; H04R 2420/07; H04R 5/04; H04S 7/303; G06F 3/165; G10L 15/08; G10L 2015/088; H04M 2201/38; H04M 2203/5018; H04M 2203/5027; H04M 3/42221; H04M 3/42323; H04M 3/4285; H04M 3/5307; H04M 3/562; H04M 3/563; H04M 3/564; H04M 3/567; H04M 7/006; H04M 7/12; H04Q 2213/1305; H04Q 2213/13093; H04Q 2213/13175; H04Q 2213/1319; H04Q 2213/1322; H04Q 2213/1324; H04Q 2213/1326; H04Q 2213/1332; H04Q 2213/13337; H04Q 2213/13389

USPC ..................................... 381/95, 333; 700/94

See application file for complete search history.

(56) References Cited

U.S. PATENT DOCUMENTS

| | | | | |
|---|---|---|---|---|
| 7,333,622 | B2 | 2/2008 | Algazi | |
| 7,519,175 | B2 | 4/2009 | Suzuki | |
| 8,060,225 | B2 | 11/2011 | Hans | |
| 8,068,925 | B2 | 11/2011 | Mckillop | |
| 8,130,978 | B2 | 3/2012 | Sun | |
| 8,208,663 | B2 | 6/2012 | Jeong | |
| 8,296,366 | B2 | 10/2012 | Huai | |
| 8,330,794 | B2 | 12/2012 | Ramanathan | |
| 8,483,853 | B1 | 7/2013 | Lambourne | |
| 8,574,075 | B2 | 11/2013 | Dickins | |
| 8,831,761 | B2 | 9/2014 | Kemp | |
| 9,031,268 | B2 | 5/2015 | Fejzo | |
| 9,064,503 | B2 | 6/2015 | Dickins | |
| 9,086,475 | B2 | 7/2015 | Kleijn | |
| 9,113,239 | B2 | 8/2015 | Kim | |
| 9,124,965 | B2 | 9/2015 | Heiman | |
| 9,154,877 | B2 | 10/2015 | Kim | |
| 9,215,545 | B2 | 12/2015 | Dublin | |
| 9,264,806 | B2 | 2/2016 | Hyun | |
| 9,271,137 | B2 | 2/2016 | Chan | |
| 9,316,717 | B2 | 4/2016 | Gicklhorn | |
| 9,319,782 | B1 | 4/2016 | Crump | |
| 9,396,731 | B2 | 7/2016 | Herre | |
| 9,412,385 | B2 | 8/2016 | Sen | |
| 9,549,253 | B2 | 1/2017 | Alexandridis | |
| 9,646,620 | B1 | 5/2017 | Oh | |
| 9,652,196 | B2 | 5/2017 | Davis | |
| 9,679,610 | B2 | 6/2017 | Cohen | |
| 9,723,406 | B2 | 8/2017 | Le Nerriec | |
| 9,723,425 | B2 | 8/2017 | Fischer | |
| 9,813,804 | B2 | 11/2017 | Franck | |
| 9,886,234 | B2 | 2/2018 | Lin | |
| 9,900,694 | B1 | 2/2018 | List | |
| 9,913,067 | B2 | 3/2018 | Ojanperä | |
| 9,933,989 | B2 | 4/2018 | Tsingos | |
| 9,942,686 | B1 | 4/2018 | Family | |
| 9,955,253 | B1 | 4/2018 | Chavez | |
| 9,979,829 | B2 | 5/2018 | Cartwright | |
| 10,002,499 | B2 | 6/2018 | Brönmark | |
| 10,051,400 | B2 | 8/2018 | Mcgrath | |
| 10,074,373 | B2 | 9/2018 | Atti | |
| 10,075,791 | B2 | 9/2018 | Milne | |
| 10,080,088 | B1 | 9/2018 | Yang | |
| 10,096,325 | B2 | 10/2018 | Terentiv | |
| 10,097,902 | B2 | 10/2018 | Rajapakse | |
| 10,097,944 | B2 | 10/2018 | Christoph | |
| 10,142,758 | B2 | 11/2018 | Sikora | |
| 10,146,398 | B2 | 12/2018 | Madonna | |
| 10,152,297 | B1 | 12/2018 | Jordahl | |
| 10,157,033 | B2 | 12/2018 | Millington | |
| 10,324,684 | B2 | 6/2019 | Millington | |
| 10,334,384 | B2 | 6/2019 | Sun | |
| 10,387,108 | B2 | 8/2019 | Mcgibney | |
| 10,506,361 | B1 | 12/2019 | Pallamsetty | |
| 10,743,105 | B1 | 8/2020 | Gokarn | |
| 11,023,199 | B2 | 6/2021 | Lemmon | |
| 11,036,461 | B2 | 6/2021 | Triplett | |
| 2002/0072816 | A1 * | 6/2002 | Shdema | H04L 12/2805 381/77 |
| 2003/0088421 | A1 | 5/2003 | Maes | |
| 2003/0118200 | A1 | 6/2003 | Beaucoup | |
| 2005/0129254 | A1 | 6/2005 | Connor | |
| 2005/0138193 | A1 | 6/2005 | Encarnacion | |
| 2005/0289224 | A1 | 12/2005 | Deslippe | |

(56) References Cited

U.S. PATENT DOCUMENTS

| | | | | |
|---|---|---|---|---|
| 2009/0298420 | A1* | 12/2009 | Haartsen | H04J 3/0658 455/3.06 |
| 2010/0284389 | A1 | 11/2010 | Ramsay | |
| 2011/0125909 | A1 | 5/2011 | Maes | |
| 2011/0316996 | A1 | 12/2011 | Abe | |
| 2013/0013096 | A1 | 1/2013 | Seefeldt | |
| 2013/0052940 | A1 | 2/2013 | Brillhart | |
| 2014/0108558 | A1 | 4/2014 | Borzycki | |
| 2014/0172435 | A1 | 6/2014 | Thiergart | |
| 2015/0016642 | A1 | 1/2015 | Walsh | |
| 2015/0128194 | A1 | 5/2015 | Kuang | |
| 2015/0131966 | A1 | 5/2015 | Zurek | |
| 2015/0189425 | A1* | 7/2015 | Pang | H04R 3/00 381/77 |
| 2015/0222991 | A1 | 8/2015 | Ramos | |
| 2016/0104491 | A1 | 4/2016 | Lee | |
| 2016/0134988 | A1 | 5/2016 | Gorzel | |
| 2016/0142763 | A1 | 5/2016 | Kim | |
| 2016/0212559 | A1 | 7/2016 | Mateos Sole | |
| 2016/0337755 | A1 | 11/2016 | Bagby | |
| 2017/0012591 | A1 | 1/2017 | Rider | |
| 2017/0032793 | A1 | 2/2017 | Baumgarte | |
| 2017/0125023 | A1 | 5/2017 | Oh | |
| 2017/0156015 | A1 | 6/2017 | Stockhammer | |
| 2017/0280264 | A1 | 9/2017 | Wang | |
| 2017/0337048 | A1 | 11/2017 | Gunderson | |
| 2017/0374465 | A1 | 12/2017 | Family | |
| 2018/0060025 | A1 | 3/2018 | Hill | |
| 2018/0098112 | A1 | 4/2018 | Suyama | |
| 2018/0152803 | A1 | 5/2018 | Seefeldt | |
| 2018/0165054 | A1 | 6/2018 | Kang | |
| 2018/0167581 | A1 | 6/2018 | Goesnar | |
| 2018/0184199 | A1 | 6/2018 | Fontana | |
| 2018/0192223 | A1 | 7/2018 | Satheesh | |
| 2018/0249267 | A1 | 8/2018 | Klingler | |
| 2018/0352329 | A1 | 12/2018 | Klingler | |
| 2018/0357038 | A1 | 12/2018 | Olivieri | |
| 2019/0058948 | A1 | 2/2019 | Gupta | |
| 2019/0124458 | A1 | 4/2019 | Sheen | |
| 2019/0158974 | A1 | 5/2019 | Tsingos | |
| 2019/0166447 | A1 | 5/2019 | Seldess | |
| 2019/0213858 | A1 | 7/2019 | Kobayashi | |
| 2019/0239013 | A1 | 8/2019 | Audfray | |
| 2019/0306607 | A1 | 10/2019 | Clayton | |
| 2020/0351606 | A1 | 11/2020 | Seefeldt | |
| 2021/0058179 | A1* | 2/2021 | Bowler | H04W 52/0216 |

FOREIGN PATENT DOCUMENTS

| | | | |
|---|---|---|---|
| CN | 107896355 | A | 4/2018 |
| CN | 107948838 | A | 4/2018 |
| CN | 107950036 | A | 4/2018 |
| CN | 108293153 | A | 7/2018 |
| CN | 109361994 | A | 2/2019 |
| DE | 102013217367 | A1 | 12/2014 |
| EP | 1605637 | A2 | 12/2005 |
| EP | 3148224 | A2 | 3/2017 |
| EP | 2755373 | B1 | 8/2017 |
| EP | 3209034 | A1 | 8/2017 |
| EP | 3467819 | A1 | 4/2019 |
| EP | 3484184 | A1 | 5/2019 |
| EP | 3032847 | B1 | 1/2020 |
| EP | 3163849 | B1 | 6/2020 |
| EP | 3223542 | B1 | 4/2021 |
| GB | 2561844 | A | 10/2018 |
| JP | 2006033806 | A | 2/2006 |
| JP | 2016100741 | A | 5/2016 |
| JP | 2016528757 | A | 9/2016 |
| JP | 2019509679 | A | 4/2019 |
| KR | 100830039 | B1 | 5/2008 |
| WO | 2009086599 | A1 | 7/2009 |
| WO | 2009086602 | A1 | 7/2009 |
| WO | 2013049125 | A1 | 4/2013 |
| WO | 2014007724 | A1 | 1/2014 |
| WO | 2016048381 | A1 | 3/2016 |
| WO | 2017039632 | A1 | 3/2017 |
| WO | 2017118983 | A1 | 7/2017 |
| WO | 2017147935 | A1 | 9/2017 |
| WO | 2018064410 | A1 | 4/2018 |
| WO | 2018202324 | A1 | 11/2018 |
| WO | 19012131 | A1 | 1/2019 |
| WO | 2019067445 | A1 | 4/2019 |
| WO | 2019067620 | A1 | 4/2019 |
| WO | 2019089322 | A1 | 5/2019 |
| WO | 2019139991 | A1 | 7/2019 |
| WO | 2019246457 | A1 | 12/2019 |
| WO | WO/2021/021814 | A1 | 2/2021 |

OTHER PUBLICATIONS

Author: Unavailable, "Combine Multiple Audio Interfaces By Creating an Aggregate Device" Apple Support, Published on Oct. 17, 2017.

Ding Lei Audio processing and the application of sound reinforcement equipment of studio in Jiangyin Broadcasting and Television Center [J] . Audio Engineering , 2016, 40( 8) : 1-9. 10 pages.

Feifer, J. "Multiple Phones Into One Big Speaker System" Sep. 22, 2015.

Fink, G. et al."Acoustic microphone geometry calibration: An overview and experimental evaluation of state-of-the-art algorithms" published Jul. 2016, IEEE Signal Processing Society.

Fink, G. et al."Geometry calibration of distributed microphone arrays exploiting audio-visual correspondences" Sep. 2014, IEEE Conference Location: Lisbon, Portugal.

Lee, C.H. "Location-Aware Speakers for the Virtual Reality Environments" Feb. 2017, IEEE Access, vol. 5, pp. 2636-2640, 2017.

Nielsen, Jesper Kjoer "Loudspeaker and Listening Position Estimation Using Smart Speakers" IEEE International Conference on Acoustics, Speech and Signal Processing (ICASSP), Calgary, AB, 2018, pp. 81-85 Date of publication: Apr. 2018.

Papp, I. et L "Smart Audio/Video Playback Control Based on Presence Detection and User Localization in Home Environment" IEEE, published Jan. 2011.

Plinge, A. et al."Passive Online Geometry Calibration of Acoustic Sensor Networks" IEEE Signal Processing Letters, vol. 24, No. 3, Mar. 2017.

Walker, Matt, "Crowd Mics turns your Smartphone Into a Microphone" Jul. 22, 2014, Endless events.

Yin Jiping et al., Lightweight Audio and Video Engine for Android, Computer Systems Applications, 2015, vol. 24, Issue 12, 5 pages.

* cited by examiner

701

| | ID | APP | SOURCE | DEST. | PRIORITY | MODE | ACK. | QUALITY |
|---|---|---|---|---|---|---|---|---|
| 801 | 50 | 410 | SPOTIFY | ALEX | 4 | SYNCHRONIZED | NO | MUSIC |
| 802 | 51 | 811 | TIMER | ANGUS | 4 | SCHEDULED | YES | AUDIBILITY |
| 803 | 52 | 410 | - | BABY | 2 | SYNCHRONIZED | NO | INAUDIBILITY |
| 804 | 53 | 411 | PHONE | GEORGE | 3 | SYNCHRONIZED | NO | INTELLIGIBILITY |
| 805 | 54 | 412 | MESSAGE | RICHARD | 3 | TRANSACTIONAL | YES | INTELLIGIBILITY |
| 806 | 55 | 810 | FIRE ALARM | ALL | 1 | SYNCHRONIZED | NO | AUDIBILITY |

Figure 8

COORDINATION OF AUDIO DEVICES

CROSS REFERENCE TO RELATED APPLICATIONS

This application is the continuation of U.S. patent application Ser. No. 17/630,779, filed Jan. 27, 2022, which is the U.S. national stage entry of International Patent Application No. PCT/US2020/043795, filed Jul. 28, 2020, which claims priorities to the following:

U.S. Provisional Patent Application No. 62/949,998, filed Dec. 18, 2019;

U.S. Provisional Patent Application No. 62/992,068, filed Mar. 19, 2020;

European Patent Application No. 19217580.0, filed Dec. 18, 2019;

Spanish Patent Application No. P201930702, filed Jul. 30, 2019;

U.S. Provisional Patent Application No. 62/971,421, filed Feb. 7, 2020;

U.S. Provisional Patent Application No. 62/705,410, filed Jun. 25, 2020;

U.S. Provisional Patent Application No. 62/880,114, filed Jul. 30, 2019;

U.S. Provisional Patent Application No. 62/705,351, filed Jun. 23, 2020;

U.S. Provisional Patent Application No. 62/880,115, filed Jul. 30, 2019;

U.S. Provisional Patent Application No. 62/705,143, filed Jun. 12, 2020;

U.S. Provisional Patent Application No. 62/880,118, filed Jul. 30, 2019;

U.S. patent application Ser. No. 16/929,215, filed Jul. 15, 2020; Now U.S. Pat. No. 11,659,332;

U.S. Provisional Patent Application No. 62/705,883, filed Jul. 20, 2020;

U.S. Provisional Patent Application No. 62/880,121, filed Jul. 30, 2019; and

U.S. Provisional Patent Application No. 62/705,884, filed Jul. 20, 2020. Each of the mentioned applications is hereby incorporated by reference in its entirety.

TECHNICAL FIELD

This disclosure pertains to systems and methods for coordinating (orchestrating) and implementing audio devices, which may include smart audio devices.

BACKGROUND

Audio devices, including but not limited to smart audio devices, have been widely deployed and are becoming common features of many homes. Although existing systems and methods for controlling audio devices provide benefits, improved systems and methods would be desirable.

NOTATION AND NOMENCLATURE

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV) or a mobile phone) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications nm locally, including the application of watching television. Similarly, the audio input and output in a mobile phone may do many things, but these are serviced by the applications running on the phone. In this sense, a single-purpose audio device having speaker(s) and microphone(s)

is often configured to nm a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

SUMMARY

In a class of embodiments, audio devices (which may include smart audio devices) are coordinated using a Continuous Hierarchical Audio Session Manager (CHASM). In some disclosed implementations, at least some aspects of a CHASM may be implemented by what is referred to herein as a "smart home hub." According to some examples, the CHASM may be implemented by a particular device of an audio environment. In some instances, the CHASM may be implemented, at least in part, via software that may be executed by one or more devices of an audio environment. In some embodiments, a device (e.g., a smart audio device) includes a network-connectable element or subsystem (e.g., a network-connectable media engine and device property descriptor) sometimes referred to herein as a Discoverable Opportunistically Orchestrated Distributed Audio Subsystem (DOODAD), and a plurality (e.g., a large number) of devices (e.g., smart audio devices or other devices including DOODADS) are collectively managed by the CHASM, or conducted in another way that achieves orchestrated functionality (e.g., which supersedes that known or intended for the devices when first purchased). Herein we describe both an architecture of development, and a control language appropriate for expressing and controlling audio functionality of, a CHASM-enabled audio system. We also describe herein a Language of Orchestration and set out fundamental elements and differences of addressing a collective audio system without reference to the devices (or route) of the audio directly. We also describe persistent sessions, destinations, prioritization, and routing of audio and seeking acknowledgement that are particular to the idea of orchestration and routing audio to and from people and places.

Aspects of this disclosure include a system configured (e.g., programmed) to perform any embodiment of the disclosed methods or steps thereof, and a tangible, non-transitory, computer readable medium which implements non-transitory storage of data (for example, a disc or other tangible storage medium) which stores code for performing (e.g., code executable to perform) any embodiment of the disclosed methods or steps thereof. For example, some embodiments can be or include a programmable general purpose processor, digital signal processor, or microprocessor, programmed with software or firmware and/or otherwise configured to perform any of a variety of operations on data, according to the one or more of the disclosed methods or steps thereof. Such a general purpose processor may be or include a computer system including an input device, a memory, and a processing subsystem that is programmed (and/or otherwise configured) to perform more of the disclosed methods (or steps thereof) in response to data asserted thereto.

At least some aspects of the present disclosure may be implemented via methods. In some instances, the methods may be implemented, at least in part, by a control system such as those disclosed herein. Some such methods may involve audio session management for an audio system of an audio environment.

Some such methods involve establishing a first smart audio device communication link between an audio session manager and at least a first smart audio device of the audio system. In some examples, the first smart audio device is, or includes, either a single-purpose audio device or a multi-purpose audio device. In some such examples, the first smart audio device includes one or more loudspeakers. Some such methods involve establishing a first application communication link between the audio session manager and a first application device executing a first application.

Some such methods involve determining, by the audio session manager, one or more first media engine capabilities of a first media engine of the first smart audio device. In some examples, the first media engine is configured for managing one or more audio media streams received by the first smart audio device and for performing first smart audio device signal processing for the one or more audio media streams according to a first media engine sample clock.

In some such examples, the method involves receiving, by the audio session manager and via the first application communication link, first application control signals from the first application. Some such methods involve controlling the first smart audio device according to the first media engine capabilities. According to some implementations, the controlling is done by the audio session manager, via first audio session management control signals transmitted to the first smart audio device via the first smart audio device communication link. In some such examples, the audio session manager transmits the first audio session management control signals to the first smart audio device without reference to the first media engine sample clock.

In some implementations, the first application communication link may be established in response to a first route initiation request from the first application device. According to some examples, the first application control signals may be transmitted from the first application without reference to the first media engine sample clock. In some examples, the first audio session management control signals may cause the first smart audio device to delegate control of the first media engine to the audio session manager.

According to some examples, a device other than the audio session manager or the first smart audio device may be configured for executing the first application. However, in some instances the first smart audio device may be configured for executing the first application.

In some examples, the first smart audio device may include a specific purpose audio session manager. According to some such examples, the audio session manager may communicate with the specific purpose audio session manager via the first smart audio device communication link According to some such examples, the audio session manager may obtain the one or more first media engine capabilities from the specific purpose audio session manager.

According to some implementations, the audio session manager may act as a gateway for all applications controlling the first media engine, whether the applications are running on the first smart audio device or on another device.

Some such methods also may involve establishing at least a first audio stream corresponding to a first audio source. The first audio stream may include first audio signals. In some such examples, establishing at least the first audio stream may involve causing, via first audio session management control signals transmitted to the first smart audio device via the first smart audio device communication link, the first smart audio device to establish at least the first audio stream.

In some examples, such methods also may involve a rendering process that causes the first audio signals to be rendered to first rendered audio signals. In some examples, the rendering process may be performed by the first smart audio device in response to the first audio session management control signals.

Some such methods also may involve causing, via the first audio session management control signals, the first smart audio device to establish an inter-smart audio device communication link between the first smart audio device and each of one or more other smart audio devices of the audio environment. Some such methods also may involve causing the first smart audio device to transmit raw microphone signals, processed microphone signals, rendered audio signals and/or unrendered audio signals to the one or more other smart audio devices via the inter-smart audio device communication link or the inter-smart audio device communication links.

In some examples, such methods also may involve establishing a second smart audio device communication link between the audio session manager and at least a second smart audio device of the home audio system. The second smart audio device may be, or may include, either a single-purpose audio device or a multi-purpose audio device. The second smart audio device may include one or more microphones. Some such methods also may involve determining, by the audio session manager, one or more second media engine capabilities of a second media engine of the second smart audio device. The second media engine may be configured for receiving microphone data from the one or more microphones and for performing second smart audio device signal processing on the microphone data. Some such methods also may involve controlling the second smart audio device according to the second media engine capabilities, by the audio session manager, via second audio session manager control signals transmitted to the second smart audio device via the second smart audio device communication link.

According to some such examples, controlling the second smart audio device also may involve causing the second smart audio device to establish an inter-smart audio device communication link between the second smart audio device and the first smart audio device. In some examples, controlling the second smart audio device may involve causing the second smart audio device to transmit processed and/or unprocessed microphone data from the second media engine to the first media engine via the inter-smart audio device communication link.

In some examples, controlling the second smart audio device may involve receiving, by the audio session manager and via the first application communication link, first application control signals from the first application, and determining the second audio session manager control signals according to the first application control signals.

Alternatively, or additionally, some audio session management methods involve receiving, from a first device implementing a first application and by a device implementing an audio session manager, a first route initiation request to initiate a first route for a first audio session. In some examples, the first route initiation request indicates a first audio source and a first audio environment destination and the first audio environment destination corresponds with at least a first person in the audio environment, but the first audio environment destination does not indicate an audio device.

Some such methods involve establishing, by the device implementing the audio session manager, a first route corresponding to the first route initiation request. According to some examples, establishing the first route involves determining a first location of at least the first person in the audio environment, determining at least one audio device for a first stage of the first audio session and initiating or scheduling the first audio session.

According to some examples, the first route initiation request may include a first audio session priority. In some instances, the first route initiation request may include a first connectivity mode. For example, the first connectivity mode may be a synchronous connectivity mode, a transactional connectivity mode or a scheduled connectivity mode.

In some implementations, the first route initiation request may include an indication of whether an acknowledgement will be required from at least the first person. In some instances, the first route initiation request may include a first audio session goal. For example, the first audio session goal may include intelligibility, audio quality, spatial fidelity, audibility, inaudibility and/or privacy.

Some such methods may involve determining a first persistent unique audio session identifier for the first route. Such methods may involve transmitting the first persistent unique audio session identifier to the first device.

According to some examples, establishing the first route may involve causing at least one device in the environment to establish at least a first media stream corresponding to the first route, the first media stream including first audio signals. Some such methods may involve causing the first audio signals to be rendered to first rendered audio signals.

Some such methods may involve determining a first orientation of the first person for the first stage of the audio session. According to some such examples, causing the first audio signals to be rendered to first rendered audio signals may involve determining a first reference spatial mode corresponding to the first location and the first orientation of the first person, and determining first relative activation of loudspeakers in the audio environment corresponding to the first reference spatial mode.

Some such methods may involve determining a second location and/or a second orientation of the first person for a second stage of the first audio session. Some such methods may involve determining a second reference spatial mode corresponding to the second location and/or the second orientation, and determining second relative activation of loudspeakers in the audio environment corresponding to the second reference spatial mode.

According to some examples, a method may involve receiving, from a second device implementing a second application and by the device implementing the audio session manager, a second route initiation request to initiate a second route for a second audio session. The second route initiation request may indicate a second audio source and a second audio environment destination. The second audio environment destination may correspond with at least a second person in the audio environment. In some examples, the second audio environment destination does not indicate an audio device.

Some such methods may involve establishing, by the device implementing the audio session manager, a second route corresponding to the second route initiation request. In some implementations, establishing the second route may involve determining a first location of at least the second person in the audio environment, determining at least one audio device for a first stage of the second audio session and initiating the second audio session. In some examples, establishing the second route may involve establishing at least a second media stream corresponding to the second route, the second media stream including second audio signals. Some such methods may involve causing the second audio signals to be rendered to second rendered audio signals.

Some such methods may involve modifying a rendering process for the first audio signals based at least in part on at least one of the second audio signals, the second rendered audio signals or characteristics thereof, to produce modified first rendered audio signals. According to some examples, modifying the rendering process for the first audio signals may involve warping the rendering of first audio signals away from a rendering location of the second rendered audio signals. Alternatively, or additionally, modifying the rendering process for the first audio signals may involve modifying the loudness of one or more of the first rendered audio signals in response to a loudness of one or more of the second audio signals or the second rendered audio signals.

In some examples, the first route initiation request may indicate at least a first area of the audio environment as a first route source or a first route destination. In some implementations, the first route initiation request may indicate at least a first service (e.g., an online content-providing service, such as a music-providing service or a podcast-providing service) as the first audio source.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform one or more methods that involve audio session management for an audio system of an audio environment. Some such methods involve establishing a first smart audio device communication link between an audio session manager and at least a first smart audio device of the audio system. In some examples, the first smart audio device is, or includes, either a single-purpose audio device or a multi-purpose audio device. In some such examples, the first smart audio device includes one or more loudspeakers. Some such methods involve establishing a first application communication link between the audio session manager and a first application device executing a first application.

Some such methods involve determining, by the audio session manager, one or more first media engine capabilities of a first media engine of the first smart audio device. In some examples, the first media engine is configured for managing one or more audio media streams received by the first smart audio device and for performing first smart audio device signal processing for the one or more audio media streams according to a first media engine sample clock.

In some such examples, the method involves receiving, by the audio session manager and via the first application communication link, first application control signals from the first application. Some such methods involve controlling the first smart audio device according to the first media engine capabilities. According to some implementations, the controlling is done by the audio session manager, via first audio session management control signals transmitted to the first smart audio device via the first smart audio device communication link. In some such examples, the audio session manager transmits the first audio session management control signals to the first smart audio device without reference to the first media engine sample clock.

In some implementations, the first application communication link may be established in response to a first route initiation request from the first application device. According to some examples, the first application control signals may be transmitted from the first application without reference to the first media engine sample clock. In some examples, the first audio session management control signals may cause the first smart audio device to delegate control of the first media engine to the audio session manager.

According to some examples, a device other than the audio session manager or the first smart audio device may be configured for executing the first application. However, in some instances the first smart audio device may be configured for executing the first application.

In some examples, the first smart audio device may include a specific purpose audio session manager. According to some such examples, the audio session manager may communicate with the specific purpose audio session manager via the first smart audio device communication link According to some such examples, the audio session manager may obtain the one or more first media engine capabilities from the specific purpose audio session manager.

According to some implementations, the audio session manager may act as a gateway for all applications controlling the first media engine, whether the applications are running on the first smart audio device or on another device.

Some such methods also may involve establishing at least a first audio stream corresponding to a first audio source. The first audio stream may include first audio signals. In some such examples, establishing at least the first audio stream may involve causing, via first audio session management control signals transmitted to the first smart audio device via the first smart audio device communication link, the first smart audio device to establish at least the first audio stream.

In some examples, such methods also may involve a rendering process that causes the first audio signals to be rendered to first rendered audio signals. In some examples, the rendering process may be performed by the first smart audio device in response to the first audio session management control signals.

Some such methods also may involve causing, via the first audio session management control signals, the first smart audio device to establish an inter-smart audio device communication link between the first smart audio device and each of one or more other smart audio devices of the audio environment. Some such methods also may involve causing the first smart audio device to transmit raw microphone signals, processed microphone signals, rendered audio signals and/or unrendered audio signals to the one or more other smart audio devices via the inter-smart audio device communication link or the inter-smart audio device communication links.

In some examples, such methods also may involve establishing a second smart audio device communication link between the audio session manager and at least a second smart audio device of the home audio system. The second smart audio device may be, or may include, either a single-purpose audio device or a multi-purpose audio device. The second smart audio device may include one or more microphones. Some such methods also may involve determining, by the audio session manager, one or more second media engine capabilities of a second media engine of the second smart audio device. The second media engine may be configured for receiving microphone data from the one or more microphones and for performing second smart audio device signal processing on the microphone data. Some such methods also may involve controlling the second smart audio device according to the second media engine capabilities, by the audio session manager, via second audio session manager control signals transmitted to the second smart audio device via the second smart audio device communication link.

According to some such examples, controlling the second smart audio device also may involve causing the second smart audio device to establish an inter-smart audio device communication link between the second smart audio device and the first smart audio device. In some examples, controlling the second smart audio device may involve causing the second smart audio device to transmit processed and/or unprocessed microphone data from the second media engine to the first media engine via the inter-smart audio device communication link.

In some examples, controlling the second smart audio device may involve receiving, by the audio session manager and via the first application communication link, first application control signals from the first application, and determining the second audio session manager control signals according to the first application control signals.

Alternatively, or additionally, the software may include instructions for controlling one or more devices to perform one or more other methods that involve audio session management for an audio system of an audio environment. Some such audio session management methods involve receiving, from a first device implementing a first application and by a device implementing an audio session manager, a first route initiation request to initiate a first route for a first audio session. In some examples, the first route initiation request indicates a first audio source and a first audio environment destination and the first audio environment destination corresponds with at least a first person in the audio environment, but the first audio environment destination does not indicate an audio device.

Some such methods involve establishing, by the device implementing the audio session manager, a first route corresponding to the first route initiation request. According to some examples, establishing the first route involves determining a first location of at least the first person in the audio environment, determining at least one audio device for a first stage of the first audio session and initiating or scheduling the first audio session.

According to some examples, the first route initiation request may include a first audio session priority. In some instances, the first route initiation request may include a first connectivity mode. For example, the first connectivity mode may be a synchronous connectivity mode, a transactional connectivity mode or a scheduled connectivity mode.

In some implementations, the first route initiation request may include an indication of whether an acknowledgement will be required from at least the first person. In some instances, the first route initiation request may include a first audio session goal. For example, the first audio session goal may include intelligibility, audio quality, spatial fidelity, audibility, inaudibility and/or privacy.

Some such methods may involve determining a first persistent unique audio session identifier for the first route. Such methods may involve transmitting the first persistent unique audio session identifier to the first device.

According to some examples, establishing the first route may involve causing at least one device in the environment to establish at least a first media stream corresponding to the first route, the first media stream including first audio signals. Some such methods may involve causing the first audio signals to be rendered to first rendered audio signals.

Some such methods may involve determining a first orientation of the first person for the first stage of the audio session. According to some such examples, causing the first audio signals to be rendered to first rendered audio signals may involve determining a first reference spatial mode corresponding to the first location and the first orientation of the first person, and determining first relative activation of loudspeakers in the audio environment corresponding to the first reference spatial mode.

Some such methods may involve determining a second location and/or a second orientation of the first person for a second stage of the first audio session. Some such methods may involve determining a second reference spatial mode corresponding to the second location and/or the second orientation, and determining second relative activation of loudspeakers in the audio environment corresponding to the second reference spatial mode.

According to some examples, a method may involve receiving, from a second device implementing a second application and by the device implementing the audio session manager, a second route initiation request to initiate a second route for a second audio session. The second route initiation request may indicate a second audio source and a second audio environment destination. The second audio environment destination may correspond with at least a second person in the audio environment. In some examples, the second audio environment destination does not indicate an audio device.

Some such methods may involve establishing, by the device implementing the audio session manager, a second route corresponding to the second route initiation request. In some implementations, establishing the second route may involve determining a first location of at least the second person in the audio environment, determining at least one audio device for a first stage of the second audio session and initiating the second audio session. In some examples, establishing the second route may involve establishing at least a second media stream corresponding to the second route, the second media stream including second audio signals. Some such methods may involve causing the second audio signals to be rendered to second rendered audio signals.

Some such methods may involve modifying a rendering process for the first audio signals based at least in part on at least one of the second audio signals, the second rendered audio signals or characteristics thereof, to produce modified first rendered audio signals. According to some examples, modifying the rendering process for the first audio signals may involve warping the rendering of first audio signals away from a rendering location of the second rendered audio signals. Alternatively, or additionally, modifying the rendering process for the first audio signals may involve modifying the loudness of one or more of the first rendered audio signals in response to a loudness of one or more of the second audio signals or the second rendered audio signals.

In some examples, the first route initiation request may indicate at least a first area of the audio environment as a first route source or a first route destination. In some implementations, the first route initiation request may indicate at least a first service (e.g., an online content-providing service, such as a music-providing service or a podcast-providing service) as the first audio source.

In some implementations, an apparatus (or system) may include an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

In some implementations, the control system may be configured for implementing one or more of the methods disclosed herein. Some such methods may involve audio session management for an audio system of an audio environment. According to some such examples, the control system may be configured for implementing what may be referred to herein as an audio session manager.

Some such methods involve establishing a first smart audio device communication link between an audio session manager (e.g., a device that is implementing the audio session manager) and at least a first smart audio device of the audio system. In some examples, the first smart audio device is, or includes, either a single-purpose audio device or a multi-purpose audio device. In some such examples, the first smart audio device includes one or more loudspeakers. Some such methods involve establishing a first application communication link between the audio session manager and a first application device executing a first application.

Some such methods involve determining, by the audio session manager, one or more first media engine capabilities of a first media engine of the first smart audio device. In some examples, the first media engine is configured for managing one or more audio media streams received by the first smart audio device and for performing first smart audio device signal processing for the one or more audio media streams according to a first media engine sample clock.

In some such examples, the method involves receiving, by the audio session manager and via the first application communication link, first application control signals from the first application. Some such methods involve controlling the first smart audio device according to the first media engine capabilities. According to some implementations, the controlling is done by the audio session manager, via first audio session management control signals transmitted to the first smart audio device via the first smart audio device communication link. In some such examples, the audio session manager transmits the first audio session management control signals to the first smart audio device without reference to the first media engine sample clock.

In some implementations, the first application communication link may be established in response to a first route initiation request from the first application device. According to some examples, the first application control signals may be transmitted from the first application without reference to the first media engine sample clock. In some examples, the first audio session management control signals may cause the first smart audio device to delegate control of the first media engine to the audio session manager.

According to some examples, a device other than the audio session manager or the first smart audio device may be configured for executing the first application. However, in some instances the first smart audio device may be configured for executing the first application.

In some examples, the first smart audio device may include a specific purpose audio session manager. According to some such examples, the audio session manager may communicate with the specific purpose audio session manager via the first smart audio device communication link According to some such examples, the audio session manager may obtain the one or more first media engine capabilities from the specific purpose audio session manager.

According to some implementations, the audio session manager may act as a gateway for all applications controlling the first media engine, whether the applications are running on the first smart audio device or on another device.

Some such methods also may involve establishing at least a first audio stream corresponding to a first audio source. The first audio stream may include first audio signals. In some such examples, establishing at least the first audio stream may involve causing, via first audio session management control signals transmitted to the first smart audio device via the first smart audio device communication link, the first smart audio device to establish at least the first audio stream.

In some examples, such methods also may involve a rendering process that causes the first audio signals to be rendered to first rendered audio signals. In some examples, the rendering process may be performed by the first smart audio device in response to the first audio session management control signals.

Some such methods also may involve causing, via the first audio session management control signals, the first smart audio device to establish an inter-smart audio device communication link between the first smart audio device and each of one or more other smart audio devices of the audio environment. Some such methods also may involve causing the first smart audio device to transmit raw microphone signals, processed microphone signals, rendered audio signals and/or unrendered audio signals to the one or more other smart audio devices via the inter-smart audio device communication link or the inter-smart audio device communication links.

In some examples, such methods also may involve establishing a second smart audio device communication link between the audio session manager and at least a second smart audio device of the home audio system. The second smart audio device may be, or may include, either a single-purpose audio device or a multi-purpose audio device. The second smart audio device may include one or more microphones. Some such methods also may involve determining, by the audio session manager, one or more second media engine capabilities of a second media engine of the second smart audio device. The second media engine may be configured for receiving microphone data from the one or more microphones and for performing second smart audio device signal processing on the microphone data. Some such methods also may involve controlling the second smart audio device according to the second media engine capabilities, by the audio session manager, via second audio session manager control signals transmitted to the second smart audio device via the second smart audio device communication link.

According to some such examples, controlling the second smart audio device also may involve causing the second smart audio device to establish an inter-smart audio device communication link between the second smart audio device and the first smart audio device. In some examples, controlling the second smart audio device may involve causing the second smart audio device to transmit processed and/or unprocessed microphone data from the second media engine to the first media engine via the inter-smart audio device communication link.

In some examples, controlling the second smart audio device may involve receiving, by the audio session manager and via the first application communication link, first application control signals from the first application, and determining the second audio session manager control signals according to the first application control signals.

Alternatively, or additionally, the control system may be configured for implementing one or more other audio session management methods. Some such audio session management methods involve receiving, from a first device implementing a first application and by a device implementing an audio session manager, a first route initiation request to initiate a first route for a first audio session. In some examples, the first route initiation request indicates a first audio source and a first audio environment destination and the first audio environment destination corresponds with at least a first person in the audio environment, but the first audio environment destination does not indicate an audio device.

Some such methods involve establishing, by the device implementing the audio session manager, a first route corresponding to the first route initiation request. According to some examples, establishing the first route involves determining a first location of at least the first person in the audio environment, determining at least one audio device for a first stage of the first audio session and initiating or scheduling the first audio session.

According to some examples, the first route initiation request may include a first audio session priority. In some instances, the first route initiation request may include a first connectivity mode. For example, the first connectivity mode may be a synchronous connectivity mode, a transactional connectivity mode or a scheduled connectivity mode.

In some implementations, the first route initiation request may include an indication of whether an acknowledgement will be required from at least the first person. In some instances, the first route initiation request may include a first audio session goal. For example, the first audio session goal may include intelligibility, audio quality, spatial fidelity, audibility, inaudibility and/or privacy.

Some such methods may involve determining a first persistent unique audio session identifier for the first route. Such methods may involve transmitting the first persistent unique audio session identifier to the first device.

According to some examples, establishing the first route may involve causing at least one device in the environment to establish at least a first media stream corresponding to the first route, the first media stream including first audio signals. Some such methods may involve causing the first audio signals to be rendered to first rendered audio signals.

Some such methods may involve determining a first orientation of the first person for the first stage of the audio session. According to some such examples, causing the first audio signals to be rendered to first rendered audio signals may involve determining a first reference spatial mode corresponding to the first location and the first orientation of the first person, and determining first relative activation of loudspeakers in the audio environment corresponding to the first reference spatial mode.

Some such methods may involve determining a second location and/or a second orientation of the first person for a second stage of the first audio session. Some such methods may involve determining a second reference spatial mode corresponding to the second location and/or the second orientation, and determining second relative activation of loudspeakers in the audio environment corresponding to the second reference spatial mode.

According to some examples, a method may involve receiving, from a second device implementing a second application and by the device implementing the audio session manager, a second route initiation request to initiate a second route for a second audio session. The second route initiation request may indicate a second audio source and a second audio environment destination. The second audio environment destination may correspond with at least a second person in the audio environment. In some examples, the second audio environment destination does not indicate an audio device.

Some such methods may involve establishing, by the device implementing the audio session manager, a second route corresponding to the second route initiation request. In some implementations, establishing the second route may involve determining a first location of at least the second person in the audio environment, determining at least one audio device for a first stage of the second audio session and initiating the second audio session. In some examples, establishing the second route may involve establishing at least a second media stream corresponding to the second route, the second media stream including second audio signals. Some such methods may involve causing the second audio signals to be rendered to second rendered audio signals.

Some such methods may involve modifying a rendering process for the first audio signals based at least in part on at least one of the second audio signals, the second rendered audio signals or characteristics thereof, to produce modified first rendered audio signals. According to some examples, modifying the rendering process for the first audio signals may involve warping the rendering of first audio signals away from a rendering location of the second rendered audio signals. Alternatively, or additionally, modifying the rendering process for the first audio signals may involve modifying the loudness of one or more of the first rendered audio signals in response to a loudness of one or more of the second audio signals or the second rendered audio signals.

In some examples, the first route initiation request may indicate at least a first area of the audio environment as a first route source or a first route destination. In some implementations, the first route initiation request may indicate at least a first service (e.g., an online content-providing service, such as a music-providing service or a podcast-providing service) as the first audio source.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 8 shows details of the routing table shown in FIG. 7 according to one example.

DETAILED DESCRIPTION OF EMBODIMENTS

Figure 1A:
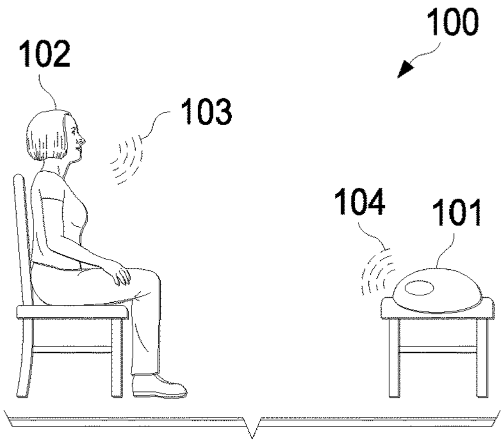
FIG. 1A shows an example of a person and a smart audio device in an audio environment.

Many embodiments are disclosed. It will be apparent to those of ordinary skill in the art from the present disclosure how to implement them.

At present, designers consider audio devices as a single point of interface for audio that may be a blend of entertainment, communications and information services. Using audio for notifications and voice control has the advantage of avoiding visual or physical intrusion. The expanding device landscape is fragmented with more systems competing for our one pair of ears. With wearable augmented audio starting to become available, things do not seem to be converging towards enabling the ideal pervasive audio personal assistant, and it has not been possible to use the multitude of devices around us for seamless capture, connectivity and communications.

It would be useful to develop a service to bridge devices, and better manage location, context, content, timing and user preference. Together, a set of standards, infrastructure and APIs could enable better access to a consolidated access to the one audio space around a user. We contemplate a kind of operating system for audio devices that manages the basic audio input output and allows connectivity of our audio devices to particular applications. This thinking and design creates a scaffold of interactive audio transport, for example, to provide a service that allows rapid organic development of improvements and provides device-independent audio connectivity for others.

The spectrum of audio interaction includes real time communications, asynchronous chat, alerts, transcriptions, history, archive, music, recommendations, reminders, promotion and context aware assistance. Herein we disclose a platform that facilitates a unified approach and may implement an intelligent media format. The platform may include or implement ubiquitous wearable audio, and/or may implement locating of a user, selecting single or multiple (e.g., collective) audio devices for best use, managing identity, privacy, timeliness, geolocation and/or the infrastructure for transport, storage, retrieval and algorithmic execution. Some aspects of the present disclosure may include identity, priorities (rank) and respecting the preferences of a user, e.g., managing the desirability of hearing and the value of being heard. The cost of unwanted audio is high. We contemplate that an 'internet of audio' may provide or implement an integral element of security and trust.

Although the categories of single-purpose audio device and multi-purpose audio device are not strictly orthogonal, the speaker(s) and microphone(s) of an audio device (e.g., a smart audio device) may be assigned to functions that are either enabled by or attached to (or implemented by) a smart audio device. However, there is typically not a sense in which the audio device's speaker(s) and/or microphone(s), considered individually (distinct from the audio device), may be added to a collective.

We describe herein a category of audio device connectivity in which the local audio devices (each of which may include speakers and microphones) are advertised and made available for a collective audio platform which exists in an abstract sense independent of any one of the local audio devices. We also describe embodiments including at least one Discoverable Opportunistic Orchestrated Distributed Audio Device Subsystem (DOODAD), which implement a design approach and collection of steps towards realising this idea of collective audio device orchestration and utilization.

A simple example will be described with reference to FIG. 1A to demonstrate the applications and results of some embodiments of this disclosure.

FIG. 1A shows an example of a person and a smart audio device in an audio environment. In this example, the audio environment 100 is a home audio environment.

In the scenario of FIG. 1A, a person (102) has a smart audio device (101) that is capable of capturing the user's voice (103) with its microphone and is capable of speaker playback (104). The user may be speaking a fair distance away from device 101, which limits the duplex capabilities of the device 101.

In FIG. 1A, the labeled elements are:

100. An audio environment depicting an example scenario of use of a smart audio device. Person 102 sitting on a chair is interacting with device 101.

101. Smart audio device capable of audio playback through speaker(s) and audio capture from microphone (s).

102. Person (also referred to as a user or listener) participating in an audio experience using device 101.

103. Sound uttered by person 102 speaking to device 101.

104. Audio playing back from the speaker(s) of device 101.

Accordingly, in this example FIG. 1A is a diagram of a person (102) at home with a smart audio device (101), which in this case is a phone device for communication. Device 101 is able to output audio heard by the person 102, and also to capture sound (103) from the person 102. The device 101 is, however, some distance from the person 102, so the microphones on the device 101 have the challenge of hearing the person 102 over the audio being output by the device 101—a challenge known as the echo problem. The established art of solving this problem typically employs echo cancellation, a form of processing that is severely limited by full duplex activity (double talk, or audio simultaneously in both directions).

Figure 1B:
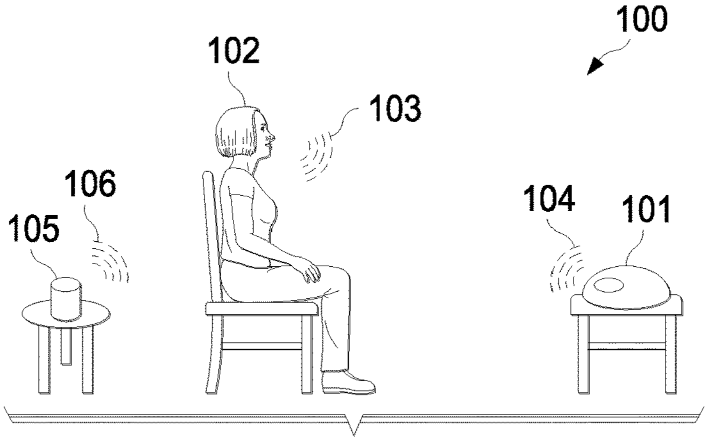
FIG. 1B is a diagram of a modified version of the FIG. 1A scenario.

FIG. 1B is a diagram of a modified version of the FIG. 1A scenario. In this example, a second smart audio device (105) is also in the audio environment 100. Smart audio device 105 sits near the person 102 but is designed towards the function of outputting audio. In some examples, the smart audio device 105 may implement, at least in part, a virtual assistant.

The person 102 (of FIG. 1A) has now obtained a second smart audio device 105, but device 105 (shown in FIG. 1B) is only capable of performing a specific purpose (106) that is completely separate from the purpose of the first device (101). In this example, the two smart audio devices (101 and 105) are incapable of sharing information and orchestrating the experience despite being in the same acoustic space as the user.

In FIG. 1B, the labeled elements are:

100-104. See FIG. 1A.

105. Additional smart audio device capable of audio playback through speaker(s) and audio capture from microphone(s).

106. Playback of audio through the speaker(s) of device 105.

While it may be possible to pair or shift the audio call from the phone (101) to this smart audio device (105), this was previously not possible without user intervention and detailed configuration. Accordingly, the scenario depicted in FIG. 1B is of two independent audio devices, each performing a very specific application. In this example, the smart audio device 105 was purchased more recently than the device 100. The smart audio device (105) was purchased for, and out of the box is only useful for, its specific purpose(s), and does not immediately add value to the device (101) that was already present in the audio environment 100 and in use as a communications device.

Figure 1C:
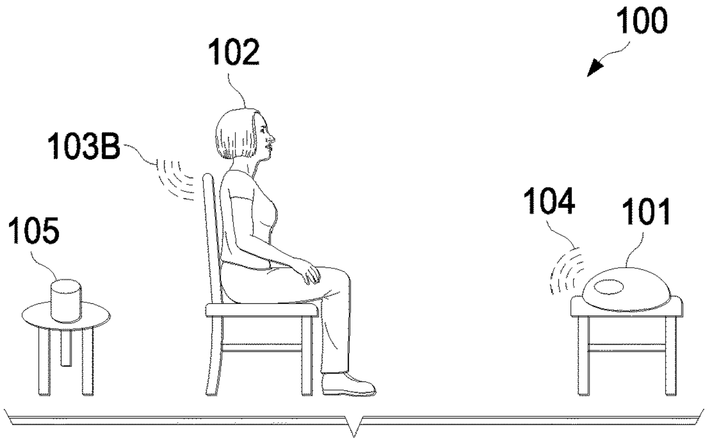
FIG. 1C is in accordance with an embodiment of the present disclosure.

FIG. 1C is in accordance with an embodiment of the present disclosure. In this example, the smart audio device 105 was purchased more recently than the smart audio device 100.

In the embodiment of FIG. 1C, smart audio devices 101 and 105 are capable of orchestration. In this example of orchestration, the smart audio device (105) is better positioned to pick up the voice (103B) of the person 102 for a telephone call involving the smart audio device (101) as smart audio device 101 plays sound 104 from its speaker(s).

In FIG. 1C, the labeled elements are:

100-104. See FIG. 1A.

105. See FIG. 1B.

103B. Sound uttered by the person 102 is better captured by the smart audio device (105), because the microphone(s) of the smart audio device (105) are closer to the user.

In FIG. 1C, new smart audio device 105 is detected in some way (examples of which are described herein) such that the microphone in device 105 can function towards supporting the application that was running on the smart audio device (101). New smart audio device 105 of FIG. 1C in a sense is coordinated or orchestrated with device 101 of FIG. 1C (in accordance with some aspects of this disclosure) in such a way that the proximity of the smart audio device 105 to the person 102 is detected and appreciated opportunistically as a superior microphone for the situation depicted in FIG. 1C. In FIG. 1C, audio 104 is coming out of the relatively more distant speaker phone 101; however, the audio 103B to be transmitted to the phone 101 is captured by the local smart audio device 105. In some embodiments, this opportunistic usage of components of different smart audio devices is made possible without the phone 101 and/or an application being used to provide the telephone call knowing the complexity of routing and capabilities of the smart audio device 105. Rather, in some such examples, a hierarchical system may be implemented for discovery, routing and utilization of such capabilities.

Later, we describe in more detail the concept of an abstract Continuous Hierarchical Audio Session Manager (CHASM), some implementations of which are able to provide audio capabilities to an application without the application needing to know the full details of managing devices, device connectivity, simultaneous device usage, and/or device levelling and tuning. In some sense, this approach sees that a device normally running the application (and having at least one speaker and at least one microphone) is relinquishing control of the audio experience. However, in a situation where the number of speakers and importantly microphones in a room vastly outnumbers the number of people, we see that the solution to many problems of audio may include the step of locating the device nearest to the relevant person—which may not be the device normally used for such an application.

One way to think about audio transducers (speakers and microphones) is that they can implement one step in the route for audio coming from a person's mouth to applications, and a return step in the route from the applications to the person's ears. In this sense we can see that any application with a need to deliver or capture audio from a user can be improved (or at least not made any worse) by taking opportunistic advantage of devices and interfacing with the audio subsystem on any device to output or obtain input audio. Such decisions and routing may, in some examples, be made in a continuous fashion, as devices and the user move or become available or removed from the system. In this respect, the Continuous Hierarchical Audio Session Manager (CHASM) disclosed herein is useful. In some implementations, Discoverable Opportunistically Orchestrated Distributed Audio Device Subsystems (DOODADs) can be included in a CHASM as a collective, or DOODADs can be used with a CHASM as a collective.

Some disclosed embodiments implement the concept of a collective audio system designed for routing audio to and from people and places. This is a departure from conventional "device-centric" designs which generally are concerned with inputting and outputting audio from a device and then collectively managing devices.

With reference to FIGS. 2A-2D, we next describe some example embodiments of this disclosure. We start with a device that has a communications function. In this case, for example, consider a doorbell audio intercom device, that when activated starts a local application that creates a full duplex audio link from the local device to some remote user. The basic functionality of the device in this mode is to manage a speaker, a microphone, and relay speaker signals and microphone signals over a bidirectional network stream, which may be referred to herein as a "link."

Figure 2A:
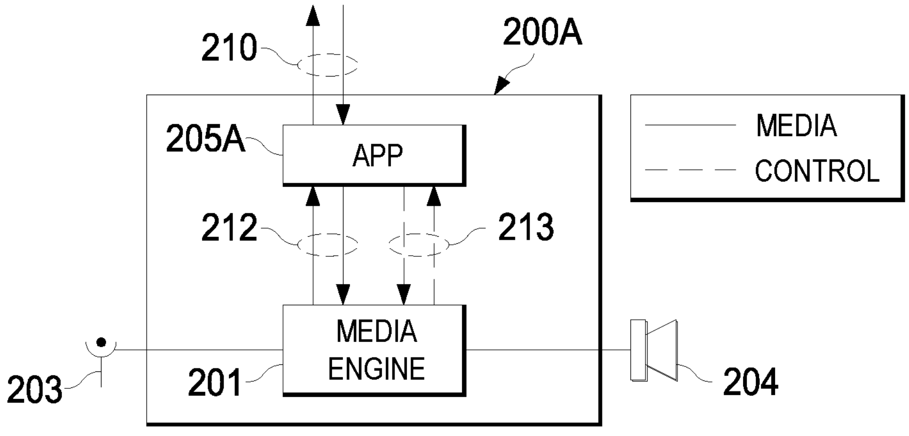
FIG. 2A is a block diagram of a conventional system.

FIG. 2A is a block diagram of a conventional system. In this example, the operation of smart audio device 200A, involves an application (205A) sending media (212) and control information (213) to and from a media engine (201). The media engine 201 and the application 205A may both be implemented by a control system of the smart audio device 200A. According to this example, the media engine 201 is responsible for managing the audio inputs (203) and outputs (204) and may be configured for signal processing and other real-time audio tasks. Application 205A may also have other network input and output connectivity (210).

In FIG. 2A, the labeled elements are:

200A. Specific purpose smart audio device.

201. Media Engine responsible for managing the real-time audio media streams that come in from application 205A and signal processing for microphone input/s and speaker output's. Examples of the signal processing may include: Acoustic echo cancellation, automatic gain control, wakeword detection, limiter, noise suppression, dynamic beamforming, speech recognition, encoding/decoding into lossy formats, voice activity detection and other classifiers, etc. In this context, the phrase "real-time" may, for example, refer to the requirement for processing of blocks of audio to be completed within the time it takes to sample a block of audio from the Analog to Digital Converter (ADC) implemented by device 200A. For example, a block of audio, in a particular implementation, may be 10-20 ms in length, and may contain 480-960 consecutive samples sampled at 48000 samples per second.

203. Microphone input/s. Input from one or more microphones capable of sensing acoustic information that are interfaced to the media engine (201) by a plurality of ADCs.

204. Speaker output's. Input from one or more speakers capable of reproducing acoustic energy that is/are interfaced to the media engine (201) by a plurality of Digital to Analog Convertors (DACs) and/or amplifiers.

205A. Application ('app") running on device 200A, which handles the media coming from and going to the network and is responsible for sending and receiving media streams to and from media engine 201. In this example, the app 205A also manages control information sent and received by the media engine. Examples of apps 205A include:

Control logic in a webcam that connects to the internet and streams packets from a microphone to a web service;

A conference phone that interfaces with a user via a touchscreen enabling them to dial telephone numbers, browse the contacts list, change volume, initiate and terminate calls; and A voice driven application in a smart speaker that enables the playback of music from a library of songs.

210. An optional network connection which connects device 200A to a network (e.g., to the Internet via Wi-Fi or Ethernet or 4G/5G cellular radio). The network may carry streaming media traffic.

212. Media streamed to and from the media engine (201). For example, the app 205A in a specific purpose teleconferencing device may receive Real-time Transport Protocol (RTP) packets from the network (210), remove the header and forward the G.711 payload to the media engine 201 for processing and playback. In some such examples, the app 205A may be responsible for receiving the G.711 stream from the media engine 201 and packing the RTP packets for upstream delivery over the network (210).

213. Control signals sent to and from the app 205A to control the media engine (201). For example, when a user presses the volume up button on a user interface, the app 205A sends control information to the media engine 201 to amplify the playback signal (204). In the specific-purpose device 200A, control of the media engine (201) only comes from the local app (205A) with no ability to control the media engine externally.

Figure 2B:
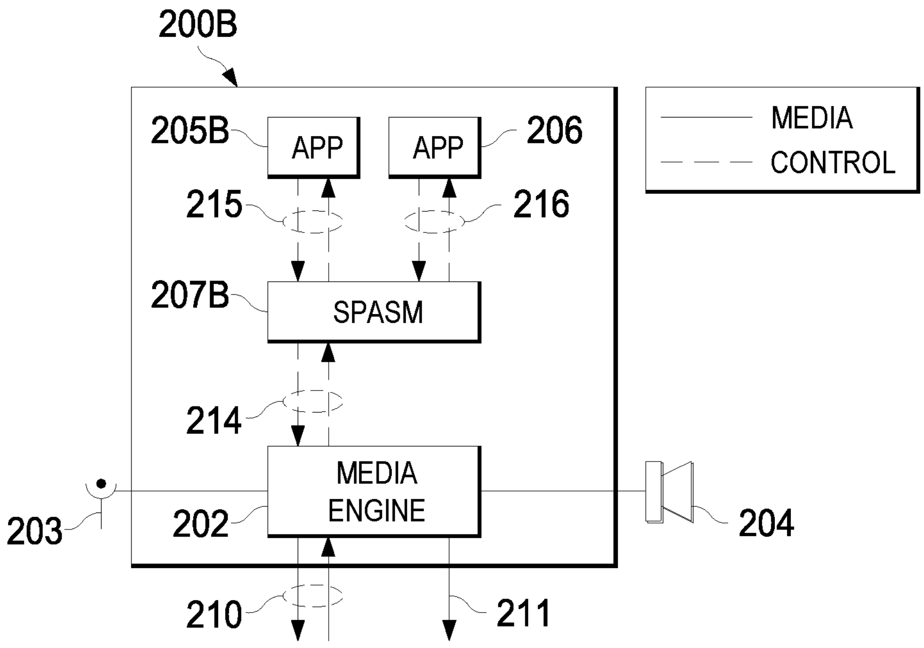
FIG. 2B shows an example of a modified version of the device shown in FIG. 2A.

FIG. 2B shows an example of a modified version of the device shown in FIG. 2A. The audio device 200B is capable of executing a second application. For example, the second application may be one that continuously streams audio from the doorbell device for a security system. In this case, the same audio subsystem (described with reference to FIG. 2A) could be used, with a second application that controls a network stream that is only single-direction.

In this example, FIG. 2B is a block diagram of a specific purpose smart audio device (200B) that is capable of hosting two applications or "apps" (app 205B and app 206) that send information to media engine 202 (of device 200B) via a Specific Purpose Audio Session Manager (SPASM). With the SPASM as the interface to the apps 205B and 206, network media is now able to flow directly to the media engine 202, where media 210 is the media to and from the first app (206) and media 211 is the media for the second app (205B).

Herein, we use the term SPASM (or specific-purpose audio session manager) to denote an element or subsystem (of a device) which is configured to implement an audio chain for a single type of functionality that the device was manufactured to provide. A SPASM may need to be reconfigured (e.g., including by tearing down the whole audio system) to implement a change of operating mode of the device. For example, audio in most laptops is implemented as or using a SPASM, where the SPASM is configured (and reconfigurable) to implement any desired single-purpose audio chain for a specific function.

In FIG. 2B, the labeled elements are:

200B. Smart audio device with a Specific Purpose Audio Session Manager (SPASM) 207B hosting two apps (app 205B, and app 206)

202-204. See FIG. 2A.

205B, 206. Apps running on local device 200B.

207B. Specific Purpose Audio Session Manager responsible for managing the audio processing and exposing the capabilities of the media engine (202) of device 200B. The delineation between each app (206 or 205B) and the SPASM 207B indicates how different apps may want to use different audio capabilities (e.g., the apps may need different sample rates or different number(s) of inputs and outputs), all of which audio capabilities the SPASM exposes and manages for different apps. A limitation of the SPASM is that it is designed for a specific purpose and is only capable of performing operations that it knows about.

210. Media information streamed to and from a network for the first app (205B). The SPASM (207B) allows the flow of media to be streamed directly to the media engine (202)

211. Media information streamed to a network for the second app (206). In this example, the app 206 does not have any media stream to receive.

214. Control information sent to and from the SPASM (207B) and the media engine (202) to manage the functionality of the media engine.

215, 216. Control information sent to and from the apps (205B, 206) and the SPASM (207B).

Inclusion of SPASM 207B as a separate subsystem of device 200B of FIG. 2B may seem to implement an artificial step in design. In fact, it does involve what would be unnecessary work from the perspective of a single-purpose audio device design. Much of the value of a CHASM (to be described below) is enabled as a network effect, which (in a sense) scales as the square of the number of nodes in the network. However, including a SPASM (e.g., SPASM 207B of FIG. 2B) in a smart audio device does have merit and value, including the following:

The abstraction of the control by the SPASM 207B more easily allows for multiple applications to run on the same device;

The SPASM 207B is closely coupled to the audio devices, and by bringing the network stream connectivity directly to the SPASM 207B we reduce the latency between the audio data over the network and the physical input and output sound. For example, the SPASM 207B may be present at a lower layer (such as a lower OSI or TCP/IP layer) in the smart audio device 200B, closer to a device driver/data link layer or down in the physical hardware layer. If the SPASM 207B were implemented at a higher layer, e.g., implemented as an application running inside the device operating system, such an implementation would be likely to incur a latency penalty because the audio data would need to be copied from a low-level layer through the operating system back up to the application layer. A potentially worse feature of such implementations is that the latency may be variable or unpredictable;

This design is now ready for greater interconnectivity at a lower audio level, prior to the application level.

In a smart audio device whose operating system runs a SPASM, in some examples many apps may obtain shared access to the speaker(s) and microphone(s) of the smart audio device. By introducing a SPASM that does not need to send or receive the audio stream(s), according to some examples a media engine may be optimized for very low latency because the media engine is separated from the control logic. A device having a SPASM may allow applications to establish additional streams of media (e.g., the media streams 210 and 211 of FIG. 2B. This benefit results from separating media engine functionality from the control logic of a SPASM. This configuration is in contrast to the situation shown in FIGS. 1A and 2A, in which the media engines are application-specific and standalone. In these examples, the devices were not designed it to have the additional low-latency connectivity to/from additional devices that is enabled by including a SPASM, e.g., as shown in FIG. 2B. In some such examples, if devices such as those shown in FIGS. 1A and 2A were designed to be stand-alone, it might not be feasible to simply, e.g., update the application 205A to provide orchestration. However, in some examples, the device 200B is designed to be orchestration-ready.

Figure 2C:
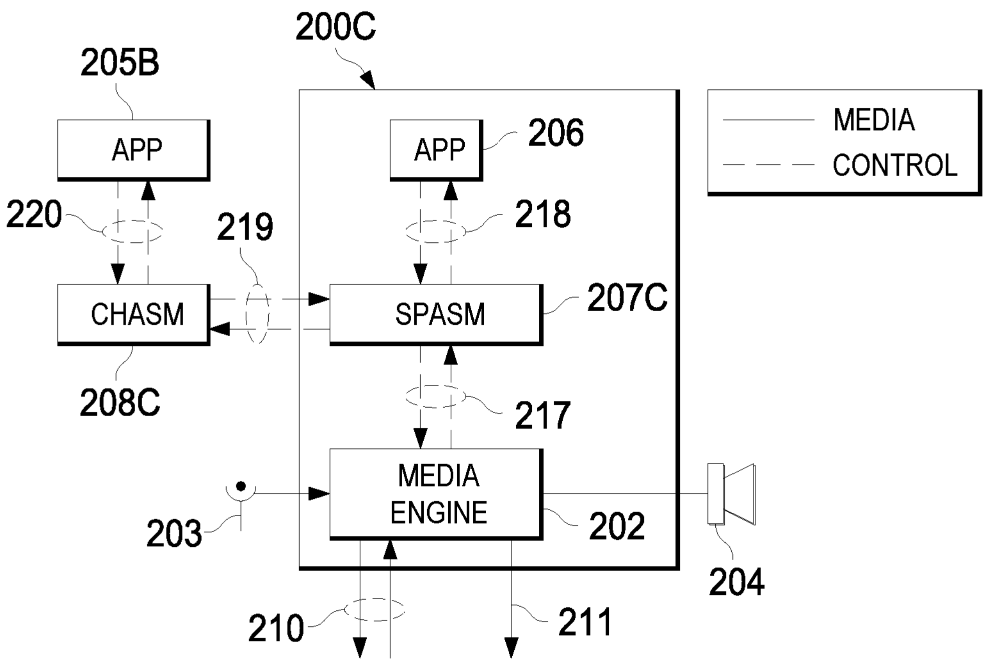
FIG. 2C is a block diagram of an example of one disclosed implementation.

With reference to FIG. 2C, we next describe an aspect of some disclosed embodiments of a SPASM (of a smart audio device) itself advertising and allowing control. This may allow other devices and/or systems in the network to be able to utilize a protocol to better understand the audio capabilities of a device, and where applicable from security and use ability perspective, may allow the connection of audio streams directly to that device to be played out the speaker(s) or sourced from the microphone(s). In this case, we see that a second application, for setting up the ability to stream audio continuously from the device, does not need to have an application running locally in order to control the media engine (e.g., 202) to stream out, e.g., the surveillance stream referenced above (e.g., 211).

FIG. 2C is a block diagram of an example of one disclosed implementation. In this example, at least one app (e.g., app 205B of FIG. 2C) of two or more apps is implemented by a device other than the smart audio device 200C, e.g., e.g., by one or more servers implementing a cloud-based service, by another device in the audio environment in which the smart audio device 200C resides, etc. Accordingly, another controller (in this example, the CHASM 208C of FIG. 2C) is required to manage the audio experience. In this implementation, the CHASM 208C is a controller bridging the gap between remote app(s) and smart audio device (200C) having audio capabilities. In various embodiments, a CHASM (e.g., CHASM 208C of FIG. 2C) may be implemented as a device, or as a subsystem (e.g., implemented in software) of a device, where the device which is or includes the CHASM is distinct from one or more (e.g., many) smart audio devices. However, in some implementations a CHASM may be implemented via software that could potentially be executed by one or more devices of an audio environment. In some such implementations, a CHASM may be implemented via software that could potentially be executed by one or more one or more smart audio devices of an audio environment. In FIG. 2C, CHASM 208C coordinates with device 200C's SPASM (i.e., SPASM 207C of FIG. 2C) to gain access to the media engine (202) which controls device 200C's audio inputs (203) and outputs (204).

Herein we use the term "CHASM" to denote a manager (e.g., a device which is or implements an audio session manager, e.g., an ongoing audio session manager) to which a number (e.g., a collection) of devices (which may include, but are not limited to, smart audio devices) can make themselves available. According to some implementations, a CHASM can continuously (at least during a time during which what is referred to herein as a "route" is implemented) adjust routing and signal processing for at least one software application. The application may, or may not, be implemented on any of the devices of the audio environment, depending on the particular implementation. In other words, the CHASM may implement, or be configured as, an audio session manager (also referred to herein as a "session manager") for one or more software applications that are being executed by one or more devices within the audio environment and/or one or more software applications that are being executed by one or more devices outside of the audio environment. A software application may sometimes be referred to herein as an "app."

In some examples, as a result of use of a CHASM, an audio device may end up being used for a purpose that was not envisaged by the creator and/or manufacturer of that audio device. For example, a smart audio device (including at least one speaker and a microphone) may enter a mode in which the smart audio device provides speaker feed signals and/or microphone signals to one or more other audio devices within the audio environment, because an app (e.g., implemented on another device which is distinct from the smart audio device) asks a CHASM (coupled with the smart audio device) to find and use all available speakers and/or microphones (or a group of available speakers and/or microphones selected by the CHASM) that may include speakers and/or microphones from more than one audio device of the audio environment. In many such implementations, the application need not select the devices, speakers and/or microphones, because the CHASM will provide this functionality. In some examples, the application may not be aware of (e.g., the CHASM may not indicate to the application) which specific audio devices are involved with implementing the commands provided by the application to the CHASM.

In FIG. 2C, the labeled elements are:

200C. Specific purpose smart audio device, which is a session manager running a local app (206) and a remote app (205B) through a CHASM (208C).

202-204. See FIG. 2A.

205B. App running remotely from device 200C, for example on a server with which the CHASM 208C is configured for communication via the Internet or on another device of the audio environment (a device distinct from device 200C, e.g. another smart audio device, such as a cell phone). App 205B may, in some examples, be implemented on a first device, and CHASM 208C on a second device, where both the first device and the second device are distinct from device 200C.

206. App running locally on device 200C.

207C. SPASM, which in addition to interfacing with the media engine (202), is capable of managing control input from CHASM 208C.

208C. Continuous Hierarchical Audio Session Manager (CHASM), which enables the app (205B) to utilize the audio capabilities of device 200C's media engine (202), inputs (203) and outputs (204). In this example, the CHASM 208C is configured to do so via the SPASM (207C), by obtaining at least partial control of the media engine (202) from the SPASM 207C.

210-211. See FIG. 2C.

217. Control information sent to and from the SPASM (207B) and the media engine (202) to manage the functionality of the media engine.

218. Control information to and from local app 206 and SPASM (207C) for implementing the local app 206. In some implementations, such control information may be according to a language of orchestration, such as the language of orchestration disclosed herein.

219. Control information to and from CHASM (208C) and the SPASM (207C) to control the functionality of the media engine 202. Such control information may, in some instances be the same as, or similar to, the control information 217. However, in some implementations the control information 219 may have a lower level of detail, because in some examples device-specific details may be delegated to the SPASM 207C.

220. Control information between app (205B) and CHASM (208C). In some examples, this control information may be in what is referred to herein as a "language of orchestration."

The control information 217 may, for example, include control signals from the SPASM 207C to the media engine 202 that have the effect of adjusting the output level of the output loudspeaker feed(s), e.g., gain adjustments specified in decibels, or linear scalar values. changing the equalization curve applied to the output loudspeaker feed(s), etc. In some examples, the control information 217 from the SPASM 207C to the media engine 202 may include control signals that have the effect of changing the equalization curve(s) applied to output loudspeaker feed(s), e.g., by way of providing new equalization curves described parametrically (as a series combination of basic filter stages) or tabulated as an enumeration of gain values at specific frequencies. In some examples, the control information 217 from the SPASM 207C to the media engine 202 may include control signals that have the effect of altering an upmix or downmix process that renders multiple audio source feeds into the output loudspeaker feed(s), e.g., by way of providing the mixing matrices used to combine source feeds into loudspeaker feeds. In some examples, the control information 217 from the SPASM 207C to the media engine 202 may include control signals that have the effect of changing dynamics processing applied to output loudspeaker feed(s), e.g., altering the dynamic range of the audio content.

In some examples, the control information 217 from the SPASM 207C to the media engine 202 may indicate changes to the set of media streams being provided to the media engine. In some examples, the control information 217 from the SPASM 207C to the media engine 202 may indicate the need to establish or end media streams with other media engines or other sources of media content (e.g., cloud-based streaming services).

In some instances, the control information 217 may include control signals from the media engine 202 to the SPASM 207C, such as wakeword detection information. Such wakeword detection information may, in some instances, include a wakeword confidence value or a message to indicate that a probable wakeword has been detected. In some examples, a wakeword confidence value may be transmitted once per time interval (e.g., once per 100 ms, once per 150 ms, once per 200 ms, etc.).

In some instances, the control information 217 from the media engine 202 may include speech recognition phone probabilities allowing the SPASM, the CHASM or another device (e.g., a device of a cloud-based service) to perform decoding (e.g., Viterbi decoding) to determine what command is being uttered. In some instances, the control information 217 from the media engine 202 may include sound pressure level (SPL) information from an SPL meter. According to some such examples, the SPL information may be sent at a time interval, e.g., once every second, once every half second, once every N seconds or milliseconds, etc. In some such examples, a CHASM may be configured to determine whether there is correlation in SPL meter readings across multiple devices, e.g., to determine whether the devices are in the same room and/or detecting the same sounds.

According to some examples, the control information 217 from the media engine 202 may include information derived from microphone feeds present as media streams available to the media engine, e.g. an estimation of background noise, an estimation of the direction of (DOA) arrival information, an indication of speech presence through voice activity detection, present echo cancellation performance, etc. In some such examples, the DOA information may be provided to an upstream CHASM (or another device) that is configured to perform acoustic mapping of audio devices in an audio environment and, in some such examples, to create an acoustic map of the audio environment. In some such examples, the DOA information may be associated with a wakeword detection event. In some such implementations, the DOA information may be provided to an upstream CHASM (or another device) that is configured to perform acoustic mapping to locate a user uttering the wakeword.

In some examples, the control information 217 from the media engine 202 may include status information, e.g., information regarding what active media streams are available, the temporal location within linear-time media streams (e.g., television programs, movies, streamed videos), information associated with the present network performance such as the latency associated with the active media streams, reliability information (e.g., packet loss statistics), etc.

The design of device 200C of FIG. 2C may be extended in various ways pursuant to aspects of the present disclosure. One may observe that a function of the SPASM 207C of FIG. 2C is to implement a set of hooks or functions to control the local media engine 202. Accordingly, one may consider the device 200C as something closer (e.g., closer than the functionality of the device 200A or the device 200B) to a media engine that can connect audio devices, network streams, carry out signal processing and respond to configuration commands both from the local application(s) of device 200C and also from an audio session manager. In this case, it is important that the device have information about itself (e.g., stored in a memory device and available to the audio session manager), in order to assist the audio session manager. Simple examples of this information include the number of speakers, the capabilities of the speaker(s), dynamics processing information, the number of microphones, information about microphone arrangement and sensitivity, etc.

Figure 2D:
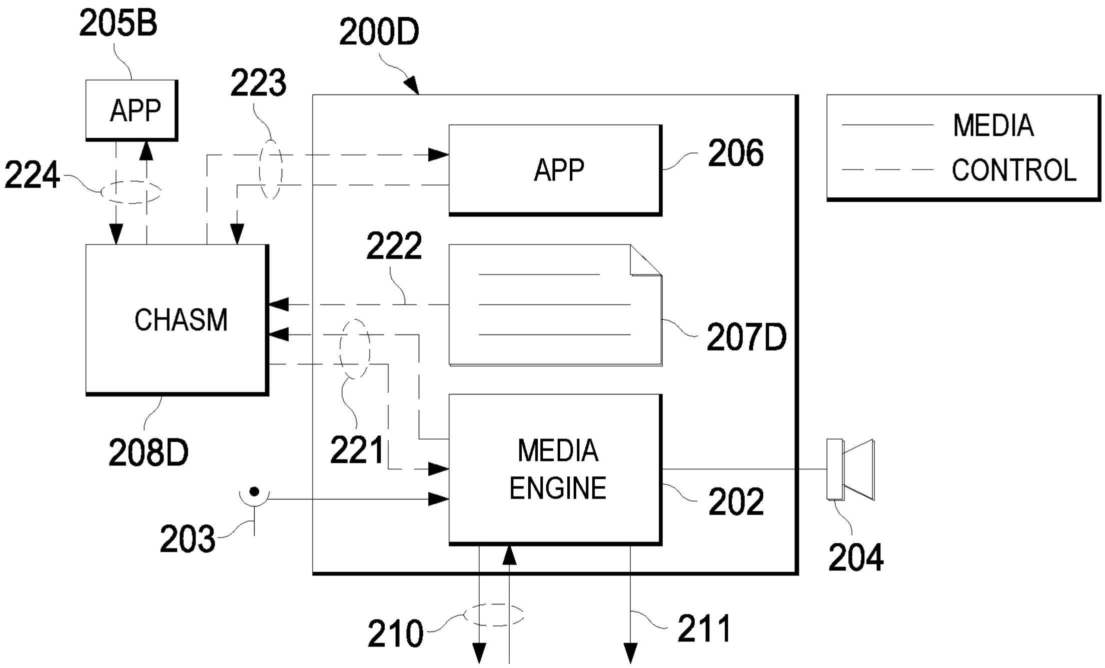
FIG. 2D shows an example of multiple applications interacting with a Continuous Hierarchical Audio Session Manager (CHASM).

FIG. 2D shows an example of multiple applications interacting with a CHASM. In the example shown in FIG. 2D, all apps, including apps local to a smart audio device (e.g., app 206, which is stored in a memory of the smart audio device 200D) are required to interface with the CHASM 208D in order to provide functionality involving the smart audio device 200D. In this example, because the CHASM 208D has taken over the interfacing, the smart audio device 200D only needs to advertise its properties 207D, or make the properties available to the CHASM 208D, and a SPASM is no longer necessary. This places the CHASM 208D as the primary controller for orchestrating experiences such as audio sessions for the apps.

In FIG. 2D, the labeled elements are:

200D. Smart audio device implementing a local app 206. CHASM 208B runs local app (206) and a remote app (205B).

202-204. See FIG. 2A.

205B. Application running remotely from (in other words, on a device other than (the smart audio device 200D (and in this example also running remotely from the CHASM 208D). In some examples, the application 205B may be executed by a device with which the CHASM 208D is configured for communication, e.g., via the Internet or via a local network. In some examples, the application 205B may be stored on another device of the audio environment, such as another smart audio device. According to some implementations, the application 205B may be stored on a mobile device that may be transported into or out of the audio environment, such as a cellular telephone.

206. App running locally on the smart audio device 200D, but for which control information (223) is sent to and/or from the CHASM 208D.

207D. Property descriptor. With the CHASM 208D taking on the duties of managing the media engine 202, the smart audio device 200D can substitute a SPASM for a simple property descriptor. In this example, the descriptor 207D indicates the capabilities of the media engine 202 to the CHASM, such as the number of inputs and outputs, the possible sample rates, and the signal processing components. In some examples, the descriptor 207D may indicate data corresponding to one or more loudspeakers of the smart audio device 200D, e.g., data indicating the type, size and number of the one or more loudspeakers, data corresponding to capabilities of the one or more loudspeakers, data relating to dynamics processing that the media engine 202 will apply to audio data before the audio data are reproduced by the one or more loudspeakers, etc. In some examples, the descriptor 207D may indicate whether the media engine 202 (or, more generally, a control system of the smart audio device 200D) is configured to provide functionality relating to the coordination of audio devices in the environment, such as rendering audio data to be reproduced by the smart audio device 200D and/or other audio devices of the audio environment, whether a control system of the smart audio device 200D is capable of implementing functionality of the CHASM 208D if the device that is currently providing functionality of the CHASM 208D (e.g., according to CHASM software stored in a memory of the device) is turned off or otherwise ceases to function, etc.

208D. In this example, the CHASM 208D acts as the gateway for all apps (whether local or remote) to interact with the media engine 202. Even local apps (e.g., app 206) gain access to the local media engine 202 via the CHASM 208D. In some instances, the CHASM 208D may be implemented only in a single device of an audio environment, e.g., via CHASM software stored on a wireless router, a smart speaker, etc. However, in some implementations more than one device of an audio environment may be configured to implement as least some aspects of CHASM functionality. In some examples, a control system of one or more other devices in the audio environment, such as one or more smart audio devices of the audio environment, may be capable of implementing functionality of the CHASM 208D if the device that is currently providing functionality of the CHASM 208D is turned off or otherwise ceases to function.

210-211. See FIG. 2C.

221. Control information sent between (e.g., to and from) the CHASM 208D and the media engine 202.

222. Data from the property descriptor 207D sent to the CHASM to indicate capabilities of the media engine 202.

223. Control information sent between the local app 206 and the CHASM 208)

224. Control information sent between a remote app 205B and the CHASM 208D.

We next describe additional embodiments. To implement some such embodiments, initially a single device (such as a communications device) is designed and coded for a specific purpose. An example of such device is smart audio device 101 of FIG. 1C, which may be implemented as shown in FIG. 3C. As background, implementations of device 101 of FIG. 1A and FIG. 1B are also described.

Figure 3A:
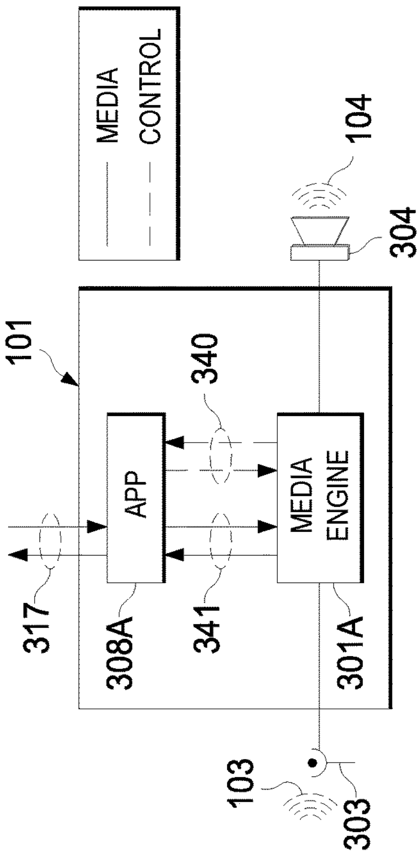
FIG. 3A is a block diagram showing details of device 101 of FIG. 1A according to one example.

FIG. 3A is a block diagram showing details of device 101 of FIG. 1A according to one example. As the user's voice 103 is captured by the microphone 303, the local app 308A is responsible for managing the network streams 317 received via a network interface of the device 101, managing the media streams 341 and providing the control signaling 340 to the media engine 301A).

In FIG. 3A, the labeled elements are:

101,103-104. See FIG. 1A.

301A. Media Engine responsible for managing the real-time audio media streams that come in from the app 308A.

303. Microphone.

304. Loudspeaker.

308A. Local app.

317. Media streams to and from a network.

340. Control information sent to and from the app 308A and the media engine 301A.

341. Media streams sent to and from the app 308A.

Figure 3B:
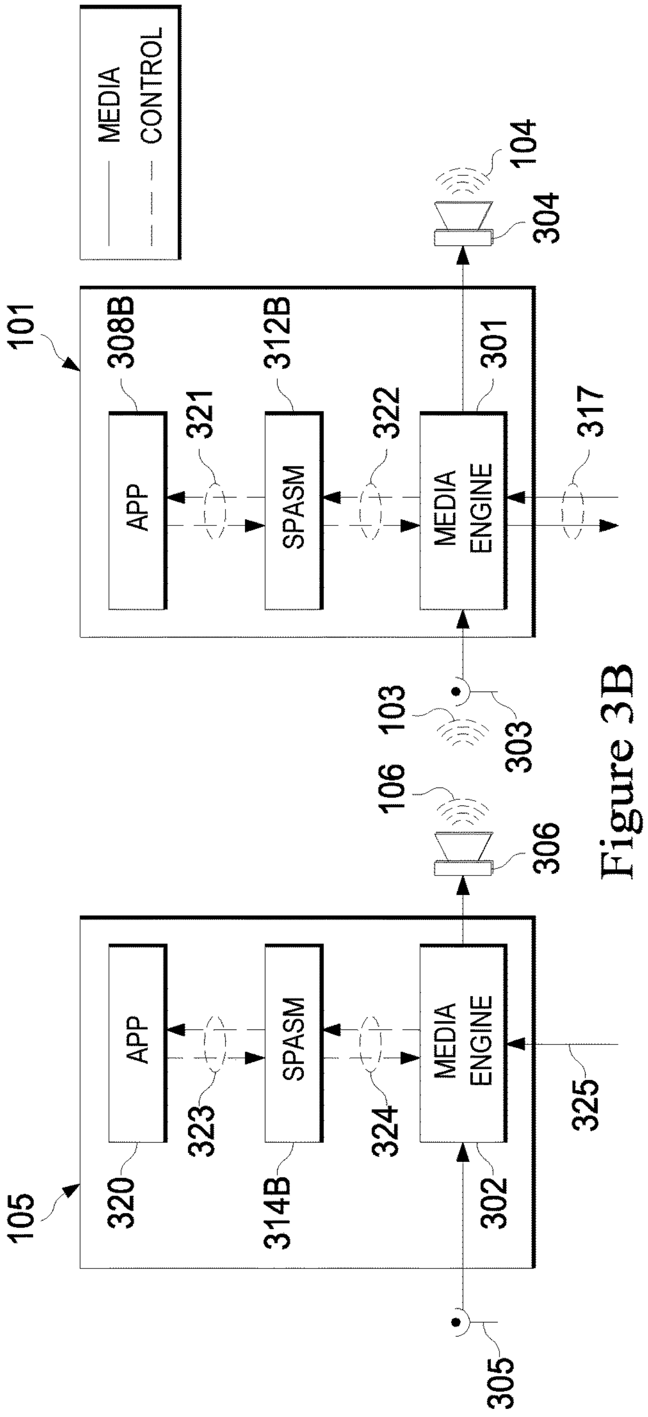
FIG. 3B shows details of an implementation of FIG. 1B according to one example.
Figure 3C:
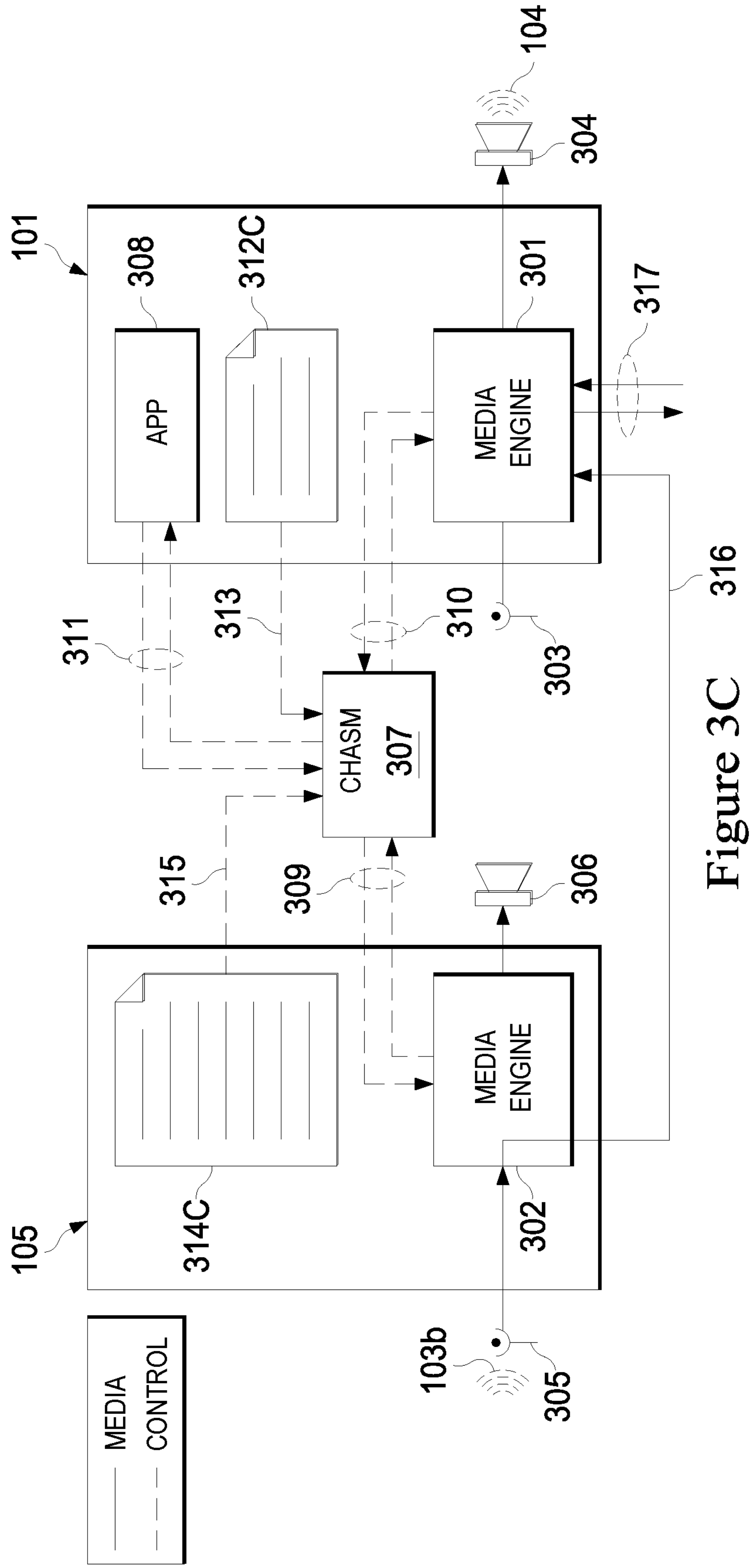
FIG. 3C is a block diagram that shows an example of a CHASM orchestrating two audio devices of an audio environment.

FIG. 3B shows details of an implementation of FIG. 1B according to one example. In this example, device 105 of FIG. 1B and an implementation of device 101 of FIG. 1B are shown. In this case, both devices are designed with a view to be 'orchestration ready' in the sense that there is a general-purpose or flexible media engine controlled through the abstraction of the SPASM.

In FIG. 3B, the output 106 of the second device 105 is unrelated to the output 104 of the first device 101 and the input 103 to the microphone 303 of the device 101 may potentially capture the output 106 of the device 105. In this example, there is no way for the devices 105 and 101 to work in an orchestrated fashion.

In FIG. 3B, the labeled elements are:

101, 103-106. See FIG. 1B.

301, 303-304. See FIG. 3A.

302. Media engine of the device 105.

305. Microphone of the device 105.

306. Loudspeaker of the device 105.

308B. Local app of the device 101.

312B. SPASM for the device 101.

314B. SPASM for the device 105.

317. Media streams to and from a network.

320. Local app for the device 105.

321. Control information sent between the app 308B and the SPASM 312B.

322. Control information sent between the SPASM 312B and the media engine 301.

323. Control information sent between (to and from) the app 320 and the SPASM 314B.

324. Control information sent between (to and from) the SPASM 314B and the media engine 302.

325. Media stream into the media engine 302 from the network.

FIG. 3C is a block diagram that shows an example of a CHASM orchestrating two audio devices of an audio environment. Based on the foregoing discussion, it should be appreciated that the situation in which the system of FIG. 3B is used would be better managed by a CHASM (e.g., as in the FIG. 3C embodiment), with the CHASM running on a modified version of the device 101 and the device 105 or running on another device. With use of the CHASM 307, in some examples, the application 308 on the phone 101 gives up direct control of its audio device 101 and defers to the CHASM 307 for control of all audio. According to some such examples, signals from the microphone 305 may include less echo than signals from the microphone 303. The CHASM 307 may, in some examples, infer that the signals from the microphone 305 include less echo than signals from the microphone 303, based on an estimation that the microphone 305 is closer to the person 102. In some such instances, the CHASM may take advantage by routing the raw microphone signals or processed microphone signals from microphone 305 on the device 105 as a network stream to the phone device 101, and these microphone signals may be used in preference to the signals from the local microphone 303 to achieve a better voice communications experience for the person 102.

According to some implementations, the CHASM 307 can ensure this remains the best configuration, e.g., by monitoring the location of the person 102, by monitoring the location of the device 101 and/or the device 105, etc. In some examples, the CHASM 307 can ensure this remains the best configuration. According to some such examples, the CHASM 307 can ensure this remains the best configuration via the exchange of low-rate (e.g., low bit rate) data and/or metadata. With only a small amount of information shared between devices, for example, the location of the person 102 can be tracked. If information is being exchanged between devices at a low bit rate, considerations about limited bandwidth may be less problematic. Examples of low bit rate information that may be exchanged between devices include, but are not limited to, information derived from microphone signals, e.g., as described below with reference to "follow me" implementations. One example of low bit rate information that may be useful in determining to determine which device's microphone has a higher speech-to-echo ratio is an estimate of the SPL caused by sound emitted by the local loudspeaker on each of a plurality of audio devices in the audio environment during a time interval, e.g., during the last second. Audio devices that emit more energy from their loudspeaker(s) are likely to capture less of the other sound in the audio environment over the echo caused by loudspeaker(s). Another example of low bit rate information that may be useful in determining to determine which device's microphone has a higher speech-to-echo ratio is the amount of energy in the echo prediction of the acoustic echo canceller of each device. A high amount of predicted echo energy indicates that the audio device's microphone(s) is/are likely to be overwhelmed by echo. In some such instances, there may be some echoes that the acoustic echo canceller will not be able to cancel (assuming the acoustic echo canceller is already converged at this time). In some examples, the CHASM 307 may be ready, continuously, to control the device 101 to resume using microphone signals from the local microphone 303 if something were to provide information of a problem with, or absence of, the microphone 305.

FIG. 3C depicts an example of the underlying system used to coordinate the app 308 running on the device 101 with the device 105. In this example, the CHASM 307 causes the user's voice 103B to be captured into the microphone 305 of the device 105, and causes the captured audio 316 to be used in the media engine 301 of the device 101, while the loudspeaker output 104 comes from the first device 101—thereby orchestrating the experience for the user 102 across devices 101 and 105.

In FIG. 3C, the labeled elements are:

101, 103B, 104, 105. See FIG. 1C.

301-306. See FIG. 3B.

307. The CHASM.

309. Control information between the CHASM 307 and the media engine 302.

310. Control information between the CHASM 307 and the media engine 301.

311. Control information between (to and from) the CHASM 307 and the app 308.

312C. Device property descriptor of the device 101.

313. Control information and/or data to the CHASM 307 from the device property descriptor 312C.

314C. Device property descriptor of device 105.

315. Control information and/or data to the CHASM 307 from the device property descriptor 314C.

316. Media stream from device media engine 302 to device media engine 301.

317. Media streams to and from the network to the media engine 301.

In some embodiments, if DOODADs are included in a CHASM (e.g., the CHASM 307) to interact with smart audio devices (e.g., to send and receive control information to and from each of the smart audio devices), and/or if DOODADs are provided (e.g., as subsystems of devices, e.g., devices 101 and 105, where the devices are separate from a device which implements a CHASM, e.g., a device which implements CHASM 307) to operate with a CHASM (e.g., CHASM 401 of FIG. 4, discussed below, or CHASM 307), then the need for a SPASM (in each of one or more smart audio devices) is replaced by operation of the smart audio devices advertising their audio capability (to the CHASM), and the applications deferring to a single abstract point of control (e.g., a CHASM) for audio function.

Figure 4:
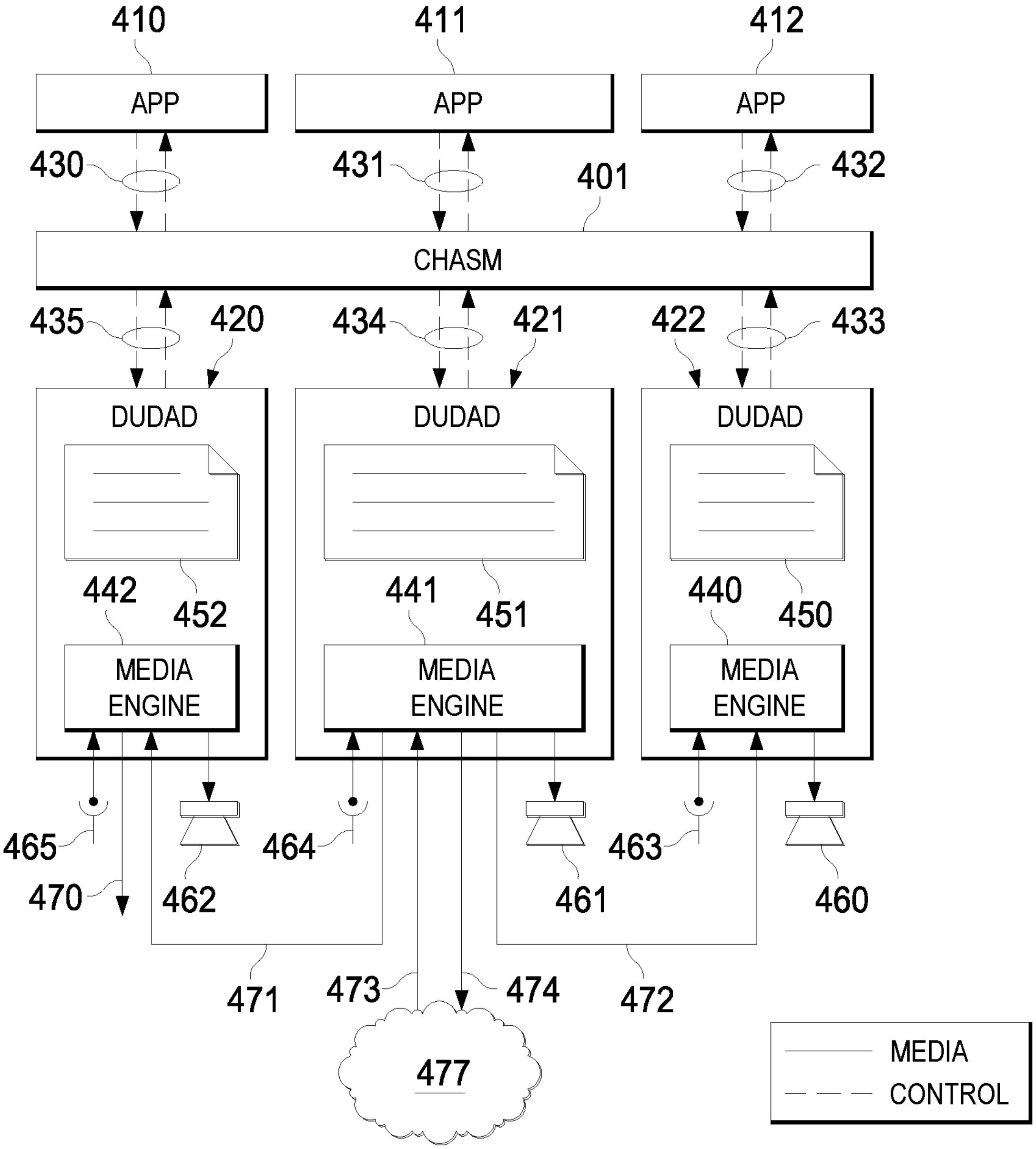
FIG. 4 is a block diagram that illustrates another disclosed embodiment.

FIG. 4 is a block diagram that illustrates another disclosed embodiment. The FIG. 4 design introduces the important abstraction that in some implementations, applications do need not to select or control directly, and in some instances may not be provided with information regarding, which specific audio devices are involved with performing functionality relating to the applications, the particular capabilities of such audio devices, etc.

FIG. 4 is a block diagram of a system including three separate physical audio devices 420, 421, and 422. In this example, each of the devices implements a Discoverable Opportunistically Orchestrated Distributed Audio Subsystem (DOODAD) and is controlled by a CHASM 401 that is running applications (410-412). According to this example, the CHASM 401 is configured for managing the media requirements for each of the applications 410-412.

In FIG. 4, the labeled elements are:

400. Example of an orchestrated audio system across three different devices. The devices 420, 421 and 422) each implement a DOODAD (DUDAD). Each of the devices 420, 421 and 422 implementing a DOODAD is sometimes itself referred to as a DOODAD. In this example, each DOODAD is (or is implemented by) a smart audio device that differs from the smart audio device 101 of FIG. 3C in that the device which is, or which implements, the DOODAD in FIG. 4 does not itself implement the relevant application, whereas device 101 implements application 308;

401. CHASM;

410-412. Apps, which in this example have different audio requirements. In some examples, each of the apps 410-412 may be stored on, and executable by, a device of the audio environment, or a mobile device that is sometimes located in the audio environment;

420-422. Smart audio devices, each implementing a Discoverable Opportunistically Orchestrated Distributed Audio Subsystem (DOODAD), so that each DOODAD runs inside a separate, physical, smart audio device;

430, 431, and 432. Control information sent between (to and from) apps 410, 411, and 412, to the CHASM 401;

433, 434 and 435. Control information sent to and from the DOODADS 420-422 and the CHASM 401;

440, 441 and 442. Media engines;

450, 451 and 452. Device Property Descriptors, which in this example the DOODADS 420-422 are configured to provide to the CHASM 401;

460-462. Loudspeakers;

463-465. Microphones;

470. Media stream out of media engine 442 to a network;

471. Media stream from media engine 441 to media engine 442;

472. Media stream from media engine 441 to media engine (440);

473. Media stream from a cloud-based service for providing media via a network, such as a cloud-based service provided by one or more servers of a data center, via the Internet, to media engine 441;

474. Media stream from media engine 441 to the cloud-based service.

477. One or more cloud-based services, which may include one or more music streaming services, movie streaming services, television show streaming services, podcast providers, etc.

FIG. 4 is a block diagram of a system in which multiple audio devices have potential for routing to create an audio experience. According to this example, audio data corresponding to the media stream 473 is being received by the media engine 441 of the smart audio device 421, which is providing the media stream 471 to the media engine 442 and is providing the media stream 472 to the media engine 440. According to some such implementations, the media engine 441 may process the media stream 473 according to a sample clock of the media engine 441, which is an example of what may be referred to herein as a "media engine sample clock."

In some such examples, the CHASM 401 may have provided the media engine 441 with instructions and information, via the control information 434, regarding processes relating to obtaining and processing the media stream 473. Such instructions and information are examples of what may be referred to herein as "audio session management control signals."

However, in some implementations, the CHASM 401 may transmit the audio session management control signals without reference to the media engine sample clock of the media engine 441. Such examples are potentially advantageous because the CHASM 401 need not, e.g., synchronize the transmission of media to audio devices of the audio environment. Instead, in some implementations, any such synchronization may be delegated to another device, such as the smart audio device 421 in the foregoing example.

According to some such implementations, the CHASM 401 may have provided the media engine 441 with audio session management control signals relating to obtaining and processing the media stream 473 in response to control information 430, 431 or 432 from the application 410, the application 411 or the application 412. Such control information is an example of what may be referred to herein as an "application control signal." According to some implementations, the application control signals may be transmitted from the application to the CHASM 401 without reference to the media engine sample clock of the media engine 441.

In some examples, the CHASM 401 may provide the media engine 441 with audio processing information, including but not limited to rendering information, along with instructions to process audio corresponding to the media stream 473 accordingly. However, in some implementations a device implementing the CHASM 401 (or a device implementing similar functionality, such as functionality of a smart home hub as described elsewhere herein) may be configured to provide at least some audio processing functionality. Some examples are provided below. In some such implementations, the CHASM 401 may be configured to receive and process audio data, and to provide processed (e.g., rendered) audio data to audio devices of an audio environment.

Figure 5:
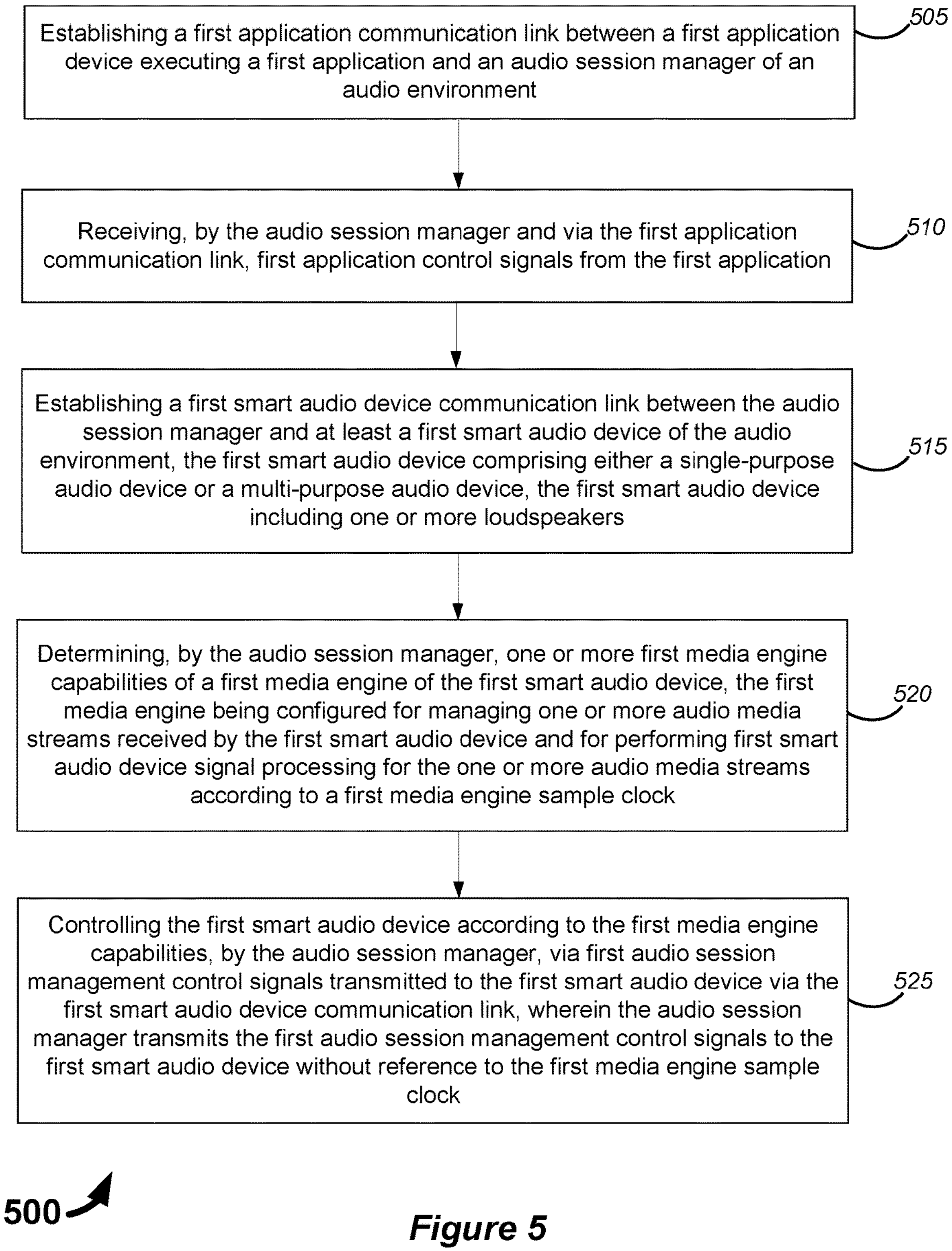
FIG. 5 is a flow diagram that includes blocks of an audio session management method according to some implementations.
Figure 6:
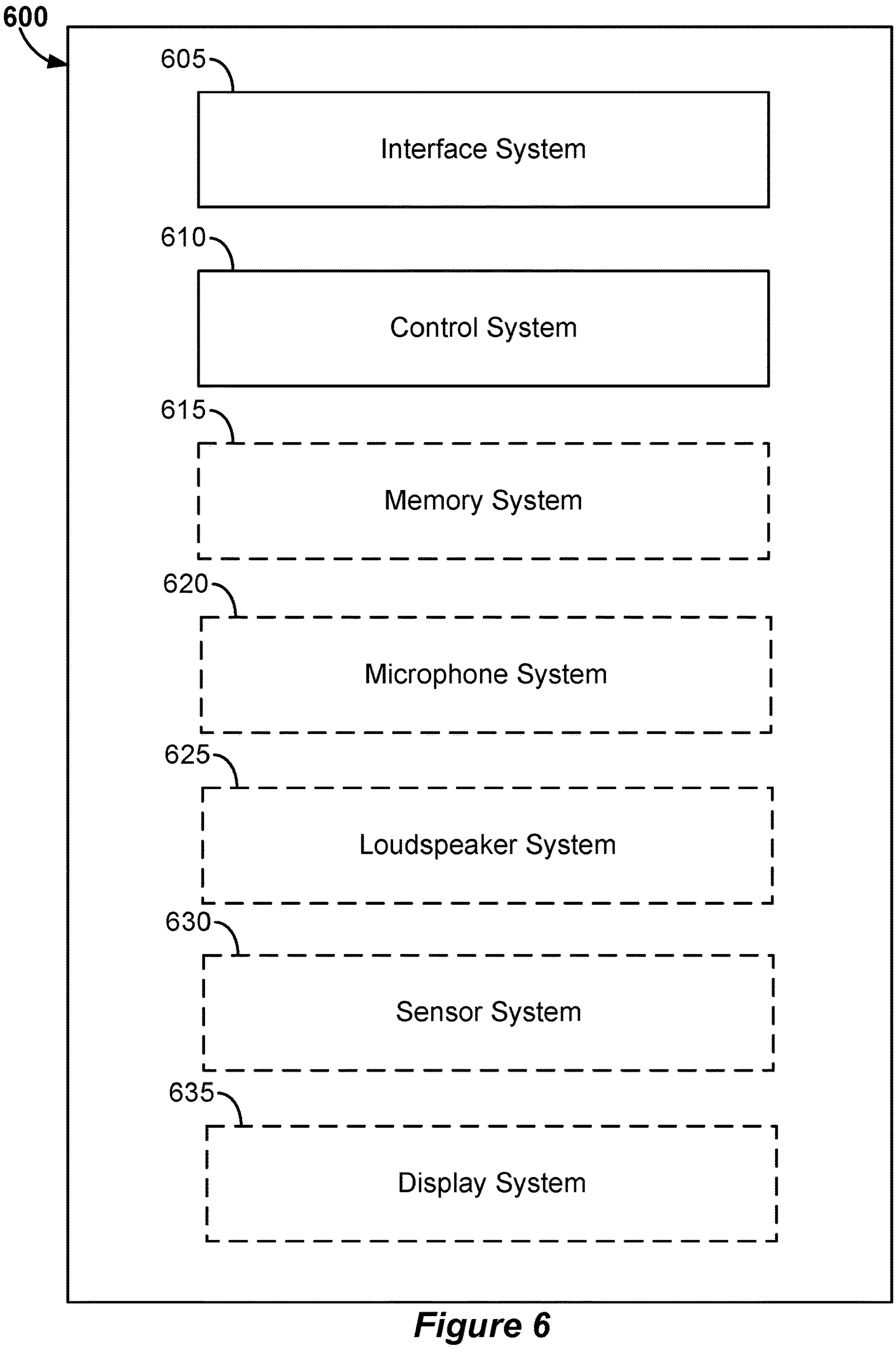
FIG. 6 is a block diagram that shows examples of components of an apparatus capable of implementing various aspects of this disclosure.

FIG. 5 is a flow diagram that includes blocks of an audio session management method according to some implementations. The blocks of method 500, like other methods described herein, are not necessarily performed in the order indicated. In some implementation, one or more of the blocks of method 500 may be performed concurrently. For example, in some instances blocks 505 and 510 may be performed concurrently. Moreover, some implementations of method 500 may include more or fewer blocks than shown and/or described. The blocks of method 500 may be performed by one or more devices, which may be (or may include) a control system such as the control system 610 that is shown in FIG. 6 and described below, or one of the other disclosed control system examples.

According to some implementations, the blocks of method 500 may be performed, at least in part, by a device that is implementing what is referred to herein as an audio session manager, e.g., a CHASM. In some such examples, the blocks of method 500 may be performed, at least in part, by the CHASM 208C, the CHASM 208D, the CHASM 307 and/or the CHASM 401 that are described above with reference to FIGS. 2C, 2D, 3C and 4. More specifically, in some implementations the functionality of the "audio session manager" that is referred to in the blocks of method 500 may be performed, at least in part, by the CHASM 208C, the CHASM 208D, the CHASM 307 and/or the CHASM 401.

According to this example, block 505 involves establishing a first application communication link between a first application device executing a first application and an audio session manager of an audio environment. In some examples, the first application communication link may be made via any suitable wireless communication protocol that is suitable for use within the audio environment, such as Zigbee, Apple's Bonjour (Rendezvous), Wi-Fi, Bluetooth, Bluetooth Low Energy (Bluetooth LE), 5G, 4G, 3G, General Packet Radio Service (GPRS), Amazon Sidewalk, Nordic's custom protocol in the RF24L01 chip, etc. In some examples, the first application communication link may be established in response to a "handshake" process, which in some examples may be started via a "handshake initiation" transmitted by the first application device to a device that is implementing the audio session manager. In some examples, the first application communication link may be established in response to what may be referred to herein as a "route initiation request" from the first application device. For the sake of convenience, a route initiation request from the first application device may be referred to herein as a "first route initiation request," in order to indicate that the route initiation request corresponds with the "first application device." In other words, the term "first" may or may not have temporal significance in this context, depending on the particular implementation.

In one such example, the first application communication link may be established between a device on which the application 410 of FIG. 4 is being executed and the CHASM 401. In some such examples, the first application communication link may be established in response to the CHASM 401 receiving a first route initiation request from a device on which the application 410 is being executed. The device on which the application 410 is being executed may, for example, be a smart audio device of the audio environment. In some instances, the device on which the application 410 is being executed may be a mobile phone. The application 410 may be used to access media, e.g., music, television programs, movies, etc., via the CHASM 401. In some instances the media be available for streaming via a cloud-based service.

Various examples of what is meant by a "route" are described in detail below. In general, a route indicates parameters of an audio session that will be managed by the audio session manager. A route initiation request may, for example, indicate an audio source and an audio environment destination. The audio environment destination may, in some instances, correspond with at least one person in the audio environment. In some instances, the audio environment destination may correspond with an area or zone of the audio environment.

However, in most instances, the audio environment destination will not indicate any specific audio device that will be involved with reproducing the media in the audio environment. Instead, an application (such as the application 410) may provide a route initiation request that, e.g., a particular type of media should be made available to a particular person in the audio environment. In various disclosed implementations, the audio session manager will be responsible for determining which audio devices will be involved with the route, e.g., determining which audio devices will be involved with obtaining, rendering and reproducing audio data associated with the media. In some implementations, the audio session manager will be responsible for determining whether audio devices that will be involved with the route have changed (e.g., in response to a determination that the person who is the intended recipient of the media has changed location), updating a corresponding data structure, etc. Detailed examples are provided below.

In this example, block 510 involves receiving, by the audio session manager and via the first application communication link, first application control signals from the first application. Referring again to FIG. 4, in some examples the application control signals may correspond to the control information 430 sent between (to and from) the app 410 and the CHASM 401. In some examples, the first application control signals may be sent after the audio session manager (e.g., the CHASM 401) has initiated the route. However, in some instances the first application control signals may correspond with the first route initiation request. In some such examples, blocks 505 and 510 may be performed concurrently, at least in part.

According to this example, block 515 involves establishing a first smart audio device communication link between the audio session manager and at least a first smart audio device of the audio environment. In this example, the first smart audio device is, or includes, either a single-purpose audio device or a multi-purpose audio device. According to this implementation, the first smart audio device includes one or more loudspeakers.

In some examples, as noted above, the first application control signals and/or the first route initiation request do not indicate any specific audio device that will be involved with the route. According to some such examples, method 500 may involve a process prior to block 515 of determining (e.g., by the audio session manager) which audio devices of the audio environment will be at least initially involved with the route.

For example, the CHASM 401 of FIG. 4 may determine that audio devices 420, 421 and 422 will be at least initially involved with the route. In the example shown in FIG. 4, the first smart audio device communication link of block 515 may be established between the audio session manager (in this example, the CHASM 401) the smart audio device 421. The first smart audio device communication link may correspond with the dashed lines in FIG. 4, shown between the CHASM 401 and the smart audio device 421, over which the control information 434 is transmitted. In some such examples, the first smart audio device communication link may be made via any suitable wireless communication protocol that is suitable for use within the audio environment, such as Apple Airplay, Miracast, Blackfire, Bluetooth 5, Real-time Transport Protocol (RTP), etc.

In the example shown in FIG. 5, block 520 involves determining, by the audio session manager, one or more first media engine capabilities of a first media engine of the first smart audio device. According to this example, the first media engine is configured for managing one or more audio media streams received by the first smart audio device and for performing first smart audio device signal processing for the one or more audio media streams according to a first media engine sample clock. In the above-described example, block 520 may involve the CHASM 401 receiving information regarding one or more capabilities of the media engine 441 from the smart audio device 421, e.g., by providing the device property descriptor 451 to the CHASM 401. According to some implementations, block 520 may involve the CHASM 401 receiving information regarding the capabilities of one or more loudspeakers of the smart audio device 421. In some examples, the CHASM 401 may have previously determined some or all of this information, e.g., prior to block 505, 510 and/or 515 of method 500.

According to this example, block 525 involves controlling the first smart audio device according to the first media engine capabilities, by the audio session manager and via first audio session management control signals transmitted to the first smart audio device via the first smart audio device communication link According to some examples, the first audio session management control signals may cause the first smart audio device to delegate control of the first media engine to the audio session manager. In this example, the audio session manager transmits the first audio session management control signals to the first smart audio device without reference to the first media engine sample clock. In some such examples, the first application control signals may be transmitted from the first application to the audio session manager without reference to the first media engine sample clock.

In one example of block 525, the CHASM 401 may control the media engine 441 to receive the media stream 473. In some such examples, via the first audio session management control signals, the CHASM 401 may provide the media engine 441 with a Universal Resource Locator (URL) corresponding to a website from which the media stream 473 could be received, along with instructions to initiate the media stream 473. According to some such examples, the CHASM 401 also may have provided, via the first audio session management control signals, the media engine 441 with instructions to provide the media stream 471 to the media engine 442 and to provide the media stream 472 to the media engine 440.

In some such examples, the CHASM 401 may have provided the media engine 441, via the first audio session management control signals, with audio processing information, including but not limited to rendering information, along with instructions to process audio corresponding to the media stream 473 accordingly. For example, the CHASM 401 may have provided the media engine 441 with an indication that, e.g., the smart audio device 420 will receive speaker feed signals corresponding to a left channel, the smart audio device 421 will reproduce speaker feed signals corresponding to a center channel and the smart audio device 422 will receive speaker feed signals corresponding to a right channel.

Various other examples of rendering are disclosed herein, some of which may involve the CHASM 401, or another audio session manager, conveying different types of audio processing information to a smart audio device. For example, in some implementations one or more devices of an audio environment may be configured to implement flexible rendering, such as Center of Mass Amplitude Panning (CMAP) and/or Flexible Virtualization (FV). In some such implementations, a device configured to implement flexible rendering may be provided with a set of audio device locations, an estimated current listener position and an estimated current listener orientation. The device configured to implement flexible rendering may be configured to render audio for a set of audio devices in the environment according to the set of audio device locations, the estimated current listener position and the estimated current listener orientation. Some detailed examples are described below.

In the foregoing example of the method 500 that is described with reference to FIG. 4, a device other than the audio session manager or the first smart audio device is configured for executing the first application. However, e.g. as described above with reference to FIGS. 2C and 2D, some examples the first smart audio device may be configured for executing the first application.

According to some such examples, e.g. as described above with reference to FIG. 2C, the first smart audio device may include a specific purpose audio session manager. In some such implementations, the audio session manager may communicate with the specific purpose audio session manager via the first smart audio device communication link. In some examples, the audio session manager may obtain the one or more first media engine capabilities from the specific purpose audio session manager. According to some such examples, the audio session manager may act as a gateway for all applications controlling the first media engine, whether the applications are running on the first smart audio device or on another device.

As noted above, in some examples the method 500 may involve establishing at least a first audio stream (e.g., the media stream 473 of FIG. 4) corresponding to a first audio source. In some examples, the first audio source may be one or more servers, etc., that are configured to provide a cloud-based media streaming service, such as a music streaming service, a television show and/or movie streaming service, etc. The first audio stream may include first audio signals. In some such implementations, establishing at least the first audio stream may involve causing, via first audio session management control signals transmitted to the first smart audio device via the first smart audio device communication link, the first smart audio device to establish at least the first audio stream.

In some examples, the method 500 may involve a rendering process that causes the first audio signals to be rendered to first rendered audio signals. In some such implementations, the rendering process may be performed by the first smart audio device in response to the first audio session management control signals. In the above-described example, the media engine 441 may render audio signals corresponding to the media stream 473 into speaker feed signals in response to the first audio session management control signals.

According to some examples, the method 500 may involve causing, via the first audio session management control signals, the first smart audio device to establish an inter-smart audio device communication link between the first smart audio device and each of one or more other smart audio devices of the audio environment. In the example described above with reference to FIG. 4, the media engine 441 may establish a wired or wireless inter-smart audio device communication link with the media engines 440 and 442. In the example described above with reference to FIG. 3C, the media engine 302 may establish a wired or wireless inter-smart audio device communication link to provide the media stream 316 to the media engine 301.

In some examples, the method 500 may involve causing the first smart audio device to transmit one or more of raw microphone signals, processed microphone signals, rendered audio signals or unrendered audio signals to the one or more other smart audio devices via the inter-smart audio device communication link or the inter-smart audio device communication links. In the example described above with reference to FIG. 4, the inter-smart audio device communication link may be used to provide rendered audio signals or unrendered audio signals via the media stream 471 and the media stream 472. In some such examples, the media stream 471 may include speaker feed signals for the media engine 442 and the media stream 472 may include speaker feed signals for the media engine 440. In the example described above with reference to FIG. 3C, the media engine 302 may provide raw microphone signals or processed microphone signals via the media stream 316 to the media engine 301.

According to some examples, the method 500 may involve establishing a second smart audio device communication link between the audio session manager and at least a second smart audio device of the audio environment. In some such examples, the second smart audio device may be a single-purpose audio device or a multi-purpose audio device. In some instances, the second smart audio device may include one or more microphones. Some such methods may involve determining, by the audio session manager, one or more second media engine capabilities of a second media engine of the second smart audio device. The second media engine may, for example, be configured for receiving microphone data from the one or more microphones and for performing second smart audio device signal processing on the microphone data.

For example, with reference to FIG. 3C, the "first smart audio device" may be the smart audio device 101. According to some such examples, the "second smart audio device" may be the smart audio device 105. The "first smart audio device communication link" may be used to provide the control signals 310 and the "second smart audio device communication link" may be used to provide the control signals 309. The CHASM 307 may determine one or more media engine capabilities of the media engine 302 based, at least in part, on the device property descriptor 314*c*.

Some such methods may involve controlling the second smart audio device according to the second media engine capabilities, by the audio session manager, via second audio session manager control signals transmitted to the second smart audio device via the second smart audio device communication link. In some instances, controlling the second smart audio device may involve causing the second smart audio device to establish an inter-smart audio device communication link (e.g., the inter-smart audio device communication link used to provide the media stream 316) between the second smart audio device and the first smart audio device. Some such examples may involve causing the second smart audio device to transmit at least one of processed or unprocessed microphone data (e.g., processed or unprocessed microphone data from the microphone 305) from the second media engine to the first media engine via the inter-smart audio device communication link.

In some examples, controlling the second smart audio device may involve receiving, by the audio session manager and via the first application communication link, first application control signals from the first application. In the example of FIG. 3C, the CHASM 307 receives control signals 311 from the application 308, which is a telephony application in this instance. Some such examples may involve determining the second audio session manager control signals according to the first application control signals. For example, referring again to FIG. 3C, the CHASM 307 may be configured to optimize the speech to echo ratio (SER) for a telephone conference that is being provided according to the control signals 311 from the application 308. The CHASM 307 may determine that the SER for a teleconference can be improved by using the microphone 305 instead of the microphone 303 to capture the speech of the person 102 (see FIG. 1C). This determination may, in some examples, be based on an estimate of the location of the person 102. Some detailed examples of estimating a person's location and/or orientation in an audio environment are disclosed herein.

FIG. 6 is a block diagram that shows examples of components of an apparatus capable of implementing various aspects of this disclosure. As with other figures provided herein, the types and numbers of elements shown in FIG. 6 are merely provided by way of example. Other implementations may include more, fewer and/or different types and numbers of elements. According to some examples, the apparatus 600 may be, or may include, a smart audio device that is configured for performing at least some of the methods disclosed herein. In other implementations, the apparatus 600 may be, or may include, another device that is configured for performing at least some of the methods disclosed herein, such as a laptop computer, a cellular telephone, a tablet device, a smart home hub, etc. In some such implementations the apparatus 600 may be, or may include, a server. In some such implementations the apparatus 600 may be configured to implement what may be referred to herein as a CHASM.

In this example, the apparatus 600 includes an interface system 605 and a control system 610. The interface system 605 may, in some implementations, be configured for communication with one or more devices that are executing, or configured for executing, software applications. Such software applications may sometimes be referred to herein as "applications" or simply "apps." The interface system 605 may, in some implementations, be configured for exchanging control information and associated data pertaining to the applications. The interface system 605 may, in some implementations, be configured for communication with one or more other devices of an audio environment. The audio environment may, in some examples, be a home audio environment. The interface system 605 may, in some implementations, be configured for exchanging control information and associated data with audio devices of the audio environment. The control information and associated data may, in some examples, pertain to one or more applications with which the apparatus 600 is configured for communication.

The interface system 605 may, in some implementations, be configured for receiving audio data. The audio data may include audio signals that are scheduled to be reproduced by at least some speakers of the audio environment. The audio data may include one or more audio signals and associated spatial data. The spatial data may, for example, include channel data and/or spatial metadata. The interface system 605 may be configured for providing rendered audio signals to at least some loudspeakers of the set of loudspeakers of the environment. The interface system 605 may, in some implementations, be configured for receiving input from one or more microphones in an environment.

The interface system 605 may include one or more network interfaces and/or one or more external device interfaces (such as one or more universal serial bus (USB) interfaces). According to some implementations, the interface system 605 may include one or more wireless interfaces. The interface system 605 may include one or more devices for implementing a user interface, such as one or more microphones, one or more speakers, a display system, a touch sensor system and/or a gesture sensor system. In some examples, the interface system 605 may include one or more interfaces between the control system 610 and a memory system, such as the optional memory system 615 shown in FIG. 6. However, the control system 610 may include a memory system in some instances.

The control system 610 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 610 may reside in more than one device. For example, a portion of the control system 610 may reside in a device within one of the environments depicted herein and another portion of the control system 610 may reside in a device that is outside the environment, such as a server, a mobile device (e.g., a smartphone or a tablet computer), etc. In other examples, a portion of the control system 610 may reside in a device within one of the environments depicted herein and another portion of the control system 610 may reside in one or more other devices of the environment. For example, control system functionality may be distributed across multiple smart audio devices of an environment, or may be shared by an orchestrating device (such as what may be referred to herein as a smart home hub) and one or more other devices of the environment. The interface system 605 also may, in some such examples, reside in more than one device.

In some implementations, the control system 610 may be configured for performing, at least in part, the methods disclosed herein. According to some examples, the control system 610 may be configured for implementing audio session management methods.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 615 shown in FIG. 6 and/or in the control system 610. Accordingly, various innovative aspects of the subject matter described in this disclosure can be implemented in one or more non-transitory media having software stored thereon. The software may, for example, include instructions for controlling at least one device for implementing audio session management methods. The software may, in some examples, include instructions for controlling one or more audio devices of the audio environment for obtaining, processing and/or providing audio data. The software may, for example, be executable by one or more components of a control system such as the control system 610 of FIG. 6.

In some examples, the apparatus 600 may include the optional microphone system 620 shown in FIG. 6. The optional microphone system 620 may include one or more microphones. In some implementations, one or more of the microphones may be part of, or associated with, another device, such as a speaker of the speaker system, a smart audio device, etc. In some examples, the apparatus 600 may not include a microphone system 620. However, in some such implementations the apparatus 600 may nonetheless be configured to receive microphone data for one or more microphones in an audio environment via the interface system 610.

According to some implementations, the apparatus 600 may include the optional loudspeaker system 625 shown in FIG. 6. The optional speaker system 625 may include one or more loudspeakers. Loudspeakers may sometimes be referred to herein as "speakers." In some examples, at least some loudspeakers of the optional loudspeaker system 625 may be arbitrarily located. For example, at least some speakers of the optional loudspeaker system 625 may be placed in locations that do not correspond to any standard prescribed speaker layout, such as Dolby 5.1, Dolby 5.1.2, Dolby 7.1, Dolby 7.1.4, Dolby 9.1, Hamasaki 22.2, etc. In some such examples, at least some loudspeakers of the optional loudspeaker system 625 may be placed in locations that are convenient to the space (e.g., in locations where there is space to accommodate the loudspeakers), but not in any standard prescribed loudspeaker layout.

In some implementations, the apparatus 600 may include the optional sensor system 630 shown in FIG. 6. The optional sensor system 630 may include one or more cameras, touch sensors, gesture sensors, motion detectors, etc. According to some implementations, the optional sensor system 630 may include one or more cameras. In some implementations, the cameras may be free-standing cameras. In some examples, one or more cameras of the optional sensor system 630 may reside in a smart audio device, which may be a single purpose audio device or a virtual assistant. In some such examples, one or more cameras of the optional sensor system 630 may reside in a TV, a mobile phone or a smart speaker. In some examples, the apparatus 600 may not include a sensor system 630. However, in some such implementations the apparatus 600 may nonetheless be configured to receive sensor data for one or more sensors in an audio environment via the interface system 610.

In some implementations, the apparatus 600 may include the optional display system 635 shown in FIG. 6. The optional display system 635 may include one or more displays, such as one or more light-emitting diode (LED) displays. In some instances, the optional display system 635 may include one or more organic light-emitting diode (OLED) displays. In some examples wherein the apparatus 600 includes the display system 635, the sensor system 630 may include a touch sensor system and/or a gesture sensor system proximate one or more displays of the display system 635. According to some such implementations, the control system 610 may be configured for controlling the display system 635 to present one or more graphical user interfaces (GUIs).

According to some examples the apparatus 600 may be, or may include, a smart audio device. In some such implementations the apparatus 600 may be, or may implement (at least in part), a wakeword detector. For example, the apparatus 600 may be, or may implement (at least in part), a virtual assistant.

Returning now to FIG. 4, according to some examples the FIG. 4 system can be implemented so that the CHASM 401 provides abstraction to the applications 410, 411 and 412, so that the applications 410, 411 and 412 can achieve presentations (e.g., audio sessions) via issuing routes in a language of orchestration. Using this language, the applications 410, 411, and 412 can command the CHASM 401 over the control links 430, 431, and 432.

With reference to above-described FIGS. 1A, 1B, and 1C, we contemplate that the description of the application and resultant situation in the language of orchestration would be the same between the case of FIG. 1A and the case of FIG. 1C.

In order to describe examples of syntax and examples of the language of orchestration, we first provide some examples which contemplate the situations of FIGS. 1A and 1C.

In some examples, what is referred to herein as a "route" of the language of orchestration may include an indication of a media source (including but not limited to an audio source) and a media destination. The media source and the media destination may, for example, be specified in a route initiation request that is sent by an application to the CHASM. According to some implementations, media destination may be, or may include, an audio environment destination. The audio environment destination may, in some instances, correspond with at least one person who is in an audio environment at least some of the time. In some instances, the audio environment destination may correspond with one or more areas or zones of the audio environment. Some examples of audio environment zones are disclosed herein. However, the audio environment destination will generally not include any specific audio devices of the audio environment that will be involved with the route. By making the language of orchestration (including but not limited to the details required from an application to establish a route) more generalized, the specifics for route implementation may be determined by the CHASM and updated as needed.

A route may, in some examples, include other information, such as an audio session priority, a connectivity mode, one or more audio session goals or criteria, etc. In some implementations, a route will have a corresponding code or identifier, which may be referred to herein as an audio session identifier. In some instances the audio session identifier may be a persistent, unique audio session identifier.

In the initial examples that are described above, the corresponding "routes" may include: a route from Person X (e.g., user 102 of FIG. 1C) to a Network (e.g., the Internet) in Synchronous Mode with High Priority; and a route from the Network to Person X in Synchronous Mode with High Priority. Such terminology is similar to natural language stating that one may want to "Connect a phone call to Person X." However, the terminology is quite different from stating (with reference to the situation of FIG. 1A, which includes device 101):

Connect This Device Mic (i.e., the microphone of device 101) to Processing (Noise/Echo Removal);

Connect Processing Output (Noise/Echo) to Network;

Connect Network to Processing Input (Dynamics);

Connect Processing Output (Dynamics) to This Device Speaker;

Connect Processing Output (Dynamics) To Processing Input (Reference).

At this point one may observe that the execution of a telephony application pursuant to such a list of commands would involve details of devices and the required processing (echo and noise removal) and would need to be completely changed if we were to introduce the device 105 (in other words, if the execution of the telephony application were to be performed in the context of FIG. 1C, which includes the device 105 as well as the device 101, e.g., as follows:

Connect That Device Mic (i.e., the microphone of device 105) to Network;

Connect Network to Input Processing (Noise/Echo Removal);

Connect Processing Output (Noise/Echo) to Network;

Connect Network to Processing Input (Dynamics);

Connect Processing Output (Dynamics) to This Device Speaker (i.e., the speaker of device 101);

Connect Processing Output (Dynamics) To Processing Input (Reference).

The details of where it is best to do the signal processing, how to connect the signals, and generally what would be the best outcome for the user (who may be in a known or unknown position) may, in some examples, involve an optimization that could be pre-computed for a limited number of use cases, but could become unmanageable for a large number of devices and/or a large number of simultaneous audio sessions. We have recognized that it is better to provide an underlying framework that may allow better connectivity, capability, knowledge and control of smart audio devices (including by orchestrating or coordinating the devices) and then to create a portable and effective syntax for controlling the devices.

Some disclosed embodiments employ an approach and language which is both effective in design and also quite general. There are particular aspects of the language that are best understood when one thinks about audio devices as part of a route (e.g., in embodiments which the system includes a CHASM as described herein, rather than a SPASM as described herein) and not the particular end point audio devices. Aspects of some embodiments include one or more of the following: a ROUTE SPECIFICATION SYNTAX; a PERSISTENT UNIQUE SESSION IDENTIFIER; and a CONTINUOUS NOTION OF DELIVERY, ACKNOWLEDGEMENT, and/or QUALITY.

The ROUTE SPECIFICATION SYNTAX (addressing the need for every issued route to have elements explicit or implied), may include:

A source (person/device/automation decision) and therefore implied authority;

A priority in terms of how important this desired audio routing is relative to other audio that may be already underway or come later;

A destination (ideally a person or set of people, and potentially generalizable to a place);

A mode of connectivity ranging from synchronous, transactional or scheduled;

The extent to which the message has to be acknowledged or a requirement of certainty in terms of confidence in delivery; and/or A sense of what is the most important aspect of the content being heard (intelligibility, quality, spatial fidelity, consistency or perhaps inaudibility). This last point may include the concept of a negative route, where there is an interest to not only hear and be heard, but also to control what is not heard and/or cannot be heard. Some such examples involve ensuring that one or more areas of an audio environment remain relatively quiet, such as the "don't wake the baby" implementations that are described in detail below. Other such examples may involve preventing others in the audio environment from overhearing a confidential conversation, e.g., by reproducing "white noise" in one or more nearby loudspeakers, by increasing the playback level of one or more other audio content in one or more nearby loudspeakers, etc.

Aspects of the PERSISTENT UNIQUE SESSION IDENTIFIER may include the following. A key aspect of some embodiments is that in some examples, an audio session corresponding to a route is persistent until complete or otherwise closed. For example, this may allow the system to keep track of the audio sessions that are underway (e.g., via. a CHASM), and to end or remove audio sessions to change the routing rather than requiring an application to determine which individual sets of connectivity must be changed. Once created, a Persistent Unique Session Identifier may have aspects of control and status involved that can allow a system to implement message- or poll-driven management. For example, controls of the audio session or route may be or include:

Finish;

Move the destination; and

Increase or Decrease the Priority.

Things that could be queried about the audio session or route may be or include:

Is it in place;

How well is the stated goal being implemented among the competing priorities;

What sense or confidence of the user having heard/acknowledged the audio;

What quality (e.g., against the different goals of fidelity, spatial, intelligibility, information, attention, consistency or inaudibility); and If desired, query down to the actual route layer about which audio devices are in use.

Aspects of the CONTINUOUS NOTION OF DELIVERY, ACKNOWLEDGEMENT, and QUALITY may include the following. While there may be some sense of the Networking Sockets approach (and Session Layer), the audio routing may be quite different, particularly when one considers the number of audio activities that may be simultaneously routed or queued, etc. Also, because the destination may be at least one person and because there may, in some instances, be uncertainty about the person's location relative to the audio devices that can be potentially routed through, it may be useful to have a sense of confidence that is quite continuous. Networking may include or pertain to links are either DATAGRAMS which may arrive or not and STREAMS which are guaranteed to arrive. In the case of audio, there may be a sense that things may be HEARD or NOT HEARD and/or a sense that we think we can HEAR or NOT HEAR someone.

These items are what are introduced in some embodiments of the Orchestration Language, which may have some aspects of simple Networking. On top of this (in some embodiments) are Presentation and Application layers (e.g., for use in implementing the example application of a "Phone Call").

Embodiments of the orchestration language may have aspects which relate to Session Initiation Protocol (SIP) and/or Media Server Markup Language (MSML) (e.g., device centric, continuously and autonomously adapting routing based on the current set of audio sessions). SIP is a signaling protocol that is used for initiating, maintaining and ending sessions that may include voice, video and/or messaging applications. In some cases, SIP may be used for signaling and controlling communication sessions of Internet telephony, e.g., for voice calls, video calls, private IP telephone systems, for instant messaging over Internet Protocol (IP) networks, for mobile phone calls, etc. SIP is a text-based protocol that defines the format of messages and the sequence of communications of the participants. SIP includes elements of Hypertext Transfer Protocol (HTTP) and Simple Mail Transfer Protocol (SMTP). A call established with SIP may, in some cases, include multiple media streams, but no separate streams are required for applications (e.g., for text messaging applications), which exchange data as a payload of an SIP message.

MSML is described in Request for Comments (RFC) 5707. MSML is used to control various types of services on IP media servers. According to MSML, the media server is an appliance specialized in controlling and/or manipulating media streams, such as Real-time Transport Protocol media streams. According to MSML, the application server is separate from the media server and is configured for establishing and discontinuing call connections. According to MSML, the application server is configured to establish a control "tunnel" via SIP or IP, which the application server uses to exchange requests and responses with the media server, which are coded in MSML.

MSML may be used to define how multimedia sessions interact on a media server and to apply services to individual users or groups of users. MSML may be used to control media server conferencing features such as video layout and audio mixing, create sidebar conferences or personal mixes, set the properties of media streams, etc.

Some embodiments need not allow the user to control a constellation of audio devices by issuing specific commands However, it is contemplated that some embodiments can effectively achieve all desired Presentations of the Application layer without reference to the devices themselves.

Figure 7:
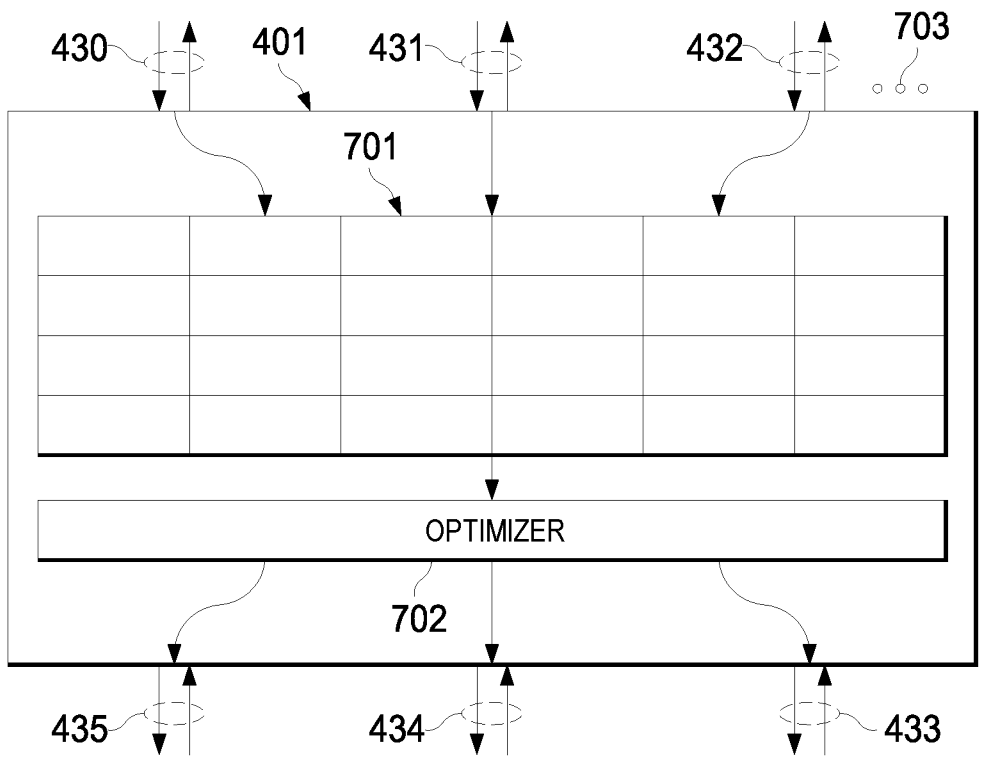
FIG. 7 is a block diagram that depicts blocks of a CHASM according to one example.

FIG. 7 is a block diagram that depicts blocks of a CHASM according to one example. FIG. 7 depicts an example of the CHASM 401 that is shown in FIG. 4. FIG. 7 shows the CHASM 401 receiving routes from a plurality of apps using a Language Of Orchestration and storing information regarding the routes in a routing table 701. The elements of FIG. 7 include:

401: The CHASM;

430: Commands from a first application (the application 410 of FIG. 4) using the Language Of Orchestration and responses from the CHASM 401;

431: Commands from a second application (the application 411 of FIG. 4) using the Language Of Orchestration and responses from the CHASM 401;

432: Commands from a third application (the application 412 of FIG. 4) using the Language Of Orchestration and responses from the CHASM 401;

703: Commands from additional applications that are not shown in FIG. 4 using the Language Of Orchestration and responses from the CHASM 401;

701: A routing table maintained by the CHASM 401;

702: An optimizer, also referred to herein as an audio session manager, which continuously controls a plurality of audio devices based on the current routing information;

435: Commands to a first audio device (the audio device 420 of FIG. 4) from the CHASM 401 and responses from the first audio device;

434: Commands to a second audio device (the audio device 421 of FIG. 4) from the CHASM 401 and responses from the second audio device;

435: Commands to a third audio device (the audio device 422 of FIG. 4) from the CHASM 401 and responses from the third audio device.

FIG. 8 shows details of the routing table shown in FIG. 7 according to one example. The elements of FIG. 8 include:

701: A table of routes maintained by the CHASM. According to this example, Each route has the following fields:

- An ID or "PERSISTENT UNIQUE SESSION IDENTIFIER";
- A record of which application has requested the route;
- A source;
- A destination, which in this example may include one or more people or locations, but not an audio device;
- A priority;
- A connectivity mode, which in this example is selected from a list of modes that includes synchronous mode, scheduled mode and transactional mode;
- An indication of whether an acknowledgment is required;
- Which audio quality aspect(s) to prioritize, which is/are also referred to herein as audio session goal(s). In some examples, the audio session manager or prioritizer 702 will optimize the audio session according to the audio session goal(s);

801: A route in the routing table 701, which has been requested by app 410 and assigned ID 50. This route specifies that Alex (the destination) wants to listen to Spotify with priority 4. In this example, priorities are integer values, with the highest priority being 1. The connectivity mode is synchronous, which means ongoing in this example. In this instance, there is no requirement that Alex confirms or acknowledges whether the corresponding music is provided to her. In this example, the only specified audio session goal is music quality;

802: A route in the routing table 701, which has been requested by app 811 and assigned ID 51. Angus is to hear a timer alarm with priority 4. This audio session is scheduled for a future time, which is stored by the CHASM 401 but which is not shown in the routing table 701. In this example, Angus is required to acknowledge that he has heard the alarm. In this example, the only specified audio session goal is audibility, in order to increase the likelihood that Angus hears the alarm;

803: A route in the routing table 701, which has been requested by app 410 and assigned ID 52. Although the destination is "baby," the underlying audio session goal is inaudibility in the vicinity of a baby in the audio environment. Accordingly, this is an example of a "Don't wake the baby!" implementation, detailed examples of which are described below. This audio session has a priority of 2 (more important than almost anything). The connectivity mode is synchronous (ongoing). No acknowledgement is required from the baby that is has not been woken. In this example, the only specified audio session goal is inaudibility of sound at the baby's location.

804: A route in the routing table 701, which has been requested by app 411 and assigned ID 53. In this example, the app 411 is a telephony app. In this instance, George is on the phone. Here, the audio session has a priority of 3. The connectivity mode is synchronous (ongoing). No acknowledgement is required that George is still on the telephone call. For example, George may intend to ask a virtual assistant to end the call when George is ready to do so. In this example, the only specified audio session goal is speech intelligibility.

805: A route in the routing table 701, which has been requested by app 412 and assigned ID 54. In this example, the underlying purpose of the audio session is to inform Richard that the plumber is at the door and needs to speak with Richard. The connectivity mode is transactional: play the message to Richard as soon as possible, in view of the priority of the priority of other audio sessions. In this example, Richard has just put the baby to bed and Richard is still in the baby's room. In view of route 803, which has a higher priority, so the CHASM's audio session manager will wait until Richard leaves the baby's room until the message corresponding to route 805 is delivered. In this example, an acknowledgement is required: in this instance, Richard is required to verbally acknowledge that Richard has heard the message and is on his way to meet the plumber. According to some examples, if Richard does not acknowledge within a specified amount of time, the CHASM's audio session manager may cause all audio devices of the audio environment (except, in some examples, any audio device in the baby's room) to provide this message until Richard responds. In this example, the only specified audio session goal is speech intelligibility, so that Richard hears and understands the message.

806: A route in the routing table 701, which has been requested by fire alarm system app 810 and assigned ID 55. The underlying purpose of this route is, under certain circumstances (e.g., according to a response from a smoke detection sensor) to sound the fire alarm to evacuate the house. This route has the highest possible priority: it is even acceptable to wake the baby. The connectivity mode is synchronous. No acknowledgement is required. In this example, the only specified audio session goal is audibility. According to this example, the CHASM will control all audio devices of the audio environment to play the alarm loudly, in order to ensure that all people in the audio environment hear the alarm and evacuate.

In some implementations, an audio session manager (e.g., a CHASM) will maintain information corresponding to each route in one or more memory structures. According to some such implementations, the audio session manager may be configured to update information corresponding to each route according to changing conditions in the audio environment (e.g., a person changing location in the audio environment) and/or according to control signals from the audio session manager 702. For example, referring to the route 801, the audio session manager may store and update one a memory structure that includes, or corresponds to, the following information:

TABLE 1

| ID | Destination Location | Destination Orientation | Audio Devices |
|---|---|---|---|
| 50 | Living room couch | Facing the television | a, b, c, d, e |

The information shown in Table 1 is in a human-readable format, for the purpose of providing an example. The actual format that an audio session manager uses for storing such information (e.g., the destination location and destination orientation) may or may not be understandable by a human being, depending on the particular implementation.

In this example, the audio session manager is configured to monitor the location and orientation of Alex, the destination for the route 801 and to determine which audio devices will be involved with providing audio content for the route 801. According to some such examples, the audio session manager may be configured to determine audio device locations, person locations and person orientations according to methods that are described in detail below. If the information in Table 1 changes, in some implementations the audio session manager will send corresponding commands/control signals to a device that is rendering audio from a media stream for the route 801 and will update a memory structure such as depicted via Table 1.

Figure 9B:
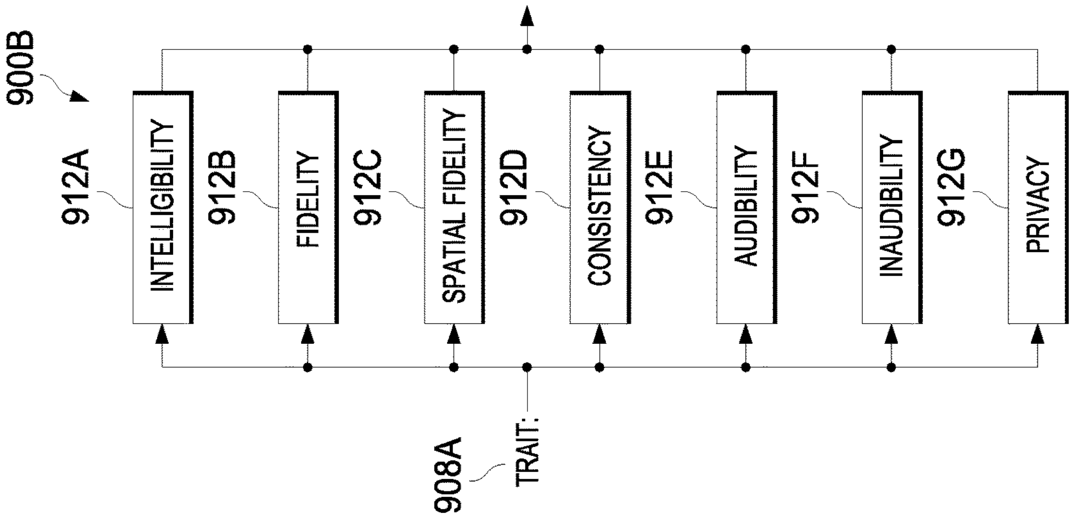
FIG. 9B provides examples of audio session goals.
Figure 9A:
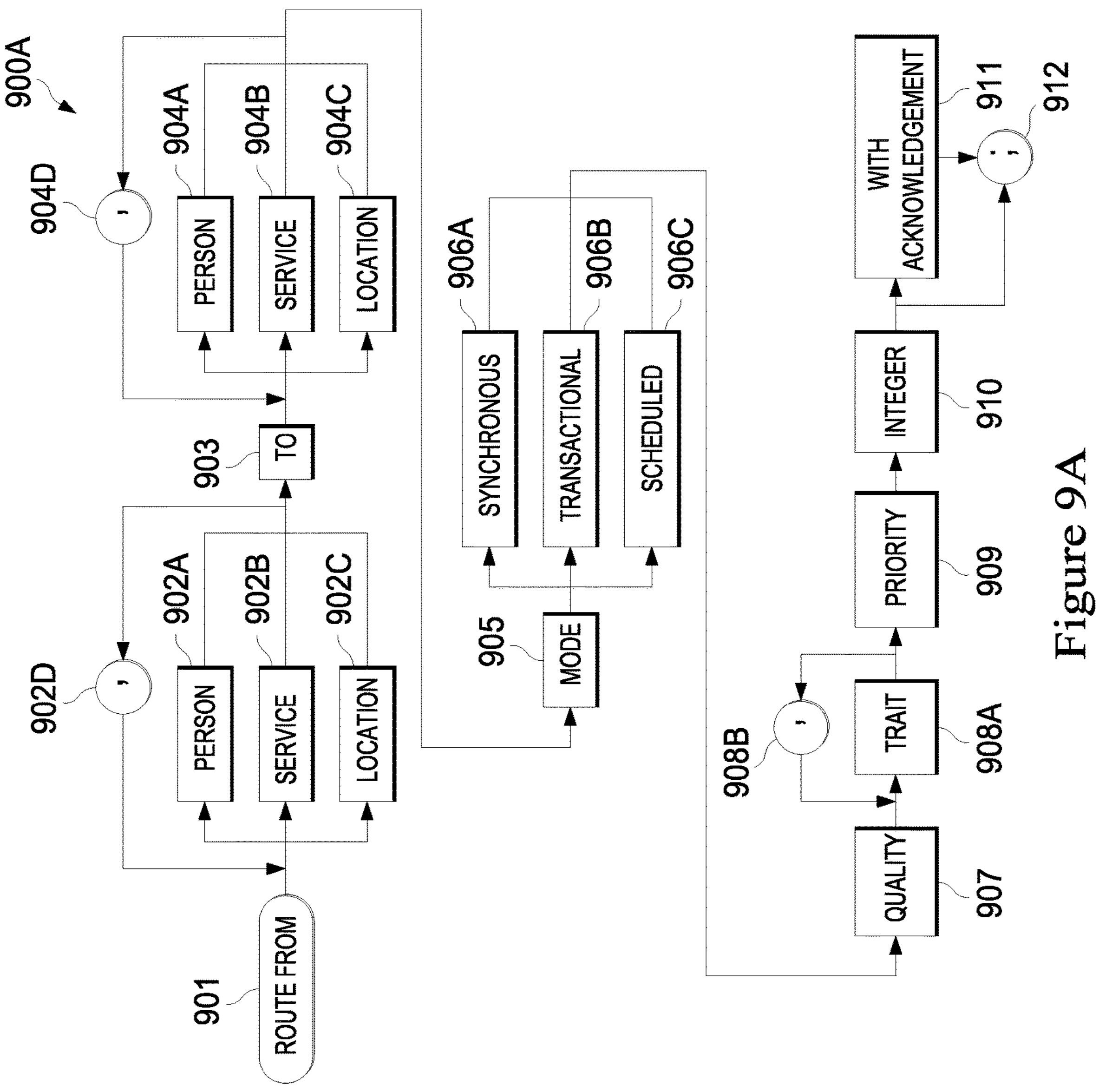
FIG. 9A represents an example of context-free grammar of a route initiation request in a language of orchestration.

FIG. 9A represents an example of context-free grammar of a route initiation request in a language of orchestration. In some examples, FIG. 9A could represent the grammar of a request from an application to a CHASM for a route. The route initiation request may, for example, be triggered according to a user having selected and interacted with the application, e.g., by selecting an icon corresponding to the application on a cell phone, via voice command, etc.

In this example, element 901, in combination with elements 902A, 902B, 902C and 902D, allow a route source to be defined. As depicted by elements 902A, 902B, 902C and 902D, in this example a route source may be, or may include, one or more people, services and audio environment locations. A service may, for example, be a cloud-based media streaming service, an in-home service that provides an audio feed from an exterior doorbell or from an audio device associated with the doorbell, etc. In some implementations, a service may be specified according to a URL (e.g., a URL for Spotify), the name of the service, the IP address of my house doorbell, etc. The audio environment locations may, in some implementations, correspond with the audio environment zones that are described below. In some examples, an audio environment location source may correspond with one or more microphones in the zone. The comma of element 902D indicates that more than one source may be specified. For example, a route request might indicate "route from Roger, Michael" or "route from Spotify" or "route from the kitchen" or "route from Roger and the kitchen," etc.

In this example, element 903, in combination with elements 904A, 904B, 904C and 904D, allow a route destination to be defined. In this implementation, a route destination may be, or may include, one or more people, services and audio environment locations. For example, a route request might indicate "route to David" or "route to the kitchen" or "route to the deck" or "route to Roger and the kitchen," etc.

In this example, only one connectivity mode may be selected per route. According to this implementation, the connectivity mode options are synchronous, scheduled or transactional However, in some implementations more than one connectivity mode may be selected per route. For example, in some such implementations a route initiation request may indicate that a route could be both scheduled and transactional. For example, a route initiation request may indicate that a message should be delivered to David at a scheduled time and that David should reply to the message. Although not shown in FIG. 9A, in some implementations a particular message may be included in a route initiation request, e.g., a pre-recorded message.

In this example, audio session goals are referred to as "traits." According to this example, one or more audio session goals may be indicated in a route initiation request via a combination of quality 907 and one or more traits 908A. The comma 908B indicates that, according to this example, one or more traits can be specified. However, in alternative implementations only one audio session goal may be indicated in a route initiation request.

FIG. 9B provides examples of audio session goals. According to this example, The "trait" list 908A allows for the specification of one or more qualities of importance. In some implementations, a route initiation request may specify more than one trait, e.g., in descending order. For example a route initiation request may specify (quality=intelligibility, spatial fidelity), meaning that intelligibility is the most important trait, followed by spatial fidelity. A route initiation request may specify (quality=audibility), meaning that the only audio session goal is for people to be able to hear, e.g., an alarm.

A route initiation request may specify (quality=inaudibility), meaning that the only audio session goal is for a person specified as a route destination (e.g., a baby) to not hear audio that is reproduced in the audio environment. This is an example of a route initiation request for a "don't wake the baby" implementation.

In another example, a route initiation request may specify (quality=audibility, privacy). This may mean, for example, that the primary audio session goal is for a person specified as a route destination to hear the audio that is delivered, but that a secondary audio session goal is to limit the extent to which other people can hear the audio that is delivered and/or exchanged in accordance with the route, e.g., during a confidential telephone conversation. As noted elsewhere herein, the latter audio session goal may be accomplished by reproducing white noise or other masking noise between the route destination and one or more other people in the audio environment, increasing the volume of other audio being reproduced near one or more other people in the audio environment, etc.

Returning now to FIG. 9A, in this example a route initiation request may specify a priority via elements 909 and 910. In some examples, priority may be indicated via an integer of a finite number of integers (e.g., 3, 4, 5, 6, 7, 8, 9, 10, etc.). In some examples, 1 may indicate the highest priority.

According to this example, a route initiation request may optionally specify an acknowledgement via the element 911. For example, a route initiation request may indicate "tell Michael that Richard says dinner is ready and get an acknowledgement." In response, in some examples an audio session manager may attempt to determine Michael's location. For example, the CHASM may infer that Michael is in the garage, because that is where Michael's voice was last detected. Accordingly, the audio session manager may cause an announcement of "dinner is ready; please confirm that you heard this message" to be played via one or more loudspeakers in the garage. If Michael responds, then the audio session manager could cause the response to be reported/replayed to Richard. If there is no response from Michael to the garage announcement (e.g., after ten seconds), the audio session manager may cause the announcement to be made in the second most likely location for Michael, e.g., a place where Michael spends a lot of time or the last place Michael was heard prior to the prior garage utterance. Let's say that place is Michael's bedroom. If there is no response from Michael to the announcement in Michael's bedroom (e.g., after ten seconds), the audio session manager may cause many loudspeakers of the environment to play the announcement, subject to other constraints such as "don't wake the baby."

Figure 10:
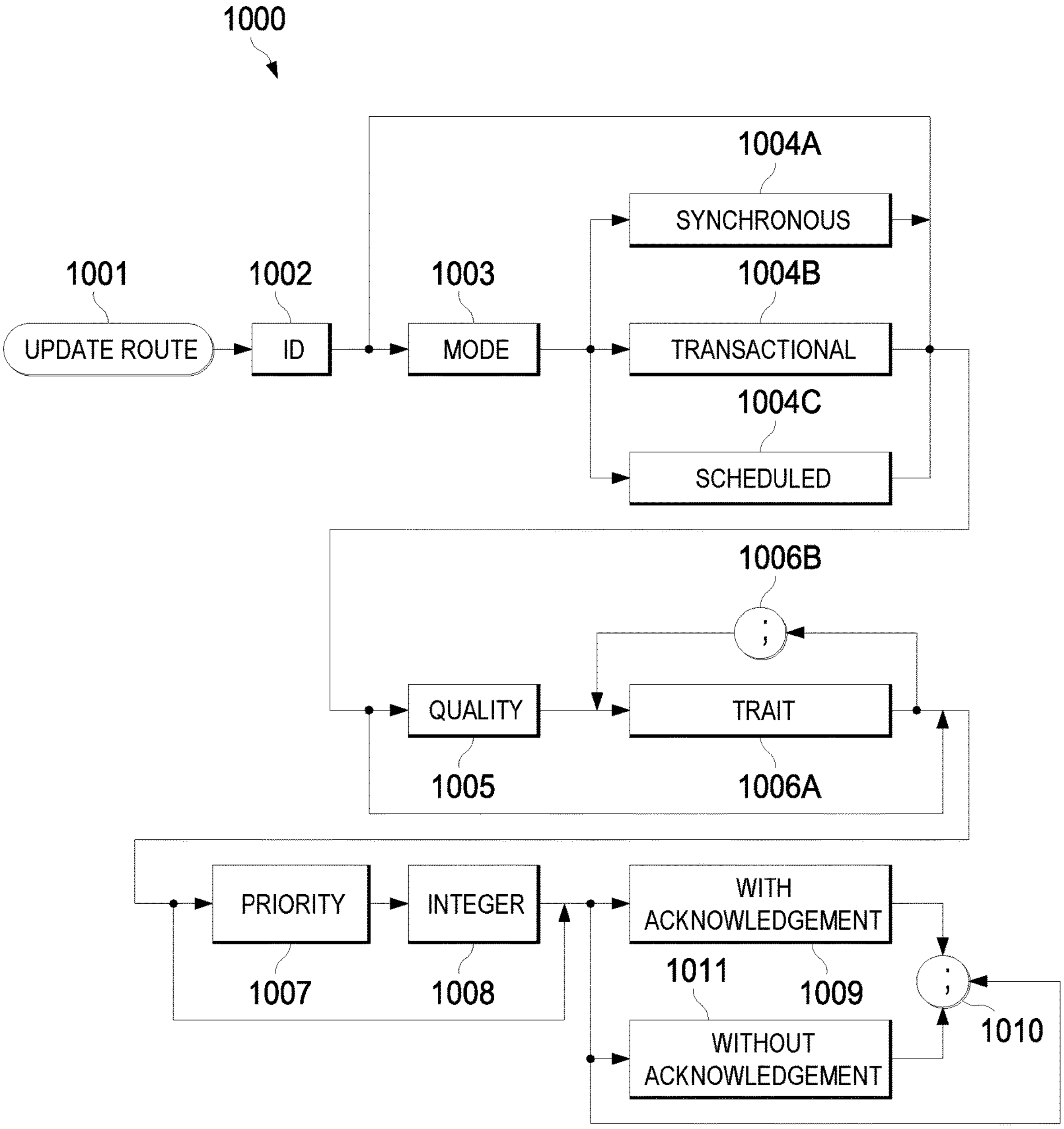
FIG. 10 shows the flow of a request to modify a route according to one example.

FIG. 10 shows the flow of a request to modify a route according to one example. The route modification request may, for example, be transmitted by an application and be received by an audio session manager. The route modification request may, for example, be triggered according to a user having selected and interacted with the application.

In this example, ID 1002 refers to the persistent unique audio session number or code that the audio session manager would have previously provided to the app in response to a route initiation request. According to this example, a connectivity mode change may be made via element 1003 and element 1004A, 1004B or 1004C. Alternatively, elements 1004A, 1004B and 1004C may be bypassed if no connectivity mode change is desired.

According to this example, one or more audio session goals may be changed via elements 1005, 1006A and 1006B. Alternatively, elements 1005, 1006A and 1006B may be bypassed if no audio session goal change is desired.

In this example, a route priority may be changed via elements 1007 and 1008. Alternatively, elements 1007 and 1008 may be bypassed if no route priority change is desired.

According to this example, element 1009 or element 1011 may be used to make an acknowledgement requirement change. For example, element 1009 indicates that an acknowledgement may be added if no acknowledgement was previously required for a route. Conversely, element 1011 indicates that an acknowledgement may be removed if an acknowledgement was previously required for a route. The semicolon of element 1010 indicates the end of a request to modify a route.

Figure 11A:
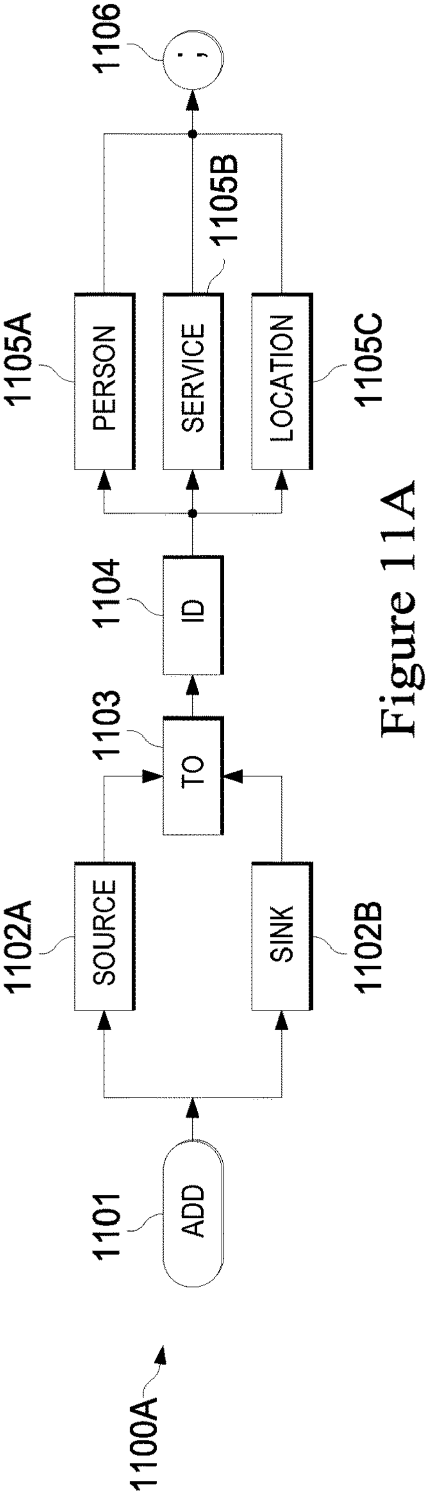
FIGS. 11A and 11B show additional examples of flows for requests to modify a route.
Figure 11B:
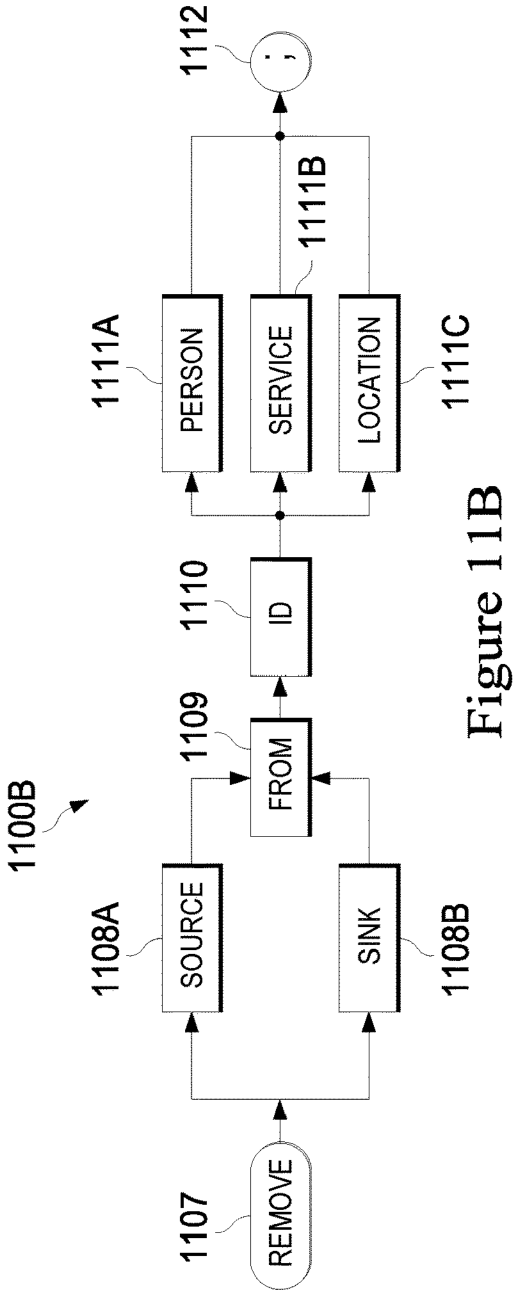
Figure 11C:
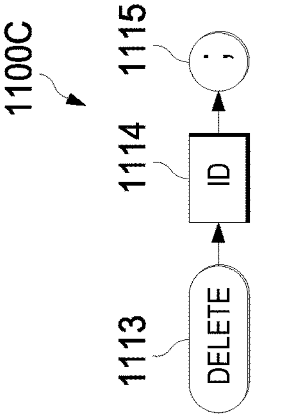
FIG. 11C shows an example of a flow for deleting a route.

FIGS. 11A and 11B show additional examples of flows for requests to modify a route. FIG. 11C shows an example of a flow for deleting a route. A route modification or deletion request may, for example, be transmitted by an application and be received by an audio session manager. The route modification request may, for example, be triggered according to a user having selected and interacted with the application. In FIGS. 11A and 11B, "sink" refers to the route destination. As with other flow diagrams disclosed herein, the operations shown in FIGS. 11A-11C are not necessarily performed in the order indicated. For example, in some implementations a route ID may be specified earlier in the flow, e.g., at the beginning of the flow.

FIG. 11A shows a flow 1100A for adding a source or destination. In some instances, one or more sources or destinations may be added. In this example, a route source may be added via elements 1101 and 1102A. According to this example, a route destination may be added via elements 1101 and 1102B. In this example, the route for which the route source or destination is added is indicated via elements 1103 and 1104. According to this example, a person may be added as a source or destination via element 1105A. In this example, a service may be added as a source or destination via element 1105B. According to this example, a location may be added as a source or destination via element 1105C. Element 1106 indicates the end of the flow for adding one or more sources or destinations.

FIG. 11B shows a flow 1100B for removing a source or destination. In some instances, one or more sources or destinations may be removed. In this example, a route source may be removed via elements 1107 and 1108A. According to this example, a route destination may be removed via elements 1107 and 1108B. In this example, the route for which the route source or destination is removed is indicated via elements 1109 and 1110. According to this example, a person may be removed as a source or destination via element 1111A. In this example, a service may be removed as a source or destination via element 1111B. According to this example, a location may be removed as a source or destination via element 1111C. Element 1112 indicates the end of the flow for removing one or more sources or destinations.

FIG. 11C shows a flow for deleting a route. Here, element 1113 indicates deletion. A route ID specified via element 1114 indicates a route to be deleted. Element 1115 indicates the end of the flow for removing one or more sources or destinations.

Figure 12:
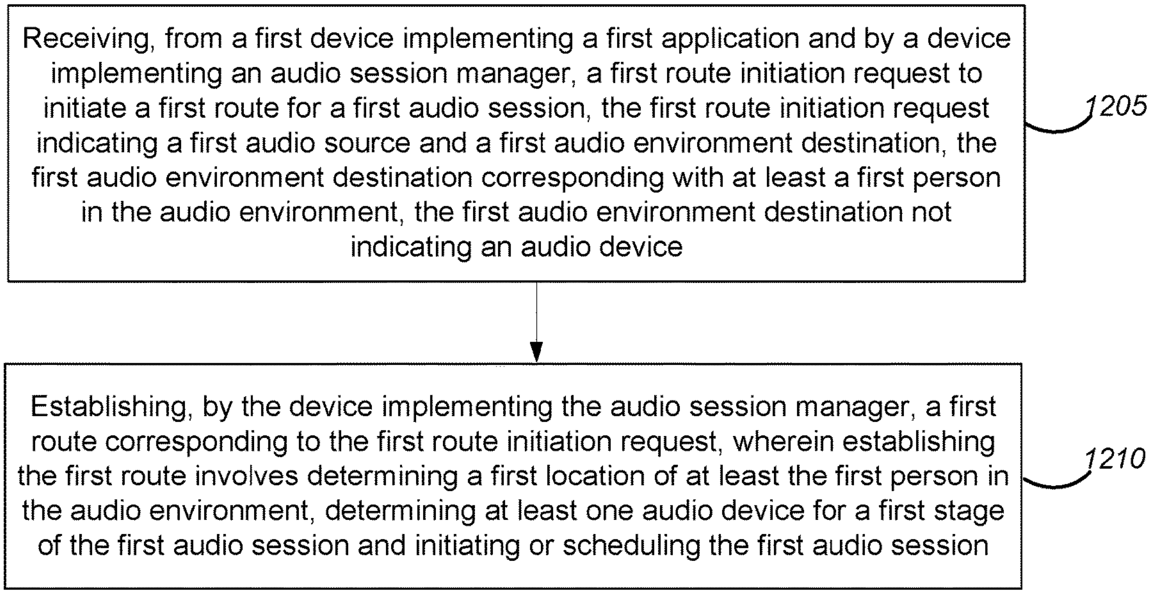
FIG. 12 is a flow diagram that includes blocks of an audio session management method according to some implementations.

FIG. 12 is a flow diagram that includes blocks of an audio session management method according to some implementations. According to this example, method 1200 is an audio session management method for an audio environment having multiple audio devices. The blocks of method 1200, like other methods described herein, are not necessarily performed in the order indicated. In some implementation, one or more of the blocks of method 1200 may be performed concurrently. Moreover, some implementations of method 1200 may include more or fewer blocks than shown and/or described. The blocks of method 1200 may be performed by one or more devices, which may be (or may include) a control system such as the control system 610 that is shown in FIG. 6 and described below, or one of the other disclosed control system examples.

In this example, block 1205 involves receiving, from a first device implementing a first application and by a device implementing an audio session manager (e.g., a CHASM), a first route initiation request to initiate a first route for a first audio session. According to this example, the first route initiation request indicates a first audio source and a first audio environment destination. Here, the first audio environment destination corresponds with at least a first person in the audio environment. However, in this example, the first audio environment destination does not indicate an audio device.

According to some examples, the first route initiation request may indicate at least a first area of the audio environment as a first route source or a first route destination. In some instances, the first route initiation request may indicate at least a first service as the first audio source.

In this implementation, block 1210 involves establishing, by the device implementing the audio session manager, a first route corresponding to the first route initiation request. In this example, establishing the first route involves determining a first location of at least the first person in the audio environment, determining at least one audio device for a first stage of the first audio session and initiating or scheduling the first audio session.

According to some examples, the first route initiation request may include a first audio session priority. In some instances, the first route initiation request may include a first connectivity mode. The first connectivity mode may, for example, be a synchronous connectivity mode, a transactional connectivity mode or a scheduled connectivity mode. In some examples, the first route initiation request may indicate more than one connectivity mode.

In some implementations, the first route initiation request may include an indication of whether an acknowledgement will be required from at least the first person. In some examples, the first route initiation request may include a first audio session goal. The first audio session goal may, for example, include intelligibility, audio quality, spatial fidelity and/or inaudibility.

As noted elsewhere herein, in some implementations a route may have an associated audio session identifier, which may be a persistent unique audio session identifier in some implementations. Accordingly, some implementations of method 1200 may involve determining a first persistent unique audio session identifier for the first route (e.g., by the audio session manager) and transmitting the first persistent unique audio session identifier to the first device (the device that is executing the first application).

In some implementations, establishing the first route may involve causing at least one device in the environment to establish at least a first media stream corresponding to the first route, the first media stream including first audio signals. Some implementations of method 1200 may involve causing the first audio signals to be rendered to first rendered audio signals. In some examples, method 1200 may involve the audio session manager causing another device of the audio environment to render the first audio signals to the first rendered audio signals. However, in some implementations the audio session manager may be configured to receive the first audio signals and to render the first audio signals to the first rendered audio signals.

As noted elsewhere herein, in some implementations an audio session manager (e.g., a CHASM) may monitor conditions of the audio environment, such as the locations and/or orientations of one or more people in the audio environment, the locations of audio devices in the audio environment, etc. For example, for "don't wake the baby" use cases, the audio session manager (e.g., the optimizer 702 of FIG. 7) may determine or at least estimate where the baby is. The audio session manager may know where the baby is because of an express statement from a user, transmitted in the "language of orchestration" from an associated application (e.g., "Do not wake the baby. The baby is in bedroom 1."). Alternatively, or additionally, the audio session manager could determine where the baby is based on prior express input or based on prior detection of baby cries (e.g., as described below). In some examples, the audio session manager may receive this constraint (e.g., via an "inaudibility" audio session goal) and may implement the constraint, e.g., by insuring that the sound pressure level at the baby's location is less than a threshold decibel level (e.g., 50 dB).

Some examples of the method 1200 may involve determining a first orientation of the first person for the first stage of the audio session. According to some such examples, causing the first audio signals to be rendered to first rendered audio signals may involve determining a first reference spatial mode corresponding to the first location and the first orientation of the first person, and determining first relative activation of loudspeakers in the audio environment corresponding to the first reference spatial mode. Some detailed examples are described below.

In some instances, the audio session manager may determine that the first person has changed location and/or orientation. Some examples of the method 1200 may involve determining at least one of a second location or a second orientation of the first person, determining a second reference spatial mode corresponding to at least one of the second location or the second orientation, and determining second relative activation of loudspeakers in the audio environment corresponding to the second reference spatial mode.

As noted elsewhere in this disclosure, an audio manager may, in some instances, be tasked with establishing and implementing more than one route at a time. Some examples of the method 1200 may involve receiving, from a second device implementing a second application and by the device implementing the audio session manager, a second route initiation request to initiate a second route for a second audio session. The first route initiation request may indicate a second audio source and a second audio environment destination. In some examples, the second audio environment destination may correspond with at least a second person in the audio environment. However, in some instances the second audio environment destination may not indicate any specific audio device associated with the second route.

Some such examples of the method 1200 may involve establishing, by the device implementing the audio session manager, a second route corresponding to the second route initiation request. In some instances, establishing the second route may involve determining a first location of at least the second person in the audio environment, determining at least one audio device for a first stage of the second audio session and initiating the second audio session.

According to some examples, establishing the second route may involve establishing at least a second media stream corresponding to the second route. The second media stream may include second audio signals. Some such examples of the method 1200 may involve causing the second audio signals to be rendered to second rendered audio signals.

Some examples of the method 1200 may involve modifying a rendering process for the first audio signals based, at least in part, on at least one of the second audio signals, the second rendered audio signals or characteristics thereof, to produce modified first rendered audio signals. Modifying the rendering process for the first audio signals may, for example, involve warping the rendering of first audio signals away from a rendering location of the second rendered audio signals. Alternatively, or additionally, modifying the rendering process for the first audio signals may involve modifying the loudness of one or more of the first rendered audio signals in response to a loudness of one or more of the second audio signals or the second rendered audio signals.

Figure 13:
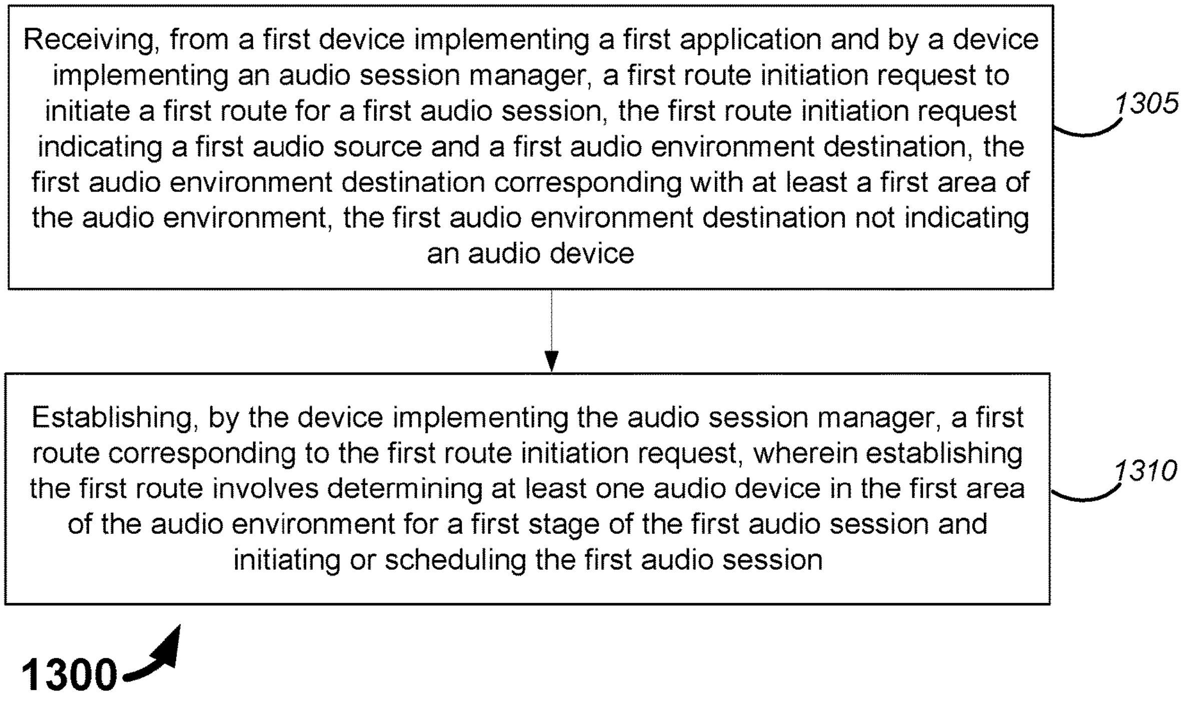
FIG. 13 is a flow diagram that includes blocks of an audio session management method according to some implementations.

FIG. 13 is a flow diagram that includes blocks of an audio session management method according to some implementations. According to this example, method 1300 is an audio session management method for an audio environment having multiple audio devices. The blocks of method 1300, like other methods described herein, are not necessarily performed in the order indicated. In some implementation, one or more of the blocks of method 1300 may be performed concurrently. Moreover, some implementations of method 1300 may include more or fewer blocks than shown and/or described. The blocks of method 1300 may be performed by one or more devices, which may be (or may include) a control system such as the control system 610 that is shown in FIG. 6 and described below, or one of the other disclosed control system examples.

In this example, block 1305 involves receiving, from a first device implementing a first application and by a device implementing an audio session manager (e.g., a CHASM), a first route initiation request to initiate a first route for a first audio session. According to this example, the first route initiation request indicates a first audio source and a first audio environment destination. Here, the first audio environment destination corresponds with at least a first area of the audio environment. However, in this example, the first audio environment destination does not indicate an audio device.

According to some examples, the first route initiation request may indicate at least a first person in the audio environment as a first route source or a first route destination. In some instances, the first route initiation request may indicate at least a first service as the first audio source.

In this implementation, block 1310 involves establishing, by the device implementing the audio session manager, a first route corresponding to the first route initiation request. In this example, establishing the first route involves determining at least one audio device in the first area of the audio environment for a first stage of the first audio session and initiating or scheduling the first audio session.

According to some examples, the first route initiation request may include a first audio session priority. In some instances, the first route initiation request may include a first connectivity mode. The first connectivity mode may, for example, be a synchronous connectivity mode, a transactional connectivity mode or a scheduled connectivity mode. In some examples, the first route initiation request may indicate more than one connectivity mode.

In some implementations, the first route initiation request may include an indication of whether an acknowledgement will be required from at least the first person. In some examples, the first route initiation request may include a first audio session goal. The first audio session goal may, for example, include intelligibility, audio quality, spatial fidelity and/or inaudibility.

Some implementations of method 1300 may involve determining a first persistent unique audio session identifier for the first route (e.g., by the audio session manager) and transmitting the first persistent unique audio session identifier to the first device (the device that is executing the first application).

In some implementations, establishing the first route may involve causing at least one device in the environment to establish at least a first media stream corresponding to the first route, the first media stream including first audio signals. Some implementations of method 1300 may involve causing the first audio signals to be rendered to first rendered audio signals. In some examples, method 1300 may involve the audio session manager causing another device of the audio environment to render the first audio signals to the first rendered audio signals. However, in some implementations the audio session manager may be configured to receive the first audio signals and to render the first audio signals to the first rendered audio signals.

As noted elsewhere herein, in some implementations an audio session manager (e.g., a CHASM) may monitor conditions of the audio environment, such as the location of one or more audio devices in the audio environment.

Some examples of the method 1300 may involve performing a first loudspeaker autolocation process of automatically determining a first location of each audio device of a plurality of audio devices in the first area of the audio environment at a first time. In some such examples, the rendering process may be based, at least in part, on the first location of each audio device. Some such examples may involve storing the first location of each audio device in a data structure associated with the first route.

In some instances, the audio session manager may determine that at least one audio device in the first area has a changed location. Some such examples may involve performing a second loudspeaker autolocation process of automatically determining the changed location and updating the rendering process based, at least in part, on the changed location. Some such implementations may involve storing the changed location in the data structure associated with the first route.

In some instances, the audio session manager may determine that at least one additional audio device has been moved to the first area. Some such examples may involve performing a second loudspeaker autolocation process of automatically determining an additional audio device location of the additional audio device and updating the rendering process based, at least in part, on the additional audio device location. Some such implementations may involve storing the additional audio device location in the data structure associated with the first route.

As noted elsewhere herein, in some examples the first route initiation request may indicate at least a first person as a first route source or a first route destination. Some examples of the method 1300 may involve determining a first orientation of the first person for the first stage of the audio session. According to some such examples, causing the first audio signals to be rendered to first rendered audio signals may involve determining a first reference spatial mode corresponding to the first location and the first orientation of the first person, and determining first relative activation of loudspeakers in the audio environment corresponding to the first reference spatial mode. Some detailed examples are described below.

In some instances, the audio session manager may determine that the first person has changed location and/or orientation. Some examples of the method 1300 may involve determining at least one of a second location or a second orientation of the first person, determining a second reference spatial mode corresponding to at least one of the second location or the second orientation, and determining second relative activation of loudspeakers in the audio environment corresponding to the second reference spatial mode.

As noted elsewhere in this disclosure, an audio manager may, in some instances, be tasked with establishing and implementing more than one route at a time. Some examples of the method 1300 may involve receiving, from a second device implementing a second application and by the device implementing the audio session manager, a second route initiation request to initiate a second route for a second audio session. The first route initiation request may indicate a second audio source and a second audio environment destination. In some examples, the second audio environment destination may correspond with at least a second person in the audio environment. However, in some instances the second audio environment destination may not indicate any specific audio device associated with the second route.

Some such examples of the method 1300 may involve establishing, by the device implementing the audio session manager, a second route corresponding to the second route initiation request. In some instances, establishing the second route may involve determining a first location of at least the second person in the audio environment, determining at least one audio device for a first stage of the second audio session and initiating the second audio session.

According to some examples, establishing the second route may involve establishing at least a second media stream corresponding to the second route. The second media stream may include second audio signals. Some such examples of the method 1300 may involve causing the second audio signals to be rendered to second rendered audio signals.

Some examples of the method 1300 may involve modifying a rendering process for the first audio signals based, at least in part, on at least one of the second audio signals, the second rendered audio signals or characteristics thereof, to produce modified first rendered audio signals. Modifying the rendering process for the first audio signals may, for example, involve warping the rendering of first audio signals away from a rendering location of the second rendered audio signals. Alternatively, or additionally, modifying the rendering process for the first audio signals may involve modifying the loudness of one or more of the first rendered audio signals in response to a loudness of one or more of the second audio signals or the second rendered audio signals.

Figure 14:
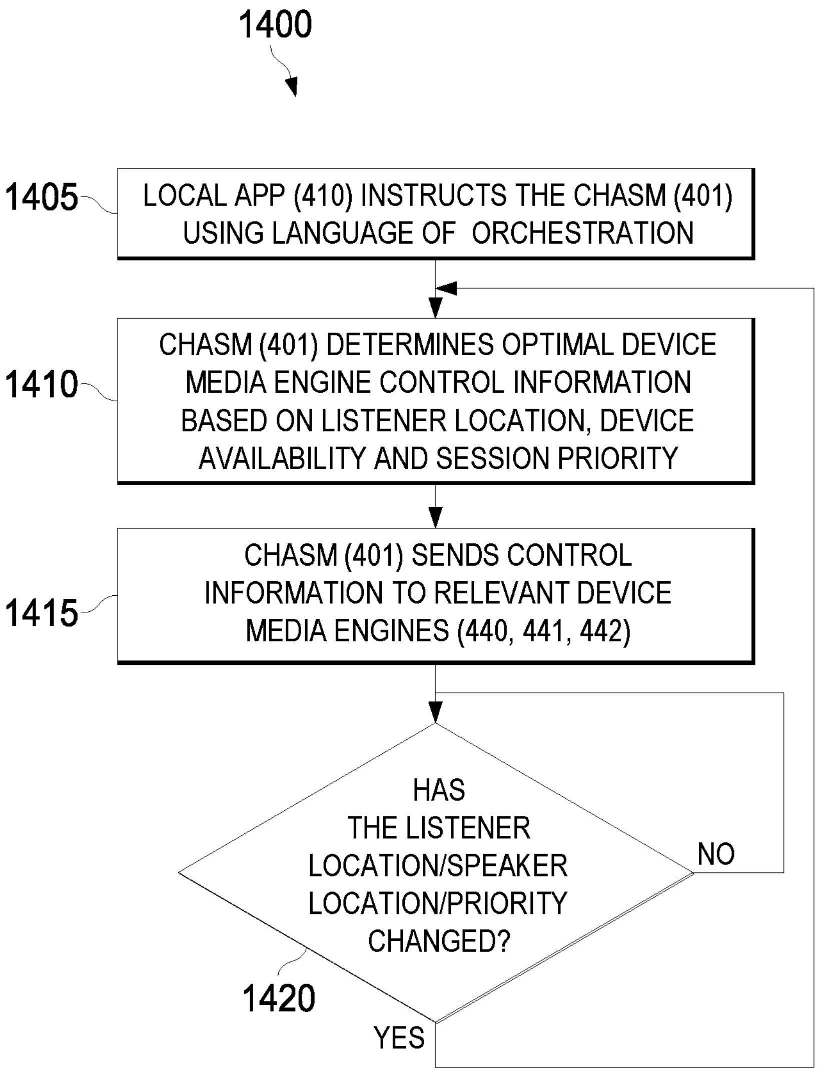
FIG. 14 is a flow diagram that includes blocks of an audio session management method according to some implementations.

FIG. 14 is a flow diagram that includes blocks of an audio session management method according to some implementations. According to this example, method 1400 is an audio session management method for an audio environment having multiple audio devices. The blocks of method 1400, like other methods described herein, are not necessarily performed in the order indicated. In some implementation, one or more of the blocks of method 1400 may be performed concurrently. Moreover, some implementations of method 1400 may include more or fewer blocks than shown and/or described. The blocks of method 1400 may be performed by one or more devices, which may be (or may include) a control system such as the control system 610 that is shown in FIG. 6 and described below, or one of the other disclosed control system examples.

In this example, in block 1405 the application 410 of FIG. 4 instructs the CHASM 401, using the language of orchestration. Block 1405 may, for example involve the application 410 sending the CHASM 401 a route initiation request or a route modification request.

According to this example, the CHASM 401 determines optimal media engine control information responsive to the instructions received from the application 410. In this example, the optimal media engine control information is based, at least in part, on a listener's location within an audio environment, audio device availability within the audio environment and an audio session priority indicated in the instructions from the application 410. In some instances, the optimal media engine control information may be based, at least in part, on media engine capabilities determined by the CHASM 401, e.g., via device property descriptors shared by the relevant audio device(s). According to some examples, the optimal media engine control information may be based, at least in part, on a listener's orientation.

In this instance, block 415 involves sending control information to one or more audio device media engines. The control information may correspond with the audio session management control signals that are described above with reference to FIG. 5.

According to this example, block 1420 represents the CHASM 401 monitoring conditions within the audio environment, as well as possible further communications from the application 410 regarding this particular route, to determine whether there have been any significant changes, such as a change in route priority, a change in audio device location(s), a change in a listener's location, etc. If so, the process reverts to block 1410 and the processes of block 1410 are performed according to the new parameter(s). If not, the CHASM 401 continues the monitoring processes of block 1420.

Figure 15:
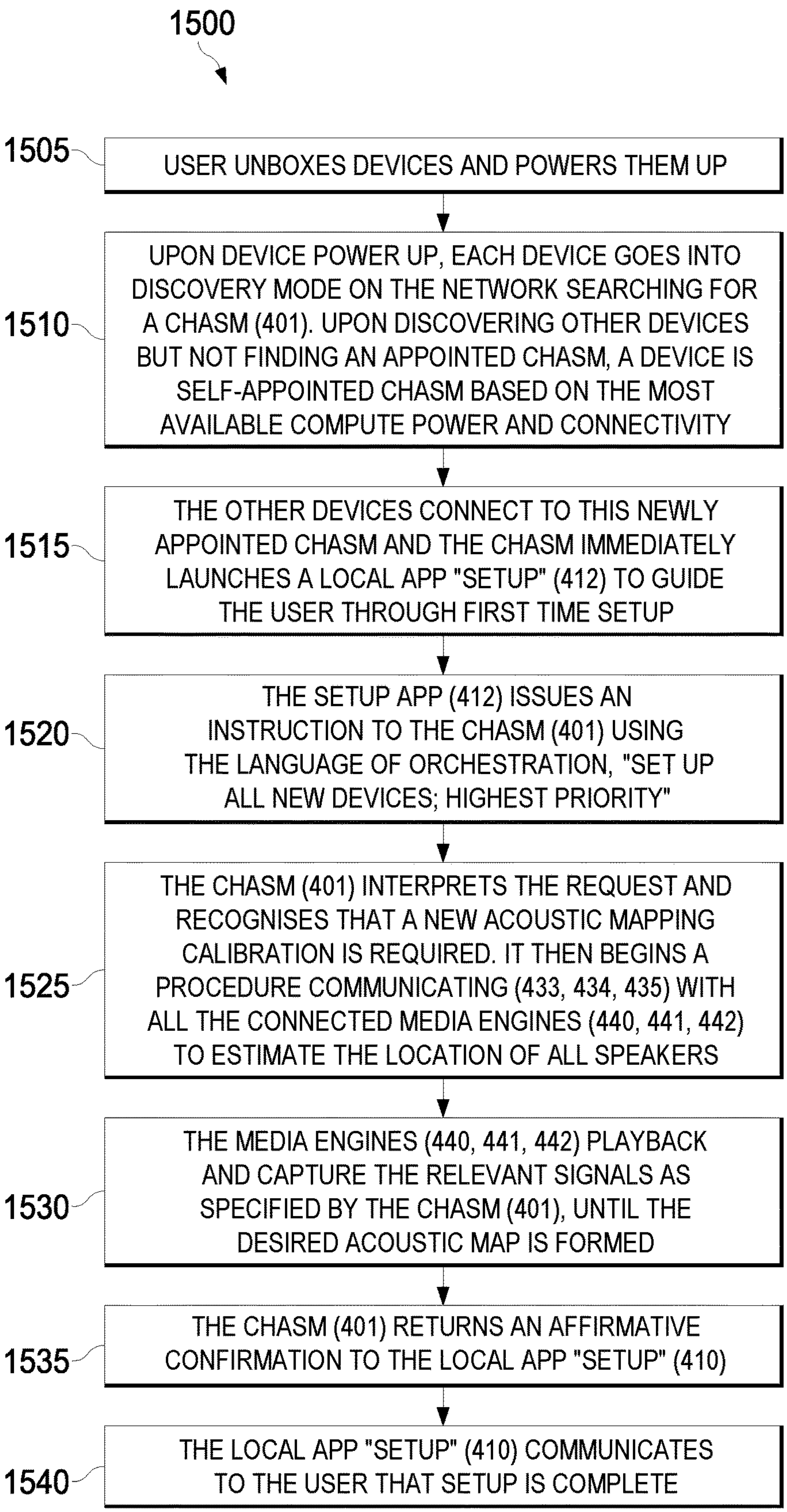
FIG. 15 is a flow diagram that includes blocks of an automatic setup process for one or more audio devices that are newly introduced to an audio environment according to some implementations.

FIG. 15 is a flow diagram that includes blocks of an automatic setup process for one or more audio devices that are newly introduced to an audio environment according to some implementations. In this example, some or all of the audio devices are new. The blocks of method 1500, like other methods described herein, are not necessarily performed in the order indicated. In some implementation, one or more of the blocks of method 1500 may be performed concurrently. Moreover, some implementations of method 1500 may include more or fewer blocks than shown and/or described. The blocks of method 1500 may be performed by one or more devices, which may be (or may include) a control system such as the control system 610 that is shown in FIG. 6 and described below, or one of the other disclosed control system examples.

In this example, the new audio devices are unpacked and powered up in block 1505. In the example of block 1510, each of the new audio devices enters a discovery mode to search for other audio devices and, in particular, to search for a CHASM of the audio environment. If an existing CHASM is discovered, the new audio devices may be configured to communicate with the CHASM, to share information regarding the capabilities of each new audio device with the CHASM, etc.

However, according to this example, no existing CHASM is discovered. Accordingly, in this example of block 1510, one of the new audio devices configures itself as a CHASM. In this example, the new audio device having the most available computational power and/or the greatest connectivity will configure itself as the new CHASM 401.

In this example, in block 1515 the new non-CHASM audio devices all communicate with the other new audio device that is the newly-appointed CHASM 401. According to this example, the new CHASM 401 launches a "set-up" application, which is the application 412 of FIG. 4 in this example. In this instance, the set-up application 412 is configured to interact with the user, e.g., via audio and/or visual prompts, to guide the user through the set-up process.

According to this example, in block 1520 the set-up application 412 sends an instruction to the CHASM 401 in the language of orchestration, indicating "set up all new devices" and having the highest level of priority.

In this example, in block 1525 the CHASM 401 interprets the instructions from the set-up application 412 and determines that a new acoustic mapping calibration is required. According to this example, the acoustic mapping process is initiated in block 1525 and is completed in block 1530 via communications between the CHASM 401 and the media engines of the new non-CHASM audio devices, which are the media engines 440, 441 and 442 of FIG. 4 in this instance. As used herein, the term "acoustic mapping" includes an estimation of all discoverable loudspeaker locations of the audio environment. The acoustic mapping process may, for example, involve a loudspeaker autolocation process such as those described in detail below. In some instances, the acoustic mapping process may involve a process of discovering of loudspeaker capability information and/or individual loudspeaker dynamics processing information.

According to this example, in block 1535 the CHASM 401 sends a confirmation to the application 412 that the set-up process has been completed. In this example, in block 1540 the application 412 indicates to the user that the set-up process has been completed.

Figure 16:
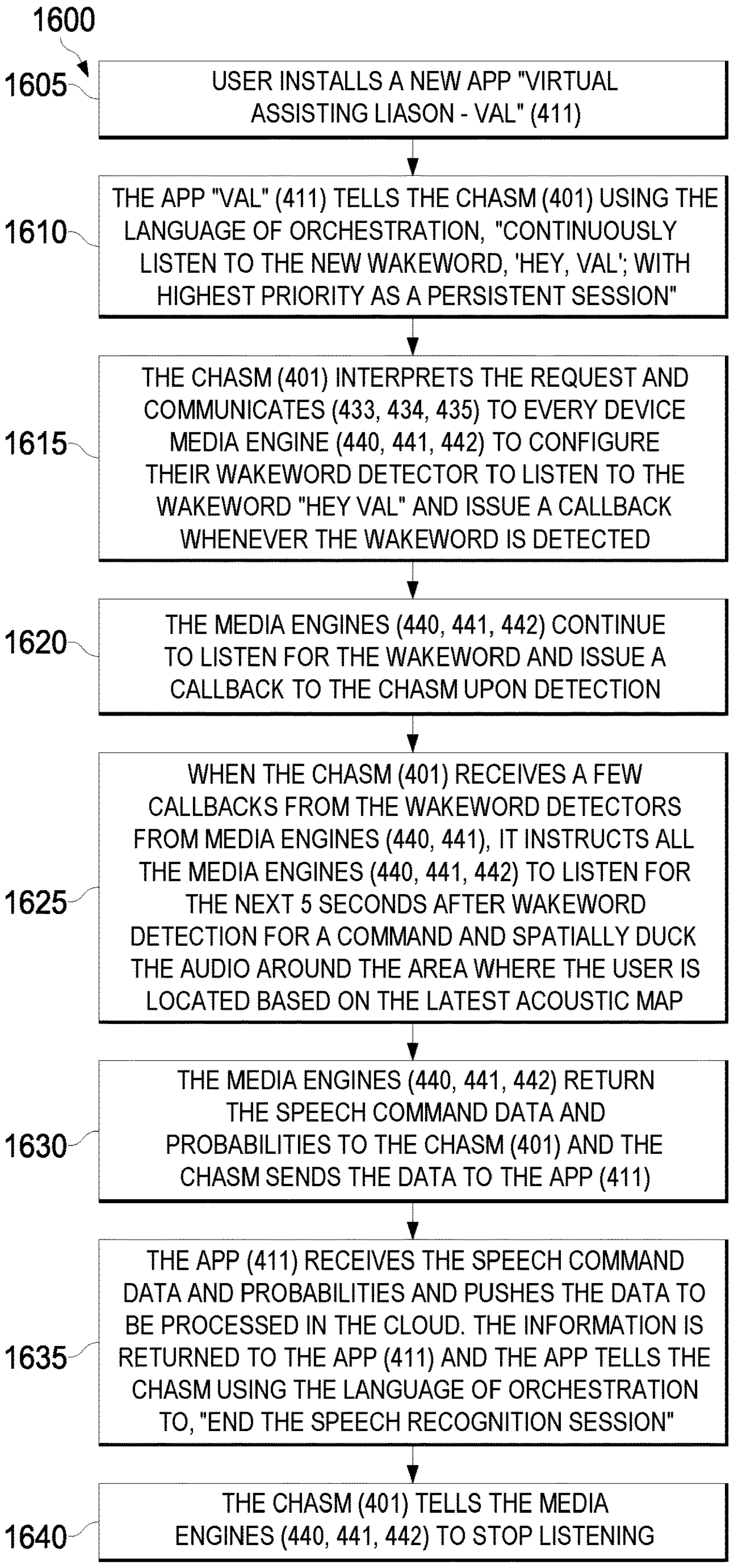
FIG. 16 is a flow diagram that includes blocks of a process for installing a virtual assistant application according to some implementations.

FIG. 16 is a flow diagram that includes blocks of a process for installing a virtual assistant application according to some implementations. In some instances, method 1700 may be performed after the set-up process of method 1500. In this example, method 1600 involves installing the virtual assistant application in the context of the audio environment shown in FIG. 4. The blocks of method 1600, like other methods described herein, are not necessarily performed in the order indicated. In some implementation, one or more of the blocks of method 1600 may be performed concurrently. Moreover, some implementations of method 1600 may include more or fewer blocks than shown and/or described. The blocks of method 1600 may be performed by one or more devices, which may be (or may include) a control system such as the control system 610 that is shown in FIG. 6 and described below, or one of the other disclosed control system examples.

In this example, a new application 411 called "Virtual Assisting Liaison" or VAL is installed by a user in block 1605. According to some examples, block 1605 may involve downloading the application 411 to an audio device, such as a cell phone, from one or more servers via the Internet.

According to this implementation, in block 1610 the application 411 instructs the CHASM 401, in the language of orchestration, to continuously listen to a new wakeword "Hey Val," with the highest priority and as a persistent audio session. In this example, in block 1615 the CHASM 401 interprets the instructions from the application 411 and instructs the media engines 440, 441 and 442 to configure their wakeword detector to listen for the wakeword "Hey Val" and to issue a callback to the CHASM 401 whenever the wakeword "Hey Val" is detected. In this implementation, in block 1620 the media engines 440, 441 and 442 continue to listen for the wakeword.

In this example, in block 1625 the CHASM 401 receives callbacks from the media engines 440 and 441, indicating that the wakeword "Hey Val" has been detected. In response, the CHASM 401 instructs the media engines 440, 441 and 442 to listen for a command during a threshold time interval (5 seconds in this example) after the wakeword was initially detected and, if the command is detected, to "duck" or reduce the volume of audio in the area where the command is detected.

According to this example, in block 1630 the media engines 440, 441 and 442 all detect a command and send to the CHASM 401 speech audio data and probabilities corresponding to the detected command In this example, in block 1630 the CHASM 401 forwards to the application 411 the speech audio data and probabilities corresponding to the detected command.

In this implementation, in block 1635 the application 411 receives the speech audio data and probabilities corresponding to the detected command, and forwards these data to a cloud-based speech recognition application for processing. In this example, in block 1635 the cloud-based speech recognition application sends the results of a speech recognition process to the application 411, which in this example include one or more words corresponding to the command Here, in block 1635 the application 411 instructs the CHASM 401, in the language of orchestration, to end the speech recognition session. According to this example, the CHASM 401 instructs the media engines 440, 441 and 442 to stop listening for the command.

Figure 17:
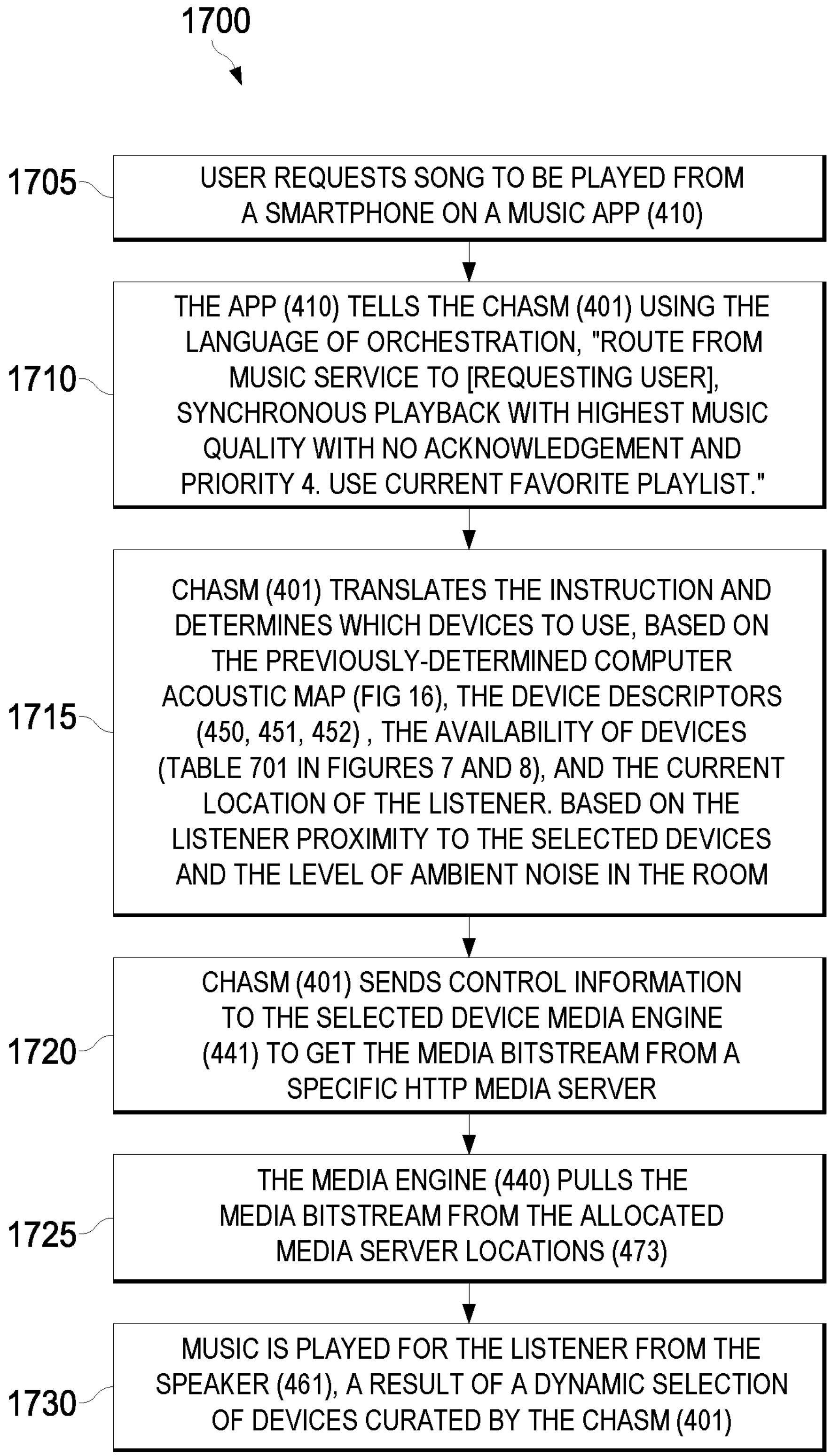
FIG. 17 is a flow diagram that includes blocks of an audio session management method according to some implementations.

FIG. 17 is a flow diagram that includes blocks of an audio session management method according to some implementations. According to this example, method 1700 is an audio session management method for implementing a music application in the audio environment of FIG. 4. In some instances, method 1700 may be performed after the set-up process of method 1500. In some examples, method 1700 may be performed before or after the process for installing a virtual assistant application that is described above with reference to FIG. 16. The blocks of method 1700, like other methods described herein, are not necessarily performed in the order indicated. In some implementation, one or more of the blocks of method 1700 may be performed concurrently. Moreover, some implementations of method 1700 may include more or fewer blocks than shown and/or described. The blocks of method 1700 may be performed by one or more devices, which may be (or may include) a control system such as the control system 610 that is shown in FIG. 6 and described below, or one of the other disclosed control system examples.

In this example, in block 1705 a user provides input to a music application that is running on a device in the audio environment. In this instance, the music application is the application 410 of FIG. 4. According to this example, the application 410 is running on a smart phone and the input is provided via a user interface of the smart phone, such as a touch and/or gesture sensor system.

According to this example, in block 1710 the application 410 instructs the CHASM 401, in this example via a route initiation request in the language of orchestration, to initiate a route from a cloud-based music service to the user who is interacting with the application 410 via the smart phone. In this example, the route initiation request indicates a synchronous mode with an audio session goal of the highest music reproduction quality, with no acknowledgment requested and a priority of 4, using the user's current favorite playlist of the cloud-based music service.

In this example, in block 1715 the CHASM 401 determines, pursuant to the instructions received in block 1710, which audio devices of the audio environment will be involved in the route. The determination may be based, at least in part, on a previously-determined acoustic map of the audio environment, on which audio devices are currently available, on the capabilities of available audio devices and on an estimated current location of the user. In some examples, the determination of block 1715 may be based, at least in part, on an estimated current orientation of the user. In some implementations, a nominal or initial listening level also may be chosen in block 1715. The level may be based, at least in part, on an estimated proximity of the user to one or more audio devices, an ambient noise level in the area of the user, etc.

According to this example, in block 1720 the CHASM 401 sends control information to a selected audio device media engine, which is the media engine 441 in this example, to obtain a media bitstream corresponding to the route requested by the application 410. In this example, the CHASM 401 provides the media engine 441 with an HTTP address of a cloud-based music provider, e.g., an HTTP address of a particular server hosted by the cloud-based music provider. According to this implementation, in block 1725 the media engine 441 obtains a media bitstream from the cloud-based music provider, in this example from one or more allocated server locations.

In this example, block 1730 involves the playback of music corresponding to the media stream obtained in block 1725. According to this example, the CHASM 401 has determined that at least the loudspeaker 461, and in some examples also the loudspeaker 460 and/or the loudspeaker 462, are involved in playback of the music. In some such examples, the CHASM 401 has provided instructions to the media engine 441 to render audio data from the media stream and to provide rendered speaker feed signals to the media engine 440 and/or the media engine 442.

Figure 18A:
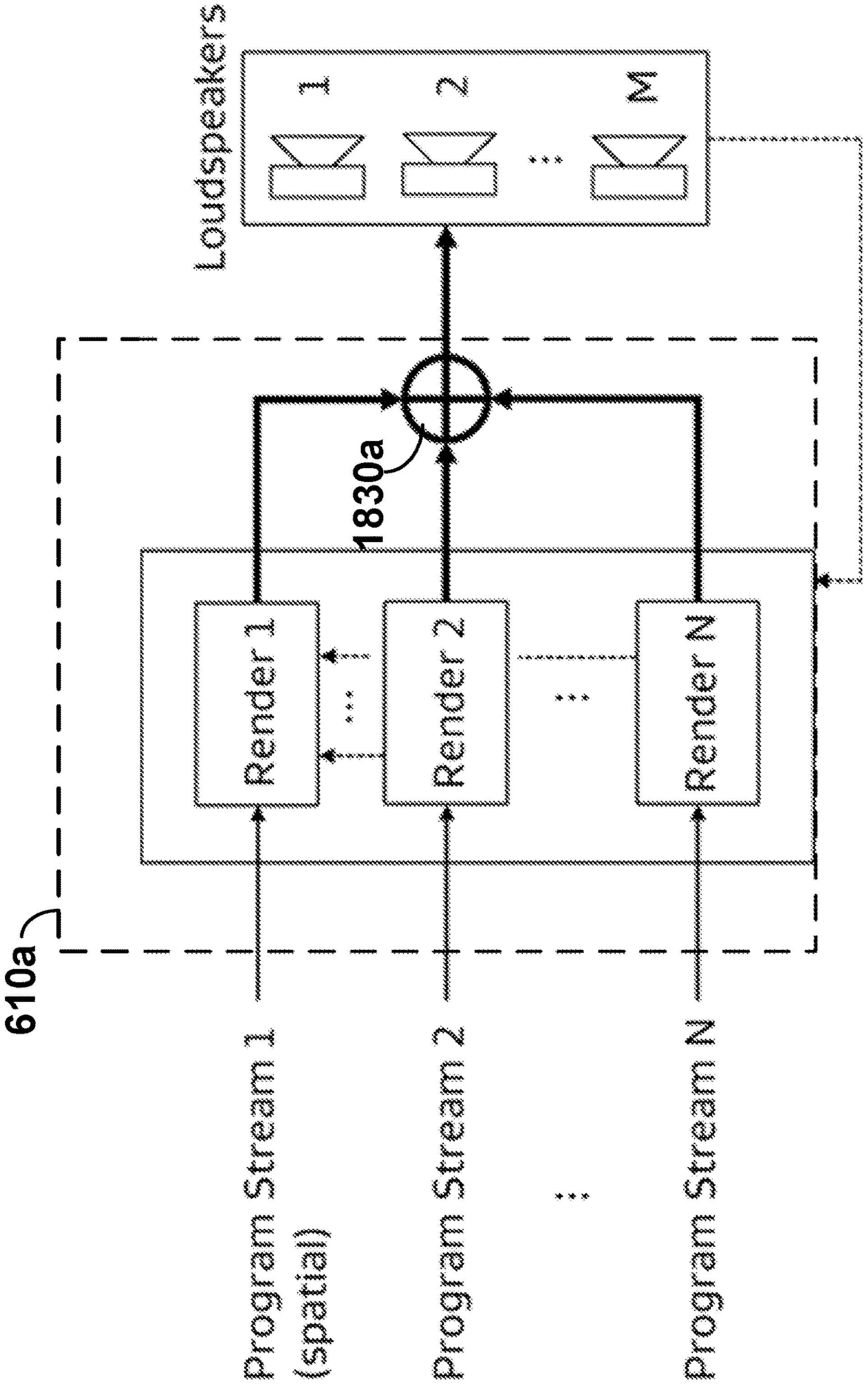
FIG. 18A is a block diagram of a minimal version of an embodiment.

FIG. 18A is a block diagram of a minimal version of an embodiment. Depicted are N program streams (N≥2), with the first explicitly labeled as being spatial, whose corresponding collection of audio signals feed through corresponding renderers that are each individually configured for playback of its corresponding program stream over a common set of M arbitrarily spaced loudspeakers (M≥2). The renderers also may be referred to herein as "rendering modules." The rendering modules and the mixer 1830*a* may be implemented via software, hardware, firmware or some combination thereof. In this example, the rendering modules and the mixer 1830*a* are implemented via control system 610*a*, which is an instance of the control system 610 that is described above with reference to FIG. 6. According to some implementations, the functionality of the rendering modules and the mixer 1830*a* may be implemented, at least in part, according to instructions from a device that is implementing what is referred to herein as an audio session manager, e.g., a CHASM. In some such examples, the functionality of the rendering modules and the mixer 1830*a* may be implemented, at least in part, according to instructions from the CHASM 208C, the CHASM 208D, the CHASM 307 and/or the CHASM 401 that are described above with reference to FIGS. 2C, 2D, 3C and 4. In alternative examples, a device that is implementing the audio session manager may also implement the functionality of the rendering modules and the mixer 1830*a*.

In the example shown in FIG. 18A, each of the N renderers output a set of M loudspeaker feeds which are summed across all N renderers for simultaneous playback over the M loudspeakers. According to this implementation, information about the layout of the M loudspeakers within the listening environment is provided to all the renderers, indicated by the dashed line feeding back from the loudspeaker block, so that the renderers may be properly configured for playback over the speakers. This layout information may or may not be sent from one or more of the speakers themselves, depending on the particular implementation. According to some examples, layout information may be provided by one or more smart speakers configured for determining the relative positions of each of the M loudspeakers in the listening environment. Some such auto-location methods may be based on direction of arrival (DOA) methods or time of arrival (TOA) methods. In other examples, this layout information may be determined by another device and/or input by a user. In some examples, loudspeaker specification information about the capabilities of at least some of the M loudspeakers within the listening environment may be provided to all the renderers. Such loudspeaker specification information may include impedance, frequency response, sensitivity, power rating, number and location of individual drivers, etc. According to this example, information from the rendering of one or more of the additional program streams is fed into the renderer of the primary spatial stream such that said rendering may be dynamically modified as a function of said information. This information is represented by the dashed lines passing from render blocks 2 through N back up to render block 1.

Figure 18B:
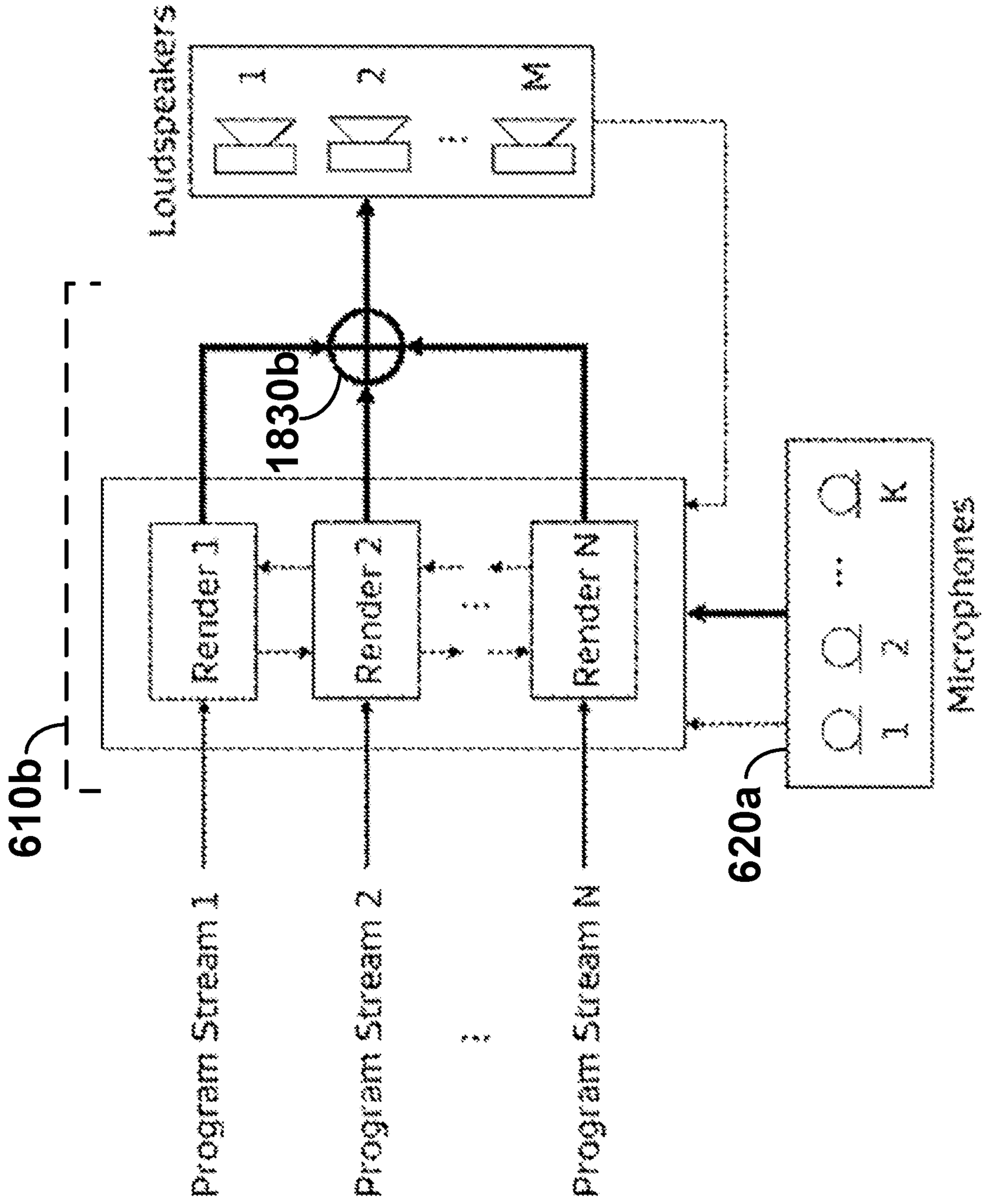
FIG. 18B depicts another (more capable) embodiment with additional features.

FIG. 18B depicts another (more capable) embodiment with additional features. In this example, the rendering modules and the mixer 1830*b* are implemented via control system 610*b*, which is an instance of the control system 610 that is described above with reference to FIG. 6. According to some implementations, the functionality of the rendering modules and the mixer 1830*b* may be implemented, at least in part, according to instructions from a device that is implementing what is referred to herein as an audio session manager, e.g., a CHASM. In some such examples, the functionality of the rendering modules and the mixer 1830*b* may be implemented, at least in part, according to instructions from the CHASM 208C, the CHASM 208D, the CHASM 307 and/or the CHASM 401 that are described above with reference to FIGS. 2C, 2D, 3C and 4. In alternative examples, a device that is implementing the audio session manager may also implement the functionality of the rendering modules and the mixer 1830*b*.

In FIG. 18B, dashed lines travelling up and down between all N renderers represent the idea that any one of the N renderers may contribute to the dynamic modification of any of the remaining N−1 renderers. In other words, the rendering of any one of the N program streams may be dynamically modified as a function of a combination of one or more renderings of any of the remaining N−1 program streams. Additionally, any one or more of the program streams may be a spatial mix, and the rendering of any program stream, regardless of whether it is spatial or not, may be dynamically modified as a function of any of the other program streams. Loudspeaker layout information may be provided to the N renderers, e.g. as noted above. In some examples, loudspeaker specification information may be provided to the N renderers. In some implementations, a microphone system 620*a* may include a set of K microphones, (K≥1), within the listening environment. In some examples, the microphone(s) may be attached to, or associated with, the one or more of the loudspeakers. These microphones may feed both their captured audio signals, represented by the solid line, and additional configuration information (their location, for example), represented by the dashed line, back into the set of N renderers. Any of the N renderers may then be dynamically modified as a function of this additional microphone input. Various examples are provided herein.

Examples of information derived from the microphone inputs and subsequently used to dynamically modify any of the N renderers include but are not limited to:

- Detection of the utterance of a particular word or phrase by a user of the system.
- An estimate of the location of one or more users of the system.
- An estimate of the loudness of any of combination of the N programs streams at a particular location in the listening space.
- An estimate of the loudness of other environmental sounds, such as background noise, in the listening environment.

Figure 19:
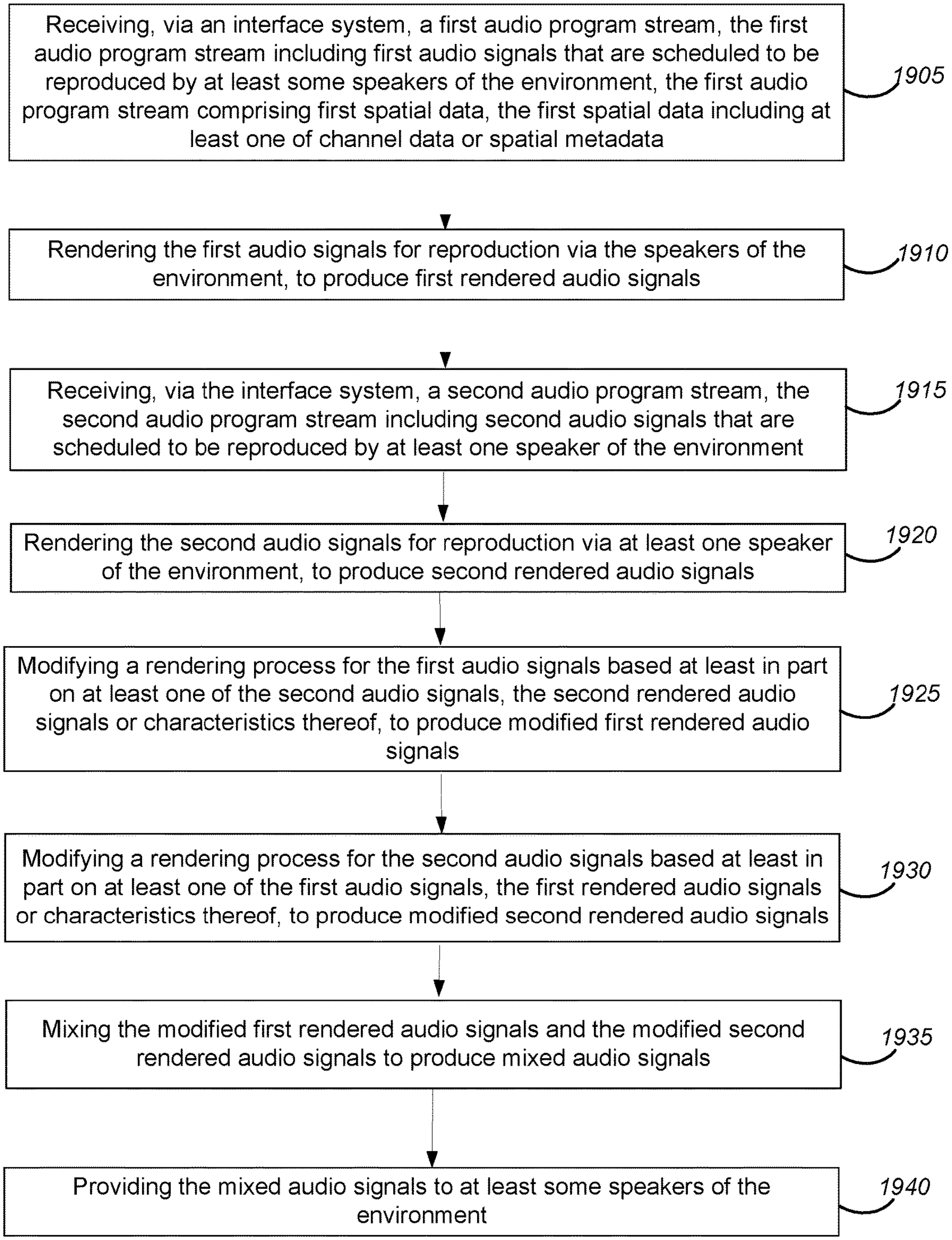
FIG. 19 is a flow diagram that outlines one example of a method that may be performed by an apparatus or system such as those shown in FIG. 6, FIG. 18A or FIG. 18B.

FIG. 19 is a flow diagram that outlines one example of a method that may be performed by an apparatus or system such as those shown in FIG. 6, FIG. 18A or FIG. 18B. The blocks of method 1900, like other methods described herein, are not necessarily performed in the order indicated. Moreover, such methods may include more or fewer blocks than shown and/or described. The blocks of method 1900 may be performed by one or more devices, which may be (or may include) a control system such as the control system 610, the control system 610*a* or the control system 610*b* that are shown in FIGS. 6, 18A and 18B, and described above, or one of the other disclosed control system examples. According to some implementations, the blocks of method 1900 may be performed, at least in part, according to instructions from a device that is implementing what is referred to herein as an audio session manager, e.g., a CHASM. In some such examples, the blocks of method 1900 may be performed, at least in part, according to instructions from the CHASM 208C, the CHASM 208D, the CHASM 307 and/or the CHASM 401 that are described above with reference to FIGS. 2C, 2D, 3C and 4. In alternative examples, a device that is implementing the audio session manager may also implement the blocks of method 1900.

In this implementation, block 1905 involves receiving, via an interface system, a first audio program stream. In this example, the first audio program stream includes first audio signals that are scheduled to be reproduced by at least some speakers of the environment. Here, the first audio program stream includes first spatial data. According to this example, the first spatial data includes channel data and/or spatial metadata. In some examples, block 1905 involves a first rendering module of a control system receiving, via an interface system, the first audio program stream.

According to this example, block 1910 involves rendering the first audio signals for reproduction via the speakers of the environment, to produce first rendered audio signals. Some examples of the method 1900 involve receiving loudspeaker layout information, e.g., as noted above. Some examples of the method 1900 involve receiving loudspeaker specification information, e.g., as noted above. In some examples, the first rendering module may produce the first rendered audio signals based, at least in part, on the loudspeaker layout information and/or the loudspeaker specification information.

In this example, block 1915 involves receiving, via the interface system, a second audio program stream. In this implementation, the second audio program stream includes second audio signals that are scheduled to be reproduced by at least some speakers of the environment. According to this example, the second audio program stream includes second spatial data. The second spatial data includes channel data and/or spatial metadata. In some examples, block 1915 involves a second rendering module of a control system receiving, via the interface system, the second audio program stream.

According to this implementation, block 1920 involves rendering the second audio signals for reproduction via the speakers of the environment, to produce second rendered audio signals. In some examples, the second rendering module may produce the second rendered audio signals based, at least in part, on received loudspeaker layout information and/or received loudspeaker specification information.

In some instances, some or all speakers of the environment may be arbitrarily located. For example, at least some speakers of the environment may be placed in locations that do not correspond to any standard prescribed speaker layout, such as Dolby 5.1, Dolby 7.1, Hamasaki 22.2, etc. In some such examples, at least some speakers of the environment may be placed in locations that are convenient with respect to the furniture, walls, etc., of the environment (e.g., in locations where there is space to accommodate the speakers), but not in any standard prescribed speaker layout.

Accordingly, some implementations block 1910 or block 1920 may involve flexible rendering to arbitrarily located speakers. Some such implementations may involve Center of Mass Amplitude Panning (CMAP), Flexible Virtualization (FV) or a combination of both. From a high level, both these techniques render a set of one or more audio signals, each with an associated desired perceived spatial position, for playback over a set of two or more speakers, where the relative activation of speakers of the set is a function of a model of perceived spatial position of said audio signals played back over the speakers and a proximity of the desired perceived spatial position of the audio signals to the positions of the speakers.

The model ensures that the audio signal is heard by the listener near its intended spatial position, and the proximity term controls which speakers are used to achieve this spatial impression. In particular, the proximity term favors the activation of speakers that are near the desired perceived spatial position of the audio signal. For both CMAP and FV, this functional relationship is conveniently derived from a cost function written as the sum of two terms, one for the spatial aspect and one for proximity.

$$C(g) = C_{spatial}\left(g, \vec{o}, \{\vec{s}_i\}\right) + C_{proximity}\left(g, \vec{o}, \{\vec{s}_i\}\right) \tag{1}$$

Here, the set $\{\vec{s}_i\}$ denotes the positions of a set of M loudspeakers, $\vec{o}$ denotes the desired perceived spatial position of the audio signal, and g denotes an M dimensional vector of speaker activations. For CMAP, each activation in the vector represents a gain per speaker, while for FV each activation represents a filter (in this second case g can equivalently be considered a vector of complex values at a particular frequency and a different g is computed across a plurality of frequencies to form the filter). The optimal vector of activations is found by minimizing the cost function across activations:

$$g_{opt} = \min_g C\left(g, \vec{o}, \{\vec{s}_i\}\right) \tag{2a}$$

With certain definitions of the cost function, it is difficult to control the absolute level of the optimal activations resulting from the above minimization, though the relative level between the components of $g_{opt}$ is appropriate. To deal with this problem, a subsequent normalization of $g_{opt}$ may be performed so that the absolute level of the activations is controlled. For example, normalization of the vector to have unit length may be desirable, which is in line with a commonly used constant power panning rules:

$$\bar{g}_{opt} = \frac{g_{opt}}{\|g_{opt}\|} \tag{2b}$$

The exact behavior of the flexible rendering algorithm is dictated by the particular construction of the two terms of the cost function, $C_{spatial}$ and $C_{proximity}$ For CMAP, $C_{spatial}$ is derived from a model that places the perceived spatial position of an audio signal playing from a set of loudspeakers at the center of mass of those loudspeakers' positions weighted by their associated activating gains $g_i$ (elements of the vector g):

$$\vec{o} = \frac{\sum_{i=1}^{M} g_i \vec{s}_i}{\sum_{i=1}^{M} g_i} \tag{3}$$

Equation 3 is then manipulated into a spatial cost representing the squared error between the desired audio position and that produced by the activated loudspeakers:

$$C_{spatial}\left(g, \vec{o}, \{\vec{s}_i\}\right) = \left\|\left(\sum_{i=1}^{M} g_i\right)\vec{o} - \sum_{i=1}^{M} g_i \vec{s}_i\right\|^2 = \left\|\sum_{i=1}^{M} g_i\left(\vec{o} - \vec{s}_i\right)\right\|^2 \tag{4}$$

With FV, the spatial term of the cost function is defined differently. There the goal is to produce a binaural response b corresponding to the audio object position flat the left and right ears of the listener. Conceptually, b is a 2×1 vector of filters (one filter for each ear) but is more conveniently treated as a 2×1 vector of complex values at a particular frequency. Proceeding with this representation at a particular frequency, the desired binaural response may be retrieved from a set of HRTFs index by object position:

$$b = HRTF\{\vec{o}\} \tag{5}$$

At the same time, the 2×1 binaural response e produced at the listener's ears by the loudspeakers is modelled as a 2×M acoustic transmission matrix H multiplied with the M×1 vector g of complex speaker activation values:

$$e = Hg \tag{6}$$

The acoustic transmission matrix H is modelled based on the set of loudspeaker positions $\{\vec{s}_i\}$ with respect to the listener position. Finally, the spatial component of the cost function is defined as the squared error between the desired binaural response (Equation 5) and that produced by the loudspeakers (Equation 6):

$$C_{spatial}(g, \vec{o}, \{\vec{s}_i\}) = (b - Hg) * (b - Hg) \tag{7}$$

Conveniently, the spatial term of the cost function for CMAP and FV defined in Equations 4 and 7 can both be rearranged into a matrix quadratic as a function of speaker activations g:

$$C_{spatial}(g, \vec{o}, \{\vec{s}_i\}) = g * Ag + Bg + C \tag{8}$$

where A is an M×M square matrix, B is a 1×M vector, and C is a scalar. The matrix A is of rank 2, and therefore when M>2 there exist an infinite number of speaker activations g for which the spatial error term equals zero. Introducing the second term of the cost function, $C_{proximity}$, removes this indeterminacy and results in a particular solution with perceptually beneficial properties in comparison to the other possible solutions. For both CMAP and FV, $C_{proximity}$ is constructed such that activation of speakers whose position $\vec{s}_i$ is distant from the desired audio signal position $\vec{o}$ is penalized more than activation of speakers whose position is close to the desired position. This construction yields an optimal set of speaker activations that is sparse, where only speakers in close proximity to the desired audio signal's position are significantly activated, and practically results in a spatial reproduction of the audio signal that is perceptually more robust to listener movement around the set of speakers.

To this end, the second term of the cost function, $C_{proximity}$, may be defined as a distance-weighted sum of the absolute values squared of speaker activations. This is represented compactly in matrix form as:

$$C_{proximity}(g, \vec{o}, \{\vec{s}_i\}) = g * Dg \tag{9a}$$

where D is a diagonal matrix of distance penalties between the desired audio position and each speaker:

$$D = \begin{bmatrix} d_1 & \dots & 0 \\ \vdots & \ddots & \vdots \\ 0 & \dots & d_M \end{bmatrix}, d_i = \text{distance}(\vec{o}, \vec{s}_i) \tag{9b}$$

The distance penalty function can take on many forms, but the following is a useful parameterization $$\text{distance}(\vec{o}, \vec{s}_i) = \alpha\, d_0^2 \left( \frac{\|\vec{o} - \vec{s}_i\|}{d_0} \right)^{\beta} \tag{9c}$$

where $\|\vec{o} - \vec{s}_i\|$ is the Euclidean distance between the desired audio position and speaker position and α and β are tunable parameters. The parameter α indicates the global strength of the penalty; $d_0$ corresponds to the spatial extent of the distance penalty (loudspeakers at a distance around $d_0$ or further away will be penalized), and β accounts for the abruptness of the onset of the penalty at distance $d_0$.

Combining the two terms of the cost function defined in Equations 8 and 9a yields the overall cost function $$C(g) = g * Ag + Bg + C + g * Dg = g * (A + D)g + Bg + C \tag{10}$$

Setting the derivative of this cost function with respect to g equal to zero and solving for g yields the optimal speaker activation solution:

$$g_{opt} = \frac{1}{2}(A + D)^{-1}B \tag{11}$$

In general, the optimal solution in Equation 11 may yield speaker activations that are negative in value. For the CMAP construction of the flexible renderer, such negative activations may not be desirable, and thus Equation (11) may be minimized subject to all activations remaining positive.

Pairing flexible rendering methods (implemented in accordance with some embodiments) with a set of wireless smart speakers (or other smart audio devices) can yield an extremely capable and easy-to-use spatial audio rendering system. In contemplating interactions with such a system it becomes evident that dynamic modifications to the spatial rendering may be desirable in order to optimize for other objectives that may arise during the system's use. To achieve this goal, a class of embodiments augment existing flexible rendering algorithms (in which speaker activation is a function of the previously disclosed spatial and proximity terms), with one or more additional dynamically configurable functions dependent on one or more properties of the audio signals being rendered, the set of speakers, and/or other external inputs. In accordance with some embodiments, the cost function of the existing flexible rendering given in Equation 1 is augmented with these one or more additional dependencies according to $$C(g) = C_{spatial}\left(g, \vec{o}, \{\vec{s}_i\}\right) + C_{proximity}\left(g, \vec{o}, \{\vec{s}_i\}\right) + \sum_j C_j(g, \{\{\hat{o}\}, \{\hat{s}_i\}, \{\hat{e}\}\}_j) \tag{12}$$

In Equation 12, the terms $C_j(g, \{\{\hat{o}\}, \{\hat{s}_i\}, \{\hat{e}\}\}_j)$ represent additional cost terms, with $\{\hat{o}\}$ representing a set of one or more properties of the audio signals (e.g., of an object-based audio program) being rendered, $\{\hat{s}_i\}$ representing a set of one or more properties of the speakers over which the audio is being rendered, and $\{\hat{e}\}$ representing one or more additional external inputs. Each term $C_j(g, \{\{\hat{o}\}, \{\hat{s}_i\}, \{\hat{e}\}\}_j)$ returns a cost as a function of activations g in relation to a combination of one or more properties of the audio signals, speakers, and/or external inputs, represented generically by the set $\{\{\hat{o}\}, \{\hat{s}_i\}, \{\hat{e}\}\}_j$. It should be appreciated that the set $\{\{\hat{o}\}, \{\hat{s}_i\}, \{\hat{e}\}\}_j$ contains at a minimum only one element from any of $\{\hat{o}\}$, $\{\hat{s}_i\}$, or $\{\hat{e}\}$.

Examples of $\{\hat{o}\}$ include but are not limited to:

Desired perceived spatial position of the audio signal;

Level (possible time-varying) of the audio signal; and/or

Spectrum (possibly time-varying) of the audio signal.

Examples of $\{\hat{s}_i\}$ include but are not limited to:

Locations of the loudspeakers in the listening space;

Frequency response of the loudspeakers;

Playback level limits of the loudspeakers;

Parameters of dynamics processing algorithms within the speakers, such as limiter gains;

A measurement or estimate of acoustic transmission from each speaker to the others;

A measure of echo canceller performance on the speakers; and/or

Relative synchronization of the speakers with respect to each other.

Examples of $\{\hat{e}\}$ include but are not limited to:

Locations of one or more listeners or talkers in the playback space;

A measurement or estimate of acoustic transmission from each loudspeaker to the listening location;

A measurement or estimate of the acoustic transmission from a talker to the set of loudspeakers;

Location of some other landmark in the playback space; and/or

A measurement or estimate of acoustic transmission from each speaker to some other landmark in the playback space;

With the new cost function defined in Equation 12, an optimal set of activations may be found through minimization with respect to g and possible post-normalization as previously specified in Equations 2a and 2b.

Similar to the proximity cost defined in Equations 9a and 9b, it is also convenient to express each of the new cost function terms $C_j(g, \{\hat{o}\{\hat{s}_i\}, \{\hat{e}\}\}_j)$ as a weighted sum of the absolute values squared of speaker activations:

$$C_j\left(g, \{\{\hat{o}\}, \{\hat{s}_i\}, \{\hat{e}\}\}_j\right) = g * W_j\left(\{\{\hat{o}\}, \{\hat{s}_i\}, \{\hat{e}\}\}_j\right)g, \tag{13a}$$

where $W_j$ is a diagonal matrix of weights $w_{ij}=w_{ij}(\{\{\hat{o}\}, \{\hat{s}_i\}, \{\hat{e}\}\}_j)$ describing the cost associated with activating speaker i for the term j:

$$W_j = \begin{bmatrix} w_{1j} & \cdots & 0 \\ \vdots & \ddots & \vdots \\ 0 & \cdots & w_{Mj} \end{bmatrix} \tag{13b}$$

Combining Equations 13a and b with the matrix quadratic version of the CMAP and FV cost functions given in Equation 10 yields a potentially beneficial implementation of the general expanded cost function (of some embodiments) given in Equation 12:

$$C(g) = g * Ag + Bg + C + g * Dg + \sum_j g * W_j g = g * \left(A + D + \sum_j W_j\right)g + Bg + C \tag{14}$$

With this definition of the new cost function terms, the overall cost function remains a matrix quadratic, and the optimal set of activations $g_{opt}$ can be found through differentiation of Equation 14 to yield $$g_{opt} = \frac{1}{2}\left(A + D + \sum_j W_j\right)^{-1} B \tag{15}$$

It is useful to consider each one of the weight terms $w_{ij}$ as functions of a given continuous penalty value $p_{ij}=p_{ij}(\{\{\hat{o}\}, \{\hat{s}_i\}, \{\hat{e}\}\}_j)$ for each one of the loudspeakers. In one example embodiment, this penalty value is the distance from the object (to be rendered) to the loudspeaker considered. In another example embodiment, this penalty value represents the inability of the given loudspeaker to reproduce some frequencies. Based on this penalty value, the weight terms $w_{ij}$ can be parametrized as:

$$w_{ij} = \alpha_j f_j\left(\frac{p_{ij}}{\tau_j}\right) \tag{16}$$

where $\alpha_j$ represents a pre-factor (which takes into account the global intensity of the weight term), where $\tau_j$ represents a penalty threshold (around or beyond which the weight term becomes significant), and where $f_j(x)$ represents a monotonically increasing function. For example, with $f_j(x)=x^{\beta_j}$ the weight term has the form:

$$w_{ij} = \alpha_j\left(\frac{p_{ij}}{\tau_j}\right)^{\beta_j} \tag{17}$$

where $\alpha_j$, $\uparrow_j$, $\tau_j$ are tunable parameters which respectively indicate the global strength of the penalty, the abruptness of the onset of the penalty and the extent of the penalty. Care should be taken in setting these tunable values so that the relative effect of the cost term $C_j$ with respect any other additional cost terms as well as $C_{spatial}$ and $C_{proximity}$ is appropriate for achieving the desired outcome. For example, as a rule of thumb, if one desires a particular penalty to clearly dominate the others then setting its intensity $\alpha_j$ roughly ten times larger than the next largest penalty intensity may be appropriate.

In case all loudspeakers are penalized, it is often convenient to subtract the minimum penalty from all weight terms in post-processing so that at least one of the speakers is not penalized:

$$w_{ij} \to w'_{ij} = w_{ij} - \min_i(w_{ij}) \tag{18}$$

As stated above, there are many possible use cases that can be realized using the new cost function terms described herein (and similar new cost function terms employed in accordance with other embodiments). Next, we describe more concrete details with three examples: moving audio towards a listener or talker, moving audio away from a listener or talker, and moving audio away from a landmark.

In the first example, what will be referred to herein as an "attracting force" is used to pull audio towards a position, which in some examples may be the position of a listener or a talker a landmark position, a furniture position, etc. The position may be referred to herein as an "attracting force position" or an "attractor location." As used herein an "attracting force" is a factor that favors relatively higher loudspeaker activation in closer proximity to an attracting force position. According to this example, the weight with takes the form of equation 17 with the continuous penalty value $p_{ij}$ given by the distance of the ith speaker from a fixed attractor location $\vec{l}_j$ and the threshold value $\tau_j$ given by the maximum of these distances across all speakers:

$$p_{ij} = \left\|\vec{l}_j - \vec{s}_i\right\|, \text{ and} \tag{19a}$$

$$\tau_j = \max_i\left\|\vec{l}_j - \vec{s}_i\right\| \tag{19b}$$

To illustrate the use case of "pulling" audio towards a listener or talker, we specifically set $\alpha_j=20$, $\beta_j=3$, and $\vec{l}_j$ to a vector corresponding to a listener/talker position of 180 degrees. These values of $\alpha_j$, $\beta_j$, and $\vec{l}_j$ are merely examples. In other implementations, $\alpha_j$ may be in the range of 1 to 100 and $\beta_j$ may be in the range of 1 to 25.

In the second example, a "repelling force" is used to "push" audio away from a position, which may be a listener position, a talker position or another position, such as a landmark position, a furniture position, etc. The position may be referred to herein as a "repelling force position" or a "repelling location." As used herein an "repelling force" is a factor that favors relatively lower loudspeaker activation in closer proximity to the repelling force position. According to this example, we define $p_{ij}$ and $\tau_j$ with respect to a fixed repelling location $\vec{l}_j$ similarly to the attracting force in Equation 19:

$$p_{ij} = \max_i\left\|\vec{l}_j - \vec{s}_i\right\| - \left\|\vec{l}_j - \vec{s}_i\right\|, \text{ and} \tag{19c}$$

$$\tau_j = \max_i\left\|\vec{l}_j - \vec{s}_i\right\| \tag{19d}$$

To illustrate the use case of pushing audio away from a listener or talker, we specifically set $\alpha_j=5$, $\beta_j=2$, and $\vec{l}_j$ to a vector corresponding to a listener/talker position of 180 degrees. These values of $\alpha_j$, $\beta_j$, and $\vec{l}_j$ are merely examples.

Returning now to FIG. 19, in this example block 1925 involves modifying a rendering process for the first audio signals based at least in part on at least one of the second audio signals, the second rendered audio signals or characteristics thereof, to produce modified first rendered audio signals. Various examples of modifying a rendering process are disclosed herein. "Characteristics" of a rendered signal may, for example, include estimated or measured loudness or audibility at an intended listening position, either in silence or in the presence of one or more additional rendered signals. Other examples of characteristics include parameters associated with the rendering of said signals such as the intended spatial positions of the constituent signals of the associated program stream, the location of loudspeakers over which the signals are rendered, the relative activation of loudspeakers as a function of intended spatial position of the constituent signals, and any other parameters or state associated with the rendering algorithm utilized to generate said rendered signals. In some examples, block 1925 may be performed by the first rendering module.

According to this example, block 1930 involves modifying a rendering process for the second audio signals based at least in part on at least one of the first audio signals, the first rendered audio signals or characteristics thereof, to produce modified second rendered audio signals. In some examples, block 1930 may be performed by the second rendering module.

In some implementations, modifying the rendering process for the first audio signals may involve warping the rendering of first audio signals away from a rendering location of the second rendered audio signals and/or modifying the loudness of one or more of the first rendered audio signals in response to a loudness of one or more of the second audio signals or the second rendered audio signals. Alternatively, or additionally, modifying the rendering process for the second audio signals may involve warping the rendering of second audio signals away from a rendering location of the first rendered audio signals and/or modifying the loudness of one or more of the second rendered audio signals in response to a loudness of one or more of the first audio signals or the first rendered audio signals. Some examples are provided below with reference to FIG. 3 et seq.

However, other types of rendering process modifications are within the scope of the present disclosure. For example, in some instances modifying the rendering process for the first audio signals or the second audio signals may involve performing spectral modification, audibility-based modification or dynamic range modification. These modifications may or may not be related to a loudness-based rendering modification, depending on the particular example. For example, in the aforementioned case of a primary spatial stream being rendered in an open plan living area and a secondary stream comprised of cooking tips being rendered in an adjacent kitchen, it may be desirable to ensure the cooking tips remain audible in the kitchen. This can be accomplished by estimating what the loudness would be for the rendered cooking tips stream in the kitchen without the interfering first signal, then estimating the loudness in the presence of the first signal in the kitchen, and finally dynamically modifying the loudness and dynamic range of both streams across a plurality of frequencies, to ensure audibility of the second signal, in the kitchen.

In the example shown in FIG. 19, block 1935 involves mixing at least the modified first rendered audio signals and the modified second rendered audio signals to produce mixed audio signals. Block 1935 may, for example, be performed by the mixer 1830*b* shown in FIG. 18B.

According to this example, block 1940 involves providing the mixed audio signals to at least some speakers of the environment. Some examples of the method 1900 involve playback of the mixed audio signals by the speakers.

As shown in FIG. 19, some implementations may provide more than 2 rendering modules. Some such implementations may provide N rendering modules, where N is an integer greater than 2. Accordingly, some such implementations may include one or more additional rendering modules. In some such examples, each of the one or more additional rendering modules may be configured for receiving, via the interface system, an additional audio program stream. The additional audio program stream may include additional audio signals that are scheduled to be reproduced by at least one speaker of the environment. Some such implementations may involve rendering the additional audio signals for reproduction via at least one speaker of the environment, to produce additional rendered audio signals and modifying a rendering process for the additional audio signals based at least in part on at least one of the first audio signals, the first rendered audio signals, the second audio signals, the second rendered audio signals or characteristics thereof, to produce modified additional rendered audio signals. According to some such examples, the mixing module may be configured for mixing the modified additional rendered audio signals with at least the modified first rendered audio signals and the modified second rendered audio signals, to produce the mixed audio signals.

As described above with reference to FIGS. 6 and 18B, some implementations may include a microphone system that includes one or more microphones in a listening environment. In some such examples, the first rendering module may be configured for modifying a rendering process for the first audio signals based, at least in part, on first microphone signals from the microphone system. The "first microphone signals" may be received from a single microphone or from 2 or more microphones, depending on the particular implementation. In some such implementations, the second rendering module may be configured for modifying a rendering process for the second audio signals based, at least in part, on the first microphone signals.

As noted above with reference to FIG. 18B, in some instances the locations of one or more microphones may be known and may be provided to the control system. According to some such implementations, the control system may be configured for estimating a first sound source position based on the first microphone signals and modifying the rendering process for at least one of the first audio signals or the second audio signals based at least in part on the first sound source position. The first sound source position may, for example, be estimated according to a triangulation process, based on DOA data from each of three or more microphones, or groups of microphones, having known locations. Alternatively, or additionally, the first sound source position may be estimated according to the amplitude of a received signal from two or more microphones. The microphone that produces the highest-amplitude signal may be assumed to be the nearest to the first sound source position. In some such examples, the first sound source position may be set to the location of the nearest microphone. In some such examples, the first sound source position may be associated with the position of a zone, where a zone is selected by processing signals from two or more microphones through a pre-trained classifier, such as a Gaussian mixer model.

In some such implementations, the control system may be configured for determining whether the first microphone signals correspond to environmental noise. Some such implementations may involve modifying the rendering process for at least one of the first audio signals or the second audio signals based, at least in part, on whether the first microphone signals correspond to environmental noise. For example, if the control system determines that the first microphone signals correspond to environmental noise, modifying the rendering process for the first audio signals or the second audio signals may involve increasing the level of the rendered audio signals so that the perceived loudness of the signals in the presence of the noise at an intended listening position is substantially equal to the perceived loudness of the signals in the absence of the noise.

In some examples, the control system may be configured for determining whether the first microphone signals correspond to a human voice. Some such implementations may involve modifying the rendering process for at least one of the first audio signals or the second audio signals based, at least in part, on whether the first microphone signals correspond to a human voice. For example, if the control system determines that the first microphone signals correspond to a human voice, such as a wakeword, modifying the rendering process for the first audio signals or the second audio signals may involve decreasing the loudness of the rendered audio signals reproduced by speakers near the first sound source position, as compared to the loudness of the rendered audio signals reproduced by speakers farther from the first sound source position. Modifying the rendering process for the first audio signals or the seconds audio signals may alternatively or in addition involve modifying the rendering process to warp the intended positions of the associated program stream's constituent signals away from the first sound source position and/or to penalize the use of speakers near the first sound source position in comparison to speakers farther from the first sound source position.

In some implementations, if the control system determines that the first microphone signals correspond to a human voice, the control system may be configured for reproducing the first microphone signals in one or more speakers near a location of the environment that is different from the first sound source position. In some such examples, the control system may be configured for determining whether the first microphone signals correspond to a child's cry. According to some such implementations, the control system may be configured for reproducing the first microphone signals in one or more speakers near a location of the environment that corresponds to an estimated location of a caregiver, such as a parent, a relative, a guardian, a child care service provider, a teacher, a nurse, etc. In some examples, the process of estimating the caregiver's estimated location may be triggered by a voice command, such as "<wakeword>, don't wake the baby". The control system would be able to estimate the location of the speaker (caregiver) according to the location of the nearest smart audio device that is implementing a virtual assistant, by triangulation based on DOA information provided by three or more local microphones, etc. According to some implementations, the control system would have a priori knowledge of the baby room location (and/or listening devices therein) would then be able to perform the appropriate processing.

According to some such examples, the control system may be configured for determining whether the first microphone signals correspond to a command. If the control system determines that the first microphone signals correspond to a command, in some instances the control system may be configured for determining a reply to the command and controlling at least one speaker near the first sound source location to reproduce the reply. In some such examples, the control system may be configured for reverting to an unmodified rendering process for the first audio signals or the second audio signals after controlling at least one speaker near the first sound source location to reproduce the reply.

In some implementations, the control system may be configured for executing the command. For example, the control system may be, or may include, a virtual assistant that is configured to control an audio device, a television, a home appliance, etc., according to the command.

With this definition of the minimal and more capable multi-stream rendering systems shown in FIGS. 6, 18A and 18B, dynamic management of the simultaneous playback of multiple program streams may be achieved for numerous useful scenarios. Several examples will now be described with reference to FIGS. 20 and 21.

Figure 20:
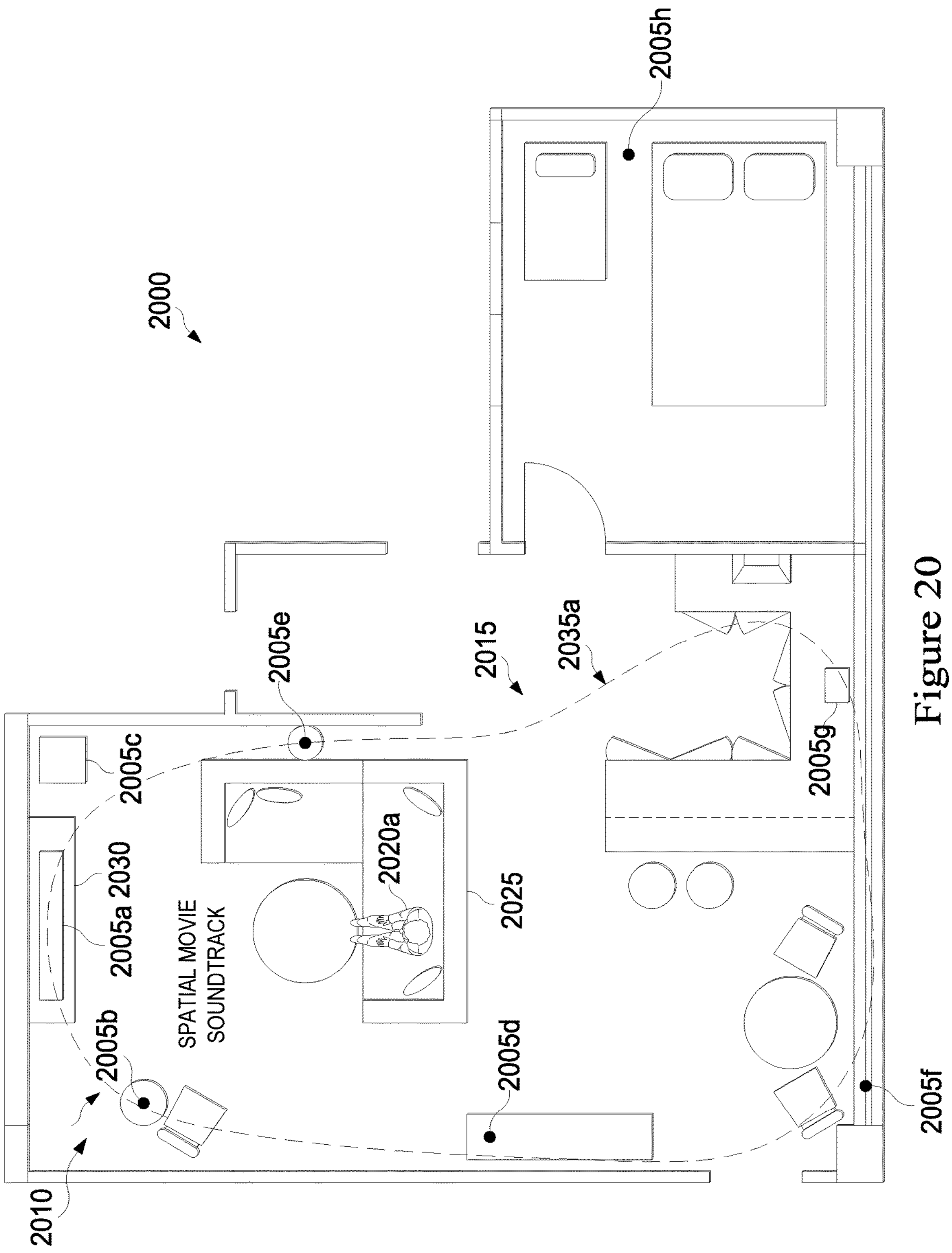
FIGS. 20 and 21 show an example of a floor plan of a connected living space.
Figure 21:
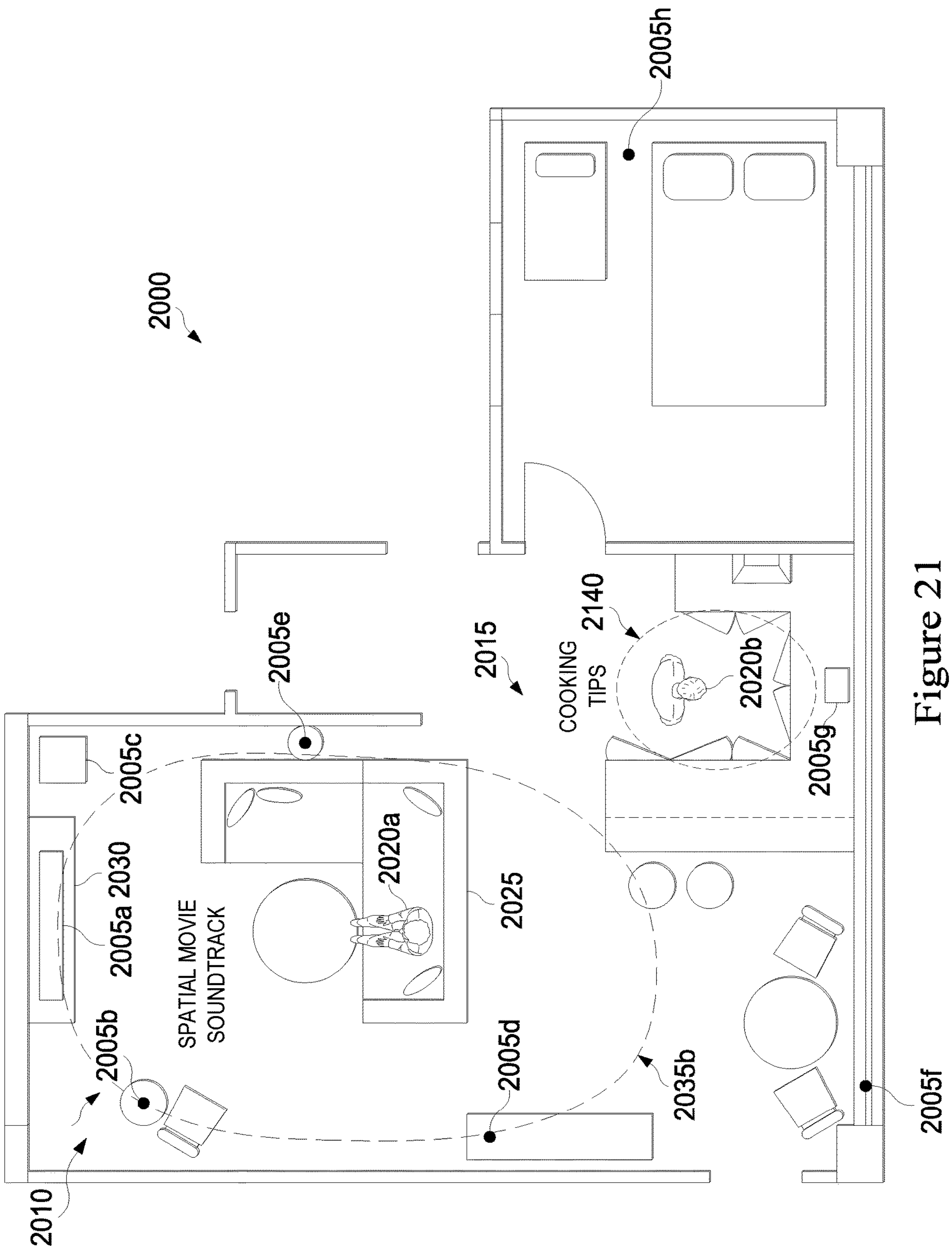

We first examine the previously-discussed example involving the simultaneous playback of a spatial movie sound track in a living room and cooking tips in a connected kitchen. The spatial movie sound track is an example of the "first audio program stream" referenced above and the cooking tips audio is an example of the "second audio program stream" referenced above. FIGS. 20 and 21 show an example of a floor plan of a connected living space. In this example, the living space 2000 includes a living room at the upper left, a kitchen at the lower center, and a bedroom at the lower right. Boxes and circles 2005*a*-2005*h* distributed across the living space represent a set of 8 loudspeakers placed in locations convenient to the space, but not adhering to any standard prescribed layout (arbitrarily placed). In FIG. 20, only the spatial movie soundtrack is being played back, and all the loudspeakers in the living room 2010 and kitchen 2015 are utilized to create an optimized spatial reproduction around the listener 2020*a* seated on the couch 2025 facing the television 2030, given the loudspeaker capabilities and layout. This optimal reproduction of the movie soundtrack is represented visually by the cloud 2035*a* lying within the bounds of the active loudspeakers.

In FIG. 21, cooking tips are simultaneously rendered and played back over a single loudspeaker 2005*g* in the kitchen 2015 for a second listener 2020*b*. The reproduction of this second program stream is represented visually by the cloud 2140 emanating from the loudspeaker 2005*g*. If these cooking tips were simultaneously played back without modification to the rendering of the movie soundtrack as depicted in FIG. 20, then audio from the movie soundtrack emanating from speakers in or near the kitchen 2015 would interfere with the second listener's ability to understand the cooking tips. Instead, in this example, rendering of the spatial movie soundtrack is dynamically modified as a function of the rendering of the cooking tips. Specifically, the rendering of the movie sound track is shifted away from speakers near the rendering location of the cooking tips (the kitchen 2015), with this shift represented visually by the smaller cloud 2035*b* in FIG. 21 that is pushed away from speakers near the kitchen. If playback of the cooking tips stops while the movie soundtrack is still playing, then in some implementations the rendering of the movie soundtrack may dynamically shift back to its original optimal configuration seen in FIG. 20. Such a dynamic shift in the rendering of the spatial movie soundtrack may be achieved through numerous disclosed methods.

Many spatial audio mixes include a plurality of constituent audio signals designed to be played back at a particular location in the listening space. For example, Dolby 5.1 and 7.1 surround sound mixes consist of 6 and 8 signals, respectively, meant to be played back on speakers in prescribed canonical locations around the listener. Object-based audio formats, e.g., Dolby Atmos, consist of constituent audio signals with associated metadata describing the possibly time-varying 3D position in the listening space where the audio is meant to be rendered. With the assumption that the renderer of the spatial movie soundtrack is capable of rendering an individual audio signal at any location with respect to the arbitrary set of loudspeakers, the dynamic shift to the rendering depicted in FIGS. 20 and 21 may be achieved by warping the intended positions of the audio signals within the spatial mix. For example, the 2D or 3D coordinates associated with the audio signals may be pushed away from the location of the speaker in the kitchen or alternatively pulled toward the upper left corner of the living room. The result of such warping is that speakers near the kitchen are used less since the warped positions of the spatial mix's audio signals are now more distant from this location. While this method does achieve the goal of making the second audio stream more intelligible to the second listener, it does so at the expense of significantly altering the intended spatial balance of the movie soundtrack for the first listener.

A second method for achieving the dynamic shift to the spatial rendering may be realized by using a flexible rendering system. In some such implementations, the flexible rendering system may be CMAP, FV or a hybrid of both, as described above. Some such flexible rendering systems attempt to reproduce a spatial mix with all its constituent signals perceived as coming from their intended locations. While doing so for each signal of the mix, in some examples, preference is given to the activation of loudspeakers in close proximity to the desired position of that signal. In some implementations, additional terms may be dynamically added to the optimization of the rendering, which penalize the use of certain loudspeakers based on other criteria. For the example at hand, what may be referred to as a "repelling force" may be dynamically placed at the location of the kitchen to highly penalize the use of loudspeakers near this location and effectively push the rendering of the spatial movie soundtrack away. As used herein, the term "repelling force" may refer to a factor that corresponds with relatively lower speaker activation in a particular location or area of a listening environment. In other words, the phrase "repelling force" may refer to a factor that favors the activation of speakers that are relatively farther from a particular position or area that corresponds with the "repelling force." However, according to some such implementations the renderer may still attempt to reproduce the intended spatial balance of the mix with the remaining, less penalized speakers. As such, this technique may be considered a superior method for achieving the dynamic shift of the rendering in comparison to that of simply warping the intended positions of the mix's constituent signals.

The described scenario of shifting the rendering of the spatial movie soundtrack away from the cooking tips in the kitchen may be achieved with the minimal version of the multi-stream renderer depicted in FIG. 18A. However, improvements to the scenario may be realized by employing the more capable system depicted in FIG. 18B. While shifting the rendering of the spatial movie soundtrack does improve the intelligibility of the cooking tips in the kitchen, the movie soundtrack may still be noticeably audible in the kitchen. Depending on the instantaneous conditions of both streams, the cooking tips might be masked by the movie soundtrack; for example, a loud moment in the movie soundtrack masking a soft moment in the cooking tips. To deal with this issue, a dynamic modification to the rendering of the cooking tips as a function of the rendering of the spatial movie soundtrack may be added. For example, a method for dynamically altering an audio signal across frequency and time in order to preserve its perceived loudness in the presence of an interfering signal may be performed. In this scenario, an estimate of the perceived loudness of the shifted movie soundtrack at the kitchen location may be generated and fed into such a process as the interfering signal. The time and frequency varying levels of the cooking tips may then be dynamically modified to maintain its perceived loudness above this interference, thereby better maintaining intelligibility for the second listener. The required estimate of the loudness of the movie soundtrack in the kitchen may be generated from the speaker feeds of the soundtrack's rendering, signals from microphones in or near the kitchen, or a combination thereof. This process of maintaining the perceived loudness of the cooking tips will in general boost the level of the cooking tips, and it is possible that the overall loudness may become objectionably high in some cases. To combat this issue, yet another rendering modification may be employed. The interfering spatial movie soundtrack may be dynamically turned down as a function of the loudness-modified cooking tips in the kitchen becoming too loud. Lastly, it is possible that some external noise source might simultaneously interfere with the audibility of both program streams; a blender may be used in the kitchen during cooking, for example. An estimate of the loudness of this environmental noise source in both the living room and kitchen may be generated from microphones connected to the rendering system. This estimate may, for example, be added to the estimate of the loudness of the soundtrack in the kitchen to affect the loudness modifications of the cooking tips. At the same time, the rendering of the soundtrack in the living room may be additionally modified as a function of the environmental noise estimate to maintain the perceived loudness of the soundtrack in the living room in the presence of this environmental noise, thereby better maintaining audibility for the listener in the living room.

Figure 22:
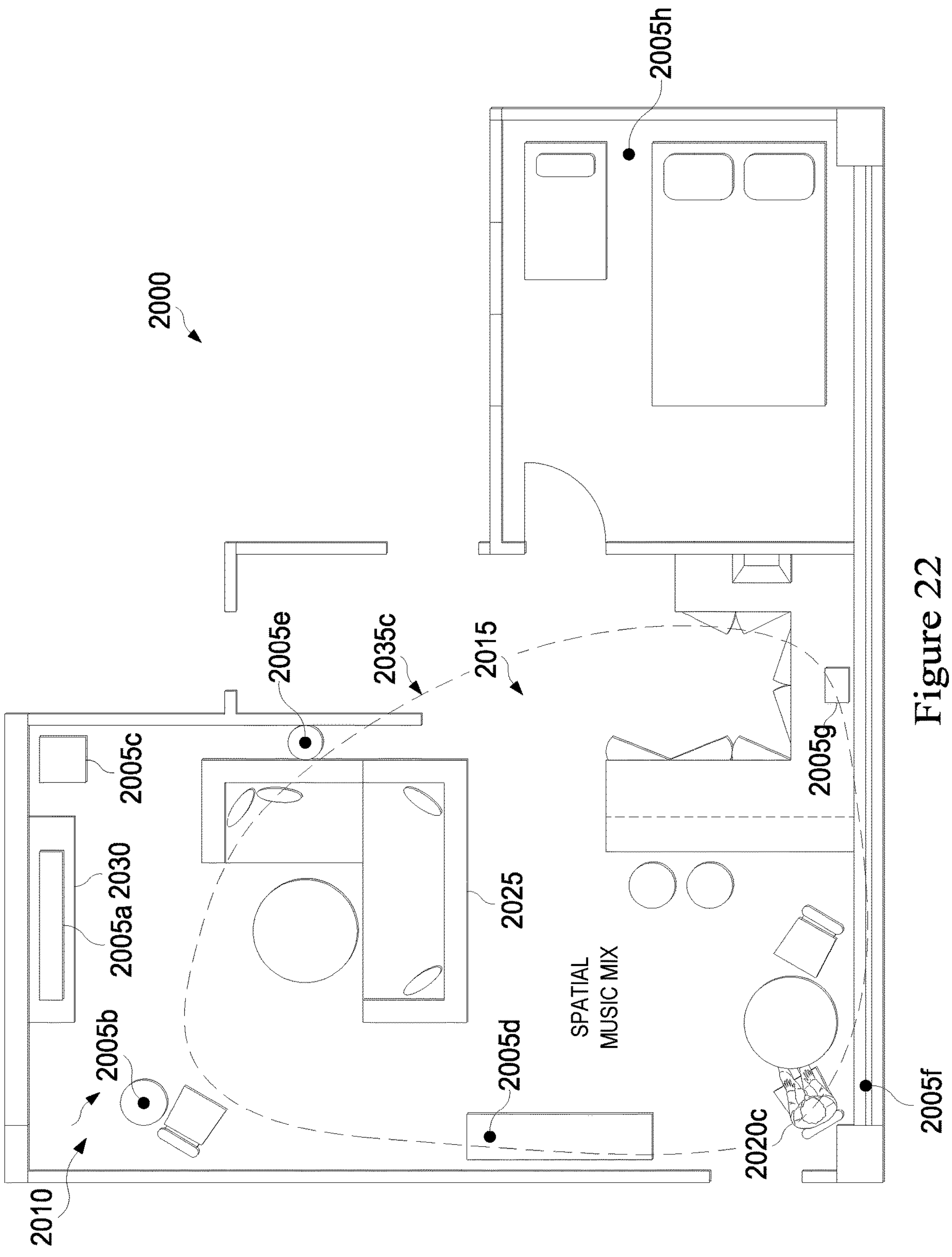
FIGS. 22 and 23 show an example of a multi-stream renderer providing simultaneous playback of a spatial music mix and a voice assistant response.
Figure 23:
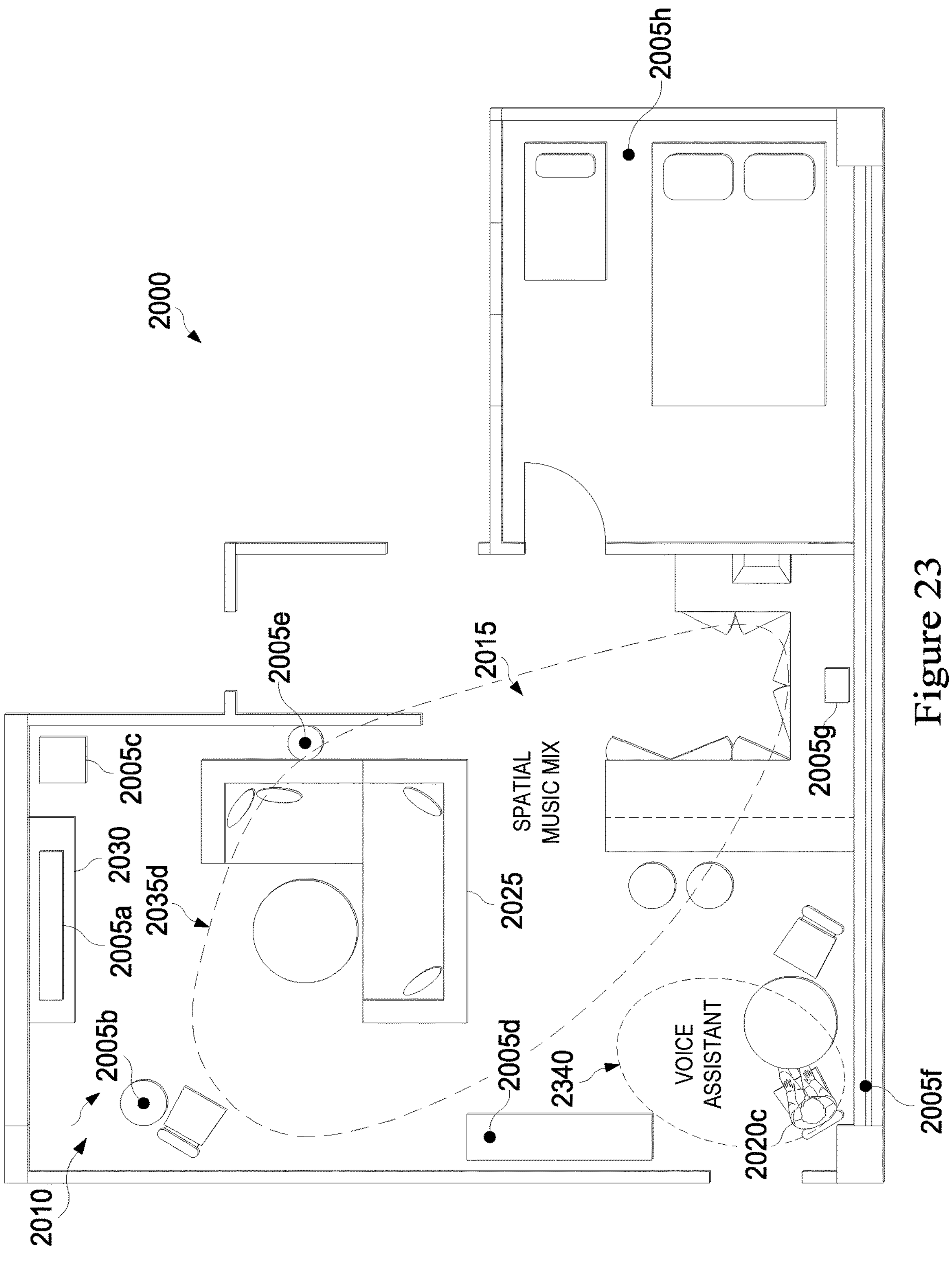

As can be seen, this example use case of the disclosed multi-stream renderer employs numerous, interconnected modifications to the two program streams in order to optimize their simultaneous playback. In summary, these modifications to the streams can be listed as:

- Spatial movie soundtrack
  - Spatial rendering shifted away from the kitchen as a function of the cooking tips being rendered in the kitchen
  - Dynamic reduction in loudness as a function of the loudness of the cooking tips rendered in the kitchen
  - Dynamic boost in loudness as a function of an estimate of the loudness in the living room of the interfering blender noise from the kitchen
- Cooking tips
  - Dynamic boost in loudness as a function of a combined estimate of the loudness of both the movie soundtrack and blender noise in the kitchen A second example use case of the disclosed multi-stream renderer involves the simultaneous playback of a spatial program stream, such as music, with the response of a smart voice assistant to some inquiry by the user. With existing smart speakers, where playback has generally been constrained to monophonic or stereo playback over a single device, an interaction with the voice assistant typically consists of the following stages:

1) Music playing
2) User utters the voice assistant wakeword
3) Smart speaker recognizes the wakeword and turns down (ducks) the music by a significant amount
4) User utters a command to the smart assistant (i.e. "Play the next song")
5) Smart speaker recognizes the command, affirms this by playing some voice response (i.e. "Ok, playing next song") through the speaker mixed over the top of the ducked music, and then executes the command
6) Smart speaker turns the music back up to the original volume FIGS. 22 and 23 show an example of a multi-stream renderer providing simultaneous playback of a spatial music mix and a voice assistant response. When playing spatial audio over a multitude of orchestrated smart speakers, some embodiments provide an improvement to the above chain of events. Specifically, the spatial mix may be shifted away from one or more of the speakers selected as appropriate for relaying the response from the voice assistant. Creating this space for the voice assistant response means that the spatial mix may be turned down less, or perhaps not at all, in comparison to the existing state of affairs listed above. FIGS. 22 and 23 depict this scenario. In this example, the modified chain of events may transpire as:

1) A spatial music program stream is playing over a multitude of orchestrated smart speakers for a user cloud 2035*c* in FIG. 22).
2) User 2020*c* utters the voice assistant wakeword.
3) One or more smart speakers (e.g., the speaker 2005*d* and/or the speaker 2005*f*) recognizes the wakeword and determines the location of the user 2020*c*, or which speaker(s) the user 2020*c* is closest to, using the associated recordings from microphones associated with the one or more smart speaker(s).
4) The rendering of the spatial music mix is shifted away from the location determined in the previous step in anticipation of a voice assistant response program stream being rendered near that location (cloud 2035*d* in FIG. 23).
5) User utters a command to the smart assistant (e.g., to a smart speaker running smart assistant/virtual assistant software).
6) Smart speakers recognize the command, synthesize a corresponding response program stream, and render the response near the location of the user (cloud 2340 in FIG. 23).
7) Rendering of the spatial music program stream shifts back to its original state when the voice assistant response is complete (cloud 2035*c* in FIG. 22).

In addition to optimizing the simultaneous playback of the spatial music mix and voice assistant response, the shifting of the spatial music mix may also improve the ability of the set of speakers to understand the listener in step 5. This is because music has been shifted out of the speakers near the listener, thereby improving the voice to other ratio of the associated microphones.

Similar to what was described for the previous scenario with the spatial movie mix and cooking tips, the current scenario may be further optimized beyond what is afforded by shifting the rendering of the spatial mix as a function of the voice assistant response. On its own, shifting the spatial mix may not be enough to make the voice assistant response completely intelligible to the user. A simple solution is to also turn the spatial mix down by a fixed amount, though less than is required with the current state of affairs. Alternatively, the loudness of the voice assistant response program stream may be dynamically boosted as a function of the loudness of the spatial music mix program stream in order to maintain the audibility of the response. As an extension, the loudness of the spatial music mix may also be dynamically cut if this boosting process on the response stream grows too large.

Figure 24:
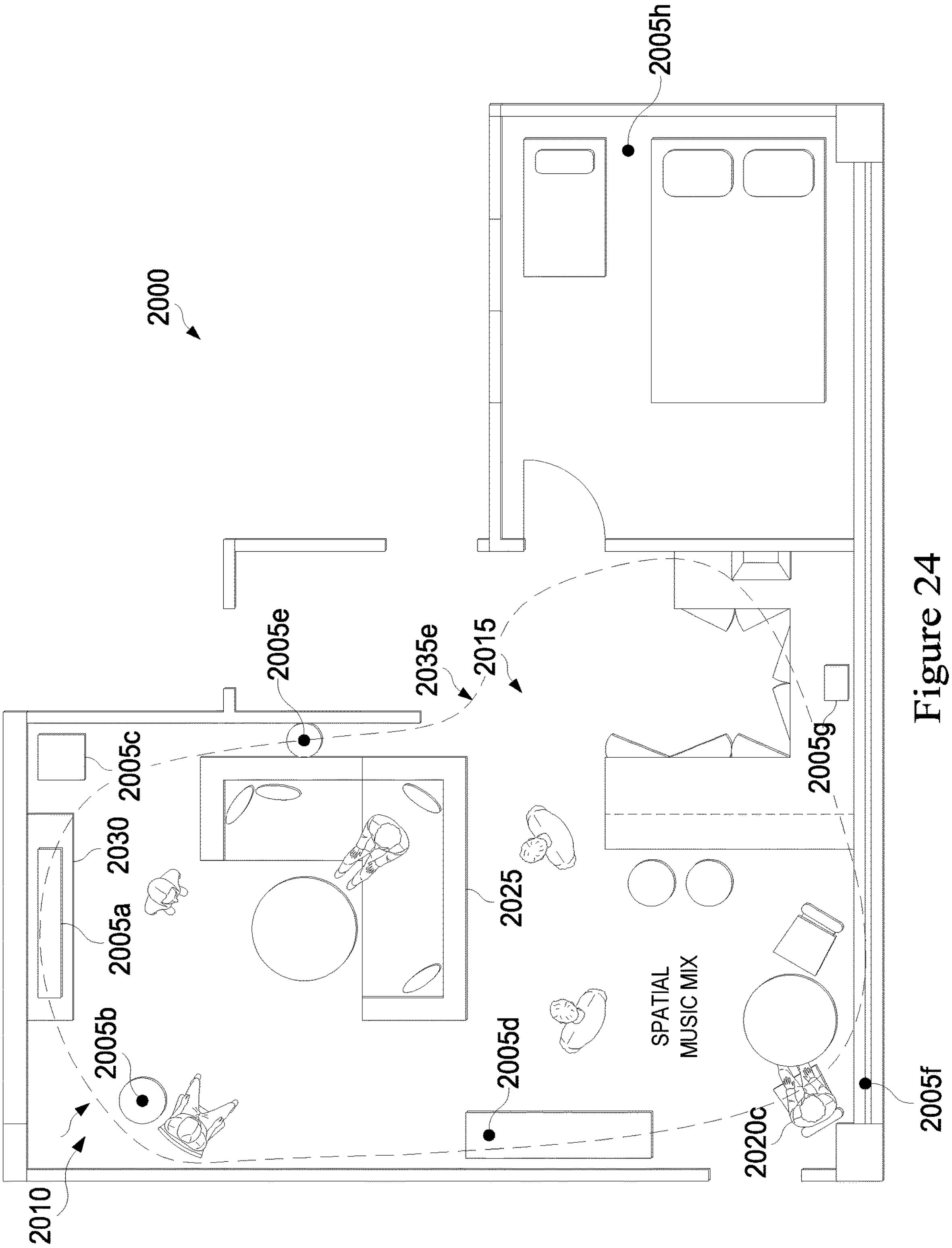
FIG. 24 depicts an example starting point wherein a spatial music mix is playing optimally across all the speakers in a living room and a kitchen for numerous people at a party.
Figure 25:
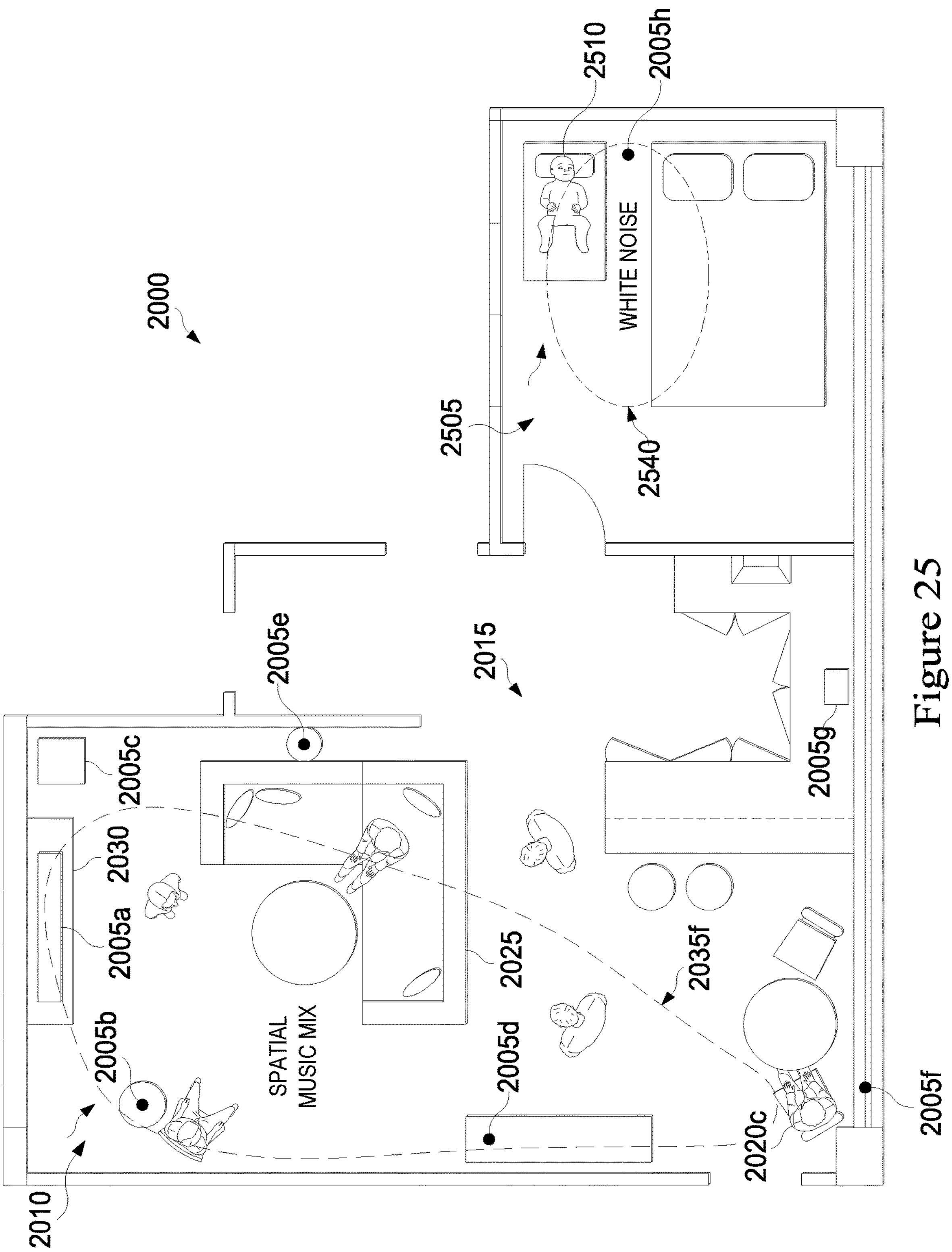
FIG. 25 shows an example of a baby trying to sleep in a bedroom.
Figure 26:
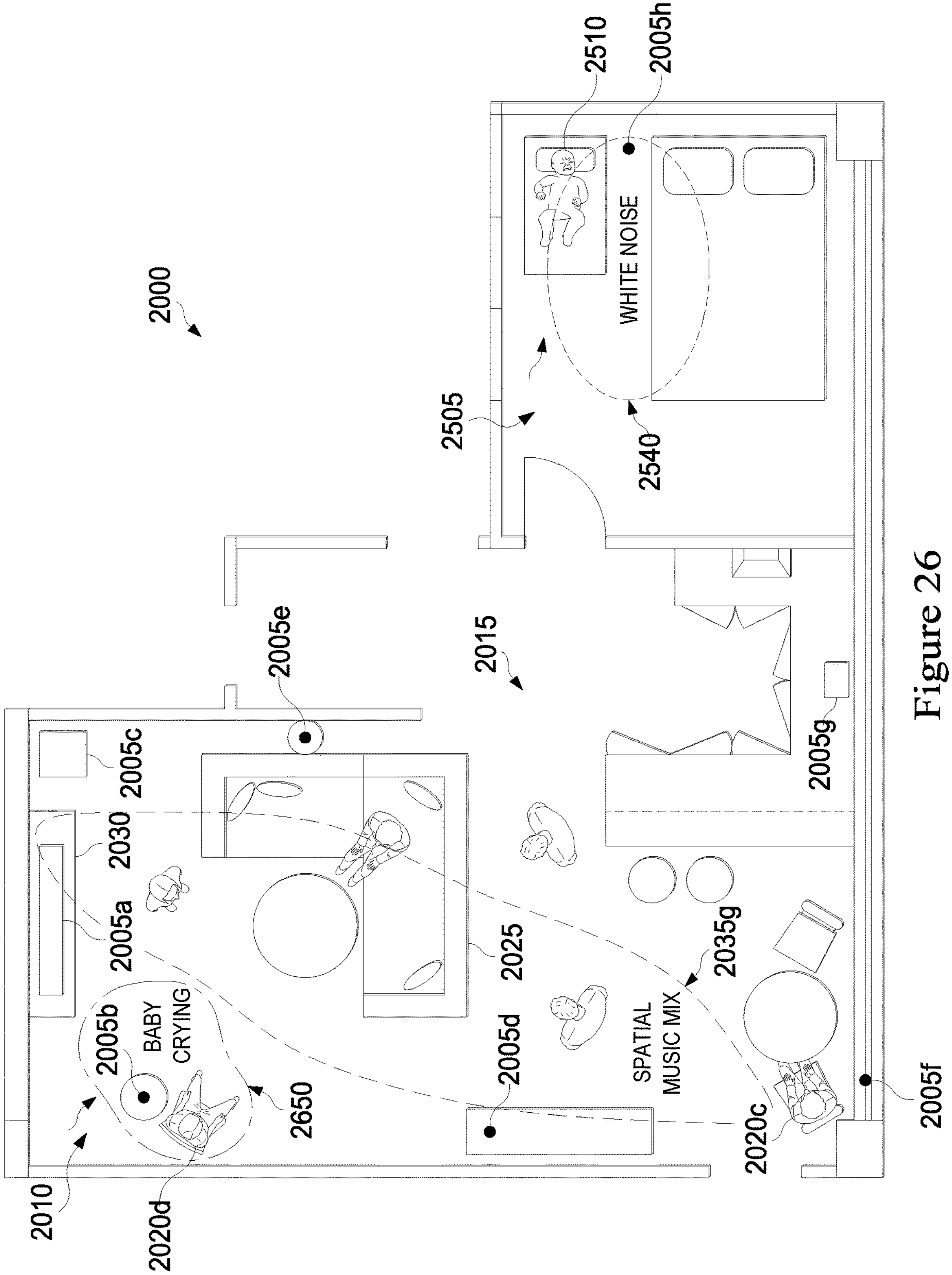
FIG. 26 depicts an example of the reproduction of an additional audio stream.

FIGS. 24, 25 and 26 illustrate a third example use case for a disclosed multi-stream renderer. This example involves managing the simultaneous playback of a spatial music mix program stream and a comfort-noise program stream while at the same time attempting to make sure that a baby stays asleep in an adjacent room but being able to hear if the baby cries. FIG. 24 depicts a starting point wherein the spatial music mix (represented by the cloud 2035*e*) is playing optimally across all the speakers in the living room 2010 and kitchen 2015 for numerous people at a party. In FIG. 25 a baby 2510 is now trying to sleep in the adjacent bedroom 2505 pictured at the lower right. To help ensure this, the spatial music mix is dynamically shifted away from the bedroom to minimize leakage therein, as depicted by the cloud 2035*f*, while still maintaining a reasonable experience for people at the party. At the same time, a second program stream containing soothing white noise (represented by the cloud 2540) plays out of the speaker 2005*h* in the baby's room to mask any remaining leakage from the music in the adjacent room. To ensure complete masking, the loudness of this white noise stream may, in some examples, be dynamically modified as a function of an estimate of the loudness of the spatial music leaking into the baby's room. This estimate may be generated from the speaker feeds of the spatial music's rendering, signals from microphones in the baby's room, or a combination thereof. Also, the loudness of the spatial music mix may be dynamically attenuated as a function of the loudness-modified noise if it becomes too loud. This is analogous to the loudness processing between the spatial movie mix and cooking tips of the first scenario. Lastly, microphones in the baby's room (e.g., microphones associated with the speaker 2005*h*, which may be a smart speaker in some implementations) may be configured to record audio from the baby (cancelling out sound that might be picked up from the spatial music and white noise), and a combination of these processed microphone signals may then serve as a third program stream which may be simultaneously played back near the listener 2020*d*, who may be a parent or other caregiver, in the living room 2010 if crying is detected (through machine learning, via a pattern matching algorithm, etc.). FIG. 26 depicts the reproduction of this additional stream with the cloud 2650. In this case, the spatial music mix may be additionally shifted away from the speaker near the parent playing the baby's cry, as shown by the modified shape of the cloud 2035*g* relative to the shape of the cloud 2035*f* of FIG. 25, and the program stream of the baby's cry may be loudness modified as a function of the spatial music stream so that the baby's cry remains audible to the listener 2020*d*. The interconnected modifications optimizing the simultaneous playback of the three program streams considered within this example may be summarized as follows:

- Spatial music mix in living room
  - Spatial rendering shifted away from the baby's room to reduce transmission into the room
  - Dynamic reduction in loudness as a function of the loudness of the white noise rendered in the baby's room
  - Spatial rendering shifted away from parent as a function of the baby's cry being rendered on a speaker near the parent
- White noise
  - Dynamic boost in loudness as a function of an estimate of the loudness of the music stream bleeding into the baby's room
- Recording of baby's cry
  - Dynamic boost in loudness as a function of an estimate of the loudness of the music mix at the position of the parent or other caregiver.

We next describe examples of how some of the noted embodiments may be implemented.

In FIG. 18A, each of the Render blocks 1 . . . N may be implemented as identical instances of any single-stream renderer, such as the CMAP, FV or hybrid renderers previously mentioned. Structuring the multi-stream renderer this way has some convenient and useful properties.

Figure 27:
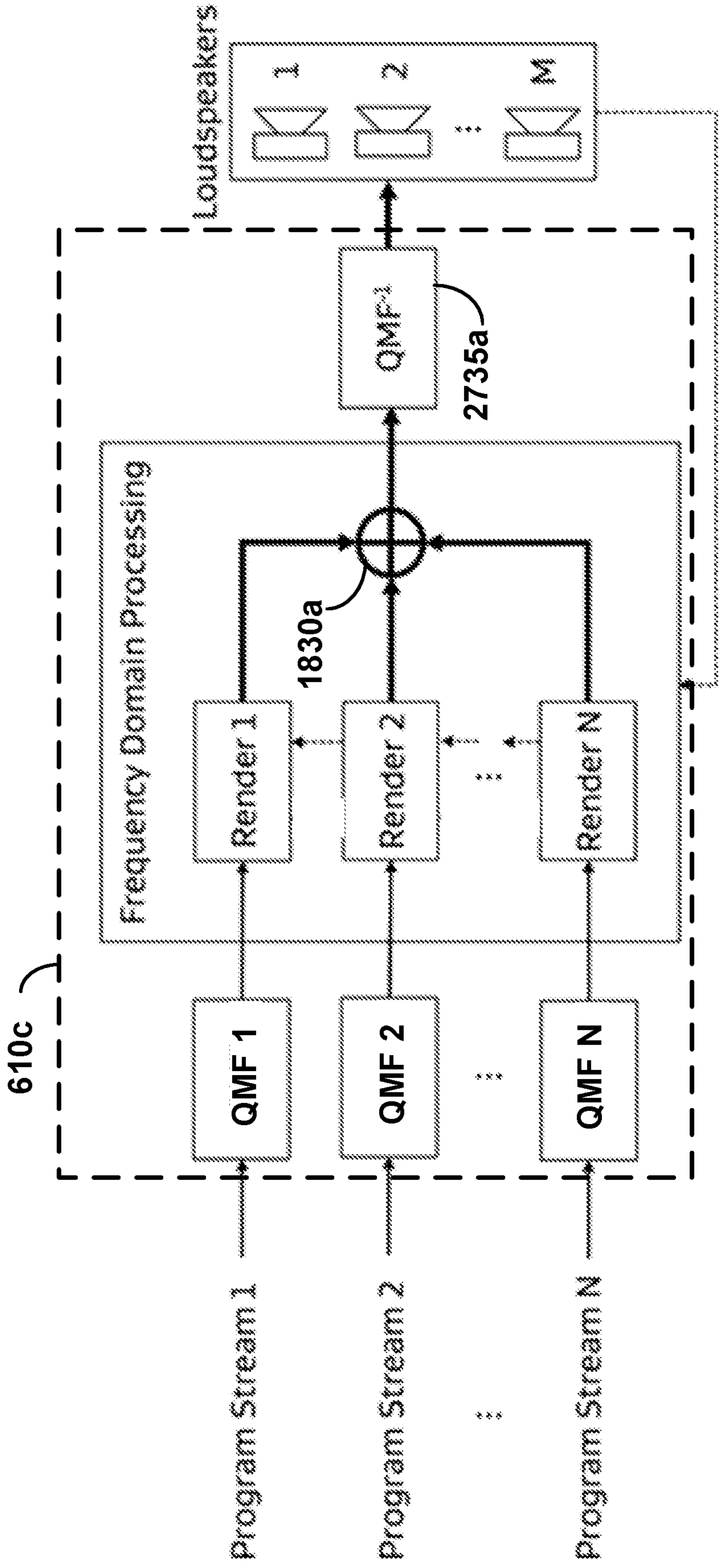
FIG. 27 shows a frequency/transform domain example of the multi-stream renderer shown in FIG. 18A.

First, if the rendering is done in this hierarchical arrangement and each of the single-stream renderer instances is configured to operate in the frequency/transform domain (e.g. QMF), then the mixing of the streams can also happen in the frequency/transform domain and the inverse transform only needs to be run once, for M channels. This is a significant efficiency improvement over running N×M inverse transforms and mixing in the time domain FIG. 27 shows a frequency/transform domain example of the multi-stream renderer shown in FIG. 18A. In this example, a quadrature mirror analysis filterbank (QMF) is applied to each of program streams 1 through N before each program stream is received by a corresponding one of the rendering modules 1 through N. According to this example, the rendering modules 1 through N operate in the frequency domain After the mixer 1830*a* mixes the outputs of the rendering modules 1 through N, an inverse synthesis filterbank 2735*a* converts the mix to the time domain and provides mixed speaker feed signals in the time domain to the loudspeakers 1 through M. In this example, the quadrature mirror filterbanks, the rendering modules 1 through N, the mixer 1830*a* and the inverse filterbank 2735*a* are components of the control system 610*c*.

Figure 28:
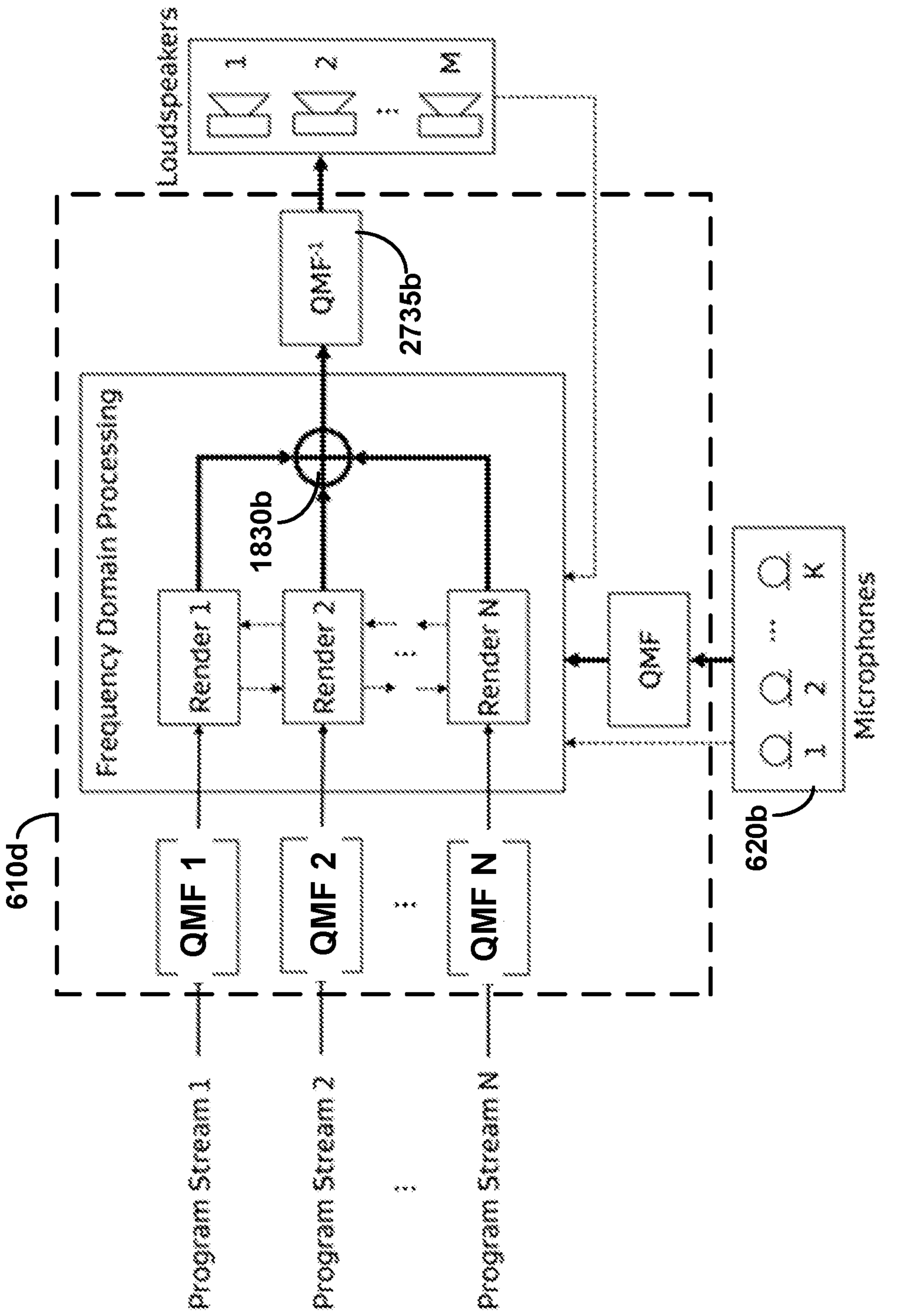
FIG. 28 shows a frequency/transform domain example of the multi-stream renderer shown in FIG. 18B.

FIG. 28 shows a frequency/transform domain example of the multi-stream renderer shown in FIG. 18B. As in FIG. 27, a quadrature mirror filterbank (QMF) is applied to each of program streams 1 through N before each program stream is received by a corresponding one of the rendering modules 1 through N. According to this example, the rendering modules 1 through N operate in the frequency domain In this implementation, time-domain microphone signals from the microphone system 620*b* are also provided to a quadrature mirror filterbank, so that the rendering modules 1 through N receive microphone signals in the frequency domain After the mixer 1830*b* mixes the outputs of the rendering modules 1 through N, an inverse filterbank 2735*b* converts the mix to the time domain and provides mixed speaker feed signals in the time domain to the loudspeakers 1 through M. In this example, the quadrature minor filterbanks, the rendering modules 1 through N, the mixer 1830*b* and the inverse filterbank 2735*b* are components of the control system 610*d*.

Figure 29:
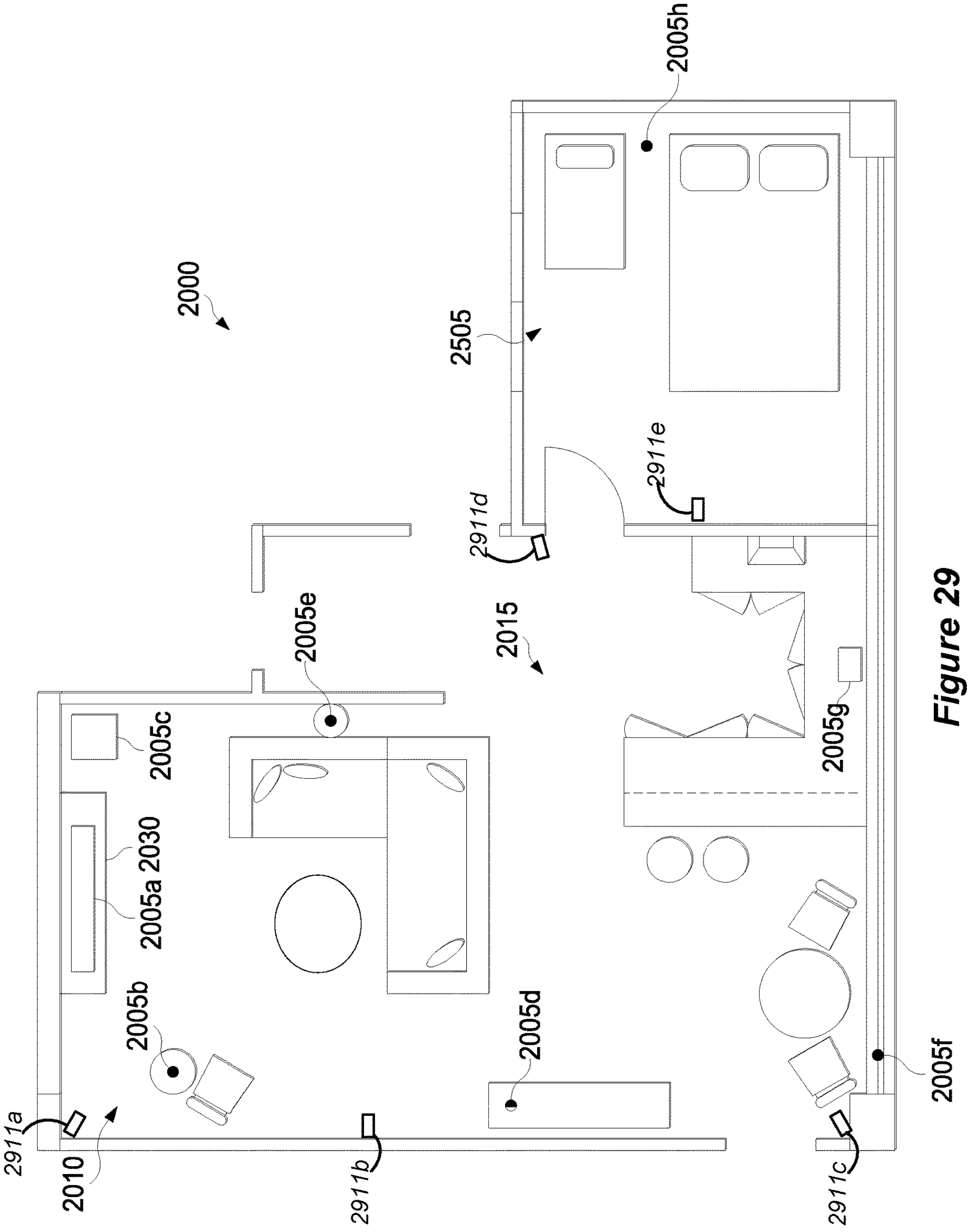
FIG. 29 depicts a floor plan of a listening environment, which is a living space in this example.

With reference to FIG. 29, we describe another example embodiment. As with other figures provided herein, the types and numbers of elements shown in FIG. 29 are merely provided by way of example. Other implementations may include more, fewer and/or different types and numbers of elements. FIG. 29 depicts a floor plan of a listening environment, which is a living space in this example According to this example, the environment 2000 includes a living room 2010 at the upper left, a kitchen 2015 at the lower center, and a bedroom 2505 at the lower right. Boxes and circles distributed across the living space represent a set of loudspeakers 2005*a*-2005*h*, at least some of which may be smart speakers in some implementations, placed in locations convenient to the space, but not adhering to any standard prescribed layout (arbitrarily placed). In some examples, the loudspeakers 2005*a*-2005*h* may be coordinated to implement one or more disclosed embodiments. For example, in some embodiments, the loudspeakers 2005*a*-2005*h* may be coordinated according to commands from a device that is implementing an audio session manager, which may in some examples be a CHASM. In some such examples, the disclosed audio processing, including but not limited to the disclosed flexible rendering functionality, may be implemented, at least in part, according to instructions from the CHASM 208C, the CHASM 208D, the CHASM 307 and/or the CHASM 401 that are described above with reference to FIGS. 2C, 2D, 3C and 4. In this example, the environment 2000 includes cameras 2911*a*-2911*e*, which are distributed throughout the environment. In some implementations, one or more smart audio devices in the environment 2000 also may include one or more cameras. The one or more smart audio devices may be single purpose audio devices or virtual assistants. In some such examples, one or more cameras (which may be cameras of the optional sensor system 630 of FIG. 6) may reside in or on the television 2030, in a mobile phone or in a smart speaker, such as one or more of the loudspeakers 2005*b*, 2005*d*, 2005*e* or 2005*h*. Although cameras 2911*a*-2911*e* are not shown in every depiction of listening environments presented in this disclosure, each of the listening environments, including but not limited to the environments 2000, may nonetheless include one or more cameras in some implementations.

FIGS. 30, 31, 32 and 33 show examples of flexibly rendering spatial audio in a reference spatial mode for a plurality of different listening positions and orientations in the living space shown in FIG. 29. FIGS. 30-33 depict this capability at four example listening positions. In each example, the arrow 3005 that is pointing towards the person 3020*a* represents the location of the front sound stage (where the person 3020*a* is facing). In each example, the arrow 3010*a* represents the left surround field and the arrow 3010*b* represents the right surround field.

Figure 30:
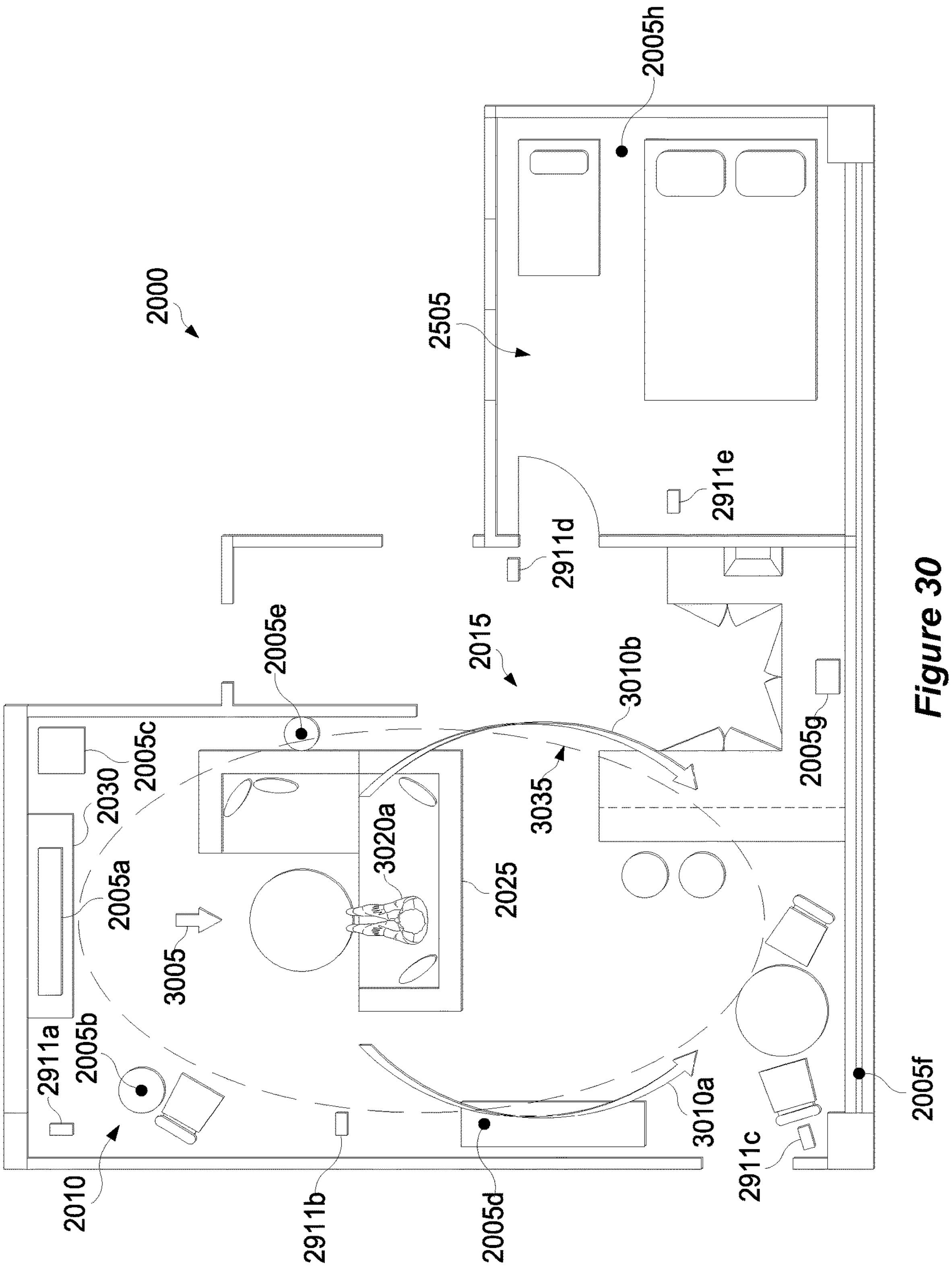
FIGS. 30, 31, 32 and 33 show examples of flexibly rendering spatial audio in a reference spatial mode for a plurality of different listening positions and orientations in the living space shown in FIG. 29.

In FIG. 30, a reference spatial mode has been determined (e.g., by a device that is implementing an audio session manager), and spatial audio has been flexibly rendered, for a person 3020*a* sitting on the living room couch 2025. In the example shown in FIG. 30, all of the loudspeakers in the living room 2010 and kitchen 2015 are used to create an optimized spatial reproduction of audio data around the listener 3020*a*, given the loudspeaker capabilities and layout. This optimal reproduction is represented visually by the cloud 3035 lying within the bounds of the active loudspeakers.

According to some implementations, a control system that is configured for implementing an audio session manager (such as the control system 610 of FIG. 6) may be configured to determine the assumed listening position and/or the assumed orientation of the reference spatial mode according to reference spatial mode data received via an interface system, such as the interface system 605 of FIG. 6. Some examples are described below. In some such examples, the reference spatial mode data may include microphone data from a microphone system (such as the microphone system 120 of FIG. 6).

In some such examples, the reference spatial mode data may include microphone data corresponding to a wakeword and a voice command, such as "[wakeword], make the television the front sound stage." Alternatively, or additionally, microphone data may be used to triangulate a user's position according to the sound of the user's voice, e.g., via direction of arrival (DOA) data. For example, three or more of loudspeakers 2005*a*-2005*e* may use microphone data to triangulate the position of the person 3020*a*, who is sitting on the living room couch 2025, according to the sound of the person 3020*a*'s voice, via DOA data. The person 3020*a*'s orientation may be assumed according to the person 3020*a*'s position: if the person 3020*a* is at the position shown in FIG. 30, the person 3020*a* may be assumed to be facing the television 2030.

Alternatively, or additionally, the person 3020*a*'s position and orientation may be determined according to image data from a camera system (such as the sensor system 130 of FIG. 6).

In some examples, the person 3020*a*'s position and orientation may be determined according to user input obtained via a graphical user interface (GUI). According to some such examples, a control system may be configured for controlling a display device (e.g., a display device of a cellular telephone) to present a GUI that allows the person 3020*a* to input the person 3020*a*'s position and orientation.

Figure 31:
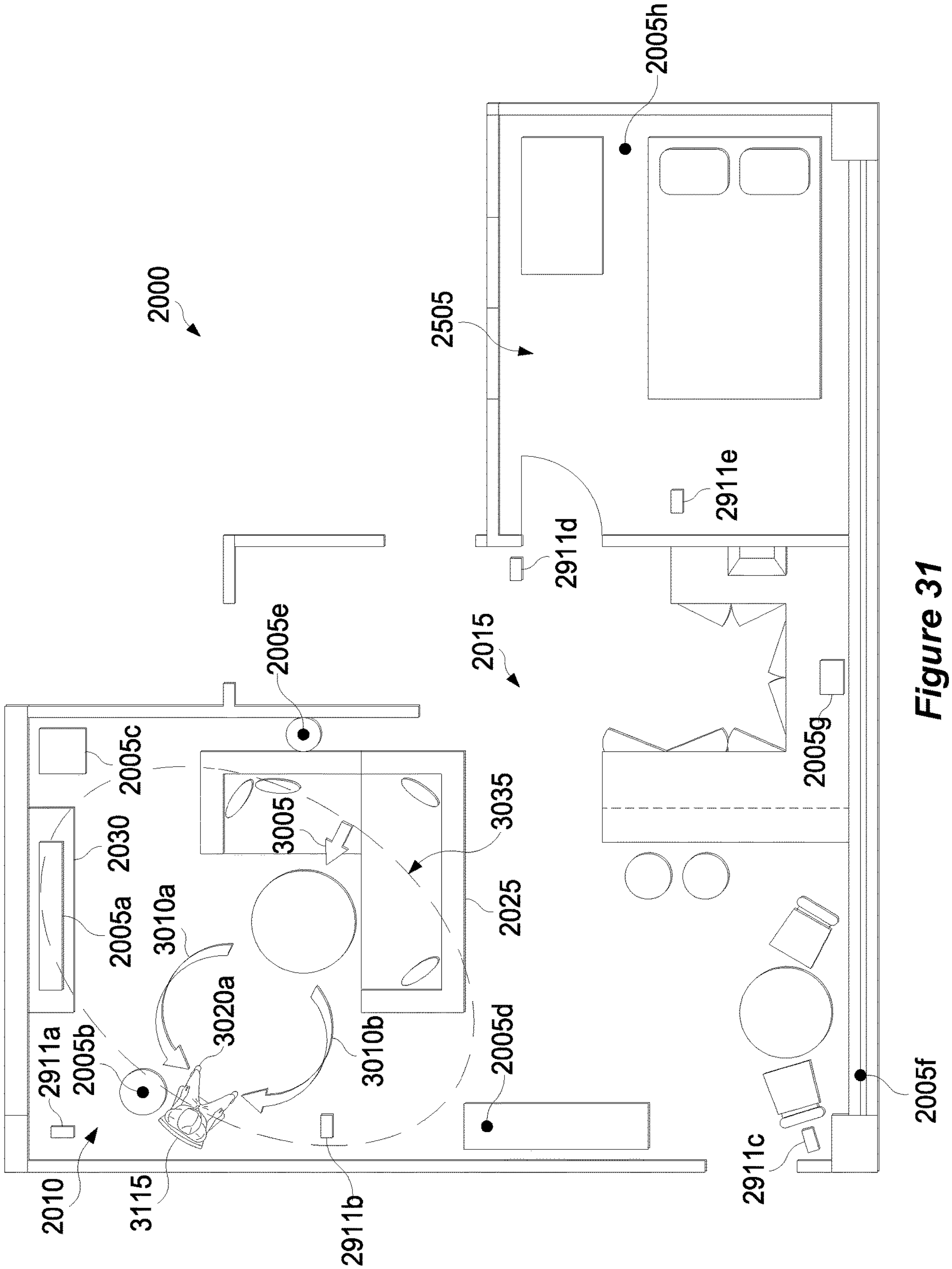
Figure 32:
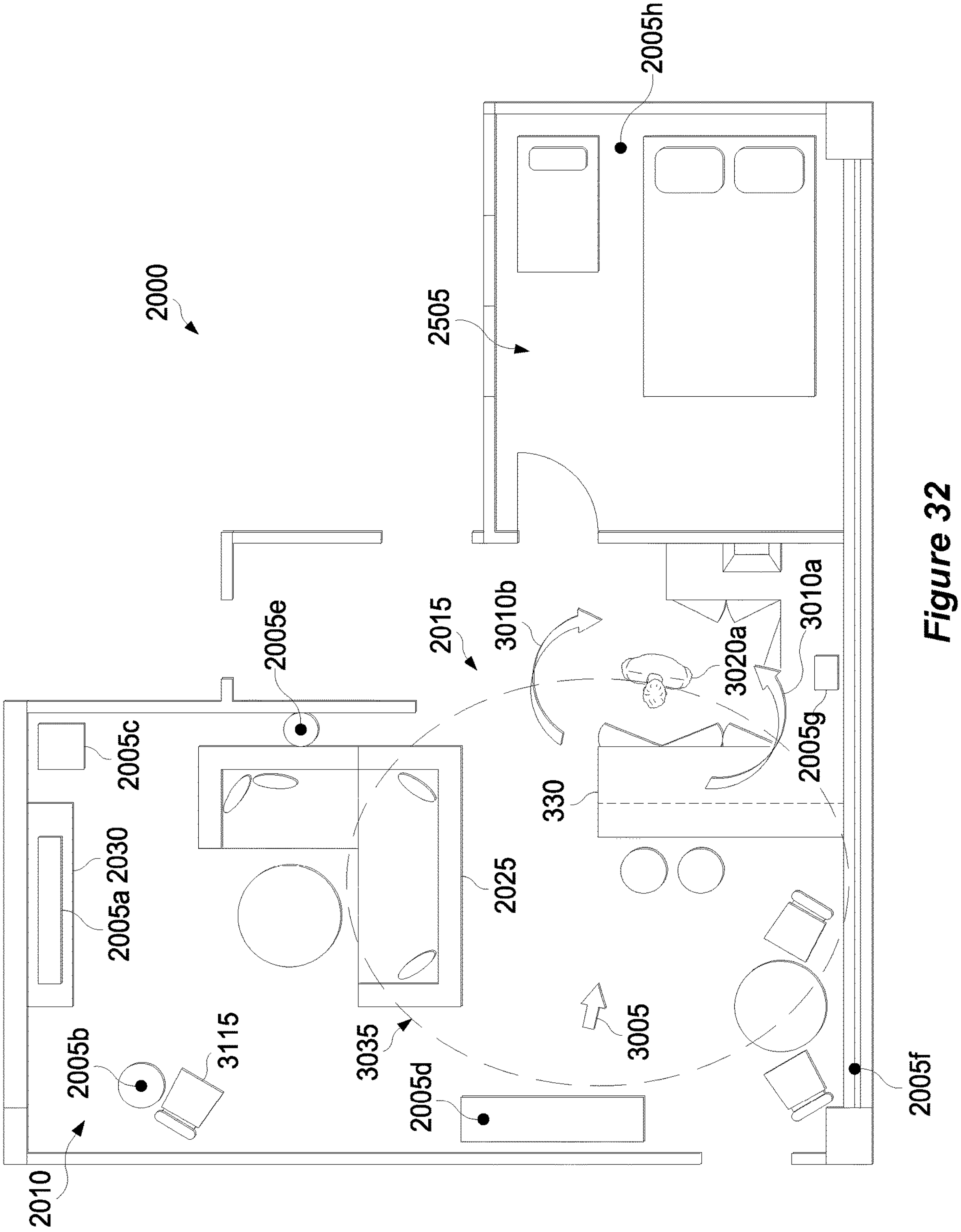
Figure 33:
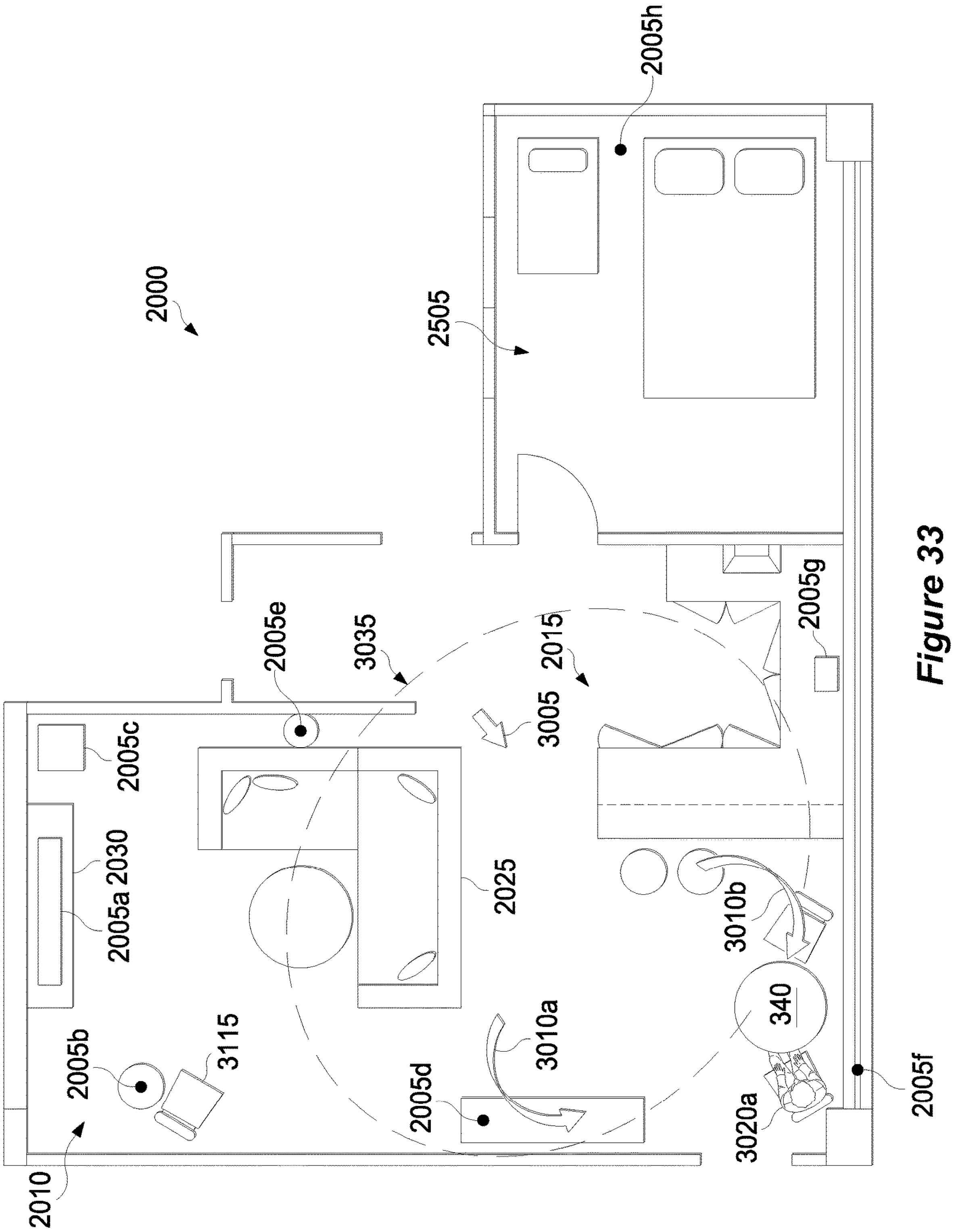

In FIG. 31, a reference spatial mode has been determined, and spatial audio has been flexibly rendered, for the person 3020*a* sitting on the living room reading chair 3115. In FIG. 32, a reference spatial mode has been determined, and spatial audio has been flexibly rendered, for the person 3020*a* standing next to the kitchen counter 330. In FIG. 33, a reference spatial mode has been determined, and spatial audio has been flexibly rendered, for the person 3020*a* sitting at the breakfast table 340. One may observe that the front sound stage orientation, as indicated by the arrow 3005, does not necessarily correspond with any particular loudspeaker within the environment 2000. As the listener's location and orientation vary, so do the speakers' responsibilities for rendering the various components of the spatial mix.

Figure 34:
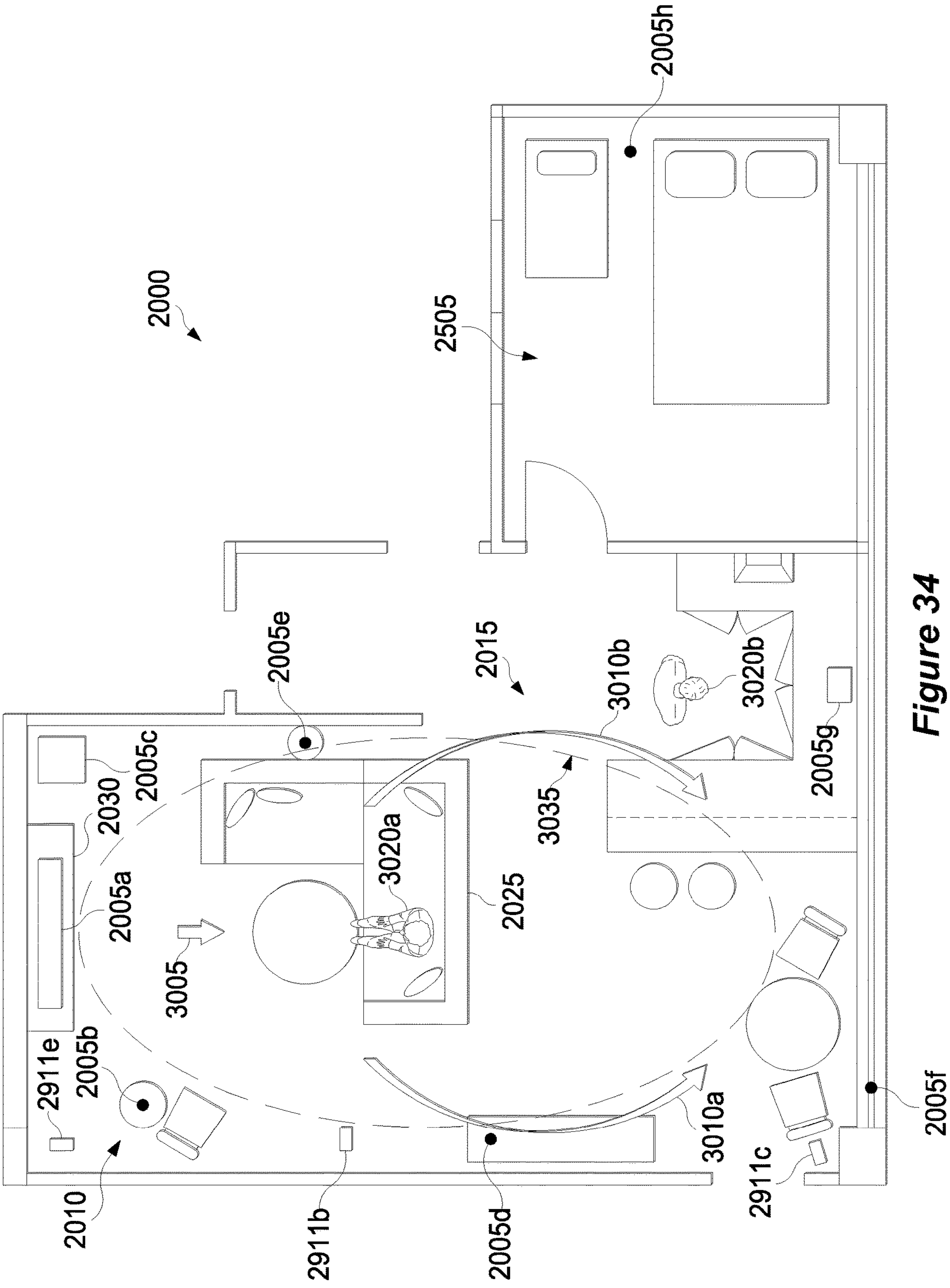
FIG. 34 shows an example of reference spatial mode rendering when two listeners are in different locations of a listening environment.

For the person 3020*a* in any of FIGS. 30-33, he or she hears the spatial mix as intended for each of the positions and orientations shown. However, the experience may be suboptimal for additional listeners in the space. FIG. 34 shows an example of reference spatial mode rendering when two listeners are in different locations of a listening environment. FIG. 34 depicts the reference spatial mode rendering for a person 3020*a* on the couch and a person 3020*b* standing in the kitchen. Rendering is optimal for the person 3020*a*, but the person 3020*b* will hear mostly signals from the surround field and little of the front sound stage given his/her location. In this case and others where multiple people may be in the space moving around in an unpredictable manner (a party, for example) there exists a need for a rendering mode that is more appropriate for such a distributed audience. Examples of such distributed spatial rendering modes are described with reference to FIGS. 4B-9 on pages 27-43 of U.S. Provisional Patent Application No. 62/705,351, filed on Jun. 23, 2020 and entitled "ADAPTABLE SPATIAL AUDIO PLAYBACK," which is hereby incorporated by reference.

Figure 35:
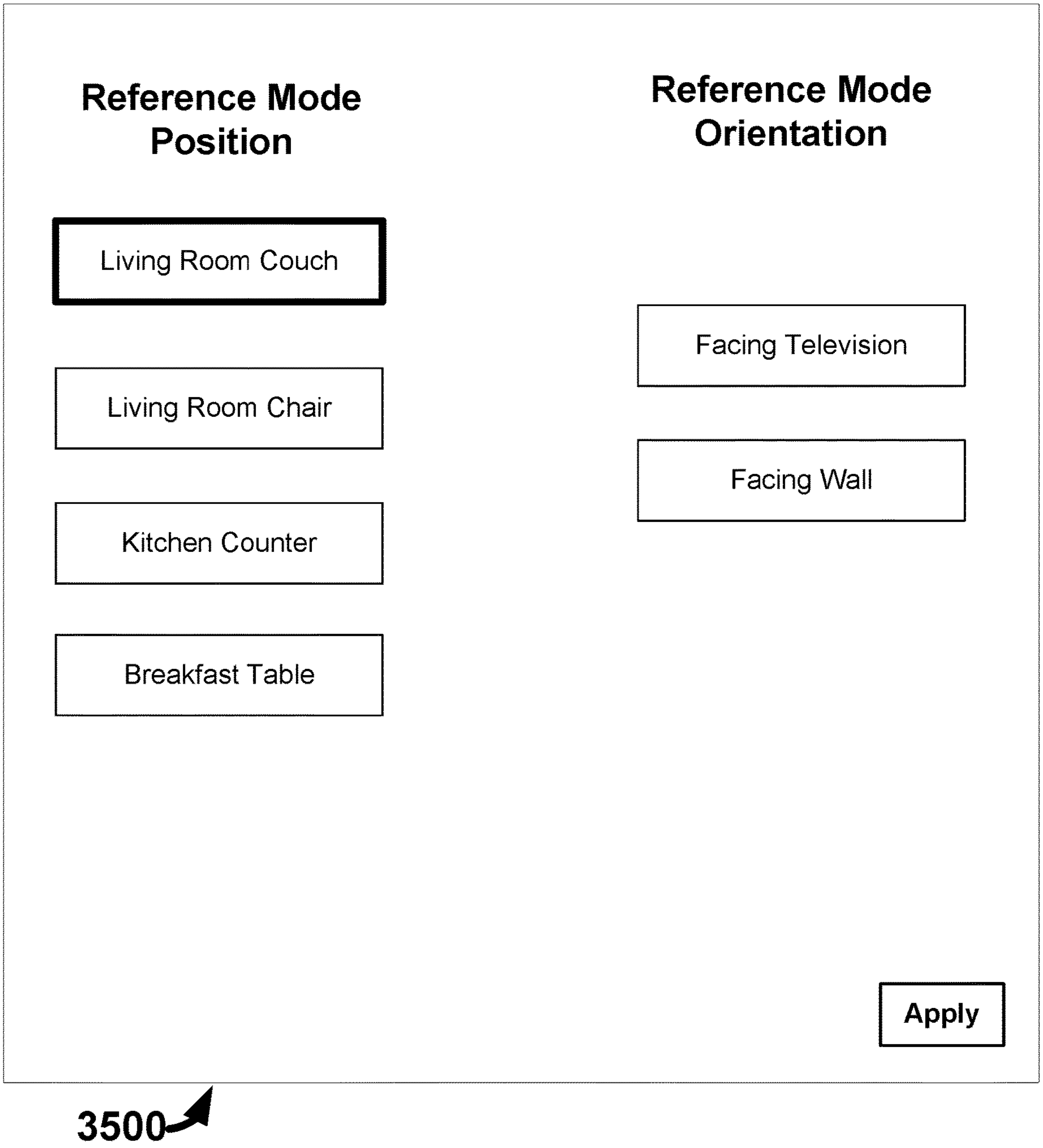
FIG. 35 shows an example of a GUI for receiving user input regarding a listener's position and orientation.

FIG. 35 shows an example of a GUI for receiving user input regarding a listener's position and orientation. According to this example, the user has previously identified several possible listening positions and corresponding orientations. Loudspeaker locations corresponding to each position and corresponding orientation have already been input and stored during a set-up process. Some examples disclosed herein. Detailed examples of audio device autolocation processes are described below. For example, a listening environment layout GUI may have been provided and the user may have been prompted to touch locations corresponding to possible listening positions and speaker positions, and to name the possible listening positions. In this example, at the time depicted in FIG. 35, the user has already provided user input to the GUI 3500 regarding the user's position by touching the virtual button "living room couch." Because there are two possible front-facing positions, given the L-shaped couch 2025, the user is being prompted to indicate which direction the user is facing.

Figure 36:
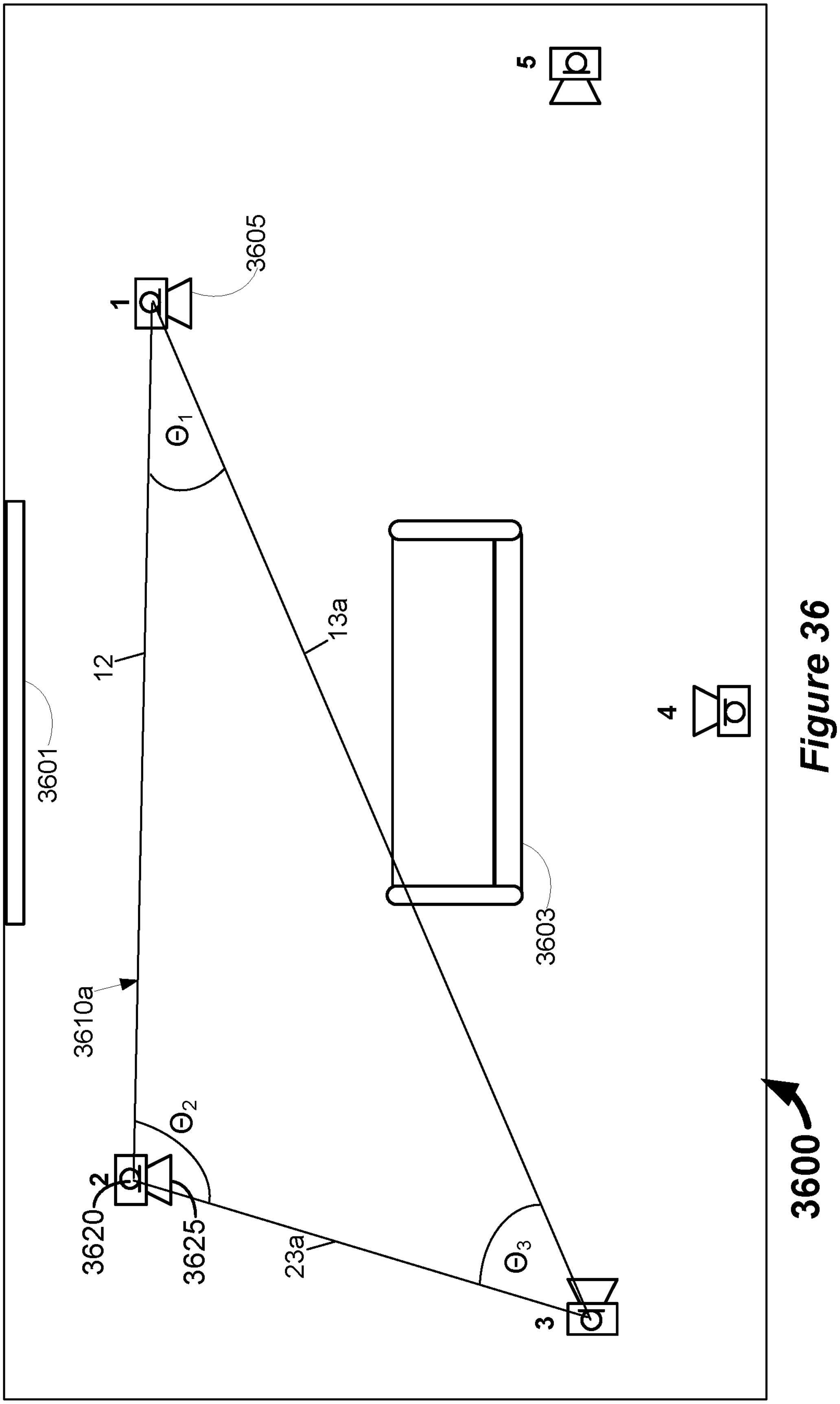
FIG. 36 shows an example of geometric relationships between three audio devices in an environment.

FIG. 36 shows an example of geometric relationships between three audio devices in an environment. In this example, the environment 3600 is a room that includes a television 3601, a sofa 3603 and five audio devices 3605. According to this example, the audio devices 3605 are in locations 1 through 5 of the environment 3600. In this implementation, each of the audio devices 3605 includes a microphone system 3620 having at least three microphones and a speaker system 3625 that includes at least one speaker. In some implementations, each microphone system 3620 includes an array of microphones. According to some implementations, each of the audio devices 3605 may include an antenna system that includes at least three antennas.

As with other examples disclosed herein, the type, number and arrangement of elements shown in FIG. 36 are merely made by way of example. Other implementations may have different types, numbers and arrangements of elements, e.g., more or fewer audio devices 3605, audio devices 3605 in different locations, etc.

In this example, the triangle 3610*a* has its vertices at locations 1, 2 and 3. Here, the triangle 3610*a* has sides 12, 23*a* and 13*a*. According to this example, the angle between sides 12 and 23 is $\theta_2$, the angle between sides 12 and 13*a* is $\theta_1$ and the angle between sides 23*a* and 13*a* is $\theta_3$. These angles may be determined according to DOA data, as described in more detail below.

In some implementations, only the relative lengths of triangle sides may be determined. In alternative implementations, the actual lengths of triangle sides may be estimated. According to some such implementations, the actual length of a triangle side may be estimated according to TOA data, e.g., according to the time of arrival of sound produced by an audio device located at one triangle vertex and detected by an audio device located at another triangle vertex. Alternatively, or additionally, the length of a triangle side may be estimated according to electromagnetic waves produced by an audio device located at one triangle vertex and detected by an audio device located at another triangle vertex. For example, the length of a triangle side may be estimated according to the signal strength of electromagnetic waves produced by an audio device located at one triangle vertex and detected by an audio device located at another triangle vertex. In some implementations, the length of a triangle side may be estimated according to a detected phase shift of electromagnetic waves.

Figure 37:
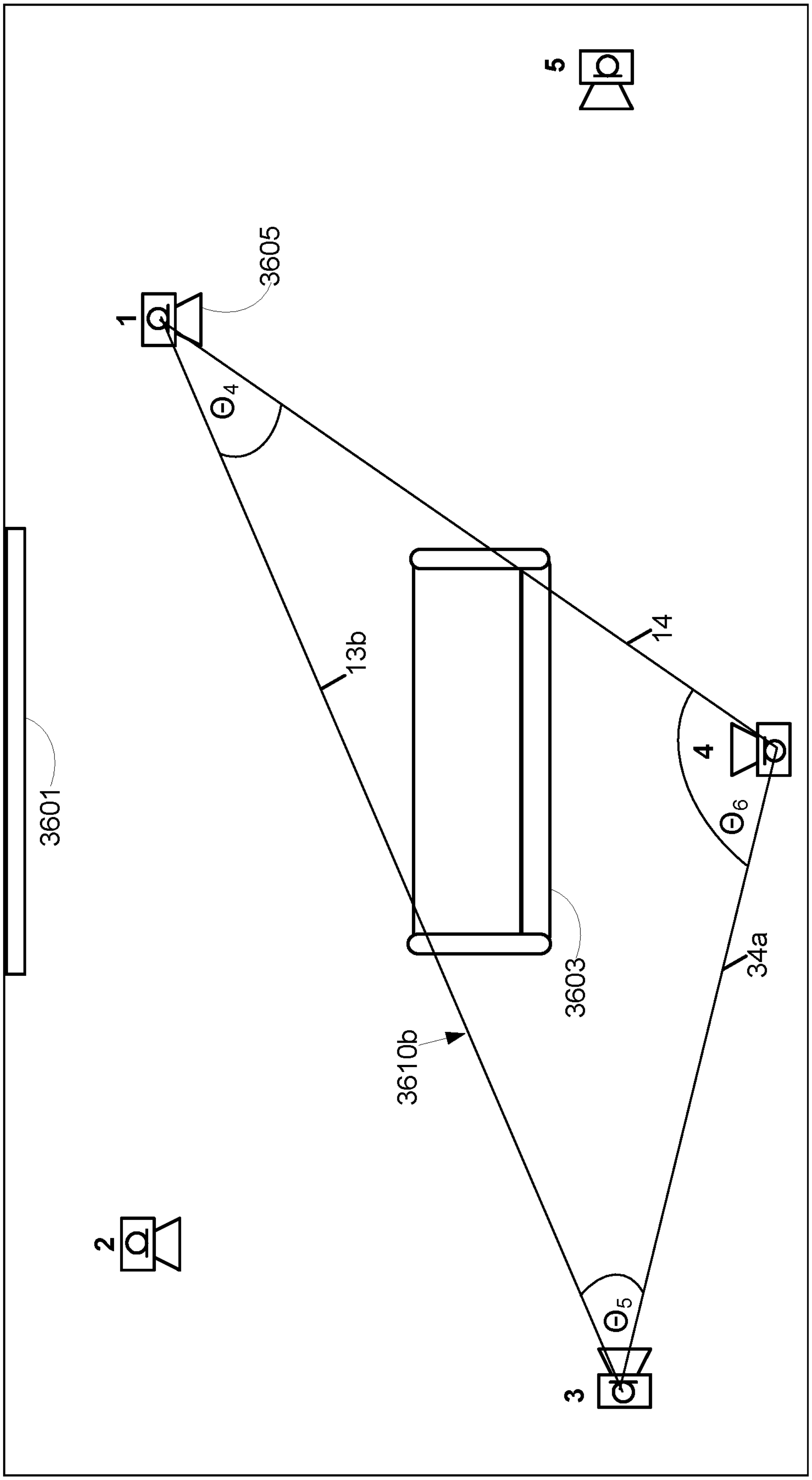
FIG. 37 shows another example of geometric relationships between three audio devices in the environment shown in FIG. 36.

FIG. 37 shows another example of geometric relationships between three audio devices in the environment shown in FIG. 36. In this example, the triangle 3610*b* has its vertices at locations 1, 3 and 4. Here, the triangle 3610*b* has sides 13*b*, 14 and 34*a*. According to this example, the angle between sides 13*b* and 14 is $\theta_4$, the angle between sides 13*b* and 34*a* is $\theta_5$ and the angle between sides 34*a* and 14 is $\theta_6$.

By comparing FIGS. 36 and 37, one may observe that the length of side 13*a* of triangle 3610*a* should equal the length of side 13*b* of triangle 3610*b*. In some implementations, the side lengths of one triangle (e.g., triangle 3610*a*) may be assumed to be correct, and the length of a side shared by an adjacent triangle will be constrained to this length.

Figure 38:
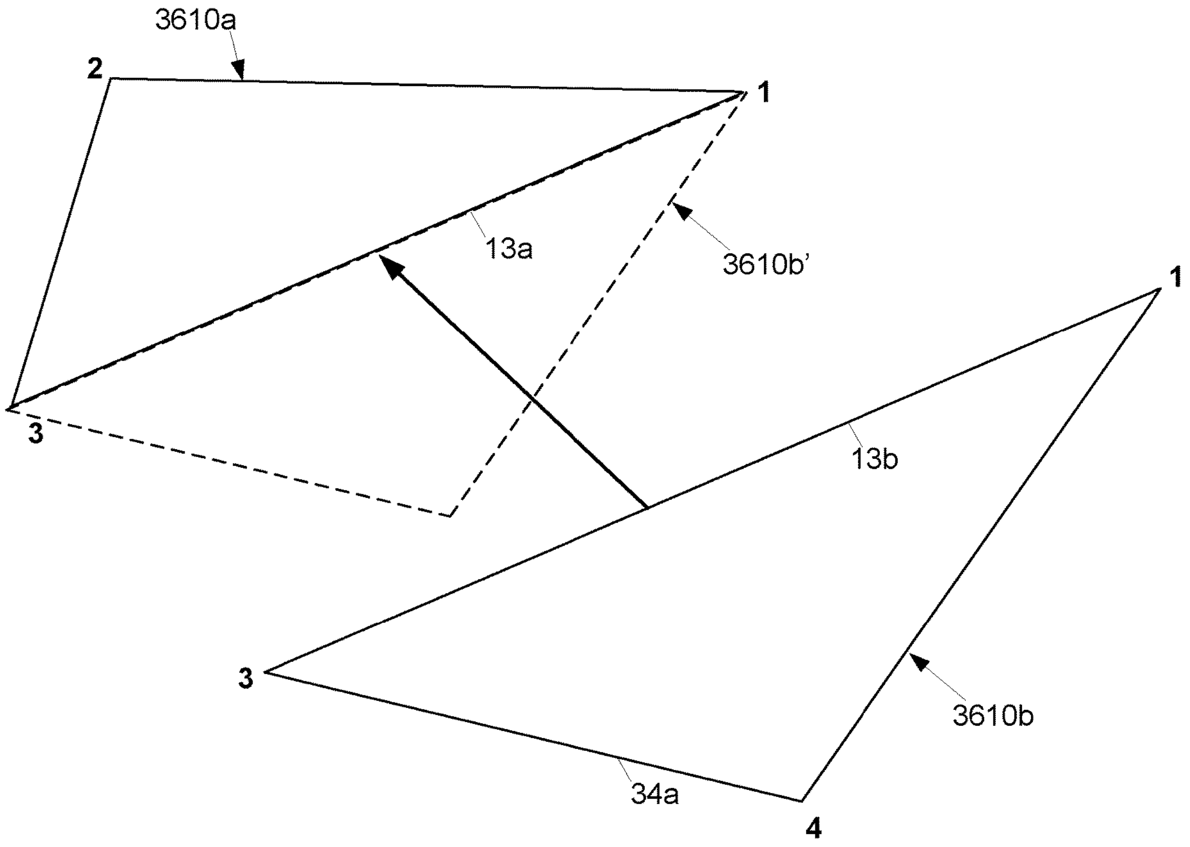
FIG. 38 shows both of the triangles depicted in FIGS. 36 and 37, without the corresponding audio devices and the other features of the environment.

FIG. 38 shows both of the triangles depicted in FIGS. 36 and 37, without the corresponding audio devices and the other features of the environment. FIG. 38 shows estimates of the side lengths and angular orientations of triangles 3610*a* and 3610*b*. In the example shown in FIG. 38, the length of side 13*b* of triangle 3610*b* is constrained to be the same length as side 13*a* of triangle 3610*a*. The lengths of the other sides of triangle 3610*b* are scaled in proportion to the resulting change in the length of side 13*b*. The resulting triangle 3610*b*' is shown in FIG. 38, adjacent to the triangle 3610*a*.

According to some implementations, the side lengths of other triangles adjacent to triangle 3610*a* and 3610*b* may be all determined in a similar fashion, until all of the audio device locations in the environment 3600 have been determined.

Some examples of audio device location may proceed as follows. Each audio device may report (e.g., in accordance with instructions from a device that is implementing an audio session manager, such as a CHASM) the DOA of every other audio device in an environment (e.g., a room) based on sounds produced by every other audio device in the environment. The Cartesian coordinates of the ith audio device may be expressed as $x_i=[x_i, y_i]_T$, where the superscript T indicates a vector transpose. Given M audio devices in the environment, $i=\{1 \ldots M\}$.

Figure 39:
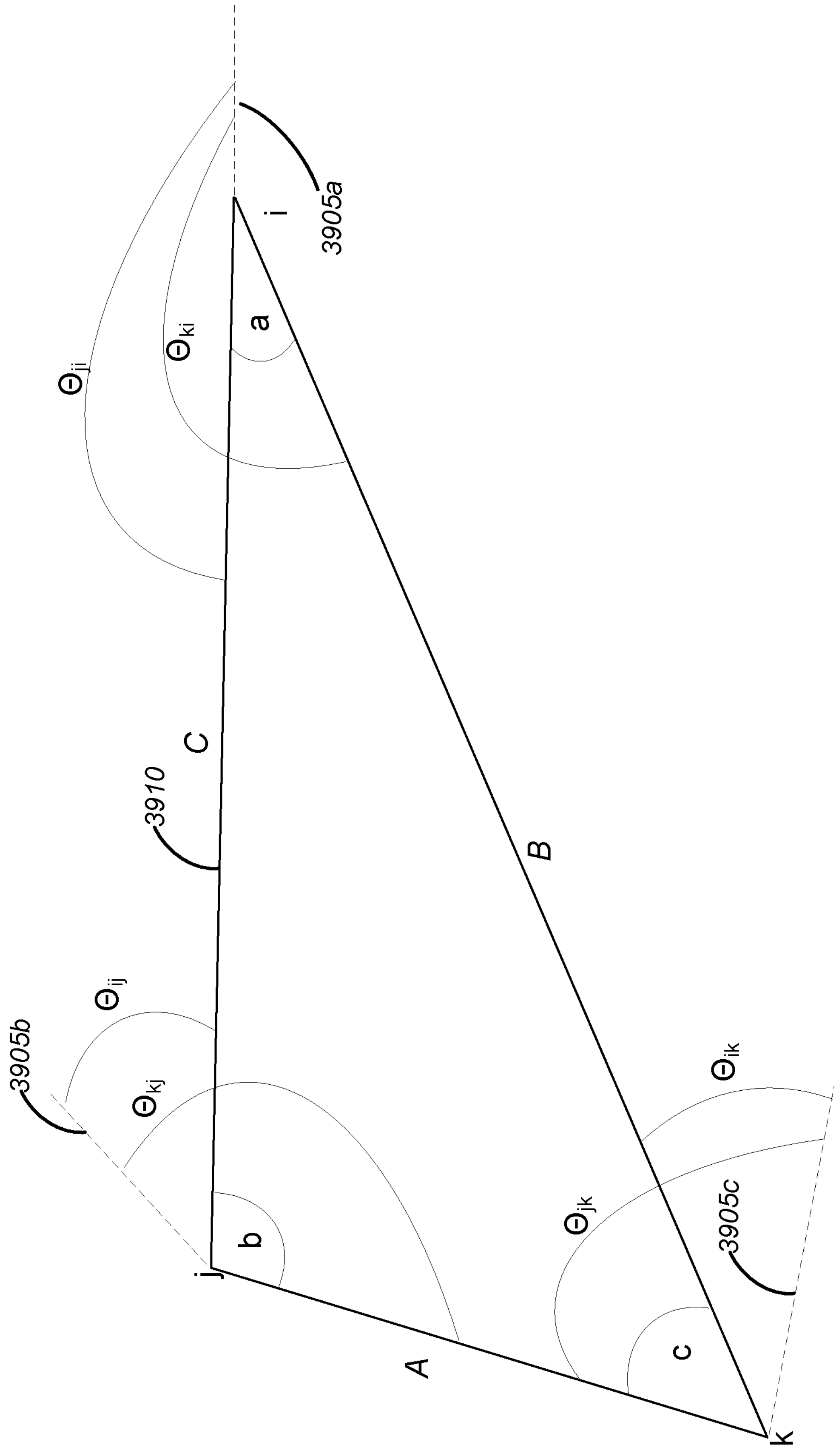
FIG. 39 shows an example of estimating the interior angles of a triangle formed by three audio devices.

FIG. 39 shows an example of estimating the interior angles of a triangle formed by three audio devices. In this example, the audio devices are i, j and k. The DOA of a sound source emanating from device j as observed from device i may be expressed as $\theta_{ji}$. The DOA of a sound source emanating from device k as observed from device i may be expressed as $\theta_{ki}$. In the example shown in FIG. 39, $\theta_{ji}$ and $\theta_{ki}$ are measured from axis 3905*a*, the orientation of which is arbitrary and which may, for example, correspond to the orientation of audio device i. Interior angle $\alpha$ of triangle 3910 may be expressed as $\alpha=\theta_{ki}-\theta_{ji}$. One may observe that the calculation of interior angle $\alpha$ does not depend on the orientation of the axis 3905*a*.

In the example shown in FIG. 39, $\theta_{ij}$ and $\theta_{ki}$ are measured from axis 3905*b*, the orientation of which is arbitrary and which may correspond to the orientation of audio device j. Interior angle b of triangle 3910 may be expressed as $b=\theta_{ij}-\theta_{ki}$. Similarly, $\theta_{jk}$ and $\theta_{ik}$ are measured from axis 3905*c* in this example. Interior angle c of triangle 3910 may be expressed as $c=\theta_{jk}-\theta_{ik}$.

In the presence of measurement error, $a+b+c\neq 180°$. Robustness can be improved by predicting each angle from the other two angles and averaging, e.g., as follows:

$$\tilde{a} = 0.5(a + \mathrm{sgn}(a)(180 - |b + c|)).$$

In some implementations, the edge lengths (A, B, C) may be calculated (up to a scaling error) by applying the sine rule. In some examples, one edge length may be assigned an arbitrary value, such as 1. For example, by making A=1 and placing vertex $\hat{x}_a=[0,0]^T$ at the origin, the locations of the remaining two vertices may be calculated as follows:

$$\hat{x}_b = [A\cos a, -A\sin a]^T,\ \hat{x}_c = [B, 0]^T$$

However, an arbitrary rotation may be acceptable.

According to some implementations, the process of triangle parameterization may be repeated for all possible subsets of three audio devices in the environment, enumerated in superset $\zeta$ of size $$N = \binom{M}{3}.$$

In some examples, $T_l$ may represent the lth triangle. Depending on the implementation, triangles may not be enumerated in any particular order. The triangles may overlap and may not align perfectly, due to possible errors in the DOA and/or side length estimates.

Figure 40:
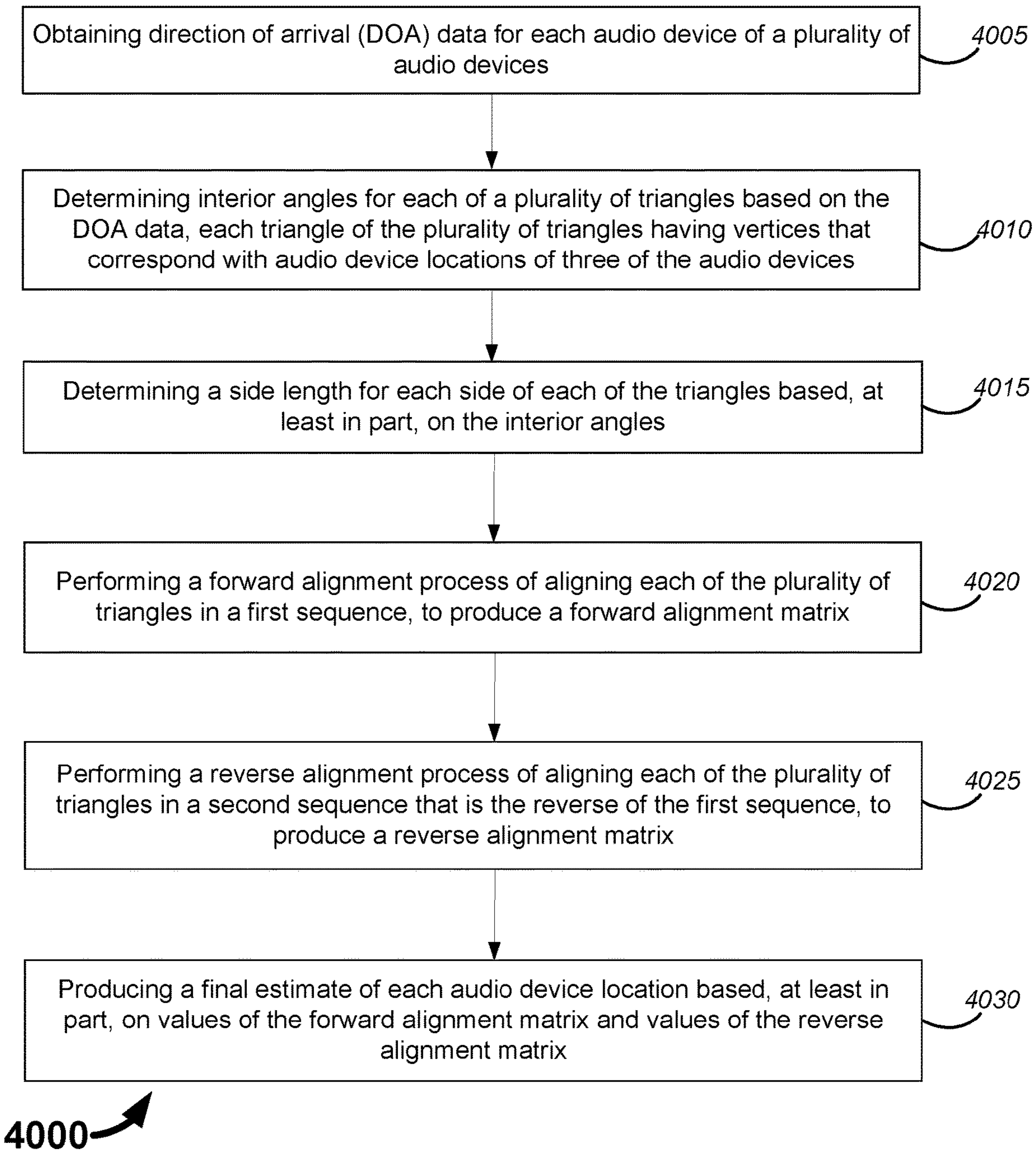
FIG. 40 is a flow diagram that outlines one example of a method that may be performed by an apparatus such as that shown in FIG. 6.

FIG. 40 is a flow diagram that outlines one example of a method that may be performed by an apparatus such as that shown in FIG. 6. The blocks of method 4000, like other methods described herein, are not necessarily performed in the order indicated. Moreover, such methods may include more or fewer blocks than shown and/or described. In this implementation, method 4000 involves estimating a speaker's location in an environment. The blocks of method 4000 may be performed by one or more devices, which may be (or may include) the apparatus 600 shown in FIG. 6. According to some implementations, the blocks of method 4000 may be performed, at least in part, by a device that is implementing an audio session manager (e.g., a CHASM) and/or according to instructions from a device that is implementing an audio session manager. In some such examples, the blocks of method 4000 may be performed, at least in part, by the CHASM 208C, the CHASM 208D, the CHASM 307 and/or the CHASM 401 that are described above with reference to FIGS. 2C, 2D, 3C and 4. According to some implementations, the blocks of method 4000 may be performed as part of the set-up process of method 1500 that is described above with reference to FIG. 15. In this example, block 4005 involves obtaining direction of arrival (DOA) data for each audio device of a plurality of audio devices. In some examples, the plurality of audio devices may include all of the audio devices in an environment, such as all of the audio devices 3605 shown in FIG. 36.

However, in some instances the plurality of audio devices may include only a subset of all of the audio devices in an environment. For example, the plurality of audio devices may include all smart speakers in an environment, but not one or more of the other audio devices in an environment.

The DOA data may be obtained in various ways, depending on the particular implementation. In some instances, determining the DOA data may involve determining the DOA data for at least one audio device of the plurality of audio devices. For example, determining the DOA data may involve receiving microphone data from each microphone of a plurality of audio device microphones corresponding to a single audio device of the plurality of audio devices and determining the DOA data for the single audio device based, at least in part, on the microphone data. Alternatively, or additionally, determining the DOA data may involve receiving antenna data from one or more antennas corresponding to a single audio device of the plurality of audio devices and determining the DOA data for the single audio device based, at least in part, on the antenna data.

In some such examples, the single audio device itself may determine the DOA data. According to some such implementations, each audio device of the plurality of audio devices may determine its own DOA data. However, in other implementations another device, which may be a local or a remote device, may determine the DOA data for one or more audio devices in the environment. According to some implementations, a server may determine the DOA data for one or more audio devices in the environment.

According to this example, block 4010 involves determining interior angles for each of a plurality of triangles based on the DOA data. In this example, each triangle of the plurality of triangles has vertices that correspond with audio device locations of three of the audio devices. Some such examples are described above.

Figure 41:
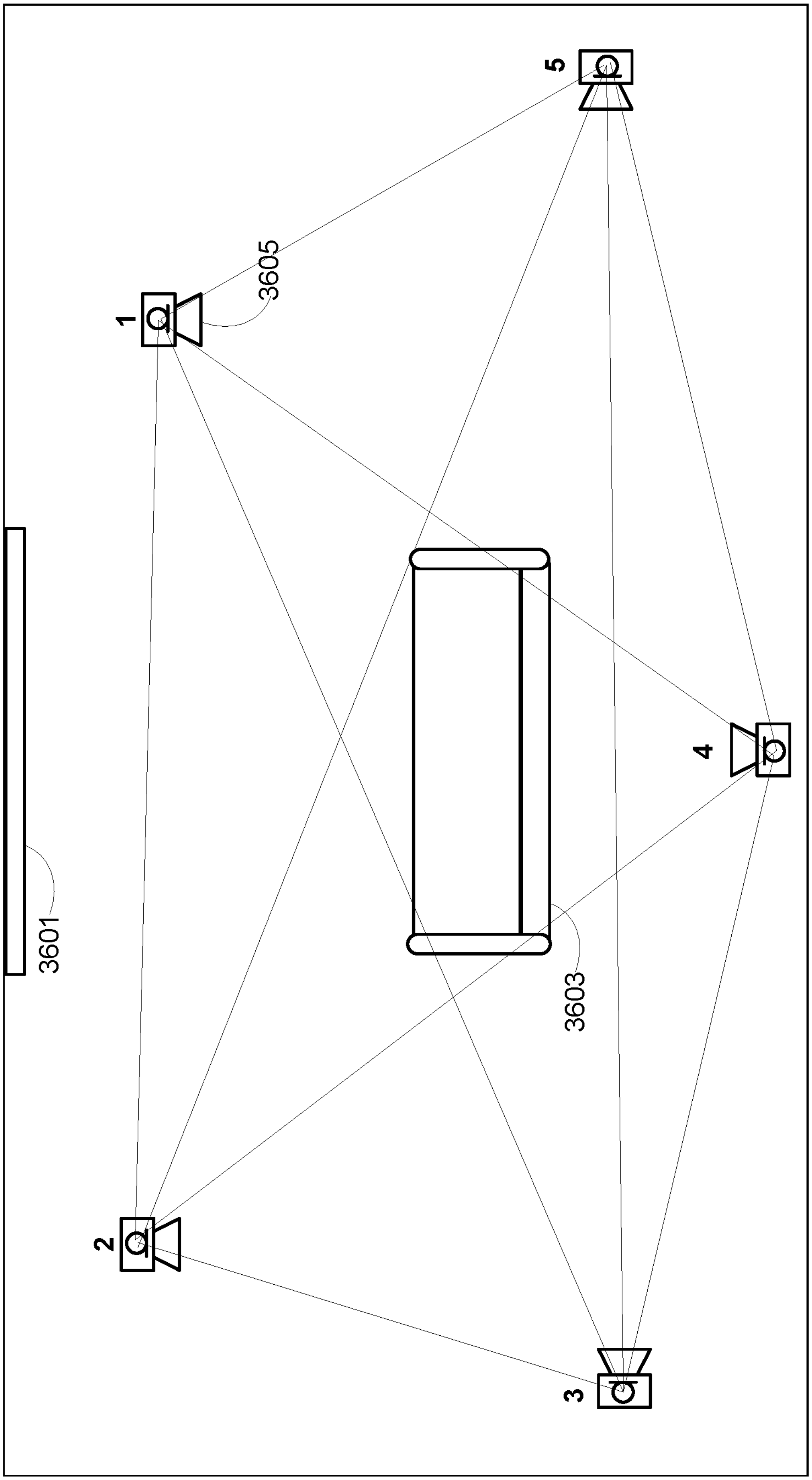
FIG. 41 shows an example in which each audio device in an environment is a vertex of multiple triangles.

FIG. 41 shows an example in which each audio device in an environment is a vertex of multiple triangles. The sides of each triangle correspond with distances between two of the audio devices 3605.

In this implementation, block 4015 involves determining a side length for each side of each of the triangles. (A side of a triangle may also be referred to herein as an "edge.") According to this example, the side lengths are based, at least in part, on the interior angles. In some instances, the side lengths may be calculated by determining a first length of a first side of a triangle and determining lengths of a second side and a third side of the triangle based on the interior angles of the triangle. Some such examples are described above.

According to some such implementations, determining the first length may involve setting the first length to a predetermined value. However, determining the first length may, in some examples, be based on time-of-arrival data and/or received signal strength data. The time-of-arrival data and/or received signal strength data may, in some implementations, correspond to sound waves from a first audio device in an environment that are detected by a second audio device in the environment. Alternatively, or additionally, the time-of-arrival data and/or received signal strength data may correspond to electromagnetic waves (e.g., radio waves, infrared waves, etc.) from a first audio device in an environment that are detected by a second audio device in the environment.

According to this example, block 4020 involves performing a forward alignment process of aligning each of the plurality of triangles in a first sequence. According to this example, the forward alignment process produces a forward alignment matrix.

According to some such examples, triangles are expected to align in such a way that an edge $(x_i, x_j)$ is equal to a neighboring edge, e.g., as shown in FIG. 38 and described above. Let ε be the set of all edges of size $$P = \binom{M}{2}.$$

In some such implementations, block 4020 may involve traversing through ε and aligning the common edges of triangles in forward order by forcing an edge to coincide with that of a previously aligned edge.

Figure 42:
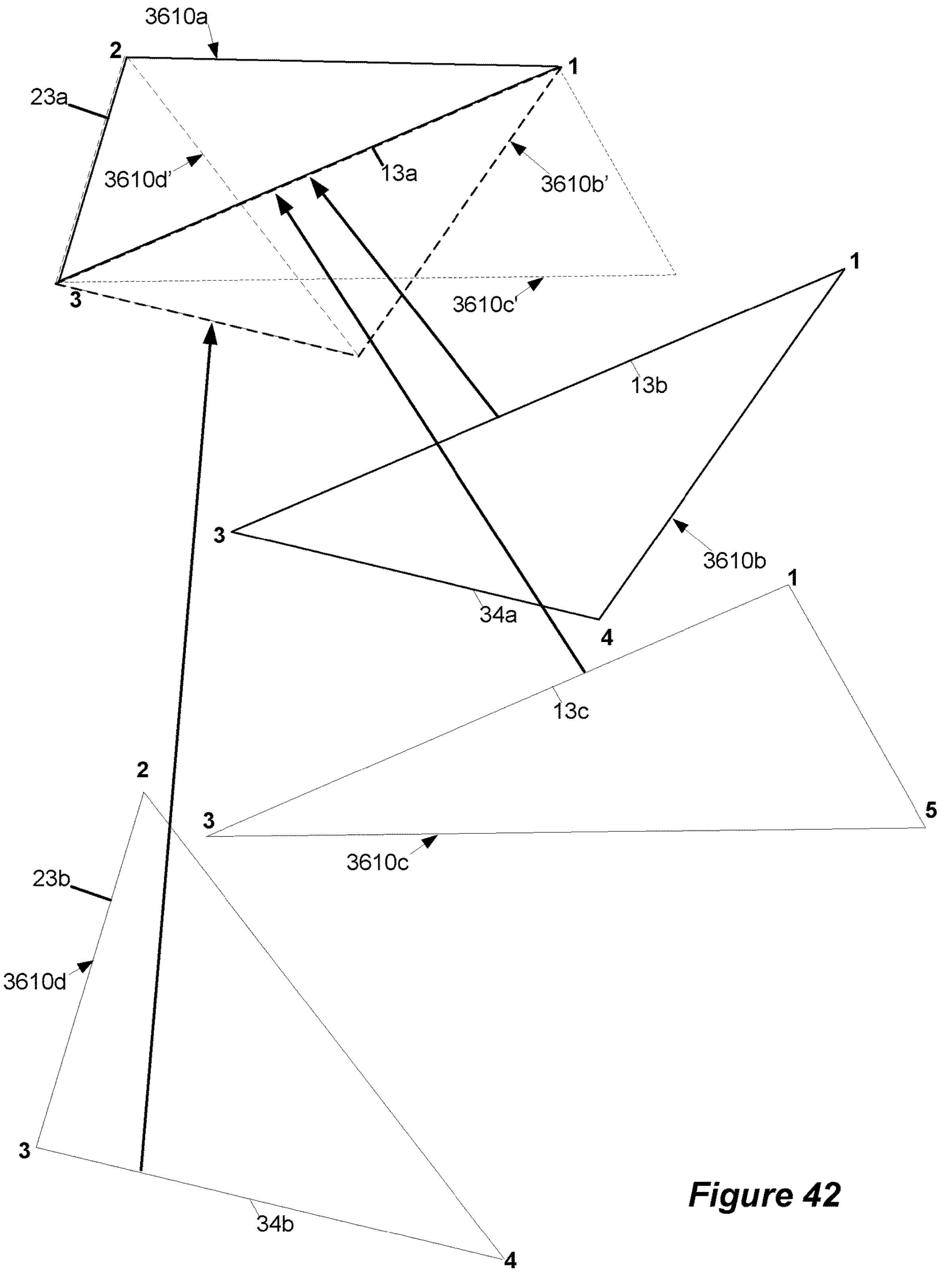
FIG. 42 provides an example of part of a forward alignment process.

FIG. 42 provides an example of part of a forward alignment process. The numbers 1 through 5 that are shown in bold in FIG. 42 correspond with the audio device locations shown in FIGS. 36, 37 and 41. The sequence of the forward alignment process that is shown in FIG. 42 and described herein is merely an example.

In this example, as in FIG. 38, the length of side 13*b* of triangle 3610*b* is forced to coincide with the length of side 13*a* of triangle 3610*a*. The resulting triangle 3610*b*' is shown in FIG. 42, with the same interior angles maintained. According to this example, the length of side 13*c* of triangle 3610*c* is also forced to coincide with the length of side 13*a* of triangle 3610*a*. The resulting triangle 3610*c*' is shown in FIG. 42, with the same interior angles maintained.

Next, in this example, the length of side 34*b* of triangle 3610*d* is forced to coincide with the length of side 34*a* of triangle 3610*b*'. Moreover, in this example, the length of side 23*b* of triangle 3610*d* is forced to coincide with the length of side 23*a* of triangle 3610*a*. The resulting triangle 3610*d*' is shown in FIG. 42, with the same interior angles maintained.

According to some such examples, the remaining triangles shown in FIG. 41 may be processed in the same manner as triangles 3610*b*, 3610*c* and 3610*d*.

The results of the forward alignment process may be stored in a data structure. According to some such examples, the results of the forward alignment process may be stored in a forward alignment matrix. For example, the results of the forward alignment process may be stored in matrix $\vec{X} \in \mathbb{R}^{3N \times 2}$, where N indicates the total number of triangles.

When the DOA data and/or the initial side length determinations contain errors, multiple estimates of audio device location will occur. The errors will generally increase during the forward alignment process.

Figure 43:
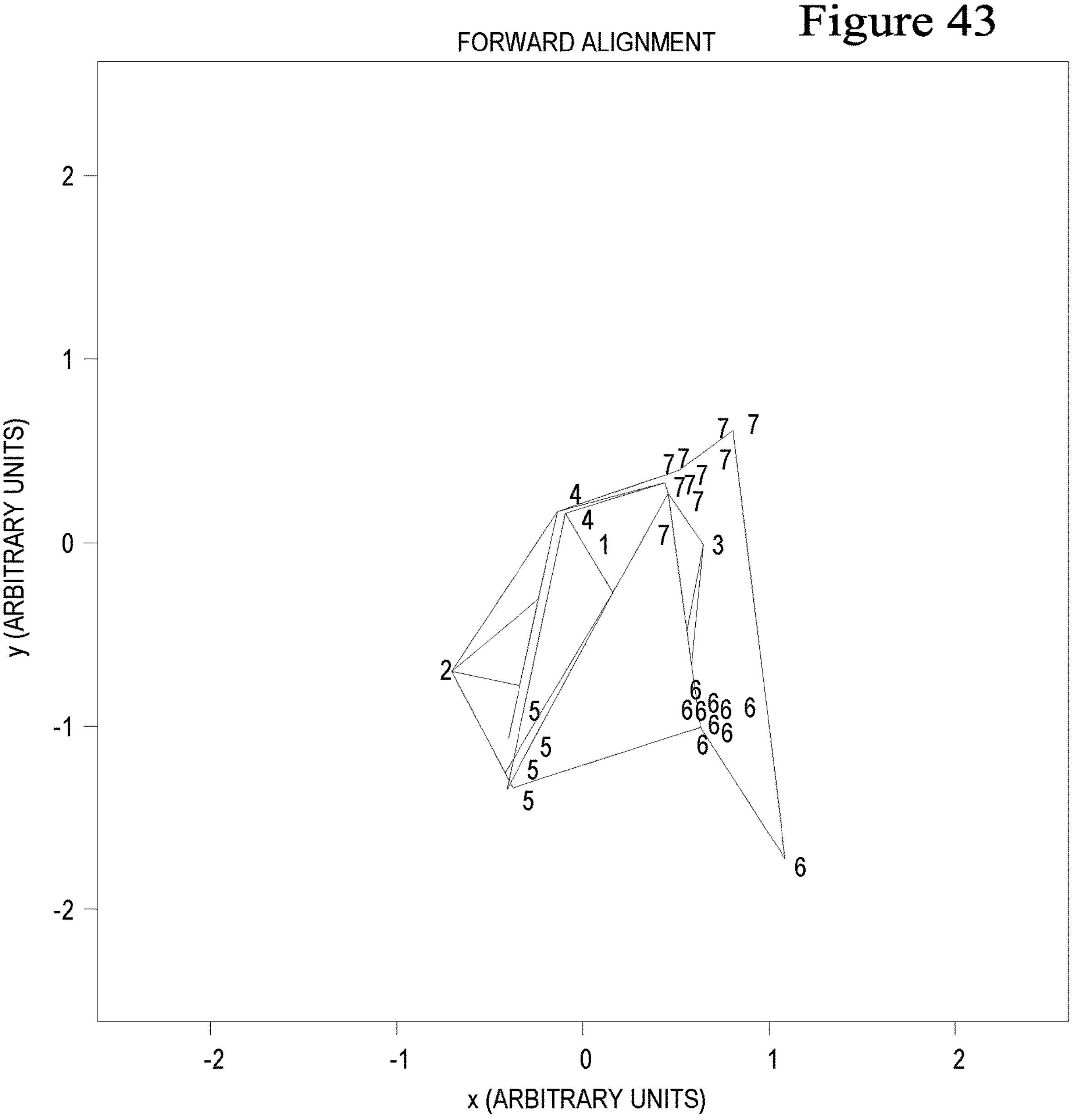
FIG. 43 shows an example of multiple estimates of audio device location that have occurred during a forward alignment process.

FIG. 43 shows an example of multiple estimates of audio device location that have occurred during a forward alignment process. In this example, the forward alignment process is based on triangles having seven audio device locations as their vertices. Here, the triangles do not align perfectly due to additive errors in the DOA estimates. The locations of the numbers 1 through 7 that are shown in FIG. 43 correspond to the estimated audio device locations produced by the forward alignment process. In this example, the audio device location estimates labelled "1" coincide but the audio device locations estimates for audio devices 6 and 7 show larger differences, as indicted by the relatively larger areas over which the numbers 6 and 7 are located.

Returning to FIG. 40, in this example block 4025 involves a reverse alignment process of aligning each of the plurality of triangles in a second sequence that is the reverse of the first sequence. According to some implementations, the reverse alignment process may involve traversing through E as before, but in reverse order. In alternative examples, the reverse alignment process may not be precisely the reverse of the sequence of operations of the forward alignment process. According to this example, the reverse alignment process produces a reverse alignment matrix, which may be represented herein as $\overleftarrow{\mathbf{X}} \in \mathbb{R}^{3N \times 2}$.

Figure 44:
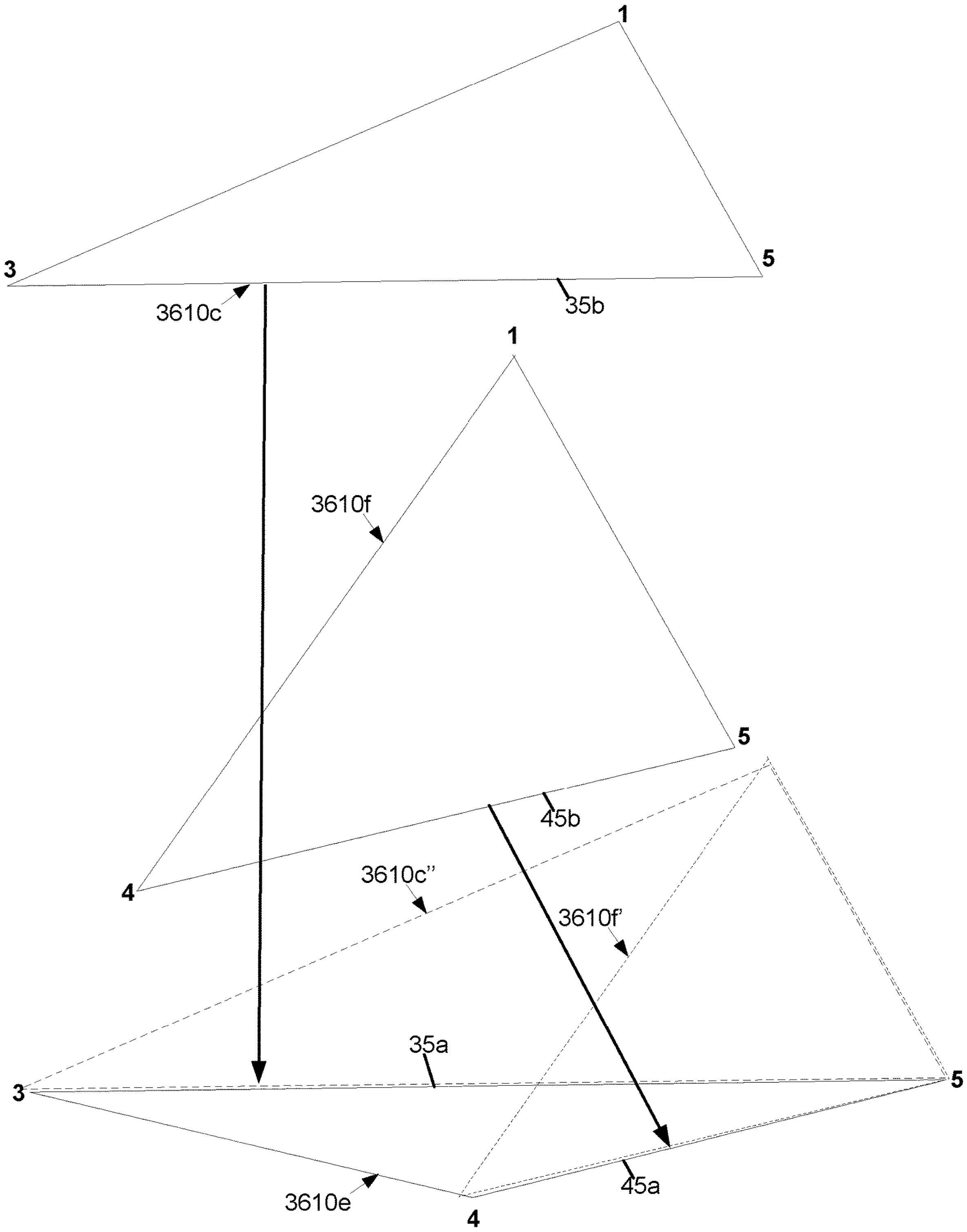
FIG. 44 provides an example of part of a reverse alignment process.

FIG. 44 provides an example of part of a reverse alignment process. The numbers 1 through 5 that are shown in bold in FIG. 44 correspond with the audio device locations shown in FIGS. 36, 37 and 41. The sequence of the reverse alignment process that is shown in FIG. 44 and described herein is merely an example.

In the example shown in FIG. 44, triangle 3610*e* is based on audio device locations 3, 4 and 5. In this implementation, the side lengths (or "edges") of triangle 3610*e* are assumed to be correct, and the side lengths of adjacent triangles are forced to coincide with them. According to this example, the length of side 45*b* of triangle 3610*f* is forced to coincide with the length of side 45*a* of triangle 3610*e*. The resulting triangle 3610*f*, with interior angles remaining the same, is shown in FIG. 44. In this example, the length of side 35*b* of triangle 3610*c* is forced to coincide with the length of side 35*a* of triangle 3610*e*. The resulting triangle 3610*c*", with interior angles remaining the same, is shown in FIG. 44. According to some such examples, the remaining triangles shown in FIG. 5 may be processed in the same manner as triangles 3610*c* and 3610*f*, until the reverse alignment process has included all remaining triangles.

Figure 45:
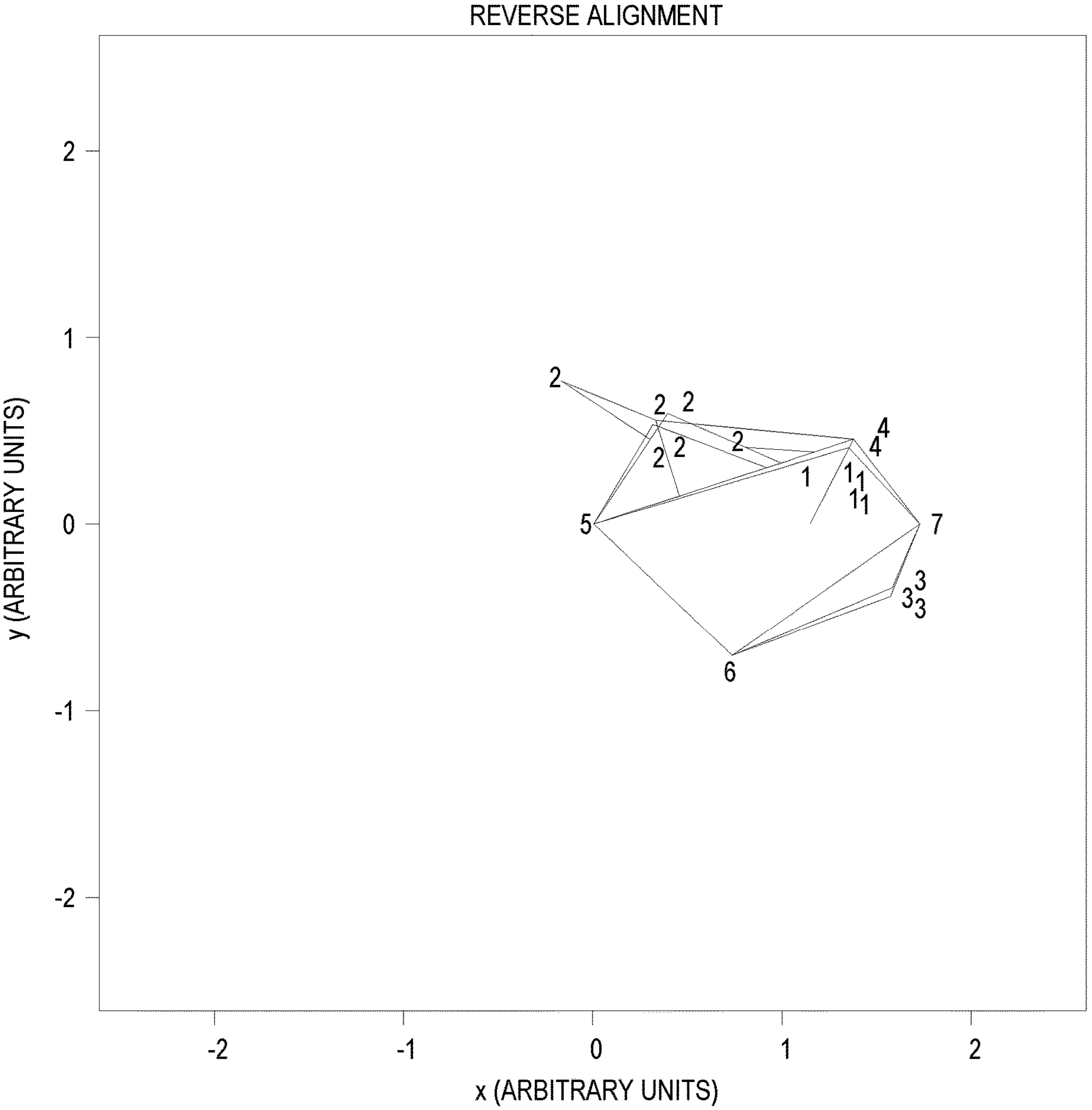
FIG. 45 shows an example of multiple estimates of audio device location that have occurred during a reverse alignment process.

FIG. 45 shows an example of multiple estimates of audio device location that have occurred during a reverse alignment process. In this example, the reverse alignment process is based on triangles having the same seven audio device locations as their vertices that are described above with reference to FIG. 43. The locations of the numbers 1 through 7 that are shown in FIG. 45 correspond to the estimated audio device locations produced by the reverse alignment process. Here again, the triangles do not align perfectly due to additive errors in the DOA estimates. In this example, the audio device location estimates labelled 6 and 7 coincide, but the audio device location estimates for audio devices 1 and 2 show larger differences.

Returning to FIG. 40, block 4030 involves producing a final estimate of each audio device location based, at least in part, on values of the forward alignment matrix and values of the reverse alignment matrix. In some examples, producing the final estimate of each audio device location may involve translating and scaling the forward alignment matrix to produce a translated and scaled forward alignment matrix, and translating and scaling the reverse alignment matrix to produce a translated and scaled reverse alignment matrix.

For example, translation and scaling are fixed by moving the centroids to the origin and forcing unit Frobenius norm, e.g., $$\vec{X} = \vec{X}/\|\vec{X}\|_2^F \text{ and } \bar{\mathbf{X}} = \overleftarrow{X}/\|\overleftarrow{X}\|_2^F.$$

According to some such examples, producing the final estimate of each audio device location also may involve producing a rotation matrix based on the translated and scaled forward alignment matrix and the translated and scaled reverse alignment matrix. The rotation matrix may include a plurality of estimated audio device locations for each audio device. An optimal rotation between forward and reverse alignments is can be found, for example, by singular value decomposition. In some such examples, involve producing the rotation matrix may involve performing a singular value decomposition on the translated and scaled forward alignment matrix and the translated and scaled reverse alignment matrix, e.g., as follows:

$$U\Sigma V = \vec{\mathbf{X}}^T \overleftarrow{\mathbf{X}}$$

In the foregoing equation, U represents the left-singular vector and V represents the right-singular vector of matrix $\vec{\mathbf{X}}^T \overleftarrow{\mathbf{X}}$ respectively. Σ represents a matrix of singular values. The foregoing equation yields a rotation matrix $R = VU^T$. The matrix product $VU^T$ yields a rotation matrix such that $R\overleftarrow{\mathbf{X}}$ is optimally rotated to align with $\vec{\mathbf{X}}$.

According to some examples, after determining the rotation matrix $R = VU^T$ alignments may be averaged, e.g., as follows:

$$\overleftrightarrow{\mathbf{X}} = 0.5(\vec{\mathbf{X}} + R\overleftarrow{\mathbf{X}}).$$

In some implementations, producing the final estimate of each audio device location also may involve averaging the estimated audio device locations for each audio device to produce the final estimate of each audio device location. Various disclosed implementations have proven to be robust, even when the DOA data and/or other calculations include significant errors. For example, $\overleftrightarrow{\mathbf{X}}$ contains $$\frac{(N-1)(N-2)}{2}$$

estimates of the same node due to overlapping vertices from multiple triangles. Averaging across common nodes yields a final estimate $\hat{X} \in \mathbb{R}^{M\times 3}$.

Figure 46:
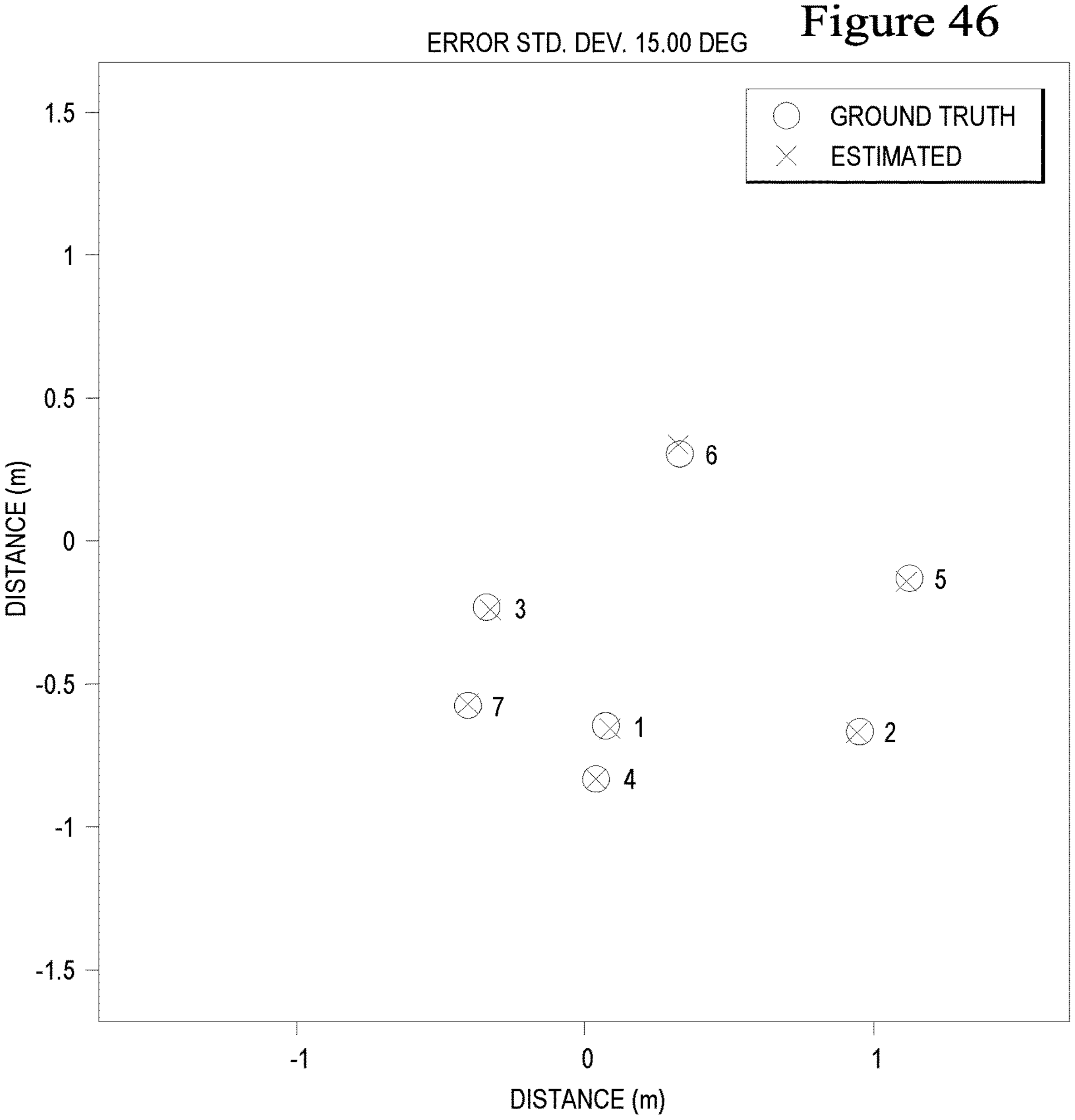
FIG. 46 shows a comparison of estimated and actual audio device locations.

FIG. 46 shows a comparison of estimated and actual audio device locations. In the example shown in FIG. 46, the audio device locations correspond to those that were estimated during the forward and reverse alignment processes that are described above with reference to FIGS. 43 and 45. In these examples, the errors in the DOA estimations had a standard deviation of 15 degrees. Nonetheless, the final estimates of each audio device location (each of which is represented by an "x" in FIG. 46) correspond well with the actual audio device locations (each of which is represented by a circle in FIG. 46).

Much of the foregoing discussion involves audio device auto-location. The following discussion expands upon some methods of determining listener location and listener angular orientation that are described briefly above. In the foregoing description, the term "rotation" is used in essentially the same way as the term "orientation" is used in the following description. For example, the above-referenced "rotation" may refer to a global rotation of the final speaker geometry, not the rotation of the individual triangles during the process that is described above with reference to FIG. 40 et seq. This global rotation or orientation may be resolved with reference to a listener angular orientation, e.g., by the direction in which the listener is looking, by the direction in which the listener's nose is pointing, etc.

Various satisfactory methods for estimating listener location are described below. However, estimating the listener angular orientation can be challenging. Some relevant methods are described in detail below.

Determining listener location and listener angular orientation can enable some desirable features, such as orienting located audio devices relative to the listener. Knowing the listener position and angular orientation allows a determination of, e.g., which speakers within an environment would be in the front, which are in the back, which are near the center (if any), etc., relative to the listener.

After making a correlation between audio device locations and a listener's location and orientation, some implementations may involve providing the audio device location data, the audio device angular orientation data, the listener location data and the listener angular orientation data to an audio rendering system. Alternatively, or additionally, some implementations may involve an audio data rendering process that is based, at least in part, on the audio device location data, the audio device angular orientation data, the listener location data and the listener angular orientation data.

Figure 47:
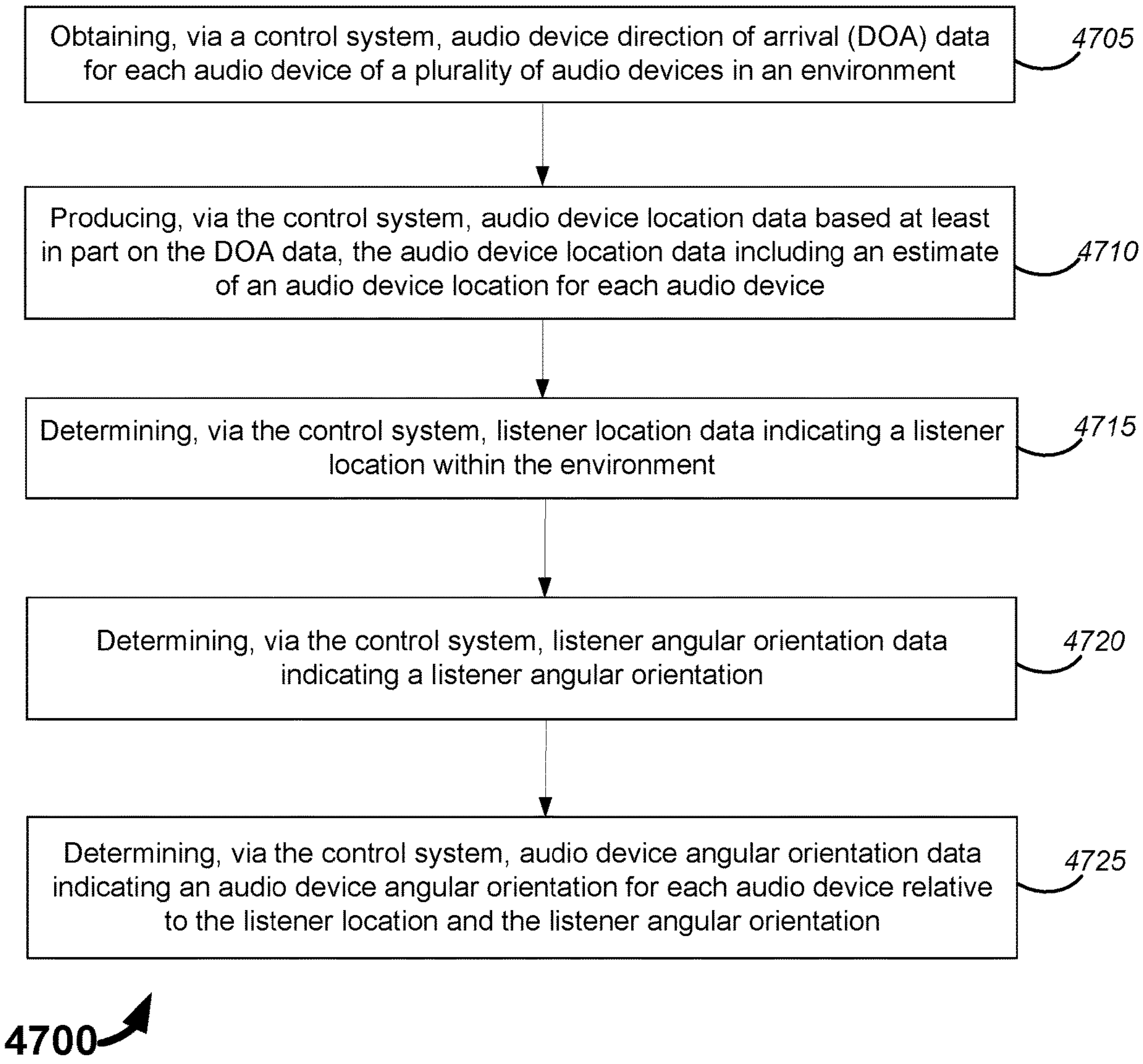
FIG. 47 is a flow diagram that outlines another example of a method that may be performed by an apparatus such as that shown in FIG. 6.

FIG. 47 is a flow diagram that outlines one example of a method that may be performed by an apparatus such as that shown in FIG. 6. The blocks of method 4700, like other methods described herein, are not necessarily performed in the order indicated. Moreover, such methods may include more or fewer blocks than shown and/or described. In this example, the blocks of method 4700 are performed by a control system, which may be (or may include) the control system 610 shown in FIG. 6. As noted above, in some implementations the control system 610 may reside in a single device, whereas in other implementations the control system 610 may reside in two or more devices. According to some implementations, the blocks of method 4700 may be performed, at least in part, by a device that is implementing an audio session manager (e.g., a CHASM) and/or according to instructions from a device that is implementing an audio session manager. In some such examples, the blocks of method 4700 may be performed, at least in part, by the CHASM 208C, the CHASM 208D, the CHASM 307 and/or the CHASM 401 that are described above with reference to FIGS. 2C, 2D, 3C and 4. According to some implementations, the blocks of method 4700 may be performed as part of the process of method 1200 that is described above with reference to FIG. 12, e.g., determining the first location and the first orientation of the first person, determining at least one of a second location or a second orientation of the first person, etc.

In this example, block 4705 involves obtaining direction of arrival (DOA) data for each audio device of a plurality of audio devices in an environment. In some examples, the plurality of audio devices may include all of the audio devices in an environment, such as all of the audio devices 3605 shown in FIG. 36.

However, in some instances the plurality of audio devices may include only a subset of all of the audio devices in an environment. For example, the plurality of audio devices may include all smart speakers in an environment, but not one or more of the other audio devices in an environment.

The DOA data may be obtained in various ways, depending on the particular implementation. In some instances, determining the DOA data may involve determining the DOA data for at least one audio device of the plurality of audio devices. In some examples, the DOA data may be obtained by controlling each loudspeaker of a plurality of loudspeakers in the environment to reproduce a test signal. For example, determining the DOA data may involve receiving microphone data from each microphone of a plurality of audio device microphones corresponding to a single audio device of the plurality of audio devices and determining the DOA data for the single audio device based, at least in part, on the microphone data. Alternatively, or additionally, determining the DOA data may involve receiving antenna data from one or more antennas corresponding to a single audio device of the plurality of audio devices and determining the DOA data for the single audio device based, at least in part, on the antenna data.

In some such examples, the single audio device itself may determine the DOA data. According to some such implementations, each audio device of the plurality of audio devices may determine its own DOA data. However, in other implementations another device, which may be a local or a remote device, may determine the DOA data for one or more audio devices in the environment. According to some implementations, a server may determine the DOA data for one or more audio devices in the environment.

According to the example shown in FIG. 47, block 4710 involves producing, via the control system, audio device location data based at least in part on the DOA data. In this example, the audio device location data includes an estimate of an audio device location for each audio device referenced in block 4705.

The audio device location data may, for example, be (or include) coordinates of a coordinate system, such as a Cartesian, spherical or cylindrical coordinate system. The coordinate system may be referred to herein as an audio device coordinate system. In some such examples, the audio device coordinate system may be oriented with reference to one of the audio devices in the environment. In other examples, the audio device coordinate system may be oriented with reference to an axis defined by a line between two of the audio devices in the environment. However, in other examples the audio device coordinate system may be oriented with reference to another part of the environment, such as a television, a wall of a room, etc.

In some examples, block 4710 may involve the processes described above with reference to FIG. 40. According to some such examples, block 4710 may involve determining interior angles for each of a plurality of triangles based on the DOA data. In some instances, each triangle of the plurality of triangles may have vertices that correspond with audio device locations of three of the audio devices. Some such methods may involve determining a side length for each side of each of the triangles based, at least in part, on the interior angles.

Some such methods may involve performing a forward alignment process of aligning each of the plurality of triangles in a first sequence, to produce a forward alignment matrix. Some such methods may involve performing a reverse alignment process of aligning each of the plurality of triangles in a second sequence that is the reverse of the first sequence, to produce a reverse alignment matrix. Some such methods may involve producing a final estimate of each audio device location based, at least in part, on values of the forward alignment matrix and values of the reverse alignment matrix. However, in some implementations of method 4700 block 4710 may involve applying methods other than those described above with reference to FIG. 40.

In this example, block 4715 involves determining, via the control system, listener location data indicating a listener location within the environment. The listener location data may, for example, be with reference to the audio device coordinate system. However, in other examples the coordinate system may be oriented with reference to the listener or to a part of the environment, such as a television, a wall of a room, etc.

In some examples, block 4715 may involve prompting the listener (e.g., via an audio prompt from one or more loudspeakers in the environment) to make one or more utterances and estimating the listener location according to DOA data. The DOA data may correspond to microphone data obtained by a plurality of microphones in the environment. The microphone data may correspond with detections of the one or more utterances by the microphones. At least some of the microphones may be co-located with loudspeakers. According to some examples, block 4715 may involve a triangulation process. For example, block 4715 may involve triangulating the user's voice by finding the point of intersection between DOA vectors passing through the audio devices, e.g., as described below with reference to FIG. 48A. According to some implementations, block 4715 (or another operation of the method 4700) may involve co-locating the origins of the audio device coordinate system and the listener coordinate system, which is after the listener location is determined. Co-locating the origins of the audio device coordinate system and the listener coordinate system may involve transforming the audio device locations from the audio device coordinate system to the listener coordinate system.

According to this implementation, block 4720 involves determining, via the control system, listener angular orientation data indicating a listener angular orientation. The listener angular orientation data may, for example, be made with reference to a coordinate system that is used to represent the listener location data, such as the audio device coordinate system. In some such examples, the listener angular orientation data may be made with reference to an origin and/or an axis of the audio device coordinate system.

However, in some implementations the listener angular orientation data may be made with reference to an axis defined by the listener location and another point in the environment, such as a television, an audio device, a wall, etc. In some such implementations, the listener location may be used to define the origin of a listener coordinate system. The listener angular orientation data may, in some such examples, be made with reference to an axis of the listener coordinate system.

Various methods for performing block 4720 are disclosed herein. According to some examples, the listener angular orientation may correspond to a listener viewing direction. In some such examples the listener viewing direction may be inferred with reference to the listener location data, e.g., by assuming that the listener is viewing a particular object, such as a television. In some such implementations, the listener viewing direction may be determined according to the listener location and a television location. Alternatively, or additionally, the listener viewing direction may be determined according to the listener location and a television soundbar location.

However, in some examples the listener viewing direction may be determined according to listener input. According to some such examples, the listener input may include inertial sensor data received from a device held by the listener. The listener may use the device to point at location in the environment, e.g., a location corresponding with a direction in which the listener is facing. For example, the listener may use the device to point to a sounding loudspeaker (a loudspeaker that is reproducing a sound). Accordingly, in such examples the inertial sensor data may include inertial sensor data corresponding to the sounding loudspeaker.

In some such instances, the listener input may include an indication of an audio device selected by the listener. The indication of the audio device may, in some examples, include inertial sensor data corresponding to the selected audio device.

However, in other examples the indication of the audio device may be made according to one or more utterances of the listener (e.g., "the television is in front of me now." "speaker 2 is in front of me now," etc.). Other examples of determining listener angular orientation data according to one or more utterances of the listener are described below.

According to the example shown in FIG. 47, block 4725 involves determining, via the control system, audio device angular orientation data indicating an audio device angular orientation for each audio device relative to the listener location and the listener angular orientation. According to some such examples, block 4725 may involve a rotation of audio device coordinates around a point defined by the listener location. In some implementations, block 4725 may involve a transformation of the audio device location data from an audio device coordinate system to a listener coordinate system. Some examples are described below.

Figure 48A:
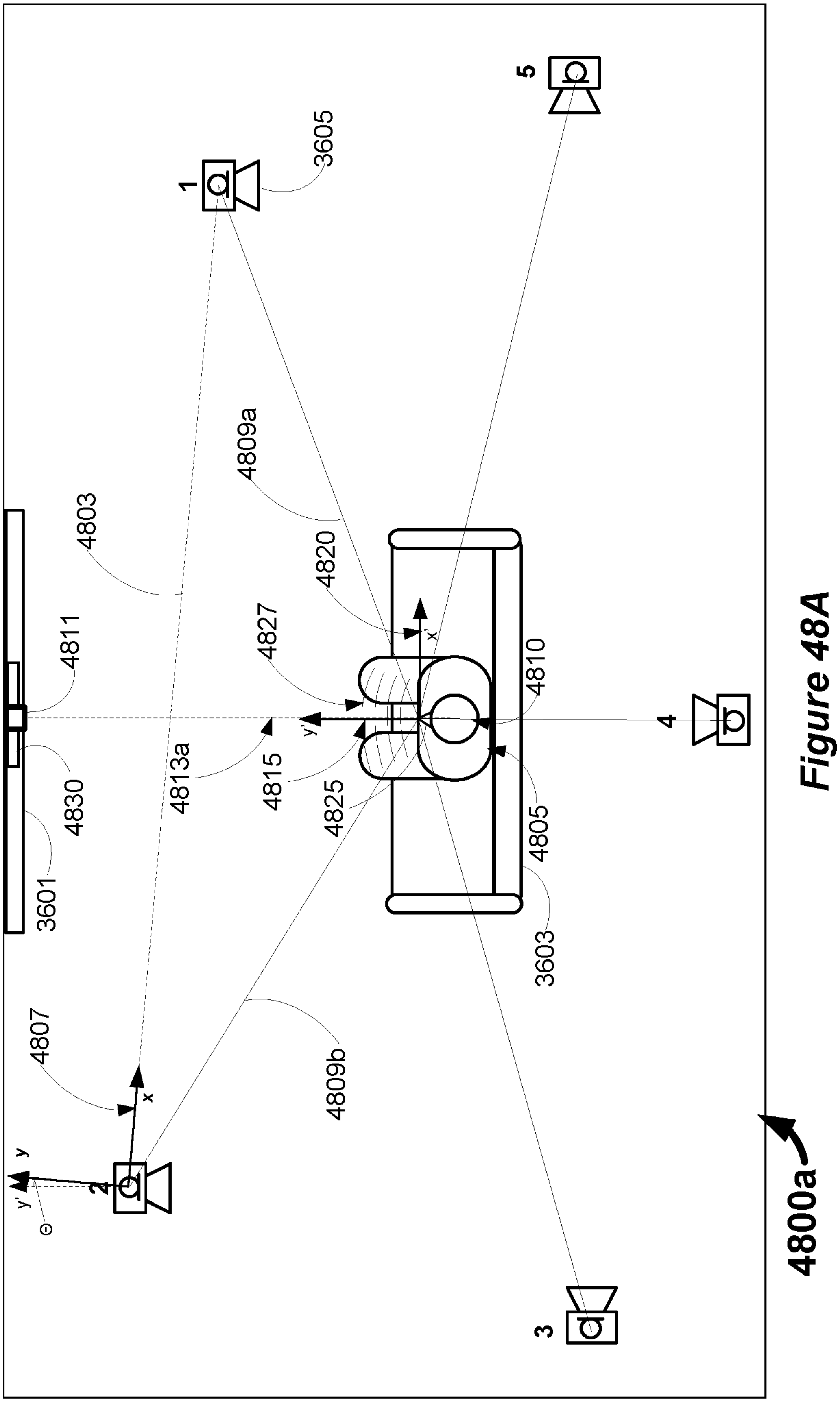
FIG. 48A shows examples of some blocks of FIG. 47.

FIG. 48A shows examples of some blocks of FIG. 47. According to some such examples, the audio device location data includes an estimate of an audio device location for each of audio devices 1-5, with reference to the audio device coordinate system 4807. In this implementation, the audio device coordinate system 4807 is a Cartesian coordinate system having the location of the microphone of audio device 2 as its origin. Here, the x axis of the audio device coordinate system 4807 corresponds with a line 4803 between the location of the microphone of audio device 2 and the location of the microphone of audio device 1.

In this example, this example, the listener location is determined by prompting the listener 4805 who is shown seated on the couch 3603 (e.g., via an audio prompt from one or more loudspeakers in the environment 4800*a*) to make one or more utterances 4827 and estimating the listener location according to time-of-arrival (TOA) data. The TOA data corresponds to microphone data obtained by a plurality of microphones in the environment. In this example, the microphone data corresponds with detections of the one or more utterances 4827 by the microphones of at least some (e.g., 3, 4 or all 5) of the audio devices 1-5.

Alternatively, or additionally, the listener location according to DOA data provided by the microphones of at least some (e.g., 2, 3, 4 or all 5) of the audio devices 1-5. According to some such examples, the listener location may be determined according to the intersection of lines 4809*a*, 4809*b*, etc., corresponding to the DOA data.

According to this example, the listener location corresponds with the origin of the listener coordinate system 4820. In this example, the listener angular orientation data is indicated by the y' axis of the listener coordinate system 4820, which corresponds with a line 4813*a* between the listener's head 4810 (and/or the listener's nose 4825) and the sound bar 4830 of the television 3601. In the example shown in FIG. 48A, the line 4813*a* is parallel to the y' axis. Therefore, the angle Θ represents the angle between the y axis and the y' axis. In this example, block 2125 of FIG. 21 may involve a rotation by the angle Θ of audio device coordinates around the origin of the listener coordinate system 4820. Accordingly, although the origin of the audio device coordinate system 4807 is shown to correspond with audio device 2 in FIG. 48A, some implementations involve co-locating the origin of the audio device coordinate system 4807 with the origin of the listener coordinate system 4820 prior to the rotation by the angle Θ of audio device coordinates around the origin of the listener coordinate system 4820. This co-location may be performed by a coordinate transformation from the audio device coordinate system 4807 to the listener coordinate system 4820.

The location of the sound bar 4830 and/or the television 3601 may, in some examples, be determined by causing the sound bar to emit a sound and estimating the sound bar's location according to DOA and/or TOA data, which may correspond detections of the sound by the microphones of at least some (e.g., 3, 4 or all 5) of the audio devices 1-5. Alternatively, or additionally, the location of the sound bar 4830 and/or the television 3601 may be determined by prompting the user to walk up to the TV and locating the user's speech by DOA and/or TOA data, which may correspond detections of the sound by the microphones of at least some (e.g., 3, 4 or all 5) of the audio devices 1-5. Such methods may involve triangulation. Such examples may be beneficial in situations wherein the sound bar 4830 and/or the television 3601 has no associated microphone.

In some other examples wherein the sound bar 4830 and/or the television 3601 does have an associated microphone, the location of the sound bar 4830 and/or the television 3601 may be determined according to TOA or DOA methods, such as the DOA methods disclosed herein. According to some such methods, the microphone may be co-located with the sound bar 4830.

According to some implementations, the sound bar 4830 and/or the television 3601 may have an associated camera 4811. A control system may be configured to capture an image of the listener's head 4810 (and/or the listener's nose 4825). In some such examples, the control system may be configured to determine a line 4813*a* between the listener's head 4810 (and/or the listener's nose 4825) and the camera 4811. The listener angular orientation data may correspond with the line 4813*a*. Alternatively, or additionally, the control system may be configured to determine an angle Θ between the line 4813*a* and the y axis of the audio device coordinate system.

Figure 48B:
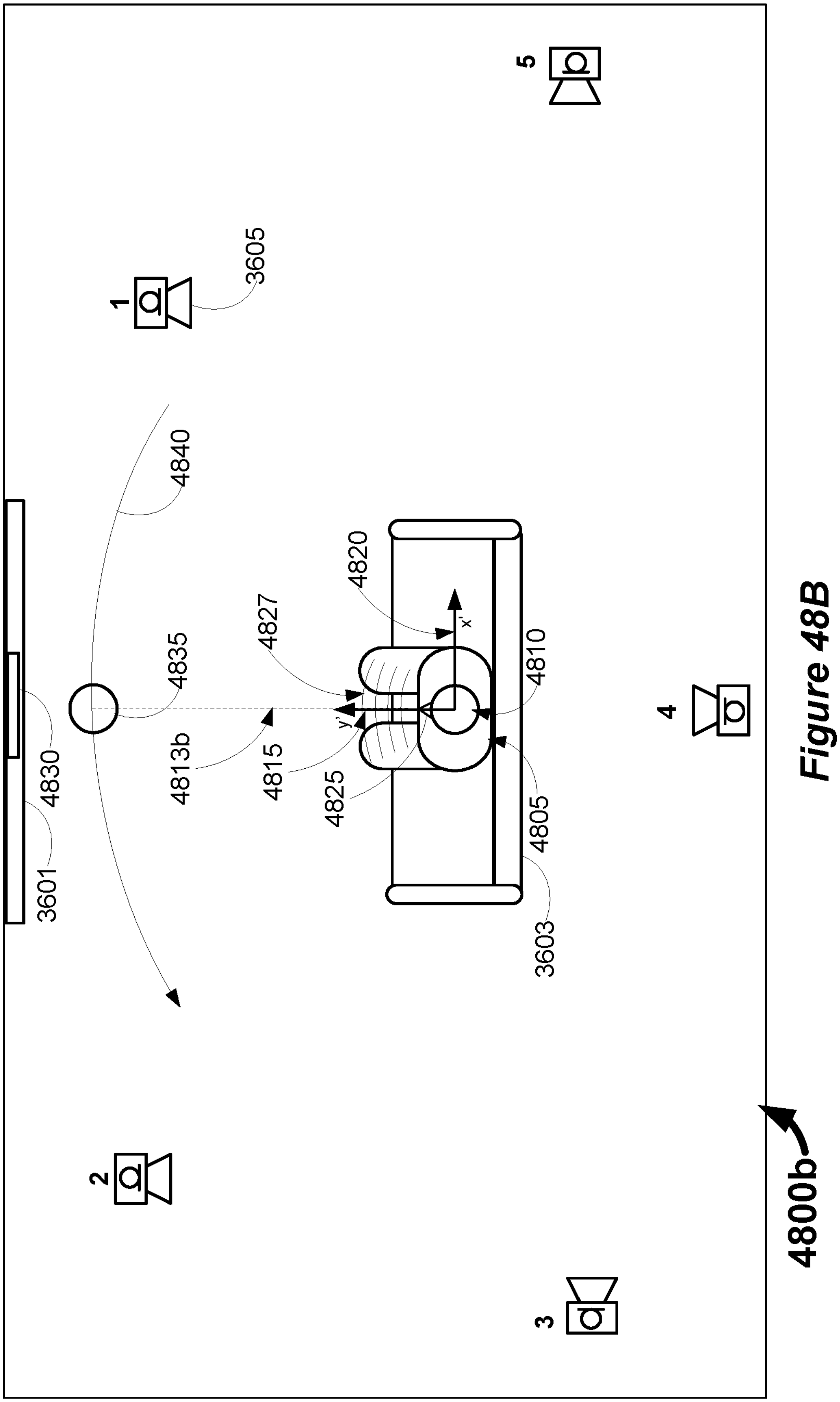
FIG. 48B shows an additional example of determining listener angular orientation data.

FIG. 48B shows an additional example of determining listener angular orientation data. According to this example, the listener location has already been determined in block 2115 of FIG. 47. Here, a control system is controlling loudspeakers of the environment 4800*b* to render the audio object 4835 to a variety of locations within the environment 4800*b*. In some such examples, the control system may cause the loudspeakers to render the audio object 4835 such that the audio object 4835 seems to rotate around the listener 4805, e.g., by rendering the audio object 4835 such that the audio object 4835 seems to rotate around the origin of the listener coordinate system 4820. In this example, the curved arrow 4840 shows a portion of the trajectory of the audio object 4835 as it rotates around the listener 4805.

According to some such examples, the listener 4805 may provide user input (e.g., saying "Stop") indicating when the audio object 4835 is in the direction that the listener 4805 is facing. In some such examples, the control system may be configured to determine a line 4813*b* between the listener location and the location of the audio object 4835. In this example, the line 4813*b* corresponds with the γ' axis of the listener coordinate system, which indicates the direction that the listener 4805 is facing. In alternative implementations, the listener 4805 may provide user input indicating when the audio object 4835 is in the front of the environment, at a TV location of the environment, at an audio device location, etc.

Figure 48C:
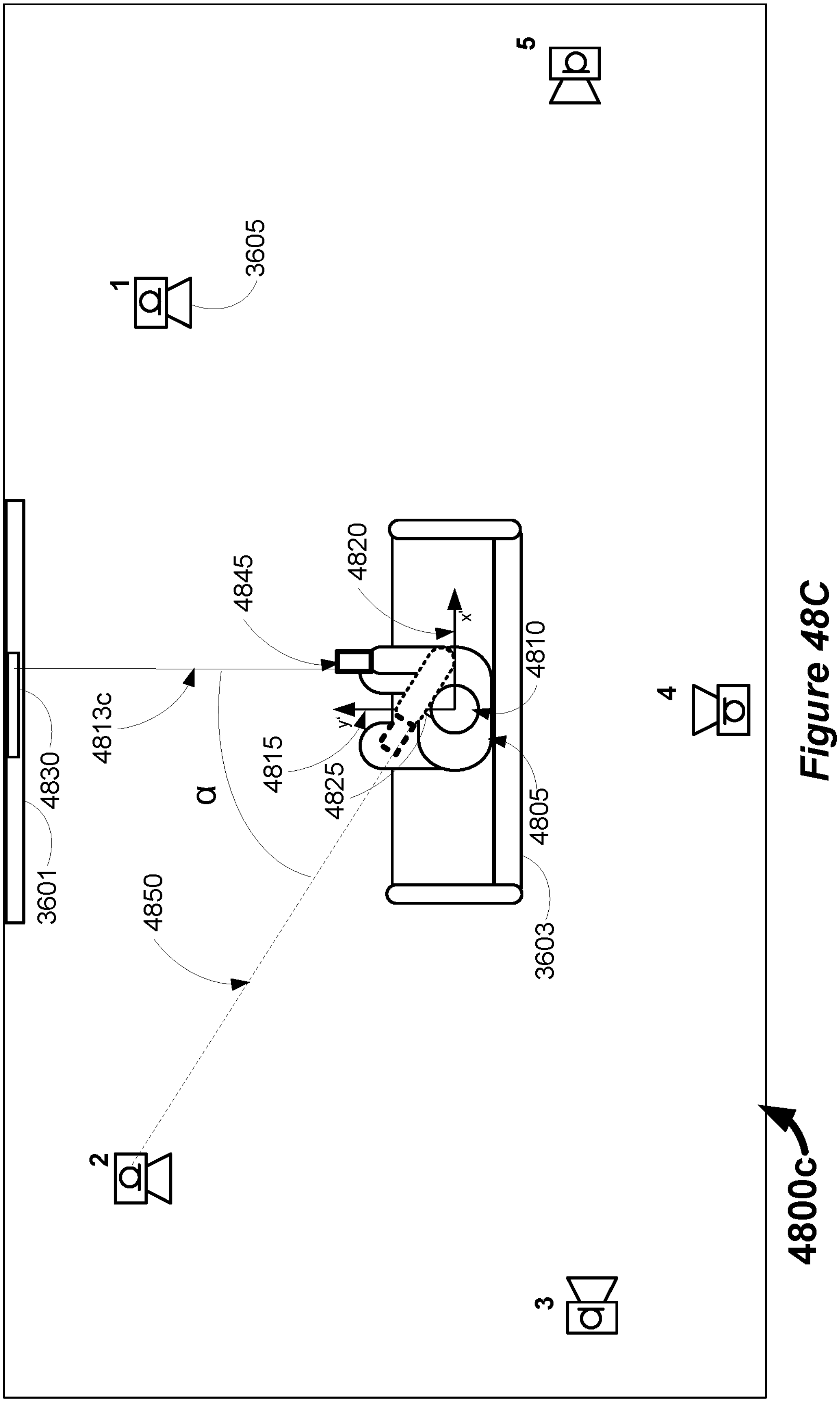
FIG. 48C shows an additional example of determining listener angular orientation data.

FIG. 48C shows an additional example of determining listener angular orientation data. According to this example, the listener location has already been determined in block 2115 of FIG. 47. Here, the listener 4805 is using a handheld device 4845 to provide input regarding a viewing direction of the listener 4805, by pointing the handheld device 4845 towards the television 3601 or the soundbar 4830. The dashed outline of the handheld device 4845 and the listener's arm indicate that at a time prior to the time at which the listener 4805 was pointing the handheld device 4845 towards the television 3601 or the soundbar 4830, the listener 4805 was pointing the handheld device 4845 towards audio device 2 in this example. In other examples, the listener 4805 may have pointed the handheld device 4845 towards another audio device, such as audio device 1. According to this example, the handheld device 4845 is configured to determine an angle α between audio device 2 and the television 3601 or the soundbar 4830, which approximates the angle between audio device 2 and the viewing direction of the listener 4805.

The handheld device 4845 may, in some examples, be a cellular telephone that includes an inertial sensor system and a wireless interface configured for communicating with a control system that is controlling the audio devices of the environment 4800*c*. In some examples, the handheld device 4845 may be running an application or "app" that is configured to control the handheld device 4845 to perform the necessary functionality, e.g., by providing user prompts (e.g., via a graphical user interface), by receiving input indicating that the handheld device 4845 is pointing in a desired direction, by saving the corresponding inertial sensor data and/or transmitting the corresponding inertial sensor data to the control system that is controlling the audio devices of the environment 4800*c*, etc.

According to this example, a control system (which may be a control system of the handheld device 4845 or a control system that is controlling the audio devices of the environment 4800*c*) is configured to determine the orientation of lines 4813*c* and 4850 according to the inertial sensor data, e.g., according to gyroscope data. In this example, the line 4813*c* is parallel to the axis y' and may be used to determine the listener angular orientation. According to some examples, a control system may determine an appropriate rotation for the audio device coordinates around the origin of the listener coordinate system 4820 according to the angle α between audio device 2 and the viewing direction of the listener 4805.

Figure 48D:
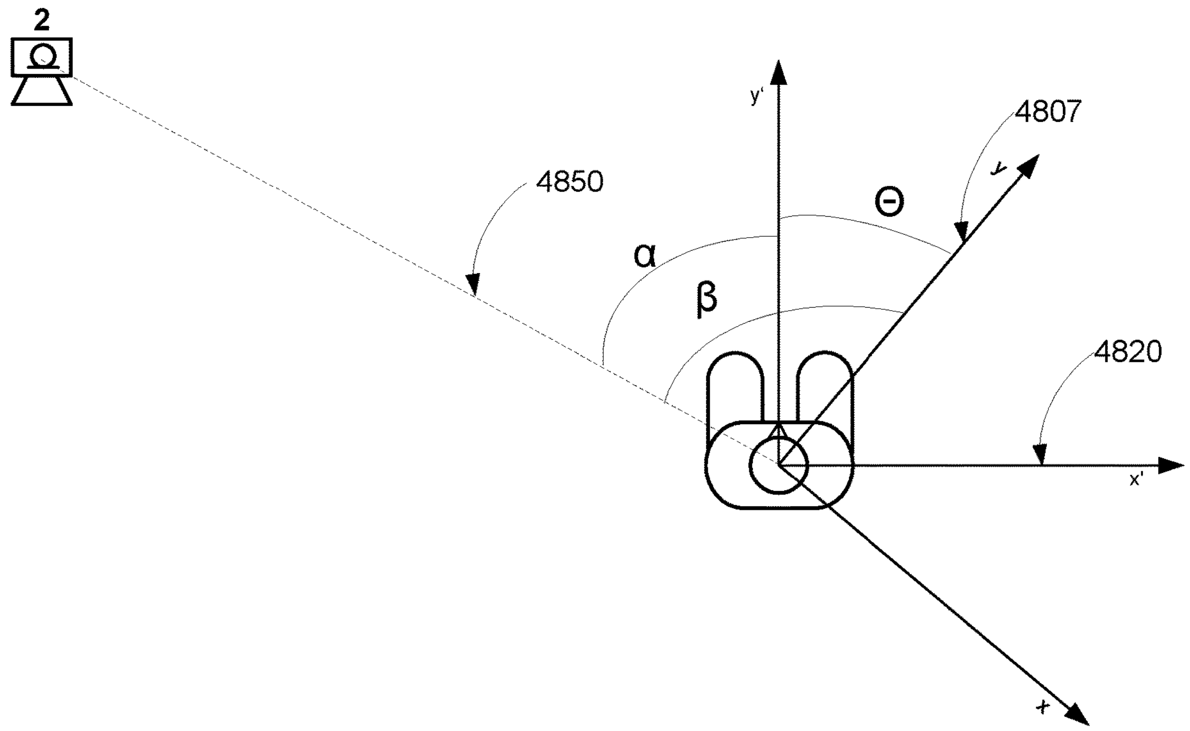
FIG. 48D shows an example of determining an appropriate rotation for the audio device coordinates in accordance with the method described with reference to FIG. 48C.

FIG. 48D shows an example of determining an appropriate rotation for the audio device coordinates in accordance with the method described with reference to FIG. 48C. In this example, the origin of the audio device coordinate system 4807 is co-located with the origin of the listener coordinate system 4820. Co-locating the origins of the audio device coordinate system 4807 and the listener coordinate system 4820 is made possible after the process of 2115, wherein the listener location is determined. Co-locating the origins of the audio device coordinate system 4807 and the listener coordinate system 4820 may involve transforming the audio device locations from the audio device coordinate system 4807 to the listener coordinate system 4820. The angle α has been determined as described above with reference to FIG. 48C. Accordingly, the angle α corresponds with the desired orientation of the audio device 2 in the listener coordinate system 4820. In this example, the angle β corresponds with the orientation of the audio device 2 in the audio device coordinate system 4807. The angle Θ, which is β−α in this example, indicates the necessary rotation to align the y axis of the of the audio device coordinate system 4807 with the y' axis of the listener coordinate system 4820.

In some implementations, the method of FIG. 47 may involve controlling at least one of the audio devices in the environment based at least in part on a corresponding audio device location, a corresponding audio device angular orientation, the listener location data and the listener angular orientation data.

For example, some implementations may involve providing the audio device location data, the audio device angular orientation data, the listener location data and the listener angular orientation data to an audio rendering system. In some examples, the audio rendering system may be implemented by a control system, such as the control system 610 of FIG. 6. Some implementations may involve controlling an audio data rendering process based, at least in part, on the audio device location data, the audio device angular orientation data, the listener location data and the listener angular orientation data. Some such implementations may involve providing loudspeaker acoustic capability data to the rendering system. The loudspeaker acoustic capability data may correspond to one or more loudspeakers of the environment. The loudspeaker acoustic capability data may indicate an orientation of one or more drivers, a number of drivers or a driver frequency response of one or more drivers. In some examples, the loudspeaker acoustic capability data may be retrieved from a memory and then provided to the rendering system.

A class of embodiments involve methods for rendering audio for playback, and/or playback of the audio, by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering of audio for playback by all or some (i.e., by speaker(s) of all or some) of the smart audio devices. Many interactions with the system are contemplated which require dynamic modifications to the rendering and/or playback. Such modifications may be, but are not necessarily, focused on spatial fidelity.

Some embodiments implement rendering for playback, and/or playback, by speaker(s) of a plurality of smart audio devices that are coordinated (orchestrated). Other embodiments implement rendering for playback, and/or playback, by speaker(s) of another set of speakers.

Some embodiments (e.g., a rendering system or renderer, or a rendering method, or a playback system or method) pertain to systems and methods for rendering audio for playback, and/or playback, by some or all speakers (e.g., each activated speaker) of a set of speakers. In some embodiments, the speakers are speakers of a coordinated (orchestrated) set of audio devices, which may include smart audio devices.

In the context of performing rendering (or rendering and playback) of a spatial audio mix (e.g., rendering of a stream of audio or multiple streams of audio) for playback by the smart audio devices of a set of smart audio devices (or by another set of speakers), the types of speakers (e.g., in, or coupled to, smart audio devices) might be varied, and the corresponding acoustics capabilities of the speakers might therefore vary quite significantly. For example, in one implementation of the audio environment 2000 shown in FIG. 29, the loudspeakers 2005*d*, 2005*f* and 2005*h* are smart speakers with a single 0.6-inch speaker. In this example, loudspeakers 2005*b*, 2005*c*, 2005*e* and 2005*f* are smart speakers having a 2.5-inch woofer and a 0.8-inch tweeter. According to this example, the loudspeaker 2005*g* is a smart speaker with a 5.25-inch woofer, three 2-inch midrange speakers and a 1.0-inch tweeter. Here, the loudspeaker 2005*a* is a sound bar having sixteen 1.1-inch beam drivers and two 4-inch woofers. Accordingly, the low-frequency capability of smart speakers 2005*d* and 2005*f* is significantly less than that of the other loudspeakers in the environment 2000, particular those having 4-inch or 5.25-inch woofers.

Figure 49:
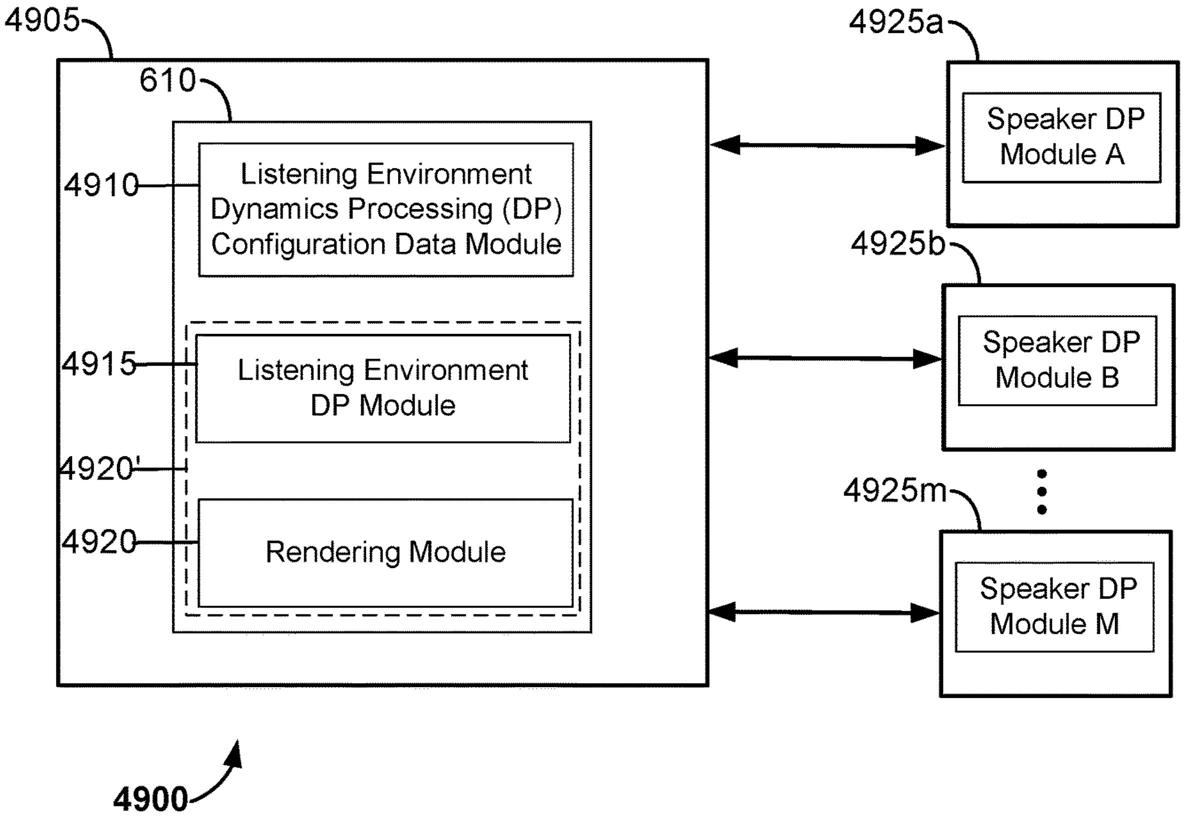
FIG. 49 is a block diagram that shows examples of components of a system capable of implementing various aspects of this disclosure.

FIG. 49 is a block diagram that shows examples of components of a system capable of implementing various aspects of this disclosure. As with other figures provided herein, the types and numbers of elements shown in FIG. 49 are merely provided by way of example. Other implementations may include more, fewer and/or different types and numbers of elements.

According to this example, the system 4900 includes a smart home hub 4905 and loudspeakers 4925*a* through 4925*m*. In this example, the smart home hub 4905 includes an instance of the control system 610 that is shown in FIG. 6 and described above. In some examples, functionality of the system 4900 may be provided, at least in part, according to instructions from an audio session manager, such as the CHASM 208C of FIG. 2C, the CHASM 208D of FIG. 2D, the CHASM 307 of FIG. 3C, or the CHASM 401 of FIG. 4. The audio session manager may, in some instances, be implemented by a device other than the smart home hub 4905. However, in some examples, audio session manager may be implemented by the smart home hub 4905. According to this implementation, the control system 610 includes a listening environment dynamics processing configuration data module 4910, a listening environment dynamics processing module 4915 and a rendering module 4920. Some examples of the listening environment dynamics processing configuration data module 4910, the listening environment dynamics processing module 4915 and the rendering module 4920 are described below. In some examples, a rendering module 4920' may be configured for both rendering and listening environment dynamics processing.

As suggested by the arrows between the smart home hub 4905 and the loudspeakers 4925*a* through 4925*m*, the smart home hub 4905 also includes an instance of the interface system 605 that is shown in FIG. 6 and described above. According to some examples, the smart home hub 4905 may be part of the environment 200 shown in FIG. 2. In some instances, the smart home hub 4905 may be implemented by a smart speaker, a smart television, a cellular telephone, a laptop, etc. In some implementations, the smart home hub 4905 may be implemented by software, e.g., via software of a downloadable software application or "app." In some instances, the smart home hub 4905 may be implemented in each of the loudspeakers 4925*a-m*, all operating in parallel to generate the same processed audio signals from module 4920. According to some such examples, in each of the loudspeakers the rendering module 4920 may then generate one or more speaker feeds relevant to each loudspeaker, or group of loudspeakers, and may provide these speaker feeds to each speaker dynamics processing module.

In some instances, the loudspeakers 4925*a* through 4925*m* may include the loudspeakers 2005*a* through 2005*h* of FIG. 29, whereas in other examples the loudspeakers 4925*a* through 4925*m* may be, or may include other loudspeakers. Accordingly, in this example the system 4900 includes M loudspeakers, where M is an integer greater than 2.

Smart speakers, as well as many other powered speakers, typically employ some type of internal dynamics processing to prevent the speakers from distorting. Often associated with such dynamics processing are signal limit thresholds (e.g., limit thresholds, which are variable across frequency), below which the signal level is dynamically held. For example, Dolby's Audio Regulator, one of several algorithms in the Dolby Audio Processing (DAP) audio post-processing suite, provides such processing. In some instances, but not typically via a smart speaker's dynamics processing module, dynamics processing also may involve applying one or more compressors, gates, expanders, duckers, etc.

Accordingly, in this example each of the loudspeakers 4925*a* through 4925*m* includes a corresponding speaker dynamics processing (DP) module A through M. The speaker dynamics processing modules are configured to apply individual loudspeaker dynamics processing configuration data for each individual loudspeaker of a listening environment. The speaker DP module A, for example, is configured to apply individual loudspeaker dynamics processing configuration data that is appropriate for the loudspeaker 4925*a*. In some examples, the individual loudspeaker dynamics processing configuration data may correspond with one of more capabilities of the individual loudspeaker, such as the loudspeaker's ability to reproduce audio data within a particular frequency range and at a particular level without appreciable distortion.

When spatial audio is rendered across a set of heterogeneous speakers (e.g., speakers of, or coupled to, smart audio devices), each with potentially different playback limits, care must be taken in performing dynamics processing on the overall mix. A simple solution is to render the spatial mix to speaker feeds for each of the participating speakers and then allow the dynamics processing module associated with each speaker to operate independently on its corresponding speaker feed, according to the limits of that speaker.

While this approach will keep each speaker from distorting, it may dynamically shift the spatial balance of the mix in a perceptually distracting manner. For example, referring to FIG. 29, suppose that a television program is being shown on the television 2030 and that corresponding audio is being reproduced by the loudspeakers of the audio environment 2000. Suppose that during the television program, audio associated with a stationary object (such as a unit of heavy machinery in a factory) is intended to be rendered to a particular location of the audio environment 2000. Suppose further that a dynamics processing module associated with the loudspeaker 4925*d* reduces the level for audio in the bass range substantially more than a dynamics processing module associated with the loudspeaker 4925*b* does, because of the substantially greater capability of the loudspeaker 4925*b* to reproduce sounds in the bass range. If the volume of a signal associated with the stationary object fluctuates, when the volume is higher the dynamics processing module associated with the loudspeaker 4925*d* will cause the level for audio in the bass range to be reduced substantially more than the level for the same audio will be reduced by the dynamics processing module associated with the loudspeaker 4925*b*. This difference in level will cause the apparent location of the stationary object to change. An improved solution would therefore be desirable.

Some embodiments of the present disclosure are systems and methods for rendering (or rendering and playback) of a spatial audio mix (e.g., rendering of a stream of audio or multiple streams of audio) for playback by at least one (e.g., all or some) of the smart audio devices of a set of smart audio devices (e.g., a set of coordinated smart audio devices), and/or by at least one (e.g., all or some) of the speakers of another set of speakers. Some embodiments are methods (or systems) for such rendering (e.g., including generation of speaker feeds), and also playback of the rendered audio (e.g., playback of generated speaker feeds). Examples of such embodiments include the following:

Systems and methods for audio processing may include rendering audio (e.g., rendering a spatial audio mix, for example by rendering a stream of audio or multiple streams of audio) for playback by at least two speakers (e.g., all or some of the speakers of a set of speakers), including by:

(a) combining individual loudspeaker dynamics processing configuration data (such as limit thresholds (playback limit thresholds) of the individual loudspeakers, thereby determining listening environment dynamics processing configuration data for the plurality of loudspeakers (such as combined thresholds);

(b) performing dynamics processing on the audio (e.g., the stream(s) of audio indicative of a spatial audio mix) using the listening environment dynamics processing configuration data for the plurality of loudspeakers (e.g., the combined thresholds) to generate processed audio; and (c) rendering the processed audio to speaker feeds.

According to some implementations, process (a) may be performed by a module such as the listening environment dynamics processing configuration data module 4910 shown in FIG. 49. The smart home hub 4905 may be configured for obtaining, via an interface system, individual loudspeaker dynamics processing configuration data for each of the M loudspeakers. In this implementation, the individual loudspeaker dynamics processing configuration data include an individual loudspeaker dynamics processing configuration data set for each loudspeaker of the plurality of loudspeakers. According to some examples, the individual loudspeaker dynamics processing configuration data for one or more loudspeakers may correspond with one or more capabilities of the one or more loudspeakers. In this example, each of the individual loudspeaker dynamics processing configuration data sets includes at least one type of dynamics processing configuration data. In some examples, the smart home hub 4905 may be configured for obtaining the individual loudspeaker dynamics processing configuration data sets by querying each of the loudspeakers 4925*a*-4925*m*. In other implementations, the smart home hub 4905 may be configured for obtaining the individual loudspeaker dynamics processing configuration data sets by querying a data structure of previously-obtained individual loudspeaker dynamics processing configuration data sets that are stored in a memory.

In some examples, process (b) may be performed by a module such as the listening environment dynamics processing module 4915 of FIG. 49. Some detailed examples of processes (a) and (b) are described below.

In some examples, the rendering of process (c) may be performed by a module such as the rendering module 4920 or the rendering module 4920' of FIG. 49. In some embodiments, the audio processing may involve:

(d) performing dynamics processing on the rendered audio signals according to the individual loudspeaker dynamics processing configuration data for each loudspeaker (e.g., limiting the speaker feeds according to the playback limit thresholds associated with the corresponding speakers, thereby generating limited speaker feeds). Process (d) may, for example, be performed by the dynamics processing modules A through M shown in FIG. 49.

The speakers may include speakers of (or coupled to) at least one (e.g., all or some) of the smart audio devices of a set of smart audio devices. In some implementations, to generate the limited speaker feeds in step (d), the speaker feeds generated in step (c) may be processed by a second stage of dynamics processing (e.g., by each speaker's associated dynamics processing system), e.g., to generate the speaker feeds prior to their final playback over the speakers. For example, the speaker feeds (or a subset or portion thereof) may be provided to a dynamics processing system of each different one of the speakers (e.g., a dynamics processing subsystem of a smart audio device, where the smart audio device includes or is coupled to the relevant one of the speakers), and the processed audio output from each said dynamics processing system may be used to generate a speaker feed for the relevant one of the speakers. Following the speaker-specific dynamics processing (in other words, the independently performed dynamics processing for each of the speakers), the processed (e.g., dynamically limited) speaker feeds may be used to drive the speakers to cause playback of sound.

The first stage of dynamics processing (in step (b)) may be designed to reduce a perceptually distracting shift in spatial balance which would otherwise result if steps (a) and (b) were omitted, and the dynamics processed (e.g., limited) speaker feeds resulting from step (d) were generated in response to the original audio (rather than in response to the processed audio generated in step (b)). This may prevent an undesirable shift in the spatial balance of a mix. The second stage of dynamics processing operating on rendered speaker feeds from step (c) may be designed to ensure that no speaker distorts, because the dynamics processing of step (b) may not necessarily guarantee that signal levels have been reduced below the thresholds of all speakers. The combining of individual loudspeaker dynamics processing configuration data (e.g., the combination of thresholds in the first stage (step (a)) may, in some examples, involve (e.g., include) a step of averaging the individual loudspeaker dynamics processing configuration data (e.g., the limit thresholds) across the speakers (e.g., across smart audio devices), or taking the minimum of the individual loudspeaker dynamics processing configuration data (e.g., the limit thresholds) across the speakers (e.g., across smart audio devices).

In some implementations, when the first stage of dynamics processing (in step (b)) operates on audio indicative of a spatial mix (e.g., audio of an object-based audio program, including at least one object channel and optionally also at least one speaker channel), this first stage may be implemented according to a technique for audio object processing through use of spatial zones. In such a case, the combined individual loudspeaker dynamics processing configuration data (e.g., combined limit thresholds) associated with each of the zones may be derived by (or as) a weighted average of individual loudspeaker dynamics processing configuration data (e.g., individual speaker limit thresholds), and this weighting may be given or determined, at least in part, by each speaker's spatial proximity to and/or position within, the zone.

In an example embodiment we assume a plurality of M speakers (M≥2), where each speaker is indexed by the variable i. Associated with each speaker i is a set of frequency varying playback limit thresholds $T_i[f]$, where the variable $f$ represents an index into a finite set of frequencies at which the thresholds are specified. (Note that if the size of the set of frequencies is one then the corresponding single threshold may be considered broadband, applied across the entire frequency range). These thresholds are utilized by each speaker in its own independent dynamics processing function to limit the audio signal below the thresholds $T_i[f]$ for a particular purpose such as preventing the speaker from distorting or preventing the speaker from playing beyond some level deemed objectionable in its vicinity.

Figure 50A:
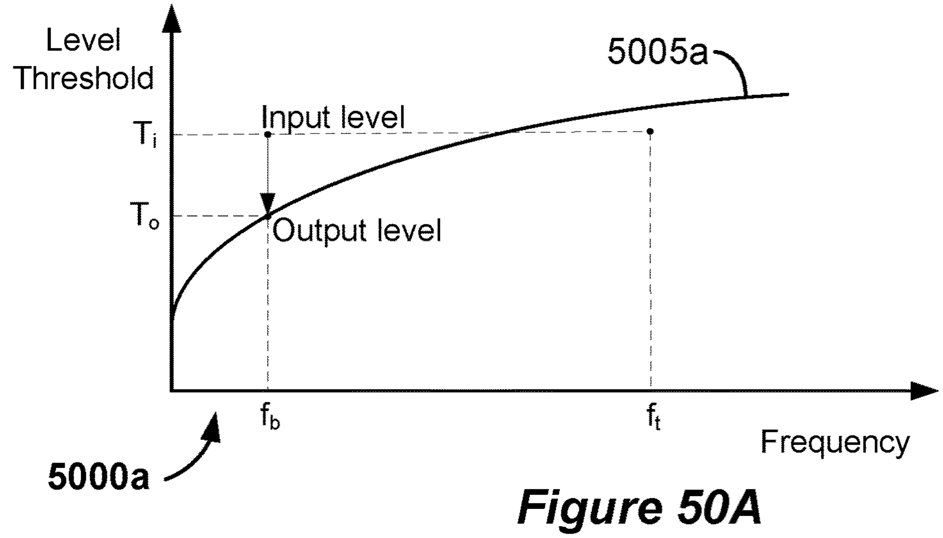
FIGS. 50A, 50B and 50C show examples of playback limit thresholds and corresponding frequencies.
Figure 50B:
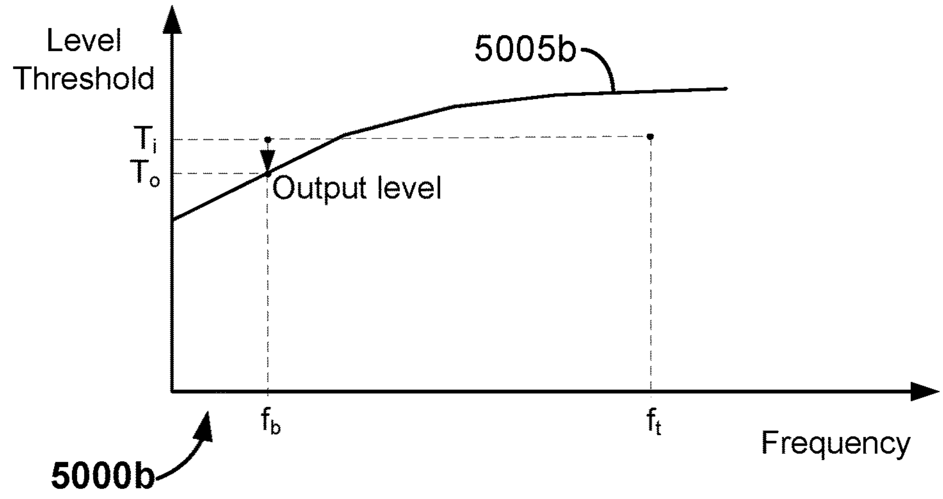
Figure 50C:
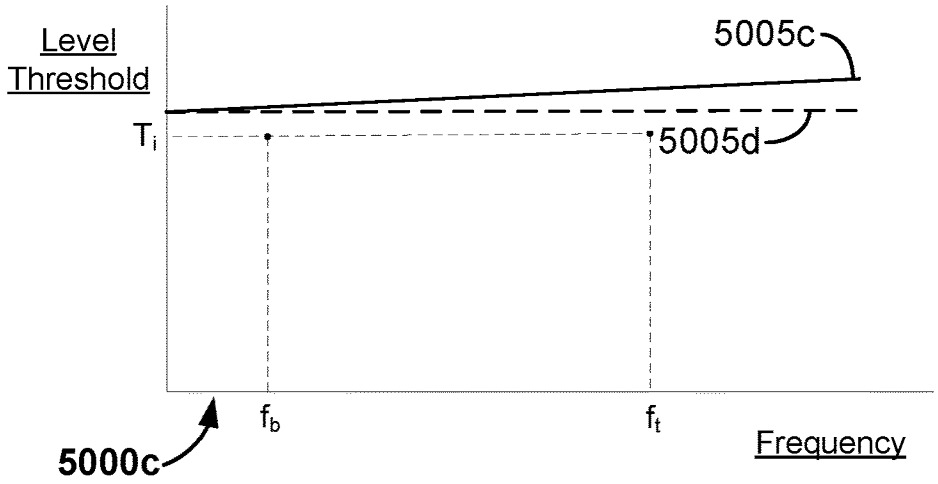

FIGS. 50A, 50B and 50C show examples of playback limit thresholds and corresponding frequencies. The range of frequencies shown may, for example, span the range of frequencies that are audible to the average human being (e.g., 20 Hz to 20 kHz). In these examples, the playback limit thresholds are indicated by the vertical axes of the graphs 5000*a*, 5000*b* and 5000*c*, which are labeled "Level Threshold" in these examples. The playback limit/level thresholds increase in the direction of the arrows on the vertical axes. The playback limit/level thresholds may, for example, be expressed in decibels. In these examples, the horizontal axes of the graphs 5000*a*, 5000*b* and 5000*c* indicate frequencies, which increase in the direction of the arrows on the horizontal axes. The playback limit thresholds indicated by the curves 5000*a*, 5000*b* and 5000*c* may, for example, be implemented by dynamics processing modules of individual loudspeakers.

The graph 5000*a* of FIG. 50A shows a first example of playback limit threshold as a function of frequency. The curve 5005*a* indicates the playback limit threshold for each corresponding frequency value. In this example, at a bass frequency $f_b$, input audio that is received at an input level $T_i$ will be output by a dynamics processing module at an output level $T_o$. The bass frequency $f_b$ may, for example, be in the range of 60 to 250 Hz. However, in this example, at a treble frequency $f_t$, input audio that is received at an input level $T_i$ will be output by a dynamics processing module at the same level, input level $T_i$. The treble frequency $f_t$ may, for example, be in the range above 1280 Hz. Accordingly, in this example the curve 5005*a* corresponds to a dynamics processing module that applies a significantly lower threshold for bass frequencies than for treble frequencies. Such a dynamics processing module may be appropriate for a loudspeaker that has no woofer (e.g., the loudspeaker 2005*d* of FIG. 29).

The graph 5000*b* of FIG. 50B shows a second example of playback limit threshold as a function of frequency. The curve 5005*b* indicates that at the same bass frequency $f_b$ shown in FIG. 50A, input audio that is received at an input level $T_i$ will be output by a dynamics processing module at a higher output level $T_o$. Accordingly, in this example the curve 5005*b* corresponds to a dynamics processing module that does not apply as low a threshold for bass frequencies than the curve 5005*a*. Such a dynamics processing module may be appropriate for a loudspeaker that has at least a small woofer (e.g., the loudspeaker 2005*b* of FIG. 29).

The graph 5000*c* of FIG. 50C shows a second example of playback limit threshold as a function of frequency. The curve 5005*c* (which is a straight line in this example) indicates that at the same bass frequency $f_b$ shown in FIG. 50A, input audio that is received at an input level $T_i$ will be output by a dynamics processing module at the same level. Accordingly, in this example the curve 5005*c* corresponds to a dynamics processing module that may be appropriate for a loudspeaker that is capable of reproducing a wide range of frequencies, including bass frequencies. One will observe that, for the sake of simplicity, a dynamics processing module could approximate the curve 5005*c* by implementing the curve 5005*d*, which applies the same threshold for all frequencies indicated.

A spatial audio mix may be rendered for the plurality of speakers using a rendering system such as Center of Mass Amplitude Panning (CMAP), Flexible Virtualization (FV), or a combination of CMAP and FV such as disclosed herein. From the constituent components of a spatial audio mix, the rendering system generates speaker feeds, one for each of the plurality of speakers. In some previous examples, the speaker feeds were then processed independently by each speaker's associated dynamics processing function with thresholds $T_i[f]$. Without the benefits of the present disclosure, this described rendering scenario may result in distracting shifts in the perceived spatial balance of the rendered spatial audio mix. For example, one of the M speakers, e.g., on the right-hand side of the listening area, may be much less capable than the others (e.g., of rendering audio in the bass range) and therefore the thresholds $T_i[f]$ for that speaker may be significantly lower than those of the other speakers, at least in a particular frequency range. During playback, this speaker's dynamics processing module will be lowering the level of components of the spatial mix on the right-hand side significantly more than components on the left-hand side. Listeners are extremely sensitive to such dynamic shifts between the left/right balance of a spatial mix and may find the results very distracting.

To deal with this issue, in some examples the individual loudspeaker dynamics processing configuration data (e.g., the playback limit thresholds) of the individual speakers of a listening environment are combined to create listening environment dynamics processing configuration data for all loudspeakers of the listening environment. The listening environment dynamics processing configuration data may then be utilized to first perform dynamics processing in the context of the entire spatial audio mix prior to its rendering to speaker feeds. Because this first stage of dynamics processing has access to the entire spatial mix, as opposed to just one independent speaker feed, the processing may be performed in ways that do not impart distracting shifts to the perceived spatial balance of the mix. The individual loudspeaker dynamics processing configuration data (e.g., the playback limit thresholds) may be combined in a manner that eliminates or reduces the amount of dynamics processing that is performed by any of the individual speaker's independent dynamics processing functions.

In one example of determining the listening environment dynamics processing configuration data, the individual loudspeaker dynamics processing configuration data (e.g., the playback limit thresholds) for the individual speakers may be combined into a single set of listening environment dynamics processing configuration data (e.g., frequency-varying playback limit thresholds $\overline{T}[f]$) that are applied to all components of the spatial mix in the first stage of dynamics processing. According to some such examples, because the limiting is the same on all components, the spatial balance of the mix may be maintained. One way to combine the individual loudspeaker dynamics processing configuration data (e.g., the playback limit thresholds) is to take minimum across all speakers i:

$$\overline{T}[f] = \min_i(T_i[f]) \qquad \text{Equation (20)}$$

Such a combination essentially eliminates the operation of each speaker's individual dynamics processing because the spatial mix is first limited below the threshold of the least capable speaker at every frequency. However, such a strategy may be overly aggressive. Many speakers may be playing back at a level lower than they are capable, and the combined playback level of all the speakers may be objectionably low. For example, if the thresholds in the bass range shown in FIG. 50A were applied to the loudspeaker corresponding to the thresholds for FIG. 50C, the playback level of the latter speaker would be unnecessarily low in the bass range. An alternative combination of determining the listening environment dynamics processing configuration data is to take the mean (average) of individual loudspeaker dynamics processing configuration data across all speakers of the listening environment. For example, in the context of playback limit thresholds, the mean may be determined as follows:

$$\overline{T}[f] = \text{mean}_i(T_i[f]) \qquad \text{Equation (21)}$$

For this combination, overall playback level may increase in comparison to taking the minimum because the first stage of dynamics processing limits to a higher level, thereby allowing the more capable speakers to play back more loudly. For speakers whose individual limit thresholds fall below the mean, their independent dynamics processing functions may still limit their associated speaker feed if necessary. However, the first stage of dynamics processing will likely have reduced the requirements of this limiting since some initial limiting has been performed on the spatial mix.

According to some examples of determining the listening environment dynamics processing configuration data, one may create a tunable combination that interpolates between the minimum and the mean of the individual loudspeaker dynamics processing configuration data through a tuning parameter α. For example, in the context of playback limit thresholds, the interpolation may be determined as follows:

$$\overline{T}[f] = \alpha\,\text{mean}_i(T_i[f]) + (1-\alpha)\min_i(T_i[f]) \qquad \text{Equation (22)}$$

Other combinations of individual loudspeaker dynamics processing configuration data are possible, and the present disclosure is meant to cover all such combinations.

Figure 51A:
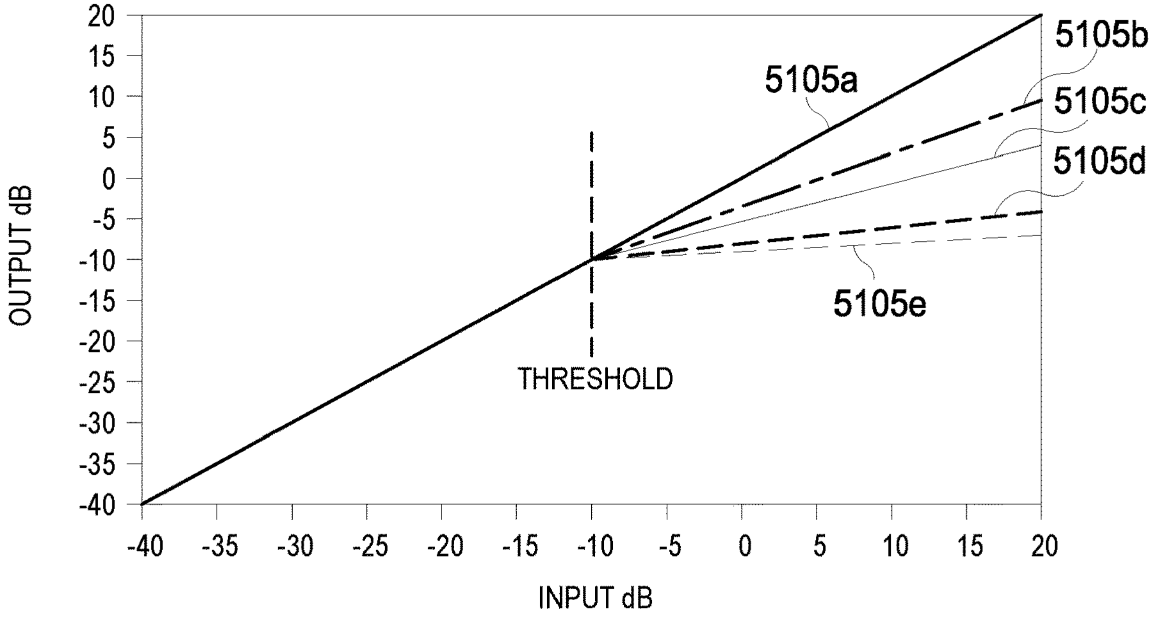
FIGS. 51A and 51B are graphs that show examples of dynamic range compression data.
Figure 51B:
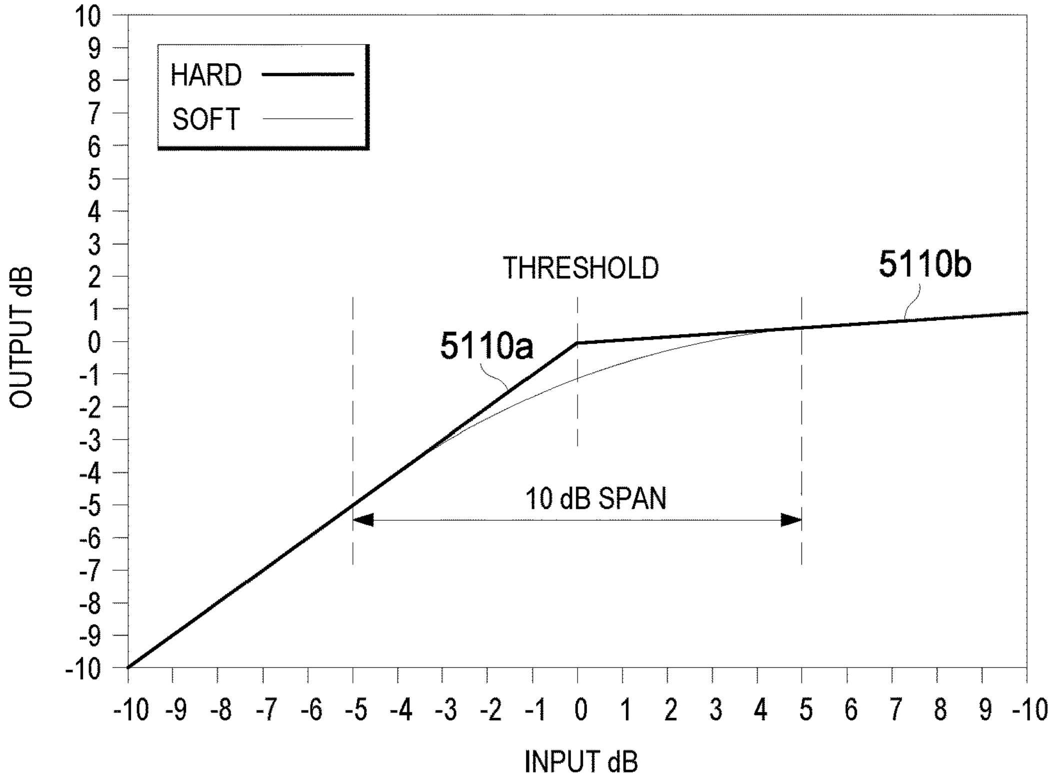

FIGS. 51A and 51B are graphs that show examples of dynamic range compression data. In graphs 5100*a* and 5100*b*, the input signal levels, in decibels, are shown on the horizontal axes and the output signal levels, in decibels, are shown on the vertical axes. As with other disclosed examples, the particular thresholds, ratios and other values are merely shown by way of example and are not limiting.

In the example shown in FIG. 51A, the output signal level is equal to the input signal level below the threshold, which is −10 dB in this example. Other examples may involve different thresholds, e.g., −20 dB, −18 dB, −16 dB, −14 dB, −12 dB, −8 dB, −6 dB, −4 dB, −2 dB, 0 dB, 2 dB, 4 dB, 6 dB, etc. Above the threshold, various examples of compression ratios are shown. An N:1 ratio means that above the threshold, the output signal level will increase by 1 dB for every N dB increase in the input signal. For example, a 10:1 compression ratio (line 5105*e*) means that above the threshold, the output signal level will increase by only 1 dB for every 10 dB increase in the input signal. A 1:1 compression ratio (line 5105*a*) means that the output signal level is still equal to the input signal level, even above the threshold. Lines 5105*b*, 5105*c*, and 5105*d* correspond to 3:2, 2:1 and 5:1 compression ratios. Other implementations may provide different compression ratios, such as 2.5:1, 3:1, 3.5:1, 4:3, 4:1, etc.

FIG. 51B shows examples of "knees," which control how the compression ratio changes at or near the threshold, which is 0 dB in this example. According to this example, the compression curve having a "hard" knee is composed of two straight line segments, line segment 5110*a* up to the threshold and line segment 5110*b* above the threshold. A hard knee can be simpler to implement, but may cause artifacts.

In FIG. 51B, one example of a "soft" knee is also shown. In this example, the soft knee spans 10 dB. According to this implementation, above and below the 10 dB span, the compression ratios of the compression curve having the soft knee are the same as those of the compression curve having the hard knee. Other implementations may provide various other shapes of "soft" knees, which may span more or fewer decibels, may indicate a different compression ratio above the span, etc.

Other types of dynamic range compression data may include "attack" data and "release" data. The attack is a period during which the compressor is decreasing gain, e.g., in response to increased level at the input, to reach the gain determined by the compression ratio. Attack times for compressors generally range between 25 milliseconds and 500 milliseconds, though other attack times are feasible. The release is a period during which the compressor is increasing gain, e.g., in response to reduced level at the input, to reach the output gain determined by the compression ratio (or to the input level if the input level has fallen below the threshold). A release time may, for example, be in the range of 25 milliseconds to 2 seconds.

Accordingly, in some examples the individual loudspeaker dynamics processing configuration data may include, for each loudspeaker of the plurality of loudspeakers, a dynamic range compression data set. The dynamic range compression data set may include threshold data, input/output ratio data, attack data, release data and/or knee data. One or more of these types of individual loudspeaker dynamics processing configuration data may be combined to determine the listening environment dynamics processing configuration data. As noted above with reference to combining playback limit thresholds, the dynamic range compression data may be averaged to determine the listening environment dynamics processing configuration data in some examples. In some instances, a minimum or maximum value of the dynamic range compression data may be used to determine the listening environment dynamics processing configuration data (e.g., the maximum compression ratio). In other implementations, one may create a tunable combination that interpolates between the minimum and the mean of the dynamic range compression data for individual loudspeaker dynamics processing, e.g., via a tuning parameter such as described above with reference to Equation (22).

In some examples described above, a single set of listening environment dynamics processing configuration data (e.g., a single set of combined thresholds $\overline{T}[f]$) is applied to all components of the spatial mix in the first stage of dynamics processing. Such implementations can maintain the spatial balance of the mix, but may impart other unwanted artifacts. For example, "spatial ducking" may occur when a very loud part of the spatial mix in an isolated spatial region causes the entire mix to be turned down. Other softer components of the mix spatially distant form this loud component may be perceived to become unnaturally soft. For example, soft background music may be playing in the surround field of the spatial mix at a level lower than the combined thresholds $\overline{T}[f]$, and therefore no limiting of the spatial mix is performed by the first stage of dynamics processing. A loud gunshot might then be momentarily introduced at the front of the spatial mix (e.g. on screen for a movie sound track), and the overall level of the mix increases above the combined thresholds. At this moment, the first stage of dynamics processing lowers the level of the entire mix below the thresholds $\overline{T}[f]$. Because the music is spatially separate from the gunshot, this may be perceived as an unnatural ducking in the continuous stream of music.

To deal with such issues, some implementations allow independent or partially independent dynamics processing on different "spatial zones" of the spatial mix. A spatial zone may be considered a subset of the spatial region over which the entire spatial mix is rendered. Although much of the following discussion provides examples of dynamics processing based on playback limit thresholds, the concepts apply equally to other types of individual loudspeaker dynamics processing configuration data and listening environment dynamics processing configuration data.

Figure 52:
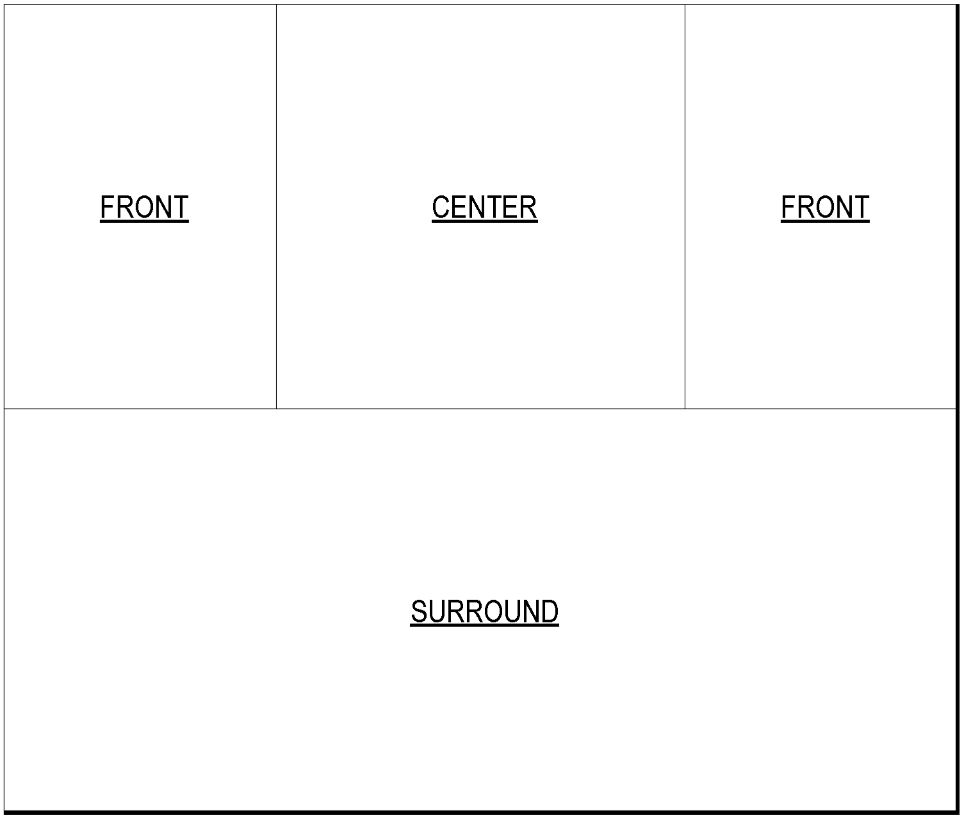
FIG. 52 shows an example of spatial zones of a listening environment.

FIG. 52 shows an example of spatial zones of a listening environment. FIG. 52 depicts an example of the region of the spatial mix (represented by the entire square), subdivided into three spatial zones: Front, Center, and Surround.

While the spatial zones in FIG. 52 are depicted with hard boundaries, in practice it is beneficial to treat the transition from one spatial zone to another as continuous. For example, a component of a spatial mix located at the middle of the left edge of the square may have half of its level assigned to the front zone and half to the surround zone. Signal level from each component of the spatial mix may be assigned and accumulated into each of the spatial zones in this continuous manner. A dynamics processing function may then operate independently for each spatial zone on the overall signal level assigned to it from the mix. For each component of the spatial mix, the results of the dynamics processing from each spatial zone (e.g. time-varying gains per frequency) may then be combined and applied to the component. In some examples, this combination of spatial zone results is different for each component and is a function of that particular component's assignment to each zone. The end result is that components of the spatial mix with similar spatial zone assignments receive similar dynamics processing, but independence between spatial zones is allowed. The spatial zones may advantageously be chosen to prevent objectionable spatial shifts, such as left/right imbalance, while still allowing some spatially independent processing (e.g., to reduce other artifacts such as the described spatial ducking).

Techniques for processing a spatial mix by spatial zones may be advantageously employed in the first stage of dynamics processing of the present disclosure. For example, a different combination of individual loudspeaker dynamics processing configuration data (e.g., playback limit thresholds) across the speakers i may be computed for each spatial zone. The set of combined zone thresholds may be represented by $\overline{T}_j[f]$, where the index j refers to one of a plurality of spatial zones. A dynamics processing module may operate independently on each spatial zone with its associated thresholds $\overline{T}_j[f]$ and the results may be applied back onto the constituent components of the spatial mix according to the technique described above.

Consider the spatial signal being rendered as composed of a total of K individual constituent signals $x_k[t]$, each with an associated desired spatial position (possibly time-varying). One particular method for implementing the zone processing involves computing time-varying panning gains $\alpha_{kj}[t]$ describing how much each audio signal $x_k[t]$ contributes to zone j as a function the audio signal's desired spatial position in relation to the position of the zone. These panning gains may advantageously be designed to follow a power preserving panning law requiring that the sum of the squares of the gains equals unity. From these panning gains, zone signals $s_j[t]$ may be computed as the sum of the constituent signals weighted by their panning gain for that zone:

$$s_j[t] = \sum_{k=1}^{K} \alpha_{kj}[t] x_k[t] \quad \text{Equation (23)}$$

Each zone signal $s_j[t]$ may then be processed independently by a dynamics processing function DP parametrized by the zone thresholds $\overline{T}_j[f]$ to produce frequency and time varying zone modification gains $G_j$:

$$G_j[f,t] = DP\{s_j[t], \overline{T}_j[f]\} \quad \text{Equation (24)}$$

Frequency and time varying modification gains may then be computed for each individual constituent signal $x_k[t]$ by combining the zone modification gains in proportion to that signal's panning gains for the zones:

$$G_k[f,t] = \sqrt{\sum_{j=1}^{J} (\alpha_{kj} G_j[f,t])^2} \quad \text{Equation (25)}$$

These signal modification gains $G_k$ may then be applied to each constituent signal, by use of a filterbank for example, to produce dynamics processed constituent signals $\hat{x}_k[t]$ which may then be subsequently rendered to speaker signals.

The combination of individual loudspeaker dynamics processing configuration data (such as speaker playback limit thresholds) for each spatial zone may be performed in a variety of manners. As one example, the spatial zone playback limit thresholds $\overline{T}_j[f]$ may be computed as a weighted sum of the speaker playback limit thresholds $\overline{T}_j[f]$ using a spatial zone and speaker dependent weighting $w_{ij}[f]$:

$$\overline{T}_j[f] = \sum_i w_{ij}[f] T_i[f] \quad \text{Equation (26)}$$

Similar weighting functions may apply to other types of individual loudspeaker dynamics processing configuration data. Advantageously, the combined individual loudspeaker dynamics processing configuration data (e.g., playback limit thresholds) of a spatial zone may be biased towards the individual loudspeaker dynamics processing configuration data (e.g., the playback limit thresholds) of the speakers most responsible for playing back components of the spatial mix associated with that spatial zone. Such biasing may, in some examples, be achieved by setting the weights $w_{ij}[f]$ as a function of each speaker's responsibility for rendering components of the spatial mix associated with that zone for the frequency $f$.

Figure 53:
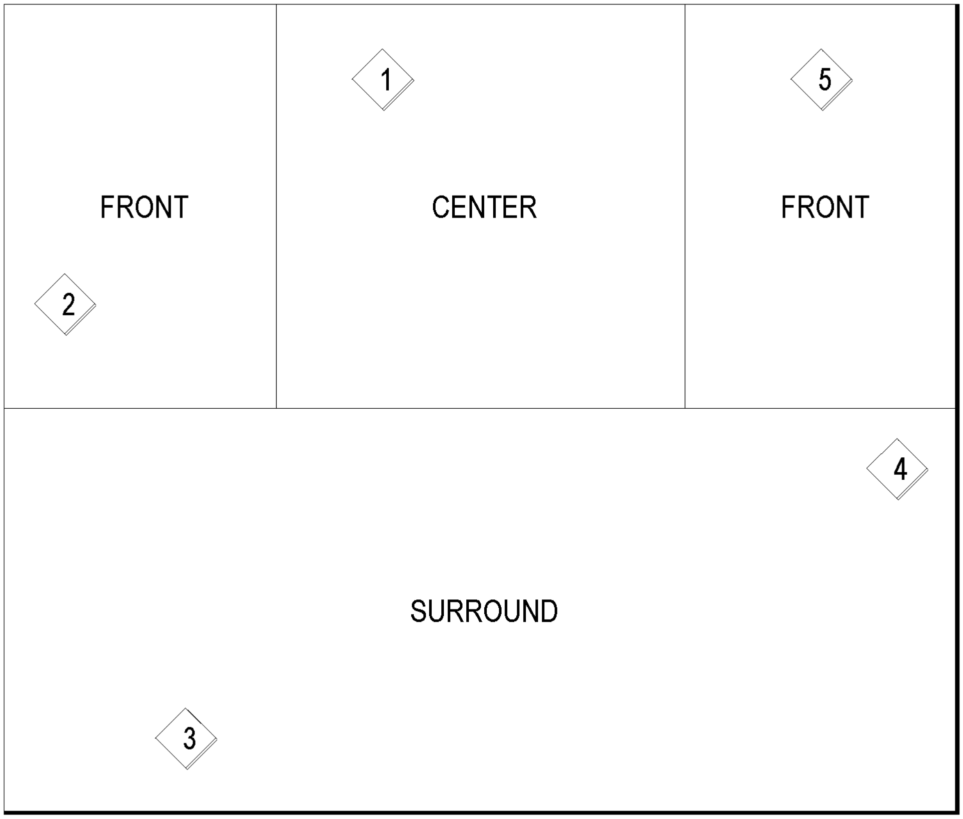
FIG. 53 shows examples of loudspeakers within the spatial zones of FIG. 52.

FIG. 53 shows examples of loudspeakers within the spatial zones of FIG. 52. FIG. 53 depicts the same zones from FIG. 52, but with the locations of five example loudspeakers (speakers 1, 2, 3, 4, and 5) responsible for rendering the spatial mix overlaid. In this example, the loudspeakers 1, 2, 3, 4, and 5 are represented by diamonds. In this particular example, speaker 1 is largely responsible for rendering the center zone, speakers 2 and 5 for the front zone, and speakers 3 and 4 for the surround zone. One could create weights $w_{ij}[f]$ based on this notional one-to-one mapping of speakers to spatial zones, but as with the spatial zone based processing of the spatial mix, a more continuous mapping may be preferred. For example, speaker 4 is quite close to the front zone, and a component of the audio mix located between speakers 4 and 5 (though in the notional front zone) will likely be played back largely by a combination of speakers 4 and 5. As such, it makes sense for the individual loudspeaker dynamics processing configuration data (e.g., playback limit thresholds) of speaker 4 to contribute to the combined individual loudspeaker dynamics processing configuration data (e.g., playback limit thresholds) of the front zone as well as the surround zone.

One way to achieve this continuous mapping is to set the weights $w_{ij}[f]$ equal to a speaker participation value describing the relative contribution of each speaker i in rendering components associated with spatial zone j. Such values may be derived directly from the rendering system responsible for rendering to the speakers (e.g., from step (c) described above) and a set of one or more nominal spatial positions associated with each spatial zone. This set of nominal spatial positions may include a set of positions within each spatial zone.

Figure 54:
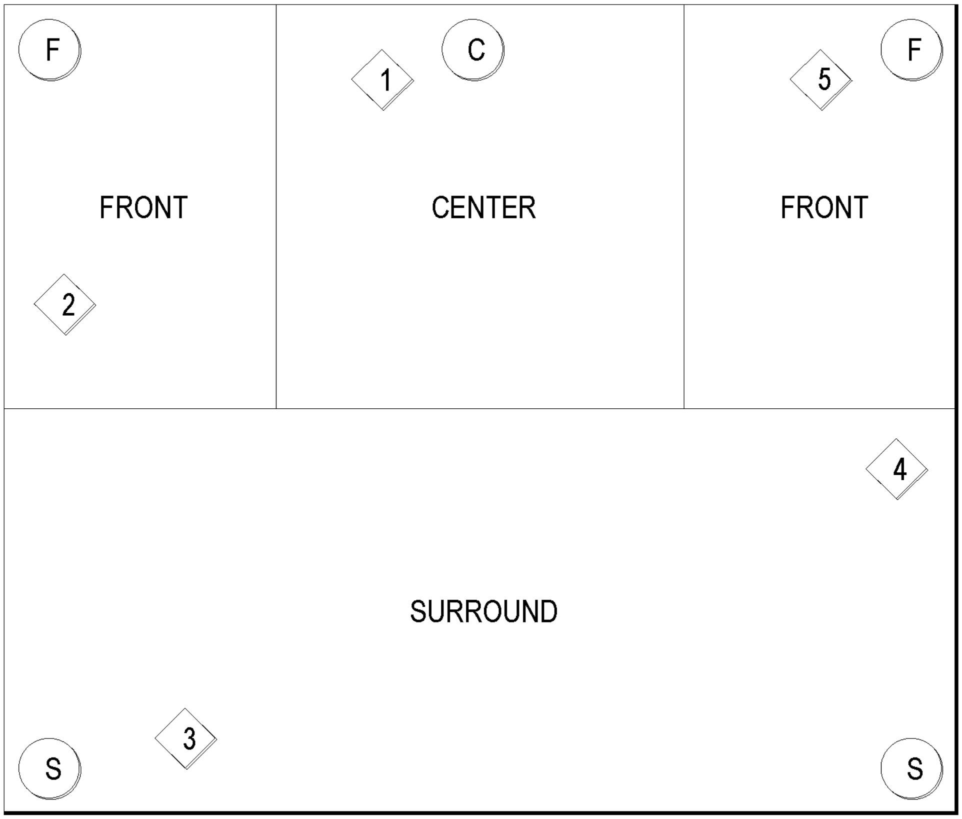
FIG. 54 shows examples of nominal spatial positions overlaid on the spatial zones and speakers of FIG. 53.

FIG. 54 shows an example of nominal spatial positions overlaid on the spatial zones and speakers of FIG. 53. The nominal positions are indicated by the numbered circles: associated with the front zone are two positions located at the top corners of the square, associated with the center zone is a single position at the top middle of the square, and associated with the surround zone are two positions at the bottom corners of the square.

To compute a speaker participation value for a spatial zone, each of the nominal positions associated with the zone may be rendered through the renderer to generate speaker activations associated with that position. These activations may, for example, be a gain for each speaker in the case of CMAP or a complex value at a given frequency for each speaker in the case of FV. Next, for each speaker and zone, these activations may be accumulated across each of the nominal positions associated with the spatial zone to produce a value $g_{ij}[f]$. This value represents the total activation of speaker i for rendering the entire set of nominal positions associated with spatial zone j. Finally, the speaker participation value in a spatial zone may be computed as the accumulated activation $g_{ij}[f]$ normalized by the sum of all these accumulated activations across speakers. The weights may then be set to this speaker participation value:

$$w_{ij}[f] = \frac{g_{ij}[f]}{\sum_i g_{ij}[f]} \quad \text{Equation (27)}$$

The described normalization ensures that the sum of $w_{ij}[f]$ across all speakers i is equal to one, which is a desirable property for the weights in Equation 8.

According to some implementations, the process described above for computing speaker participation values and combining thresholds as a function of these values may be performed as a static process where the resulting combined thresholds are computed once during a setup procedure that determines the layout and capabilities of the speakers in the environment. In such a system it may be assumed that once set up, both the dynamics processing configuration data of the individual loudspeakers and the manner in which the rendering algorithm activates loudspeakers as a function of desired audio signal location remains static. In certain systems, however, both these aspects may vary over time, in response to changing conditions in the playback environment for example, and as such it may be desirable to update the combined thresholds according to the process described above in either a continuous or event-triggered fashion to take into account such variations.

Both the CMAP and FV rendering algorithms may be augmented to adapt to one or more dynamically configurable functions responsive to changes in the listening environment.

For example, with respect to FIG. 53, a person located near speaker 3 may utter the wakeword of a smart assistant associated with the speakers, thereby placing the system in a state where it is ready to listen to a subsequent command from the person. While the wakeword is uttered the system may determine the location of the person using the microphones associated with the loudspeakers. With this information, the system may then choose to divert energy of the audio being played back from speaker 3 into other speakers so that the microphones on speaker 3 may better hear the person. In such a scenario, speaker 2 in FIG. 53 may for a period of time essentially "take over" the responsibilities of speaker 3, and as a result the speaker participation values for the surround zone change significantly; the participation value of speaker 3 decreases and that of speaker 2 increases. The zone thresholds may then be recomputed since they depend on the speaker participation values which have changed. Alternatively, or in addition to these changes to the rendering algorithm, the limit thresholds of speaker 3 may be lowered below their nominal values set to prevent the speaker from distorting. This may ensure that any remaining audio playing from speaker 3 does not increase beyond some threshold determined to cause interference with the microphones listening to the person. Since the zone thresholds are also a function of the individual speaker thresholds, they may be updated in this case as well.

Figure 55:
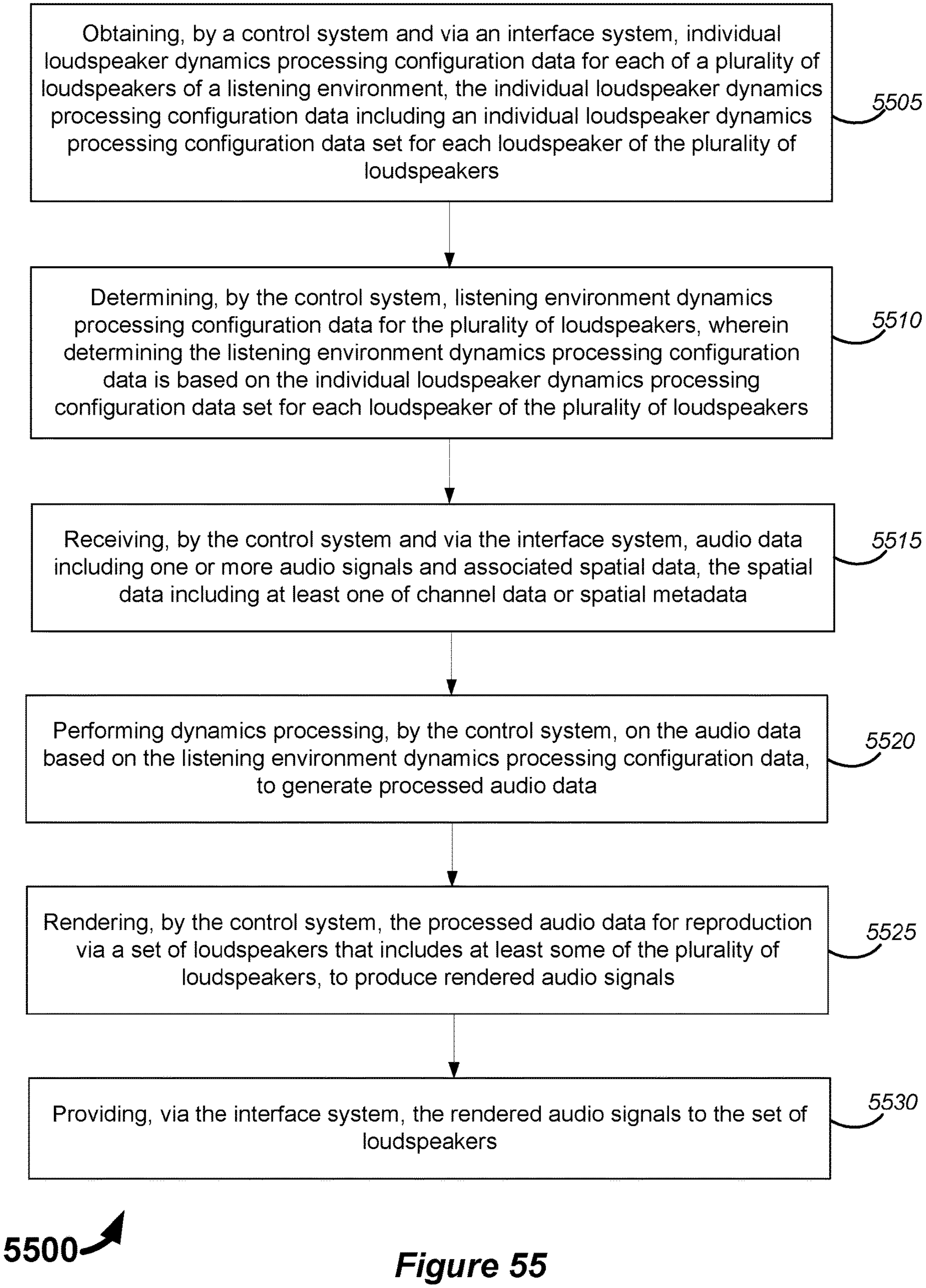
FIG. 55 is a flow diagram that outlines one example of a method that may be performed by an apparatus or system such as those disclosed herein.

FIG. 55 is a flow diagram that outlines one example of a method that may be performed by an apparatus or system such as those disclosed herein. The blocks of method 5500, like other methods described herein, are not necessarily performed in the order indicated. In some implementation, one or more of the blocks of method 5500 may be performed concurrently. Moreover, some implementations of method 5500 may include more or fewer blocks than shown and/or described. The blocks of method 5500 may be performed by one or more devices, which may be (or may include) a control system such as the control system 610 that is shown in FIG. 6 and described above, or one of the other disclosed control system examples. In some examples, method 5500 may be performed, at least in part, according to instructions from an audio session manager, such as the CHASM 208C of FIG. 2C, the CHASM 208D of FIG. 2D, the CHASM 307 of FIG. 3C, or the CHASM 401 of FIG. 4.

According to this example, block 5505 involves obtaining, by a control system and via an interface system, individual loudspeaker dynamics processing configuration data for each of a plurality of loudspeakers of a listening environment. In this implementation, the individual loudspeaker dynamics processing configuration data include an individual loudspeaker dynamics processing configuration data set for each loudspeaker of the plurality of loudspeakers. According to some examples, the individual loudspeaker dynamics processing configuration data for one or more loudspeakers may correspond with one or more capabilities of the one or more loudspeakers. In this example, each of the individual loudspeaker dynamics processing configuration data sets includes at least one type of dynamics processing configuration data.

In some instances, block 5505 may involve obtaining the individual loudspeaker dynamics processing configuration data sets from each of the plurality of loudspeakers of a listening environment. In other examples, block 5505 may involve obtaining the individual loudspeaker dynamics processing configuration data sets from a data structure stored in a memory. For example, the individual loudspeaker dynamics processing configuration data sets may have previously been obtained, e.g., as part of a set-up procedure for each of the loudspeakers, and stored in the data structure.

According to some examples, the individual loudspeaker dynamics processing configuration data sets may be proprietary. In some such examples, the individual loudspeaker dynamics processing configuration data may sets have previously been estimated, based on the individual loudspeaker dynamics processing configuration data for speakers having similar characteristics. For example, block 5505 may involve a speaker matching process of determining the most similar speaker from a data structure indicating a plurality of speakers and a corresponding individual loudspeaker dynamics processing configuration data set for each of the plurality of speakers. The speaker matching process may be based, e.g., on a comparison of the size of one or more woofers, tweeters and/or midrange speakers.

In this example, block 5510 involves determining, by the control system, listening environment dynamics processing configuration data for the plurality of loudspeakers. According to this implementation, determining the listening environment dynamics processing configuration data is based on the individual loudspeaker dynamics processing configuration data set for each loudspeaker of the plurality of loudspeakers. Determining the listening environment dynamics processing configuration data may involve combining the individual loudspeaker dynamics processing configuration data of the dynamics processing configuration data set, e.g., by taking the average of one or more types of individual loudspeaker dynamics processing configuration data. In some instances, determining the listening environment dynamics processing configuration data may involve determining a minimum or a maximum value of one or more types of individual loudspeaker dynamics processing configuration data. According to some such implementations, determining the listening environment dynamics processing configuration data may involve interpolating between a minimum or a maximum value and a mean value of one or more types of individual loudspeaker dynamics processing configuration data.

In this implementation, block 5515 involves receiving, by a control system and via an interface system, audio data including one or more audio signals and associated spatial data. For example, the spatial data may indicate an intended perceived spatial position corresponding to an audio signal. In this example, the spatial data includes channel data and/or spatial metadata.

In this example, block 5520 involves performing dynamics processing, by the control system, on the audio data based on the listening environment dynamics processing configuration data, to generate processed audio data. The dynamics processing of block 5520 may involve any of the disclosed dynamics processing methods disclosed herein, including but not limited to applying one or more playback limit thresholds, compression data, etc.

Here, block 5525 involves rendering, by the control system, the processed audio data for reproduction via a set of loudspeakers that includes at least some of the plurality of loudspeakers, to produce rendered audio signals. In some examples, block 5525 may involve applying a CMAP rendering process, an FV rendering process, or a combination of the two. In this example, block 5520 is performed prior to block 5525. However, as noted above, block 5520 and/or block 5510 may be based, at least in part, on the rendering process of block 5525. Blocks 5520 and 5525 may involve performing processes such as those described above with reference to the listening environment dynamics processing module and the rendering module 4920 of FIG. 49.

According to this example, block 930 involves providing, via the interface system, the rendered audio signals to the set of loudspeakers. In one example, block 930 may involves providing, by the smart home hub 4905 and via its interface system, the rendered audio signals to the loudspeakers 4925*a* through 4925*m*.

In some examples, the method 5500 may involve performing dynamics processing on the rendered audio signals according to the individual loudspeaker dynamics processing configuration data for each loudspeaker of the set of loudspeakers to which the rendered audio signals are provided. For example, referring again to FIG. 49, the dynamics processing modules A through M may perform dynamics processing on the rendered audio signals according to the individual loudspeaker dynamics processing configuration data for the loudspeakers 4925*a* through 4925*m*.

In some implementations, the individual loudspeaker dynamics processing configuration data may include a playback limit threshold data set for each loudspeaker of the plurality of loudspeakers. In some such examples, the playback limit threshold data set may include playback limit thresholds for each of a plurality of frequencies.

Determining the listening environment dynamics processing configuration data may, in some instances, involve determining minimum playback limit thresholds across the plurality of loudspeakers. In some examples, determining the listening environment dynamics processing configuration data may involve averaging the playback limit thresholds to obtain averaged playback limit thresholds across the plurality of loudspeakers. In some such examples, determining the listening environment dynamics processing configuration data may involve determining minimum playback limit thresholds across the plurality of loudspeakers and interpolating between the minimum playback limit thresholds and the averaged playback limit thresholds.

According to some implementations, averaging the playback limit thresholds may involve determining a weighted average of the playback limit thresholds. In some such examples, the weighted average may be based, at least in part, on characteristics of a rendering process implemented by the control system, e.g., characteristics of the rendering process of block 5525.

In some implementations, performing dynamics processing on the audio data may be based on spatial zones. Each of the spatial zones may correspond to a subset of the listening environment.

According to some such implementations, the dynamics processing may be performed separately for each of the spatial zones. For example, determining the listening environment dynamics processing configuration data may be performed separately for each of the spatial zones. For example, combining the dynamics processing configuration data sets across the plurality of loudspeakers may be performed separately for each of the one or more spatial zones. In some examples, combining the dynamics processing configuration data sets across the plurality of loudspeakers separately for each of the one or more spatial zones may be based, at least in part, on activation of loudspeakers by the rendering process as a function of desired audio signal location across the one or more spatial zones.

In some examples, combining the dynamics processing configuration data sets across the plurality of loudspeakers separately for each of the one or more spatial zones may be based, at least in part, on a loudspeaker participation value for each loudspeaker in each of the one or more spatial zones. Each loudspeaker participation value may be based, at least in part, on one or more nominal spatial positions within each of the one or more spatial zones. The nominal spatial positions may, in some examples, correspond to canonical locations of channels in a Dolby 5.1, Dolby 5.1.2, Dolby 7.1, Dolby 7.1.4 or Dolby 9.1 surround sound mix. In some such implementations, each loudspeaker participation value is based, at least in part, on an activation of each loudspeaker corresponding to rendering of audio data at each of the one or more nominal spatial positions within each of the one or more spatial zones.

According to some such examples, the weighted average of the playback limit thresholds may be based, at least in part, on activation of loudspeakers by the rendering process as a function of audio signal proximity to the spatial zones. In some instances, the weighted average may be based, at least in part, on a loudspeaker participation value for each loudspeaker in each of the spatial zones. In some such examples, each loudspeaker participation value may be based, at least in part, on one or more nominal spatial positions within each of the spatial zones. For example, the nominal spatial positions may correspond to canonical locations of channels in a Dolby 5.1, Dolby 5.1.2, Dolby 7.1, Dolby 7.1.4 or Dolby 9.1 surround sound mix. In some implementations, each loudspeaker participation value may be based, at least in part, on an activation of each loudspeaker corresponding to rendering of audio data at each of the one or more nominal spatial positions within each of the spatial zones.

Figure 56A:
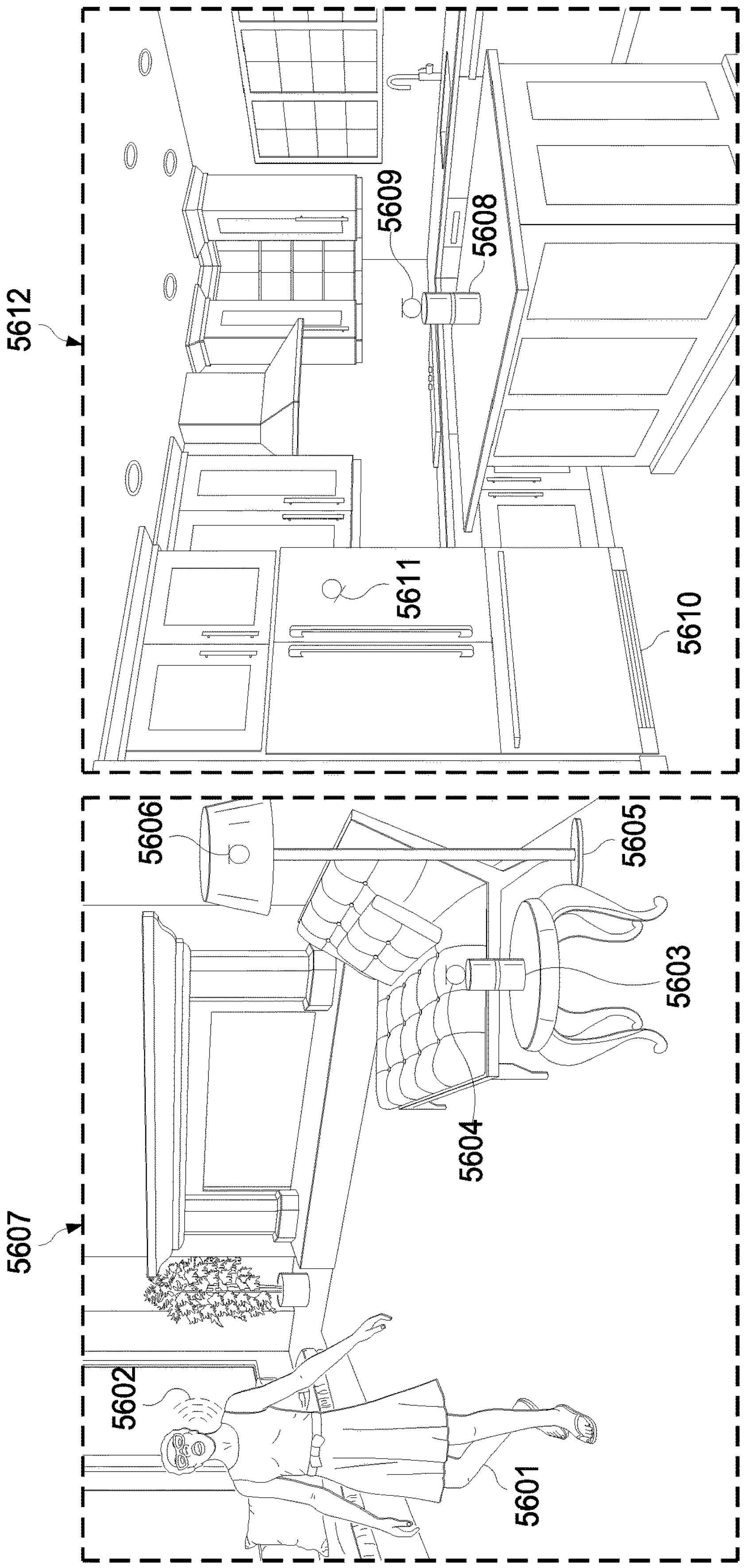
FIGS. 56A and 56B show examples of a system which can be implemented in accordance with some embodiments.
Figure 56B:
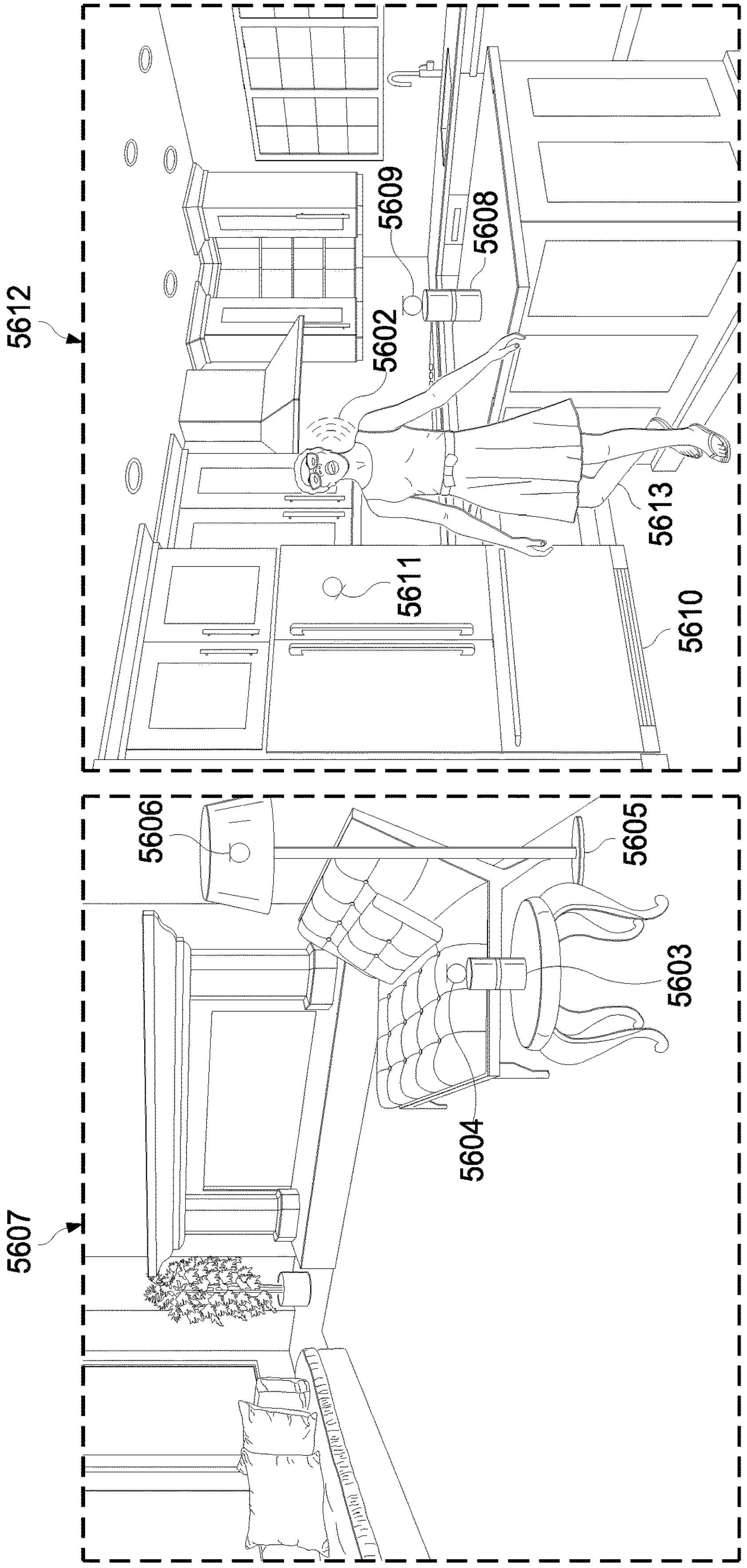

FIGS. 56A and 56B show examples of a system which can be implemented in accordance with some embodiments. FIG. 56B differs from FIG. 56A in that the position 5601 of the user in FIG. 56A is different than the position 113 of the user in FIG. 56B.

In FIG. 56A and FIG. 56B, the labeled elements are:

5607: Zone 1;

5612: Zone 2;

5601: user (talker) position, in zone 1;

5602: Direct local voice (uttered by the user);

5603: Plurality of loudspeakers in smart audio device (e.g., voice assistant device) located in zone 1;

5604: Plurality of microphones in smart audio device (e.g., voice assistant device) located in zone 1;

5605: Household appliance located in zone 1, e.g. a lamp;

5606: Plurality of microphones in a household appliance located in zone 1;

5613: user (talker) position, in zone 2;

5608: Plurality of loudspeakers in smart audio device (e.g., voice assistant device) located in zone 2;

5609: Plurality of microphones in smart audio device (e.g., voice assistant device located in zone 2;

5610: Household appliance (e.g., refrigerator) located in zone 2; and

5611: Plurality of microphones in a household appliance located in zone 2.

Figure 57:
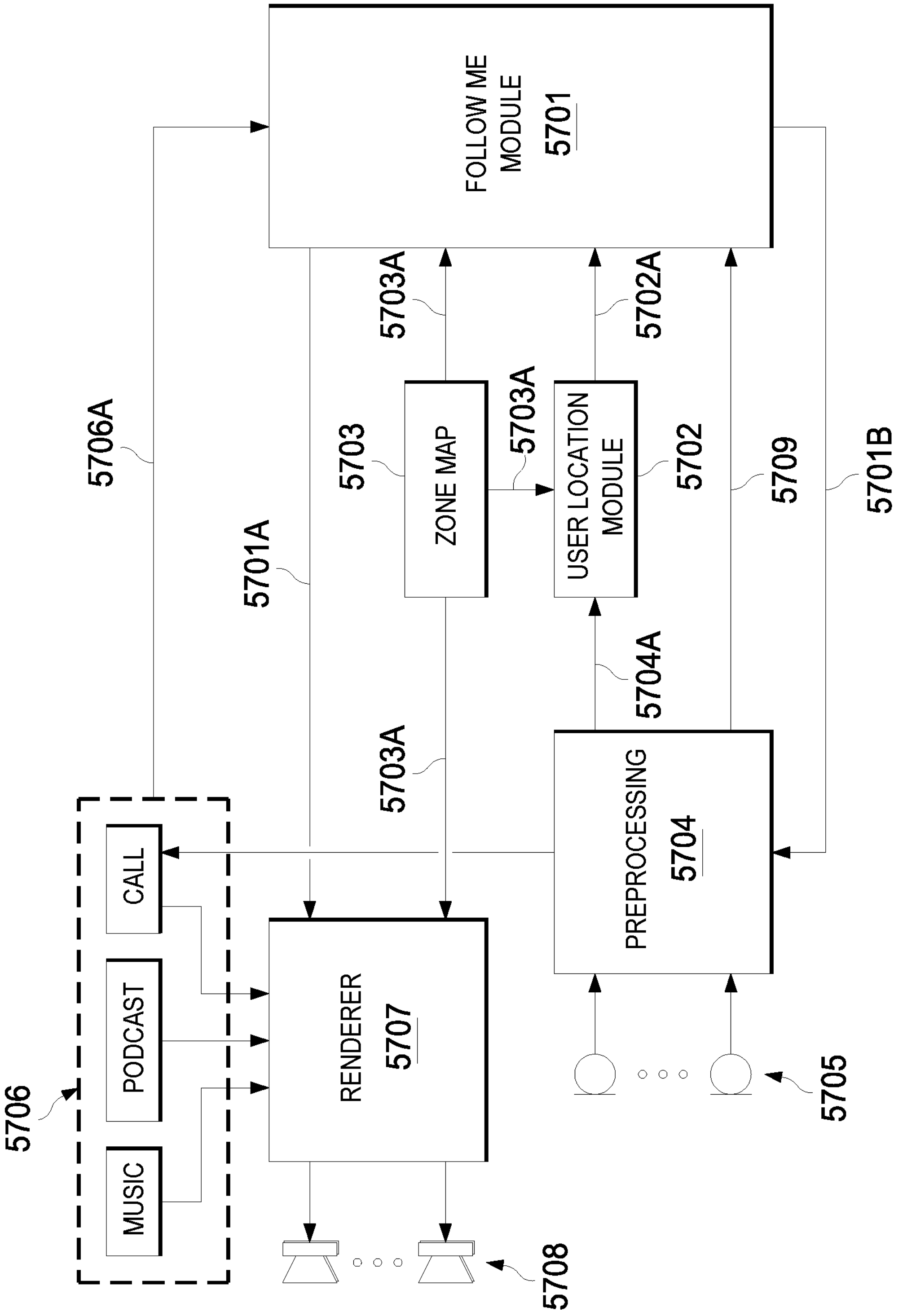
FIG. 57 is a block diagram of a system implemented in an environment (e.g., a home) in accordance with an embodiment.

FIG. 57 is a block diagram of a system implemented in an environment (e.g., a home) in accordance with an embodiment. The system implements a "follow me" mechanism to track user location. In FIG. 57, the labeled elements are:

5701: subsystem (sometimes referred to as a module or "follow me" module) configured to take inputs and make decisions (in response to the inputs) about best microphones and loudspeakers to use for a determined activity (e.g., indicated by input 5706A);

5701A: data indicative of a decision (determined in module 5701) as to best loudspeaker(s) of the system to use for the determined activity, and/or the zone (i.e., one of the zones indicated by zone map 5703) in which a user (e.g., a talker) is currently located;

5701B: data indicative of a decision (determined in module 5701) as to best microphone(s) of the system to use for the determined activity, and/or the zone (i.e., one of the zones indicated by zone map 5703) in which the user is currently located;

5702: User location subsystem (module), configured to determine location of the user (e.g., a talker, for example, the user of FIG. 56A or 56B), e.g., within a zone of the environment. In some embodiments, subsystem 5702 is configured to estimate a user's zone (e.g., according to multiple acoustic features derived from at least some of the microphones 5705). In some such embodiments, the goal is not to estimate the user's exact geometric location but to form a robust estimate of a discrete zone (e.g., in the presence of heavy noise and residual echo) in which the user is located;

5702A: Information (data) indicative of current location of the user (talker), determined by module 5702 and asserted to module 5701;

5703: Zone map subsystem, providing a zone map indicative of zones of the environment of the system (e.g., the zones of FIGS. 56A and 56B, if the system is in the environment of FIGS. 56A and 56B), and a list of all microphones and loudspeakers of the system grouped by their locations in the zones. In some implementations, subsystem 5703 is or includes a memory which stores data indicative of the zone map. According to some examples, the functionality of the subsystem 5701, 5702 and/or 5703 may be provided by what is referred to herein as a SPASM (see, e.g., the SPASM 207C of FIG. 2C);

5703A: Information (data) about at least one zone (of the zone map) and the plurality of microphones and loudspeakers contained in each such zone (e.g., each of at least a subset of the zones) of the zone map, asserted (in some implementations of the system) to module 5701 and/or to module 5702;

5704: Preprocessing subsystem, coupled and configured to perform preprocessing of the outputs of microphones 5705. Subsystem 5704 may implement one or more microphone preprocessing subsystems (e.g., an echo management subsystem, a wakeword detector, and/or a speech recognition subsystem, etc.). Accordingly, the subsystem 5704 is an example of a component of what may be referred to herein as an a "media engine" (see, e.g., the media engines 440, 441 and 442 of FIG. 4);

5704A: preprocessed microphone signal(s) generated by, and output from, subsystem 5704;

5705: Plurality of microphones (e.g., including microphones 5604, 5606, 5609, and 5611 of FIGS. 56A and 56B);

5706: subsystem coupled and configured to implement at least one current audio activity (e.g., a plurality of current ongoing audio activities). Each such audio activity (sometimes referred to herein as an "activity" for convenience) includes detection of sound (using at least one microphone) and/or production of sound (by emitting the sound from at least one loudspeaker). Examples of such audio activities include, but are not limited to, music playback (e.g., including a step of providing audio for rendering by subsystem 5707), a podcast (e.g., including a step of providing audio for rendering by subsystem 5707), and/or a phone call (e.g., including providing teleconference audio for rendering by subsystem 5707, and processing and/or transmitting each microphone signal provided to subsystem 5704). Accordingly, the subsystem 5706 is an example of what may be referred to herein as an a "software application," "application," an "app" or as a device that is configured for executing a software application, application or app (see, e.g., the applications 410, 411 and 412 of FIG. 4);

5706A: Information (data) about the current ongoing activity or activities implemented by subsystem 5706, which is generated by subsystem 5706 and asserted from subsystem 5706 to module 5701;

5707: Multichannel loudspeaker renderer subsystem, coupled and configured to render audio (e.g., by generating speaker feeds for driving speakers 5708) generated or otherwise provided during performance of at least one current activity of the system. For example, subsystem 5707 may be implemented to render audio for playback by a subset of speakers 5708 (which may be implemented in or coupled to different smart audio devices) such that sound emitted by the relevant loudspeakers is perceivable (e.g., clearly, or in a best or desired manner) by the user, in the user's current location (e.g., zone), in accordance with data 5701A. Accordingly, the subsystem 5707 is an example of a component of what may be referred to herein as an a "media engine" (see, e.g., the media engines 440, 441 and 442 of FIG. 4);

5708: Plurality of loudspeakers (e.g., including 5603 and 5608 of FIGS. 56A and 56B); and

5709: voice command(s) from a user (e.g., a talker, for example, the user of FIG. 56A or 56B), which is or are output from subsystem 5704 and provided to module 5701 in typical implementations of the system.

Elements 5701, 5702, and 5703 (or elements 5702 and 5703) may be referred to collectively as a user location and activity control subsystem of the FIG. 57 system.

Elements of the FIG. 57 system (and some other embodiments) may be implemented in or coupled to smart audio devices. For example, all or some of loudspeakers 5708 and/or all or some of microphones 5705 may be implemented in or coupled to one or more smart audio devices, or at least some of the microphones and loudspeakers may be implemented in a Bluetooth device connected to a Bluetooth transmitter/receiver (e.g., smartphone). Also for example, one or more other elements (e.g., all or some of elements 5701, 5702, 5703, 5704, and 5706) of the FIG. 57 system (and/or all or some of elements 5701, 5702, 5703, 5704, 5706, and 6011 of the FIG. 60 system to be described below) may be implemented in or coupled to smart audio devices. In such example embodiments, the "follow me" module 5701 operates (and other system elements operate) to coordinate (orchestrate) the smart audio devices, by tracking user location in response to sound (uttered by a user) and detected by at least one microphone of the system. For example, such coordination includes coordination of rendering of sound to be emitted by element(s) of the system and/or processing of the output(s) of microphone(s) of the system, and/or at least one activity implemented by the system (e.g., by element 5706 of the system, for example by controlling activity manager 6011 of FIG. 60 or another activity manager of the system).

Typically, subsystems 5702 and 5703 are tightly integrated. Subsystem 5702 may receive outputs of all or some (e.g., two or more) of microphones 5705 (e.g., implemented as asynchronous microphones). Subsystem 5702 may implement a classifier, which in some examples is implemented in a smart audio device of the system. In other examples, the classifier may be implemented by another type of device (e.g., a smart device which is not configured to provide audio) of the system which is coupled and configured for communication with the microphones. For example, at least some of microphones 5705 may be discrete microphones (e.g., in household appliances) which are not included in any smart audio device but which are configured for communication with a device which implements subsystem 5702 as a classifier, and the classifier may be configured to estimate a user's zone according to multiple acoustic features derived from the output signals of each microphone. In some such embodiments, the goal is not to estimate the user's exact geometric location but to form a robust estimate of a discrete zone (e.g., in the presence of heavy noise and residual echo).

Herein, the expression "geometric location" (referred to in the previous and the following description) of an object, or a user, or a talker, in an environment, refers to a location based on a coordinate system (e.g., a coordinate system with reference to GPS coordinates), with reference to the system environment as a whole (e.g., according to a Cartesian or polar coordinate system having its origin somewhere within the environment) or with reference to a particular device (e.g., a smart audio device) within the environment (e.g., according to a Cartesian or polar coordinate system having the device as its origin). In some implementations, subsystem 5702 is configured to determine an estimate of a user's location in the environment without reference to geometric locations of microphones 5705.

"Follow me" module 5701 is coupled and configured to operate in response to a number of inputs (one or more of 5702A, 5703A, 5706A, and 5709), and to produce one or both of outputs 5701A and 5701B. Examples of the inputs are next described in more detail.

Input 5703A may be indicative of information regarding each zone of the zone map (sometimes referred to as acoustic zones), including but not limited to one or more of: a list of devices (e.g., smart devices, microphones, loudspeakers, etc.) of the system located within each zone, dimension(s) of each zone (e.g., in same coordinate system as geometric location units), geometric location of each zone (e.g., Kitchen, Living Room, Bedroom, etc.) with respect to the environment and/or with respect to other zones, geometric location of each device of the system (e.g., with respect to their respective zones and/or with respect to other ones of the devices), and/or name of each zone.

Input 5702A may be or include real time information (data) regarding all or some of: the acoustic zone in which the user (talker) is located, the talker's geometric location within such zone, and for how long has the talker been in such zone. Input 5702A may also include a degree of confidence by user location module 5702 as to the accuracy or correctness of any of the information noted in the previous sentence, and/or a history of talker movement (e.g., within the past N hours, where the parameter N is configurable).

Input 5709 may be a voice command, or two or more voice commands, uttered by the user (talker), each of which has been detected by preprocessing subsystem 5704 (e.g., commands related or unrelated to the functionality of "follow me" module 5701).

Output 5701A of module 5701 is an instruction to rendering subsystem (renderer) 5707 to adapt processing according to the current (e.g., most recently determined) acoustic zone of the talker. Output 5701B of module 5701 is an instruction to preprocessing subsystem 5704 to adapt processing according to the current (e.g., most recently determined) acoustic zone of the talker.

Output 5701A may be indicative of the talker's geometric location with respect to the talker's current acoustic zone, as well as geometric location and distance of each of loudspeakers 5708 with respect to the talker, e.g., to cause renderer 5707 to perform rendering in the best way possible for the relevant activity being implemented by the system. The best way possible may depend on the activity and the zone, and optionally also on the talker's previously determined (e.g., recorded) preferences. For example, if the activity is a movie, and the talker is in the living room, output 5701A may instruct renderer 5707 to play back the audio of the movie using as many loudspeakers as possible for a cinema-like experience. If the activity is music, or a podcast, and the talker is in the kitchen, or in the bedroom, output 5701A may instruct renderer 5707 to render the music with only the closest loudspeakers, for a more intimate experience.

Output 5701B may be indicative of a sorted list of some or all of microphones 5705 for use by subsystem 5704 (i.e., microphone(s) whose output(s) should not be ignored, and instead should be used (i.e., processed) by subsystem 5704), and the geometric location of each such microphone with respect to the user (talker). In some embodiments, subsystem 5704 may process outputs of some or all of microphones 5705 in a manner determined by one or more of: distance of each microphone from the talker (as indicated by output 5701B); wakeword score for each microphone (i.e., likelihood that the microphone heard a wakeword uttered by the user) if available; signal to noise ratio of each microphone (i.e., how much louder is speech uttered by the talker with respect to environmental noise and/or audio playback captured from the microphone); or a combination of two or more of the foregoing. The wakeword scores and signal to noise ratios may be calculated by preprocessing subsystem 5704. In some applications, such as a phone call, subsystem 5704 may only use the output of a best one of microphones 5705 (as indicated by the list), or may implement beam forming with signals from a plurality of microphones from the list. To implement some applications, such as (for example) a distributed speech recognizer or a distributed wakeword detector, subsystem 5704 may use outputs of a plurality of the microphones 5705 (e.g., determined from a sorted list indicated by output 5701B, where the sorting may be, for example, in order of proximity to the user).

Figure 58:
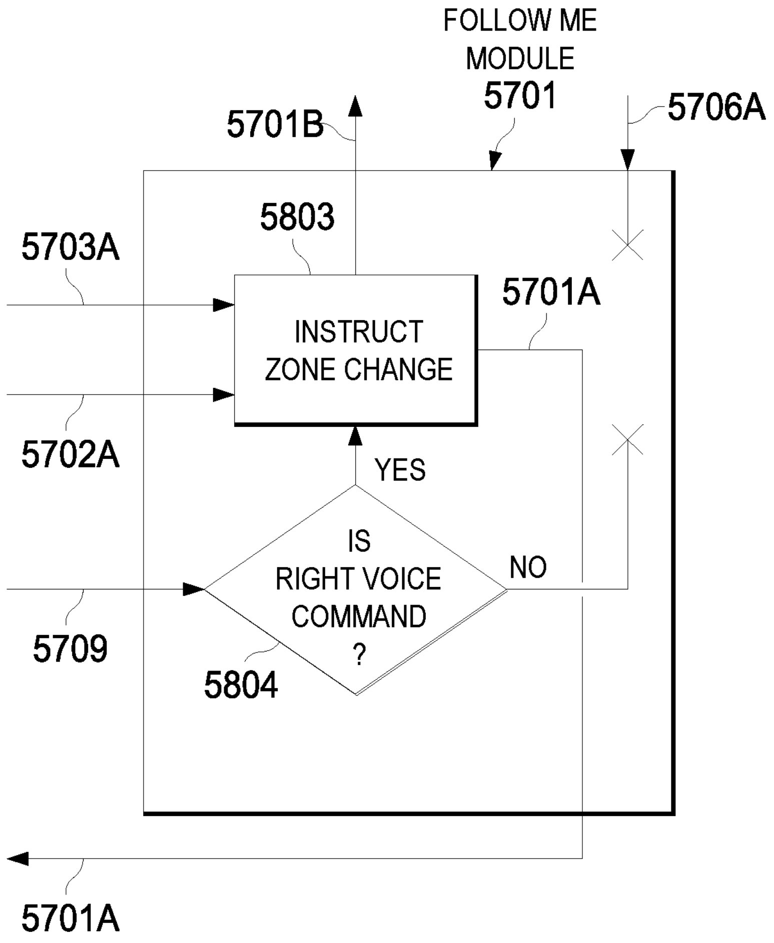
FIG. 58 is a block diagram of elements of an example embodiment of module 5701 of FIG. 57.

In some example applications, subsystem 5704 (with modules 5701 and 5702) implements a microphone selection or adaptive beamforming scheme that attempts to pick up sound from the zone of the user more effectively (e.g., in order to better recognize a command that follows a wakeword), using (i.e., at least partially in response to) output 5701B. In such scenarios, module 5702 may use output 5704A of subsystem 5704 as feedback regarding the quality of user zone prediction to improve user zone determination in any of various was, including (but not limited to) the following:

- penalizing predictions that result in misrecognition of a voice command following a wakeword. E.g., a user zone prediction that results in the user cutting short a voice assistant's response to a command (e.g., by uttering a counter-command, such as for example, "Amanda, stop!") may be penalized;
- penalizing predictions that result in low confidence that a speech recognizer (implemented by subsystem 5704) has successfully recognized a command;
- penalizing predictions that result in failure of a second-pass wakeword detector (implemented by subsystem 5704) to retrospectively detect a wakeword with high confidence; and/or
- reinforcing predictions that result in highly confident recognition of a wakeword and/or correct recognition of a user voice command FIG. 58 is a block diagram of elements of an example embodiment of module 5701 of FIG. 57. In FIG. 58, the labeled elements are:

- elements of the FIG. 57 system (labeled identically in FIGS. 2 and 3);
- 5804: module which is coupled and configured to recognize at least one specific type of voice commands 5709, and to assert an indication to module 5803 (in response to recognizing that a voice command 5709 is of a specific recognized type);
- 5803: module which is coupled and configured to generate output signals 5701A and 5701B (or only one of signal 5701A or signal 5701B, in some implementations); and
- 5709: voice command(s) from talker.

In the FIG. 58 embodiment, "follow me" module 5701 is configured to operate as follows. In response to voice command 5709 from the talker (e.g., "Amanda, move the call here" uttered while subsystem 5706 is implementing a phone call), determining a changed set of loudspeakers (indicated by output 5701A) and/or microphones (indicated by output 5701B) for renderer 5707 and/or subsystem 5704 to use accordingly.

With module 5701 implemented as in FIG. 58, user location module 5702 or subsystem 5704 (both shown in FIG. 57) may be or include a simple command and control module that recognizes commands from the talker's direct local voice (i.e., microphone signal(s) 5704A provided to module 5702 from subsystem 5704 is/are indicative of such local voice, or command 5709 is provided to module 5702 as well as to module 5701). For example, preprocessing subsystem 5704 of FIG. 57 may contain a simple command and control module coupled and configured to recognize voice commands (indicated by output(s) of one or more of microphones 5705), and to provide output 5709 (indicative of such commands) to module 5702 as well as to module 5701.

In an example of the FIG. 58 implementation of module 5701, the module 5701 is configured to respond to a voice command 5709 from the talker (e.g. "move the call here"), including by:

- knowing the talker's location (indicated by input 5702A) as a result of zone mapping, to instruct renderer 5707 in accordance with the current talker acoustic zone information (indicated by output 5701A), so the renderer can change its rendering configuration to use the best loudspeaker(s) for the talker's current acoustic zone; and/or
- knowing the talker's location (indicated by input 5702A) as a result of zone mapping, to instruct preprocessing module 5704 to use outputs of only the best microphone(s) in accordance with the current talker acoustic zone information (indicated by output 5701B).

In an example of the FIG. 58 implementation of module 5701, the module 5701 is configured to operate as follows:

1. Wait for a voice command (5709);
2. Upon receiving a voice command 5709, determining (in module 5804) whether the received command 5709 is of a predetermined specific type (e.g., is one of: "move [activity] here," or "follow me," where "[activity]" here denotes any of the activities currently being implemented by the system (e.g., by subsystem 5706);
3. If the voice command is not of the specific type, ignore the voice command (so that output signal 5701A and/or output signal 5701B are generated by module 5803 as if the voice command being ignored was not received); and
4. If the voice command is of the specific type, generate (in module 5803) output signal 5701A and/or output signal 5701B to instruct other elements of the system to change their processing according to the current acoustic zone (as detected by user location module 5702 and indicated by input 5702A.

Figure 59:
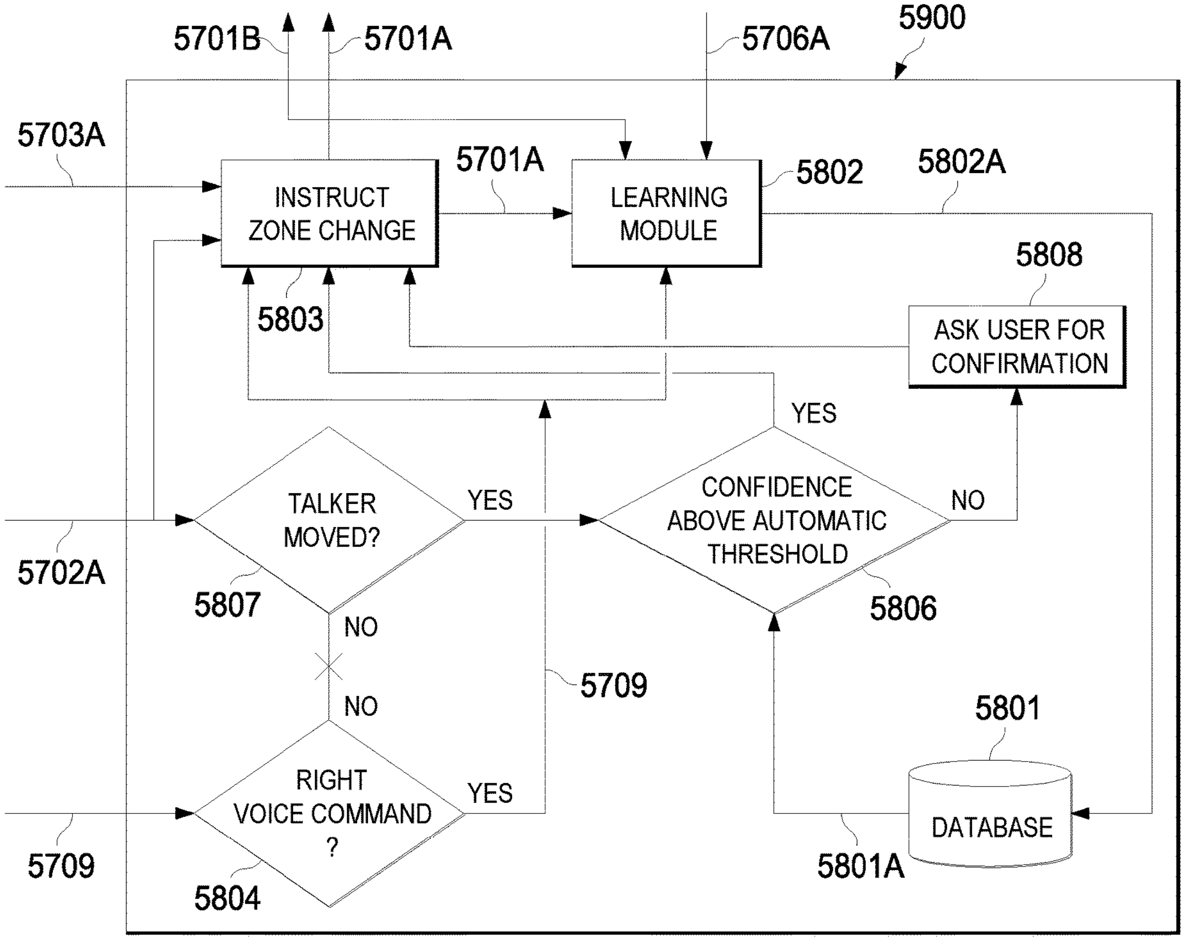
FIG. 59 is a block diagram of another example embodiment (labeled 5900 in FIG. 59) of module 5701 of FIG. 57, and operation thereof.

FIG. 59 is a block diagram of another example embodiment (labeled 5900 in FIG. 59) of module 5701 of FIG. 57, and operation thereof. In FIG. 59, the labeled elements are:

- 5900: "Follow me" module;
- elements of the FIG. 57 system (labeled identically in FIGS. 2 and 4);
- elements 5803 and 5804 of module 5900 (labeled as are the corresponding elements of module 5701 of FIG. 58);
- 5801: Database of data indicative of learned preferences from a talker's (e.g., the user's) past experiences. Database 5801 may be implemented as a memory which stores the data in a non-transitory manner;
- 5801A: Information (data) from database 5801 regarding learned preferences from the talker's past experiences;
- 5802: Learning module, coupled and configured to update database 5801 in response to one or more of inputs 5709 and/or 5706A, and/or one or both of outputs 5701A and 5701B (generated by module 5803);

5802A: Updated information (data) about the talker's preferences (generated by module 5802 and provided to database 5801 for storage therein);

5806: module coupled and configured to assess confidence in a determined talker location;

5807: module coupled and configured to assess whether a determined talker location is a new location; and 5808: module coupled and configured to request a user confirmation (e.g., confirmation of the user's location).

Follow me module 5900 of FIG. 59 implements an extension to the example embodiment of follow me module 5701 of FIG. 58, in that module 5900 is configured to make automatic decisions about the best loudspeaker(s) and microphone(s) to use based on the talker's past experiences.

With module 5701 of FIG. 57 implemented as module 5900 of FIG. 59, preprocessing subsystem 5704 of FIG. 57 may include a simple command and control module coupled and configured to recognize voice commands (indicated by output(s) of one or more of microphones 5705), and to provide output 5709 (indicative of recognized commands) to both module 5702 and module 5900. More generally, user location module 5702 or subsystem 5704 (both shown in FIG. 57) may be or implement a command and control module which is configured to recognize commands from the talker's direct local voice (e.g., microphone signal(s) 5704A provided to module 5702 from subsystem 5704 is/are indicative of such local voice, or a recognized voice command 5709 is provided from subsystem 5704 to module 5702 as well as to module 5900), and module 5702 is configured to use the recognized commands to automatically detect the talker's location.

In the FIG. 59 embodiment, module 5702 together with zone map 5703 may implement an acoustic zone mapper (module 5702 may be coupled and configured to operate with zone map 5703, or may be integrated with zone map 5703). In some implementations, the zone mapper may use the outputs of Bluetooth devices or other radio frequency beacons to determine the talker's location within the zones. In some implementations, the zone mapper may keep historical information in its own system, and generate output 5702A (for provision to module 5900 of FIG. 59, or to another embodiment of module 5701 of FIG. 57) to be indicative of a probabilistic confidence in the talker's location. The probability that the talker's location has been determined correctly may be used by module 5806 (of module 5900) to influence the acuity of the loudspeaker renderer (e.g., to cause output 5701A to in turn cause renderer 5707 to render the relevant audio in a more focused way if module 5806 is sufficiently confident about the talker location, e.g., because module 5900 has seen other instances, indicated by data 5801A, of a talker speaking from that location). Conversely, if module 5900 does not recognize that the talker has previously been located in a particular position, and module 5806 has insufficient confidence in the talker location (e.g., confidence below a predetermined threshold), and module 5806 may cause output 5701A to be generated so as to cause renderer 5707 to render the relevant audio to be perceived in a more general vicinity.

In the FIG. 59 implementation, a command 5709 from the talker may cause module 5900 to generate output 5701A and/or output 5701B to indicate a new set of current loudspeakers and/or microphones, and thus override the current loudspeakers and/or microphones in use, e.g., as in the example embodiment of FIG. 58. Depending on the talker's location within the acoustic zones (e.g., as indicated by input 5702A), the confidence (as determined by module 5806) that the talker is in fact within a determined zone, the activities currently ongoing (i.e., those being implemented by subsystem 5706 of FIG. 57, e.g., as indicated by input 5706A), and past learned experiences (e.g., as indicated by data 5801A), module 5900 is configured makes an automatic decision to change the currently used loudspeakers and/or microphones for a determined ongoing activity. In some implementations, if the system is not sufficiently confident about such an automatic decision (e.g., if module 5806 has confidence in a determined talker location that does not exceed a predetermined threshold), it may issue a request (e.g., module 5806 may cause module 5808 to cause output 5701A to cause issuance of a request) for confirmation of the location from the talker. This request may be in the form of a voice prompt from the loudspeaker closest to the talker (for example the prompt "we've noticed you moved to the Kitchen, would you like to play music here?").

Module 5900 of FIG. 59 is configured to make automatic decisions regarding the configuration of renderer 5707 and which microphone(s) the subsystem 5704 should use based on the talker's movements within acoustic zones, and optionally on past experiences (indicated by data in database 5801). To do so, module 5900 may take into account input (e.g., command(s) 5709) from the above-mentioned command and control module (implemented by preprocessing subsystem 5704 or module 5702) indicative of commands indicated by the talker's direct local voice, as well as information (e.g., input 5702A generated by module 5702) which indicates the talker's location.

After a decision is made by module 5900 (i.e., to generate output 5701A and/or output 5701B to cause a change in a previously determined set of loudspeakers and/or microphones), learning module 5802 may store data 5802A into database 5801, where data 5802A may indicate whether the decision was satisfactory (e.g., the talker didn't manually override the decision) or unsatisfactory (e.g., the talker manually overrode the decision by issuing a voice command), in an effort to ensure a better automatically determined outcome in the future.

More generally, generation (e.g., updating) of output 5701A and/or output 5701B may be performed at the time of an ongoing audio activity in response to data (e.g., from database 5801) indicative of learned experiences (e.g., learned preferences of a user) determined by learning module 5802 (and/or another learning module of an embodiment) from at least one previous activity (which occurred before the generation of the outputs 5701A and/or 5701B, e.g., before the ongoing audio activity). For example, the learned experiences may be determined from previous user commands asserted under conditions which were the same or similar to those present during the current, ongoing audio activity, and output 5701A and/or output 5701B may be updated in accordance with a probabilistic confidence based on data (e.g., from database 5801) indicative of such learned experiences (e.g., to influence the acuity of loudspeaker renderer 5707 in the sense that the updated output 5701A causes renderer 5707 to render the relevant audio in a more focused way if module 5900 is sufficiently confident about the user's preference based on the learned experiences).

Learning module 5802 may implement a simple database of the most recent correct decision made in response to (and/or having) each set of the same inputs (provided to module 5900) and/or features. Inputs to this database may be or include current system activity (e.g., indicated by input 5706A), current talker acoustic zone (indicated by input 5702A), previous talker acoustic zone (also indicated by input 5702A), and an indication (e.g., indicated by a voice command 5709) as to whether a previous decision in the same situation was correct. Alternatively, module 5802 can implement a state map with probabilities that the talker wants to change the state of the system automatically, with each past decision, correct and incorrect, being added to such probability map. Alternatively, module 5802 may be implemented as a neural network that learns based on all, or some of, the inputs of module 5900, with its output being used to generate outputs 5701A and 5701B (e.g., to instruct renderer 5707 and preprocessing module 5704 whether a zone change is required or not).

An example flow of the processing performed by the FIG. 57 system (with module 5701 implemented as module 5900 of FIG. 59) is as follows:

1. A talker is in acoustic zone 1 (e.g., element 5607 of FIG. 56A) and starts a phone call with Anthony;
2. User location module 5702 and follow me module 5900 know the talker is in zone 1, and module 5900 generates outputs 5701A and 5701B to cause preprocessing module 5704 to use a best microphone (or microphones) for that zone, and causes renderer 5707 to use a best loudspeaker configuration for that zone;
3. The talker moves to acoustic zone 2 (e.g., element 5612 of FIG. 56B);
4. User location module 5702 detects a change in the talker's acoustic zone and asserts input 5702A to module 5900 so as to indicate the change;
5. Module 5900 remembers from past experiences (i.e., data in database 5801 indicates) that the talker asked to move a phone call to the new acoustic zone upon talker movement in circumstances like the current one. After a short amount of time, confidence that the call should be moved goes above a set threshold (as determined by module 5806), and module 5900 instructs preprocessing subsystem 5704 to change the microphone configuration to the new acoustic zone, and also instructs renderer 5707 to adjust its loudspeaker configuration to provide the best experience for the new acoustic zone; and
6. The talker does not override the automatic decision by uttering a voice command 5709 (so that module 5804 does not indicate such an override to learning module 5802 and to module 5803), and learning module 5802 causes data 5802A to be stored in database 5801 to indicate that module 5900 made the correct decision in this case, reinforcing such decision for similar future cases.

Figure 60:
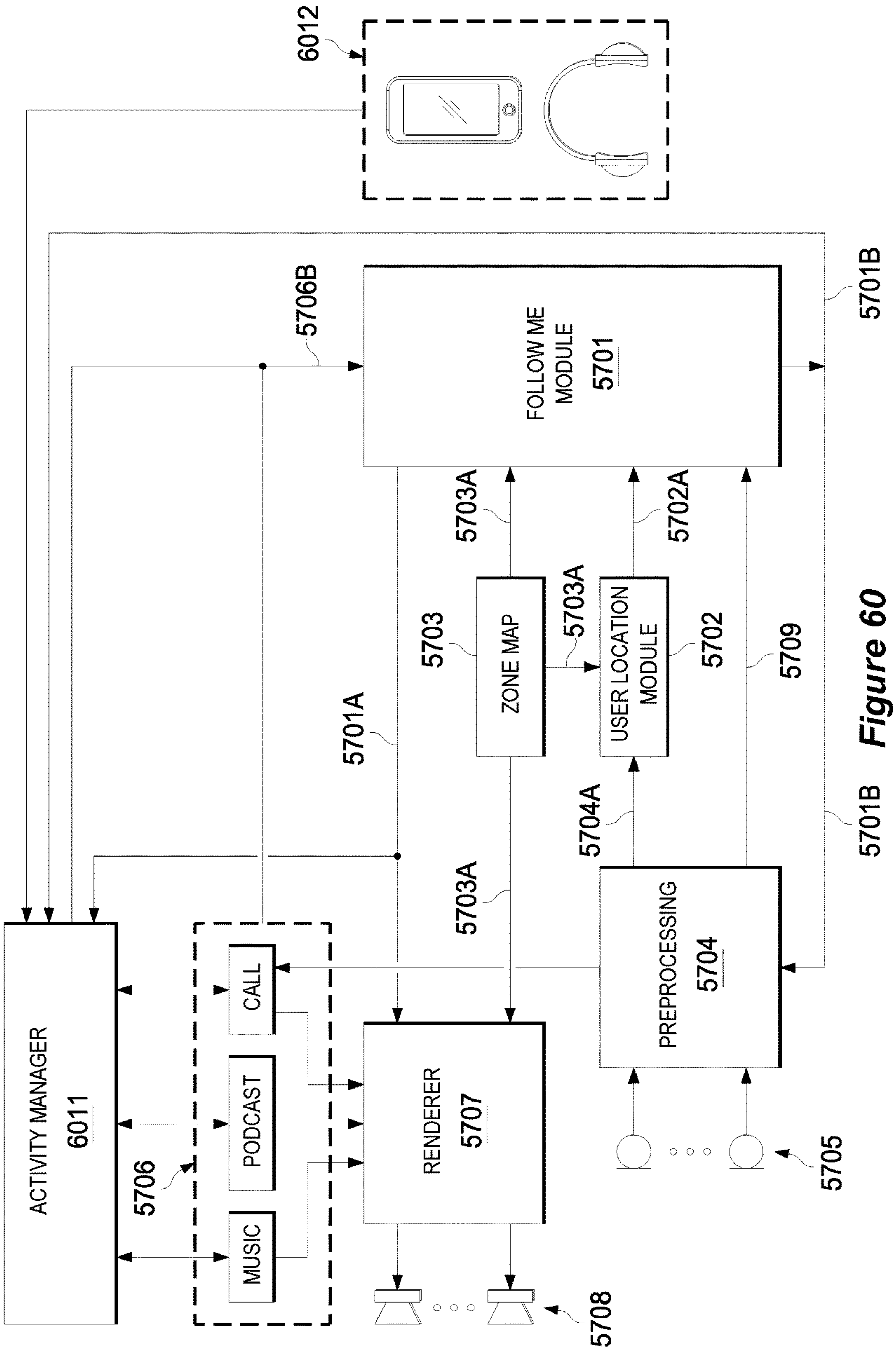
FIG. 60 is a block diagram of another example embodiment.

FIG. 60 is a block diagram of another example embodiment. In FIG. 60, the labeled elements are:

- elements of the FIG. 57 system (labeled identically in FIGS. 57 and 60);
- 6011: Activity Manager, which is coupled to subsystem 5706 and module 5701, and has knowledge of the talker's activities in and beyond the environment (e.g., a home) in which the system is implemented. The Activity Manager 6011 is an example of what is referred to herein as an audio session manager, some examples of which are referred to herein as CHASMs (see, e.g., the CHASM 208C of FIG. 2C, the CHASM 208D of FIG. 2D, the CHASM 307 of FIG. 3C and the CHASM 401 of FIG. 4;
- 6012: a smartphone (of the system's user, who is sometimes referred to herein as a talker) coupled to activity manager 6011, and a Bluetooth headset connected to the smartphone; and
- 5706B: Information (data) about the current ongoing activity or activities implemented by subsystem 5706 (and/or activities of the talker beyond the environment in which the system is implemented), which is generated by activity manager 6011 and/or subsystem 5706, and provided as an input to module 5701.

In the FIG. 60 system, outputs 5701A and 5701B of "follow me" module 5701 are instructions to activity manager 6011, as well as to renderer 5707 and preprocessing subsystem 5704, which may cause each of them to adapt processing according to the talker's current acoustic zone (e.g., a new acoustic zone in which the talker is determined to be located).

In the FIG. 60 system, module 5701 is configured to generate output 5701A and/or output 5701B in response to input 5706B (and the other inputs provided to module 5701). Output 5701A of module 5701 instructs renderer 5707 (and/or activity manager 6011) to adapt processing according to the current (e.g., newly determined) acoustic zone of the talker. Output 5701B of module 5701 instructs preprocessing subsystem 5704 (and/or activity manager 6011) to adapt processing according to the current (e.g., newly determined) acoustic zone of the talker.

An example flow of the processing implemented by the FIG. 60 system assumes that the system is implemented in a house, except that element 6012 may operate either within or outside the house, and that module 5701 is implemented as is module 5900 of FIG. 59. The example flow is as follows:

1. The talker is out of the house for a walk and receives a phone call from Anthony on smartphone element 6012;
2. The talker walks into the house, into acoustic zone 1 (e.g., element 5607 of FIG. 56A), in the middle of the call and turns off the Bluetooth headset of element 6012;
3. User location module 5702 and module 5701 detect that talker entered acoustic zone 1, and module 5701 knows (from input 5706B) that the talker is in a phone call (being implemented by subsystem 5706) and that the Bluetooth headset of element 6012 has been turned off;
4. Module 5701 remembers from past experiences that the talker asked to move the call to the new acoustic zone in circumstances similar to the current one. After a short amount of time, confidence that the call should be moved rises above a threshold, and module 5701 instructs activity manager 6011 (by asserting appropriate output(s) 5701A and/or 5701B) that the call should be moved from smartphone element 6012 to the devices of the FIG. 60 system which are implemented in the home; module 5701 instructs preprocessing subsystem 5704 (by asserting an appropriate output 5701B) to change the microphone configuration to the new acoustic zone; and module 5701 also instructs renderer 5707 (by asserting an appropriate output 5701A) to adjust its loudspeaker configuration to provide the best experience for the new acoustic zone; and
5. The talker does not override the automatic decision (made by module 5701) by uttering a voice command, and the learning module (5802) of module 5701 stores data indicating that module 5701 made the correct decision in this case, for use in reinforcing such decision for similar future cases.

Other embodiments may involve:

- a method of controlling a system including a plurality of smart audio devices in an environment, wherein the system includes a set of one or more microphones (e.g., each of the microphones is included in or configured for communication with at least one of the smart audio devices in the environment) and a set of one or more loudspeakers, and wherein the environment includes a plurality of user zones, the method including steps of: determining an estimate of a user's location in the environment at least in part from output signals of the microphones, wherein the estimate is indicative of in which one of the user zones the user is located;

a method of managing an audio session across a plurality of smart audio devices, including a step of changing a set of currently used microphones and loudspeakers for an ongoing audio activity in response to a user's request or other sound uttered by the user; and a method of managing an audio session across a plurality of smart audio devices, including a step of changing a set of currently used microphones and loudspeakers for an ongoing audio activity based on at least one previous experience (e.g., based on at least one learned preference from a user's past experiences).

Aspects of some embodiments include the following enumerated example embodiments (EEEs):

EEE1. A method of controlling audio in a collective system (constellation) of devices comprising a plurality of audio devices (e.g., smart audio devices) working collectively through a single hierarchical system that can issue lower level control for audio signal routing, where:

a. There is a single point of interface for applications to the constellation of devices that can be controlled;

b. The interaction with this single point of contact does not involve specific detail about the devices;

c. The interaction includes a plurality of explicit or implicit parameters including i. Source, ii. destination, and iii. priority;

d. The system keeps track of a unique persistent identifier for each of these routes (e.g., requests to a CHASM) and optionally also can query a plurality of properties from it (e.g., properties which are continuous in nature); and e. The system continuously utilizes available (e.g., at least some, or any, or all available current and historical) information to execute the control of audio devices.

EEE2. The method of claim EEE1, wherein said plurality of parameters also includes a mode (e.g., sync).

EEE3. The method of any previous claim wherein said plurality of parameters also includes a quality (e.g., a goal of delivering the audio, e.g., intelligibility).

EEE4. The method of any previous claim wherein said plurality of parameters also includes an insistence (e.g., how much you want to know it is confirmed).

EEE5. The method of any previous claim wherein said plurality of properties includes how well (e.g., confidence) that it (e.g., the audio) is being heard (e.g., ongoing).

EEE6. The method of any previous claim wherein said plurality of properties includes the extent to which there was interaction (acknowledgement).

EEE7. The method of any previous claim wherein said plurality of parameters includes audibility.

EEE8. The method of any previous claim wherein said plurality of parameters includes lack of audibility.

EEE9. The method of any previous claim wherein said plurality of parameters includes intelligibility.

EEE10. The method of any previous claim wherein said plurality of parameters includes a lack of intelligibility (e.g., masking, "cone of silence").

EEE11. The method of any previous claim wherein said plurality of parameters includes spatial fidelity (e.g., localization performance).

EEE12. The method of any previous claim wherein said plurality of parameters includes consistency.

EEE13. The method of any previous claim wherein said plurality of parameters includes fidelity (e.g., lack of coding distortion).

EEE14. A system configured to implement the method of any previous claim wherein a route can only have a single destination (unicast).

EEE15. A system configured to implement the method of any of claims EEE1-EEE13, wherein a route may have multiple destinations (multicast).

EEE16. An audio session management method for an audio environment having multiple audio devices, the audio session management method comprising:

receiving, from a first device implementing a first application and by a device implementing an audio session manager, a first route initiation request to initiate a first route for a first audio session, the first route initiation request indicating a first audio source and a first audio environment destination, the first audio environment destination corresponding with at least a first area of the audio environment, the first audio environment destination not indicating an audio device; and establishing, by the device implementing the audio session manager, a first route corresponding to the first route initiation request, wherein establishing the first route involves:

determining at least one audio device in the first area of the audio environment for a first stage of the first audio session; and initiating or scheduling the first audio session.

EEE17. The audio session management method of EEE16, wherein the first route initiation request includes a first audio session priority.

EEE18. The audio session management method of EEE16 or EEE17, wherein the first route initiation request includes a first connectivity mode.

EEE19. The audio session management method of EEE18, wherein the first connectivity mode is a synchronous connectivity mode, a transactional connectivity mode or a scheduled connectivity mode.

EEE20. The audio session management method of any one of EEE16-EEE19, wherein the first route initiation request indicates a first person and includes an indication of whether an acknowledgement will be required from at least the first person.

EEE21. The audio session management method of any one of EEE16-EEE20, wherein the first route initiation request includes a first audio session goal.

EEE22. The audio session management method of EEE21, wherein the first audio session goal includes one or more of intelligibility, audio quality, spatial fidelity or inaudibility.

EEE23. The audio session management method of any one of EEE16-EEE22, further comprising determining a first persistent unique audio session identifier for the first route and transmitting the first persistent unique audio session identifier to the first device.

EEE24. The audio session management method of any one of EEE16-EEE23, wherein establishing the first route involves causing at least one device in the environment to establish at least a first media stream corresponding to the first route, the first media stream including first audio signals.

EEE25. The audio session management method of EEE24, further comprising a rendering process that causes the first audio signals to be rendered to first rendered audio signals.

EEE26. The audio session management method of EEE25, further comprising:

performing a first loudspeaker autolocation process of automatically determining a first location of each audio device of a plurality of audio devices in the first area of the audio environment at a first time, wherein the rendering process is based, at least in part, on the first location of each audio device; and storing the first location of each audio device in a data structure associated with the first route.

EEE27. The audio session management method of EEE25, further comprising:

determining that at least one audio device in the first area has a changed location; performing a second loudspeaker autolocation process of automatically determining the changed location;

updating the rendering process is based, at least in part, on the changed location; and storing the changed location in the data structure associated with the first route.

EEE28. The audio session management method of EEE25, further comprising:

determining that at least one additional audio device has been moved to the first area;

performing a second loudspeaker autolocation process of automatically determining an additional audio device location of the additional audio device;

updating the rendering process is based, at least in part, on the additional audio device location; and storing the additional audio device location in the data structure associated with the first route.

EEE29. The audio session management method of any one of EEE16-EEE28, wherein the first route initiation request indicates at least a first person as a first route source or a first route destination.

EEE30. The audio session management method of any one of EEE16-EEE29, wherein the first route initiation request indicates at least a first service as the first audio source.

EEE31. An apparatus configured to perform the method of any one of EEE16-EEE30.

EEE32. A system configured to perform the method of any one of EEE16-EEE30.

EEE33. One or more non-transitory media having software encoded thereon, the software including instructions for controlling one or more devices to perform the method of any one of EEE16-EEE30.

Some disclosed implementations include a system or device configured (e.g., programmed) to perform some or all of the disclosed methods, and a tangible computer readable medium (e.g., a disc) which stores code for implementing some or all of the disclosed methods or steps thereof. Some disclosed systems can be or include a programmable general purpose processor, digital signal processor, or microprocessor, programmed with software or firmware and/or otherwise configured to perform any of a variety of operations on data, including implementations of some or all of the disclosed methods or steps thereof. Such a general purpose processor may be or include a computer system including an input device, a memory, and a processing subsystem that is programmed (and/or otherwise configured) to perform some or all of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of some or all of the disclosed methods. Alternatively, or additionally, some embodiments (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including some or all of the disclosed methods. Alternatively, or additionally, elements of some embodiments may be implemented as a general purpose processor or DSP configured (e.g., programmed) to perform some or all of the disclosed methods, and the system may also include other elements (e.g., one or more loudspeakers and/or one or more microphones). A general purpose processor configured to perform some or all of the disclosed method may, in some examples, be coupled to an input device (e.g., a mouse and/or a keyboard), a memory, and a display device.

Some implementations of the present disclosure may be, or may include, a computer readable medium (for example, a disc or other tangible storage medium) which stores code for performing (e.g., coder executable to perform) some or all of the disclosed methods or steps thereof.

While specific embodiments and applications have been described herein, it will be apparent to those of ordinary skill in the art that many variations on the embodiments and applications described herein are possible without departing from the scope of the material shown, described and claimed herein. It should be understood that while certain implementations have been shown and described, the present disclosure is not to be limited to the specific embodiments described and shown or the specific methods described.

The invention claimed is:

1. An audio session management method for an audio system of an audio environment, the audio session management method comprising:

establishing a first smart audio device communication link between an audio session manager and at least a first smart audio device of the audio system, the first smart audio device comprising either a single-purpose audio device or a multi-purpose audio device, the first smart audio device including one or more loudspeakers;

establishing a first application communication link between the audio session manager and a first application device executing a first software application, wherein the first software application is configured to provide media via a cloud-based service;

determining, by the audio session manager, one or more first media engine capabilities of a first media engine of the first smart audio device, the first media engine being configured for managing one or more audio media streams received by the first smart audio device and for performing first smart audio device signal processing for the one or more audio media streams according to a first media engine sample clock;

receiving, by the audio session manager and via the first application communication link, first application control signals from the first software application; and controlling the first smart audio device according to the first media engine capabilities, by the audio session manager, via first audio session management control signals transmitted to the first smart audio device via the first smart audio device communication link, the first audio session management control signals being responsive to the first application control signals, wherein the audio session manager transmits the first audio session management control signals to the first smart audio device without reference to the first media engine sample clock.

2. The audio session management method of claim 1, wherein the first application communication link is established in response to a first route initiation request from the first application device.

3. The audio session management method of claim 1, wherein the first application control signals are transmitted from the first software application without reference to the first media engine sample clock.

4. The audio session management method of claim 1, wherein the first audio session management control signals cause the first smart audio device to delegate control of the first media engine to the audio session manager.

5. The audio session management method of claim 1, wherein a device other than the audio session manager or the first smart audio device is configured for executing the first software application.

6. The audio session management method of claim 1, wherein the first smart audio device is configured for executing the first software application.

7. The audio session management method of claim 1, wherein the first smart audio device includes a specific purpose audio session manager and wherein the audio session manager communicates with the specific purpose audio session manager via the first smart audio device communication link.

8. The audio session management method of claim 7, wherein the audio session manager obtains the one or more first media engine capabilities from the specific purpose audio session manager.

9. The audio session management method of claim 1, wherein the audio session manager acts as a gateway for all applications controlling the first media engine, whether the applications are running on the first smart audio device or on another device.

10. The audio session management method of claim 1, further comprising establishing at least a first audio stream corresponding to a first audio source, the first audio stream including first audio signals.

11. The audio session management method of claim 10, wherein establishing at least the first audio stream involves causing, via first audio session management control signals transmitted to the first smart audio device via the first smart audio device communication link, the first smart audio device to establish at least the first audio stream.

12. The audio session management method of claim 10, further comprising a rendering process that causes the first audio signals to be rendered to first rendered audio signals.

13. The audio session management method of claim 12, wherein the rendering process is performed by the first smart audio device in response to the first audio session management control signals.

14. The audio session management method of claim 12, further comprising:

causing, via the first audio session management control signals, the first smart audio device to establish an inter-smart audio device communication link between the first smart audio device and each of one or more other smart audio devices of the audio environment; and causing the first smart audio device to transmit one or more of raw microphone signals, processed microphone signals, rendered audio signals or unrendered audio signals to the one or more other smart audio devices via the inter-smart audio device communication link or the inter-smart audio device communication links.

15. The audio session management method of claim 1, further comprising:

establishing a second smart audio device communication link between the audio session manager and at least a second smart audio device of the audio system, the second smart audio device comprising either a single-purpose audio device or a multi-purpose audio device, the second smart audio device including one or more microphones;

determining, by the audio session manager, one or more second media engine capabilities of a second media engine of the second smart audio device, the second media engine being configured for receiving microphone data from the one or more microphones and for performing second smart audio device signal processing on the microphone data; and controlling the second smart audio device according to the second media engine capabilities, by the audio session manager, via second audio session manager control signals transmitted to the second smart audio device via the second smart audio device communication link.

16. The audio session management method of claim 15, wherein controlling the second smart audio device involves:

causing the second smart audio device to establish an inter-smart audio device communication link between the second smart audio device and the first smart audio device; and causing the second smart audio device to transmit at least one of processed or unprocessed microphone data from the second media engine to the first media engine via the inter-smart audio device communication link.

17. The audio session management method of claim 15, wherein controlling the second smart audio device involves:

receiving, by the audio session manager and via the first application communication link, first application control signals from the first software application; and determining the second audio session manager control signals according to the first application control signals.

18. An apparatus, comprising:

an interface system; and a control system configured to implement an audio session manager, the control system being further configured to:

establish, via the interface system, a first smart audio device communication link between the audio session manager and at least a first smart audio device of an audio system, the first smart audio device comprising either a single-purpose audio device or a multi-purpose audio device, the first smart audio device including one or more loudspeakers;

establish, via the interface system, a first application communication link between the audio session manager and a first application device executing a first software application, wherein the first software application is configured to provide media via a cloud-based service;

determine one or more first media engine capabilities of a first media engine of the first smart audio device, the first media engine being configured for managing one or more audio media streams received by the first smart audio device and for performing first smart audio device signal processing for the one or more audio media streams according to a first media engine sample clock;

receive, by the audio session manager and via the first application communication link, first application control signals from the first software application; and control, by the audio session manager and via first audio session management control signals transmitted to the first smart audio device via the first smart audio device communication link, the first smart audio device according to the first media engine capabilities, the first audio session management control signals being responsive to the first application control signals, wherein the audio session manager transmits the first audio session management control signals to the first smart audio device without reference to the first media engine sample clock.

19. A system that includes the apparatus of claim 18.

20. One or more non-transitory media having software encoded thereon, the software including instructions for controlling one or more devices to perform an audio session management method for an audio system of an audio environment, the audio session management method comprising:

establishing a first smart audio device communication link between an audio session manager and at least a first smart audio device of the audio system, the first smart audio device comprising either a single-purpose audio device or a multi-purpose audio device, the first smart audio device including one or more loudspeakers;

establishing a first application communication link between the audio session manager and a first application device executing a first software application, wherein the first software application is configured to provide media via a cloud-based service;

determining, by the audio session manager, one or more first media engine capabilities of a first media engine of the first smart audio device, the first media engine being configured for managing one or more audio media streams received by the first smart audio device and for performing first smart audio device signal processing for the one or more audio media streams according to a first media engine sample clock;

receiving, by the audio session manager and via the first application communication link, first application control signals from the first software application; and controlling the first smart audio device according to the first media engine capabilities, by the audio session manager, via first audio session management control signals transmitted to the first smart audio device via the first smart audio device communication link, the first audio session management control signals being responsive to the first application control signals, wherein the audio session manager transmits the first audio session management control signals to the first smart audio device without reference to the first media engine sample clock.

* * * * *